US012103796B2

(12) United States Patent
Felton et al.

(10) Patent No.: US 12,103,796 B2
(45) Date of Patent: Oct. 1, 2024

(54) AUTONOMOUS MULTI-TIER RACKING AND RETRIEVAL SYSTEM FOR DELIVERY VEHICLE

(71) Applicant: Monotony.ai, Inc., Newton, MA (US)

(72) Inventors: Samuel M. Felton, Belmont, MA (US); Benjamin D. Bixby, Newton Highlands, MA (US); Wilson J. Mefford, Somerville, MA (US); Stuart E. Schechter, Newton, MA (US); Jesse Sielaff, Norfolk, MA (US); Madeline R. Hickman, Arlington, MA (US)

(73) Assignee: MONOTONY.AI, INC., Watertown, MA (US)

( * ) Notice: Subject to any disclaimer, the term of this patent is extended or adjusted under 35 U.S.C. 154(b) by 443 days.

(21) Appl. No.: 17/504,988

(22) Filed: Oct. 19, 2021

(65) Prior Publication Data

US 2022/0119210 A1 Apr. 21, 2022

Related U.S. Application Data

(60) Provisional application No. 63/191,012, filed on May 20, 2021, provisional application No. 63/093,785, filed on Oct. 19, 2020.

(51) Int. Cl.
*B65G 67/24* (2006.01)
(52) U.S. Cl.
CPC .................................. *B65G 67/24* (2013.01)
(58) Field of Classification Search
CPC ..................................................... B65G 67/24
(Continued)

(56) References Cited

U.S. PATENT DOCUMENTS

| 2,832,636 A | 4/1958 | Black |
| 4,139,109 A | 2/1979 | Murphy |

(Continued)

FOREIGN PATENT DOCUMENTS

| AT | 14048 U1 | 3/2015 |
| DE | 19802761 A1 | 7/1999 |

(Continued)

OTHER PUBLICATIONS

International Search Report and Written Opinion for PCT/US2021/055566 mailed Feb. 7, 2022, 17 pages.

(Continued)

*Primary Examiner* — Saul Rodriguez
*Assistant Examiner* — Willie W Berry, Jr.
(74) *Attorney, Agent, or Firm* — Myers Bigel, P.A.

(57) ABSTRACT

An autonomous racking system for use with a mobile delivery vehicle includes an array of flow racks configured to receive thereon a plurality of containers each of which associated with a single customer and a plurality of pushers configured to push each one of the containers past a front end of the array. An elevator abuts the front end of the array to receive one or more containers from at least one of the array and a vehicle side access portal, and to deliver one or more containers to one or more of the plurality of flow racks from the portal. The elevator comprises a plurality of loading pushers configured to push a container off of the movable carriage and onto the array. A controller is operable communication with a plurality of pusher drives, an elevator drive motor, and one or more elevator position sensors.

34 Claims, 81 Drawing Sheets

(58) Field of Classification Search
USPC .......................................................... 414/507
See application file for complete search history.

(56) References Cited

U.S. PATENT DOCUMENTS

| | | |
|---|---|---|
| 4,701,086 A | 10/1987 | Thorndyke |
| 5,092,721 A | 3/1992 | Prince |
| 5,915,913 A | 6/1999 | Greenlaw et al. |
| 5,931,262 A | 8/1999 | Greenlaw et al. |
| 2008/0089769 A1 | 4/2008 | Cook |
| 2016/0318722 A1* | 11/2016 | Cervelli .................. B65F 3/001 |
| 2019/0143872 A1* | 5/2019 | Gil ............................ B60P 1/54 |
| | | 211/86.01 |
| 2019/0287051 A1 | 9/2019 | Heinla |
| 2020/0209865 A1 | 7/2020 | Jarvis et al. |
| 2020/0265665 A1 | 8/2020 | Nandakumar |
| 2020/0270066 A1 | 8/2020 | Almogy et al. |
| 2020/0317340 A1 | 10/2020 | Gil et al. |
| 2020/0376670 A1 | 12/2020 | Diankov et al. |

FOREIGN PATENT DOCUMENTS

| | | |
|---|---|---|
| EP | 3511886 A1 | 7/2019 |
| WO | 2014092145 A1 | 6/2014 |
| WO | 2020104568 A1 | 5/2020 |

OTHER PUBLICATIONS

Storage-retrieval machine for bins, cartons and trays—Schafer Miniload Crane, uploaded from YouTube: https://www.youtube.com/watch?v=NRO98Rm58-k, Jan. 26, 2015.

\* cited by examiner

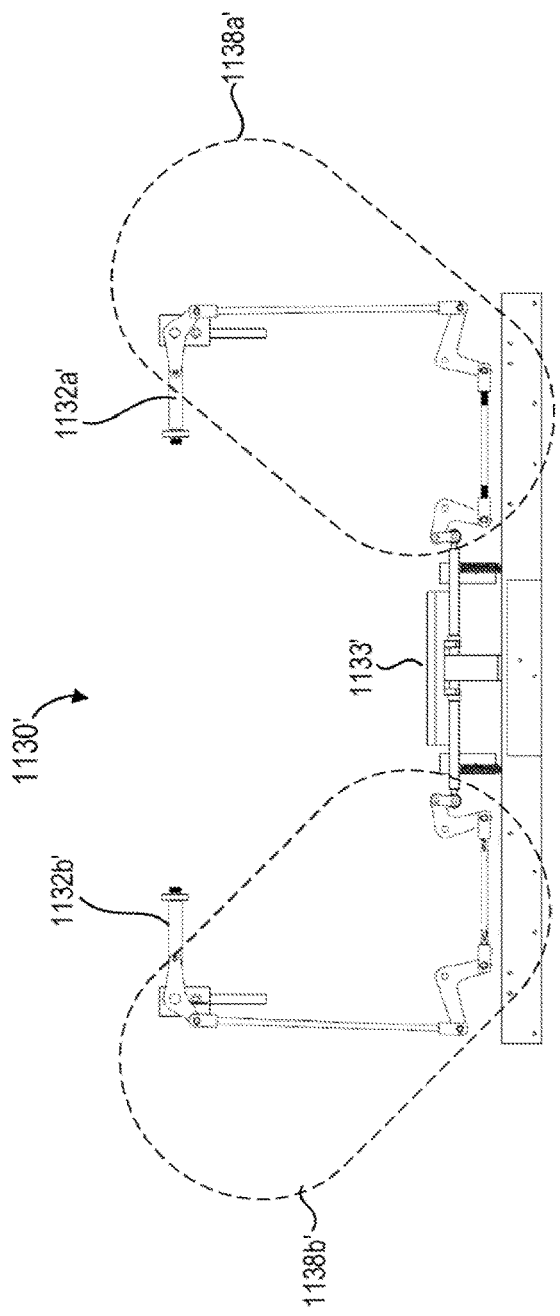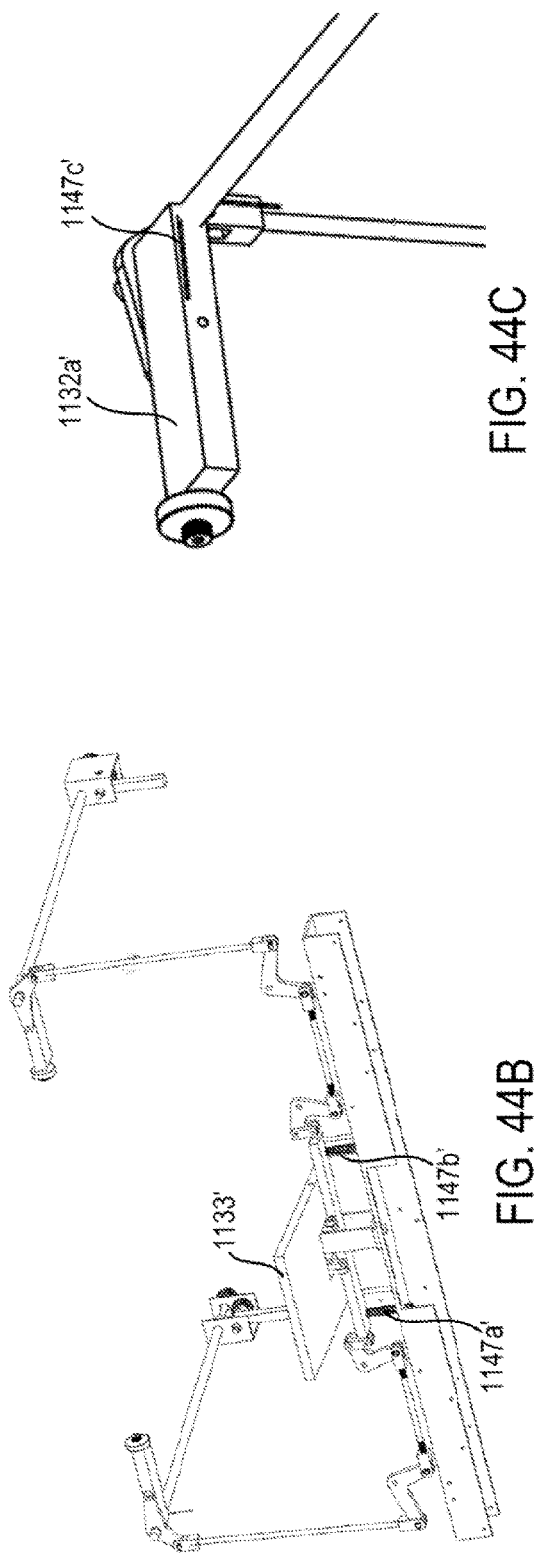

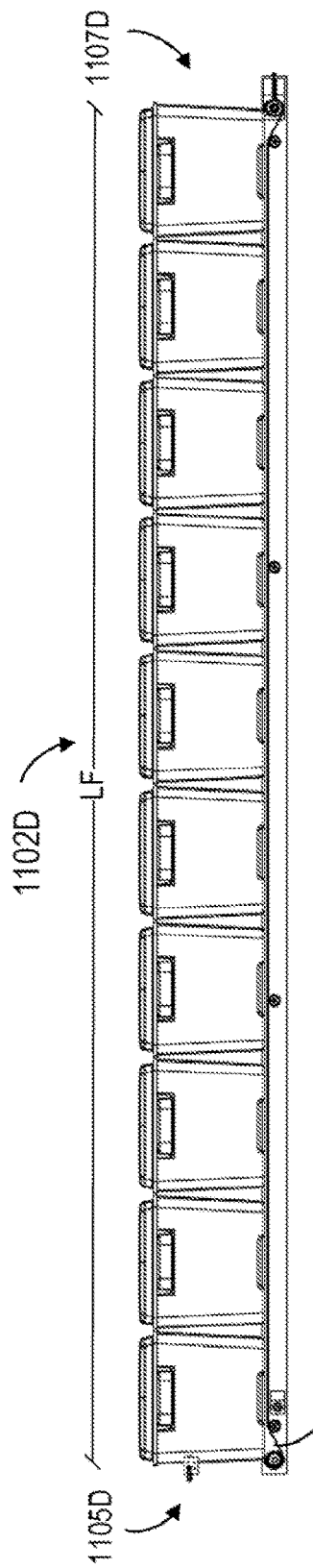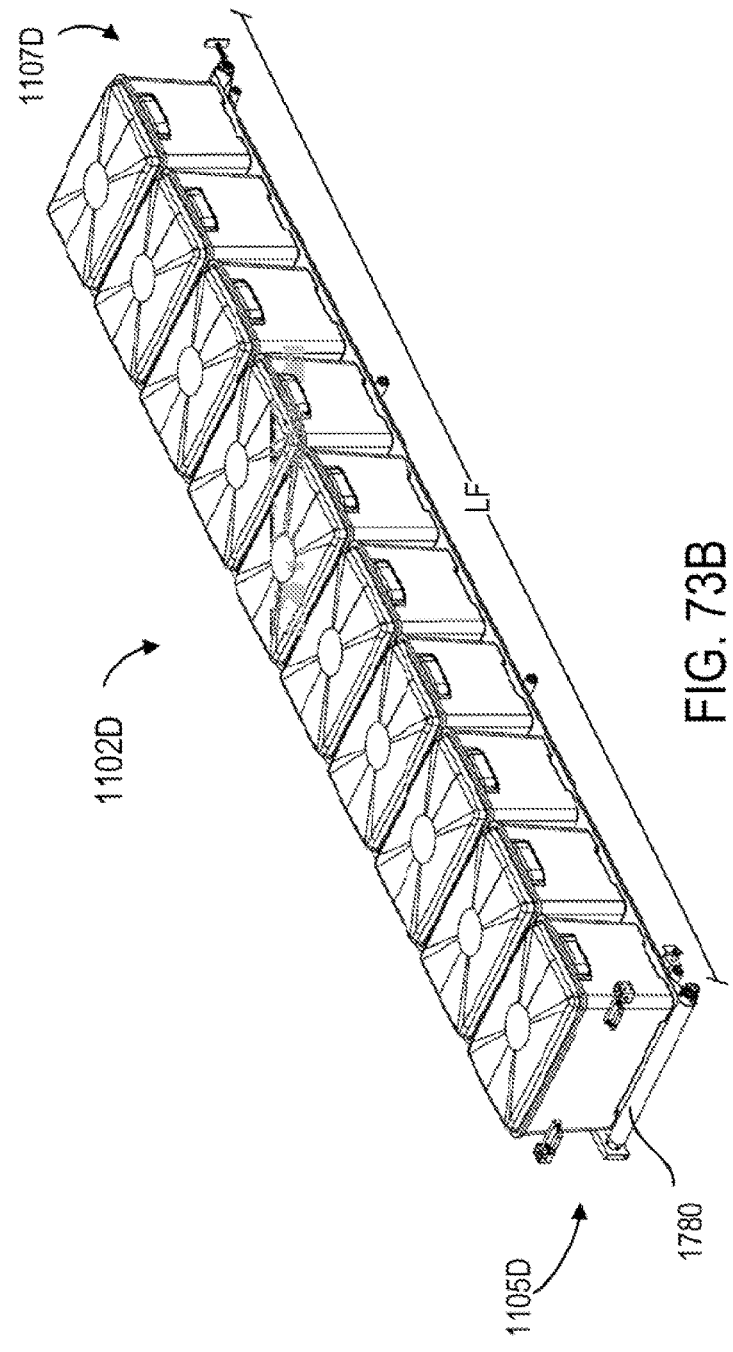

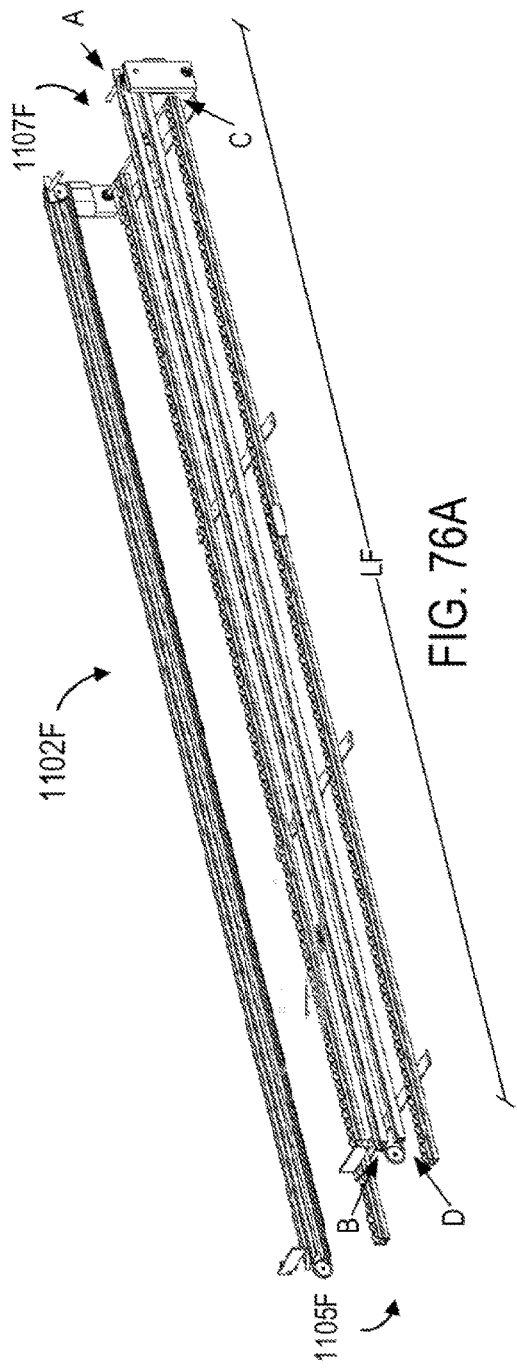
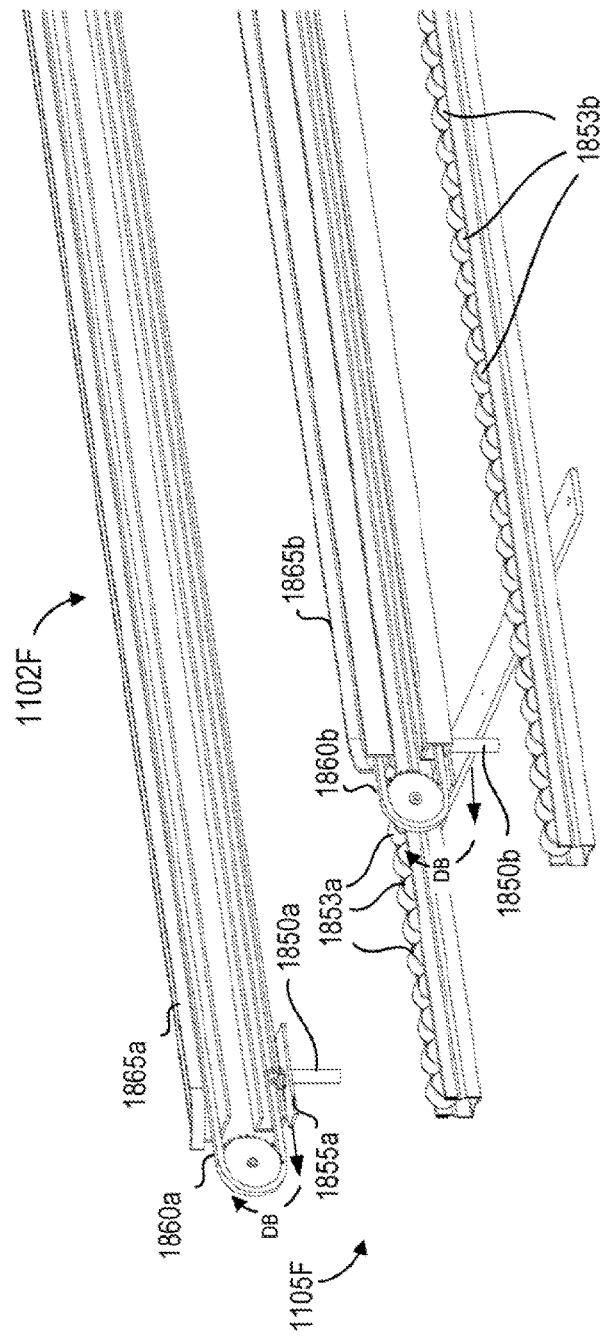
FIG. 76A
FIG. 76B

AUTONOMOUS MULTI-TIER RACKING AND RETRIEVAL SYSTEM FOR DELIVERY VEHICLE

CROSS-REFERENCE TO RELATED APPLICATIONS

This application claims priority under 35 U.S.C. § 119(e) to U.S. Provisional Patent Application Ser. No. 63/093,785 filed Oct. 19, 2020, titled "Autonomous Multi-Tier Racking and Retrieval System for Delivery Vehicle," and U.S. Provisional Patent Application Ser. No. 63/191,012 filed May 20, 2021, titled "Autonomous Multi-Tier Racking and Retrieval System for Delivery Vehicle," the entirety of each of which applications is hereby incorporated by reference.

BACKGROUND

The present disclosure is directed to autonomous multi-tier racking and retrieval devices, systems, and methods for integration with an autonomous robotic laundry service.

Automating and outsourcing mundane, time-consuming household chores to robotic devices is increasingly common. Time saving home robots include, for example, floor vacuuming and floor washing robots. Outsourcing responsibilities include, for example, engaging grocery shopping and delivery services, and manually operated and human-operator dependent laundry washing and dry-cleaning pick up and return services.

Many homes are appointed with a dedicated washer and dryer for family use. Domestic washers and dryers are increasingly sophisticated and include IoT connectivity features and push notifications for alerting users about cycle progress and energy and resource usage. These technologically advanced machines, however, require human interaction and cannot eliminate the time required for processing loads of laundry in the home. Although more modern, "high efficiency" machines are equipped with sensors for metering water usage and dryer temperatures, the efficiency gains are capped by the constraints of sequentially processing single loads of laundry. Grey water is output to the city water and sewer system for mitigation with each load of laundry processed. Energy is consumed with each load of laundry washed and dried.

Households can outsource laundry chores to laundromat facilities for a fee in exchange for time. Laundromats offering residential mixed load laundering services, however, require human interaction for intake and sorting of dirty laundry, transferring loads from washer to dryer, and then manually folding clean laundry. These are costly processes as measured in time, energy consumption, water consumption, and wastewater output, and they rely on human intervention to keep the process running at every transition and throughout several process steps. This invites delays at every stage. Because these processes are human-dependent and inefficient, the costs are passed along to customers outsourcing their laundry for cleaning. Human-reliant laundering services also require that employees touch the belongings of the customer, potentially exposing the employee to contaminants in the dirty laundry and potentially exposing the clean laundry to transferable pathogens, dust, hair, and other debris emanating from a laundromat employee. In addition to potentially introducing undesirable contact contamination from the employees processing the loads of laundry, a privacy barrier is breached. Outsourcing household laundry to a laundromat involves employees interacting with customers' personal belongings including bodily worn garments.

Industrial laundry services exist for handling uniform business-related items, such as hospital bed sheets, medical scrubs, and hotel towels. Such industrial machines are tailor-made to accept one type of laundry item of one size or style. For example, unique folding machines exist to accept a dedicated one of washed flat sheets, fitted sheets, hotel towels, and hotel bathrobes. These machines require human operators to load the washed article into its dedicated machine, which is sized and designed to fold that one type and size of article. This type of process line relies on a human operator for properly aligning and loading the clean article into the machine, which could introduce bodily contaminants, bacteria, and viral matter into the clean articles. Like laundromat services, these industrial services rely on human intervention and potentially introduce bio-contaminants into clean loads of laundry. Because these services are only profitable by processing large volumes of like items, these industrial processors are generally subscription-based services for large clients like hotels and hospitals producing standard-size, repeat laundry articles and are not available to consumers at an individual household level. Additionally, these services are configured to combine laundry from more than one source and are not configured to isolate and process separate loads for individual households.

Returning personal belongings from a subscribed service facility requires care so that personal items, such as a customer's clothing, are not lost or damaged. Returning such daily worn articles to customers in a timely, efficient manner is a high priority for maintaining customer satisfaction. Because loads of household laundry can be heavy and copious, pick up and delivery systems must attend to the challenges associated with lifting, racking, and unloading variable numbers of containers and container weights for each customer.

Autonomous robotic devices and systems are provided to process and handle loads of household laundry and efficiently return clean loads of household laundry to one or more customers. Such devices eliminate direct human contact with deformable laundry articles and minimize physical burdens associated with delivery services. As such, the devices and systems are designed to be efficient and reliable for replacing the common, human-dependent chores of laundry processing, and loading and unloading delivery vehicles.

SUMMARY

In one example, an autonomous racking system for use with a mobile delivery vehicle, includes an array of flow racks, an elevator abutting the front end (e.g., loading/unloading access end) of the array of flow racks, and a controller in operable communication with one or more motor drivers and memory stores. The array of flow racks includes a plurality of rows and a plurality of columns, each one of the flow racks of the array of flow racks configured to receive thereon a plurality of containers each associated with a single household. The array of flow racks includes a plurality of unloading pushers. Each one of the plurality of unloading pushers is disposed at a back end of one or more of the plurality of containers disposed on each of the flow racks the array and being configured to push each one of the plurality of containers past a front end of the array of flow racks. A plurality of unloading pusher drives are in operable communication with one of the plurality of unloading pushers for moving the corresponding one of the unloading pushers toward the front end of the array of flow racks. The elevator is configured to receive one or more containers from at least one or more of the plurality of flow racks and a vehicle side access portal, and deliver one or more containers to one or more of the plurality of flow racks. The elevator includes a movable carriage extending across the plurality of columns. The movable carriage is in operable communication with an elevator drive motor configured to move the carriage up and down to align a carriage support surface with at least of one of the plurality of rows and a lower edge of the vehicle side access portal disposed in a range of between about 0.25 to 2.25 meters from a ground upon which the delivery vehicle is disposed. The elevator includes one or more elevator position sensors configured to detect a vertical location of the movable carriage and output a position signal, a plurality of loading pushers, each one of which is aligned with one of the plurality of columns and configured to push a container off of the movable carriage and onto one of the aligned plurality of columns, and a plurality of loading pusher drives. Each one of the loading pusher drives is in operable communication with one of the plurality of loading pushers for moving the corresponding one of the loading pushers toward the front end of the array of flow racks. The controller is in operable communication with plurality of unloading pusher drives, the plurality of loading pusher drives, the drive motor of the movable carriage, and the one or more elevator position sensors. The controller is configured to instruct the drive motor to move the movable carriage to align the carriage support surface with one of the plurality of rows, receive the position signal, and determine whether the carriage support surface is aligned with the one of the plurality of rows.

Implementations of the system may include one or more of the following features.

In examples, the controller is further configured to instruct a drive of the one of the plurality of unloading pushers associated with the aligned one of the plurality of rows and one of the plurality of columns to retract by a distance equal to a depth of a container, and instruct a drive of an opposing one of the one of the plurality of loading pushers associated with the one of the plurality of columns to advance the one of the plurality of loading pushers to the front end of the array.

In examples, the controller is further configured to instruct a drive of the one of the plurality of unloading pushers associated with the aligned one of the plurality of rows and one of the plurality of columns to advance by a distance equal to a depth of a container.

In examples, the flow racks include a movable support for receiving one or more of the plurality of containers thereon. In implementations, the movable support comprises a conveyor configured to rotate toward the front end of the array. The conveyor can be motor driven and configured to operate simultaneously with the unloading pusher drive motor. Alternatively, the conveyor can be configured to rotate upon application of force from an associated one of the plurality of pushers to one or more of the plurality of containers disposed on the conveyor. In implementations, the movable support comprises a plurality of rollers disposed continuously along the length of each one of the array of flow racks, the plurality of rollers being configured to roll one or more of the plurality of containers disposed thereon toward the front end. The plurality of rollers rotate freely under application of a push force. Additionally or alternatively, the plurality of rollers can be interconnected to rotate simultaneously. In implementations, the plurality of rollers rotate under an application of pushing force from an associated one of the plurality of unloading pushers.

In examples, the plurality of rows comprises 3 rows and the plurality of columns comprises 3 columns.

In examples, the array has a length extending substantially parallel to a length of a transport volume of the delivery vehicle and a width extending substantially perpendicular to the length of the transport volume and substantially parallel to one or more vehicle wheel axles. The movable carriage has a longitudinal axis substantially perpendicular to the length of the transport volume and substantially parallel to the one or more vehicle wheel axles. In implementations, each flow rack of the array of flow racks is interlinked by at least one shared structural beam along the length of the array with at least one other adjacent flow rack of the array of flow racks.

In examples, each flow rack of the array of flow racks further includes a movable stop gate disposed at the front end and configured to restrain one or more racked containers. In examples, the system further includes a stop gate motor in operable communication with the controller, the stop gate motor being configured to retract the movable stop gate upon the controller instructing a corresponding one of the plurality of unloading pusher drives to move the associated pusher toward the front end. In implementations, the stop gate motor includes at least one of a servo motor and a linear motor.

In examples, each one of the plurality of unloading pushers comprises a contact face configured to engage a back wall of a container disposed at the back end of the one or more of the plurality of containers disposed on each of the flow racks the array. The contact face includes a contact material that is at least one of durable, damping, and non-marking. The contact face is configured to enter the elevator upon pushing the container disposed at the back end of a flow rack on the elevator.

In examples, each one of the plurality of unloading pusher drives includes a motor. Each one of the motors includes an operably linked encoder in communication with the controller and configured to output a signal indicative of pusher position between the front end and the back end.

In examples, the system further includes at least one rail disposed at a top of each flow rack of the array of flow racks. The at least one rail is configured to receive thereon in slidable engagement an associated one of the plurality of unloading pushers. In implementations, the at least one rail is configured to extend into the elevator.

In examples, a connector extends between each one of the plurality of pushers and a corresponding one of the plurality of unloading pusher drives. The connector can include a roller chain.

In examples, each one of the plurality of flow racks of the array of flow racks has a length extending parallel to a length of a transport volume of the delivery vehicle, and each one of the flow racks comprises a plurality of container positions along the length each configured to receive one of the plurality of containers. In implementations, the plurality of container positions comprises a range of between about 5-15 positions. In implementations, each one of the plurality of containers weighs between about 5 to 50 lbs. Each one of the plurality of containers weighs about 30 lbs. A collective weight of a plurality of containers disposed on the array of flow racks is in a range of between about 50 to 100 percent of the weight of a structure defining the array of flow racks. In such implementations, when the array of flow racks is empty of containers, the weight delta in the transport volume has no significant impact on performance of the vehicle 1000. In examples, each one of the plurality of containers comprises outer envelope dimensions of 12 inches by 22 inches by 14 inches.

In examples, each one of the plurality of containers comprises a matching bottom surface length and width so that they occupy identical surface areas on a flow rack. Additionally or alternatively, one or more of the plurality of containers includes one common dimension across the width of a flow rack and one or more variable dimensions comprising at least one of a height and a length parallel to the length LF of the array of flow racks.

In examples, each one of the plurality of containers is associated with a single customer. The array of flow racks is configured to receive one or more containers associated with one or more of a plurality of customers. Each one of the plurality of customers is associated with a physical location along a delivery and pickup route transited by the delivery vehicle. In implementations, the controller is further configured to record in a memory in wired or wireless communication with the controller each location in the array of flow racks of one or more containers associated with each one of the plurality of customers. The controller can be further configured to record in the memory which one or more containers have been unloaded from the array of flow racks along the route transited by the delivery vehicle. In examples, a delivery route transited by the delivery vehicle is predetermined based on an order in which the order in which each of the one or more containers associated with each one of the plurality of customers is received into the array of flow racks. Additionally or alternatively, in implementations, each of the containers comprises an identification marker for associating with one of the plurality of customers. The identification marker can include at least one of a machine-readable serial number, a machine-readable barcode, a machine-readable QR code, an RFID code, and a NFC tag. The system further includes one or more sensors disposed on at least one of the array, the elevator, and the vehicle side access portal, the one or more sensors being configured to detect the identification marker and output a signal to the controller indicative of the identification marker associated with a customer.

In examples, each container of the plurality of containers is rigid and reusable.

In examples, each container has an ingress protection rating of at least one of IP56, IP57, IP58, IP66, IP67, and IP68 in accordance with Ingress Protection Code, IEC standard 60529.

In examples, each container of the plurality of containers has two or more tapered sidewalls so that the surface area at the container top is larger than the surface area at the container bottom. In examples, the system further includes angled guides disposed on each flow rack of the array of flow racks that match the tapered sidewalls to hold each container upright.

In examples, the system further includes one or more sensors for detecting at least one of the loading and unloading of one or more of the plurality of containers on to at least one of the elevator and the array of flow racks. The one or more sensors can include at least one of an IR break beam sensor, an encoder, a limit switch, and a Hall-effect sensor. The one or more sensors can be disposed at least one of at the vehicle side access portal, at the front of each flow rack in the array of flow racks, and at each container dwell position along a length of each flow rack in the array of flow racks.

In examples, the elevator further includes a plurality of bidirectionally driven transfer wheels disposed at a transfer level and configured to move one or more containers across a width of the vehicle in a travel direction comprising at least one of travel from the elevator to the vehicle side access portal and travel from the vehicle side access portal onto an elevator position aligned with one of the plurality of columns. In examples, the carriage support surface includes a plurality of flow wheels configured to rotate in a direction parallel to a length of the transport volume of the delivery vehicle. The plurality of bidirectionally driven transfer wheels are configured to occupy gaps between adjacent ones of the plurality of flow wheels and protrude above a top surface of the plurality of flow wheels when the movable carriage is lowered to a loading and unloading height. The loading and unloading height is beneath the bottom row of the plurality of rows of flow racks such that the bidirectionally driven transfer wheels are not engaged with the flow wheels when the carriage support surface is aligned with the bottom row of the array of flow racks. In examples, the elevator further includes a drive motor for rotating the plurality of bidirectional transfer wheels.

In examples, the elevator further includes one or more sensors for detecting a columnar location of the container traveling from side to side on the plurality of bidirectional transfer wheels. The one or more sensors can include at least one of an IR break beam sensor, an encoder, a limit switch, and a hall sensor.

In examples, the elevator further includes at least one of an encoder and limit switches in communication the elevator drive motor and configured to output a signal to the controller while moving up and down, the output signal being indicative of vertical location of the carriage support surface relative the plurality of rows of flow racks.

In examples, each one of the plurality of unloading pusher drives comprises a motor. In implementations each one of the motors includes an operably linked encoder in communication with the controller and configured to output a signal indicative of pusher position between the front end and the back end.

In examples, a flow wheel of the movable carriage adjacent an edge abutting the front end of the array is at least one of larger than and higher than the remainder of the plurality of flow wheels of the carriage support surface such that a container disposed on the carriage support surface cannot roll back onto the front end of the array. Additionally or alternatively, in implementations, the carriage support surface further comprises a detent configured to retain a container loaded on the carriage support surface from the array of flow racks.

In examples, the plurality of loading pusher drives are configured to move each one of the plurality of loading pushers independently. Additionally or alternatively, in implementations, the plurality of loading pusher drives are configured to move all of the plurality of loading pushers simultaneously.

In examples, each one of the plurality of loading pusher drives includes a motor. In implementations, each one of the motors includes an operably linked encoder in communication with the controller and configured to output a signal indicative of one of two pusher positions.

In examples, the array of flow racks is configured to be disposed within an enclosed transport volume of the delivery vehicle.

In examples, the mobile delivery vehicle is configured to deliver and retrieve the plurality of containers from one or more customer destinations associated with a subscription delivery service. In implementations, each one of the retrieved plurality of containers is configured to contain dirty household laundry and each one of the delivered plurality of containers contains clean household laundry.

In examples, the controller is in wired or wireless communication with a communication network. The controller is configured to transmit and receive information to one or more remote devices regarding the receipt and disgorgement of the plurality of containers to and from the array of flow racks. The one or more remote devices can be a handheld Internet enabled device configured to receive input from a driver of the mobile delivery vehicle. Additionally or alternatively, the one or more remote devices can be a terminal or handheld device located at a laundering facility. In implementations, the one or more remote devices is at least one of a computer terminal and a handheld device located at a customer delivery and pickup location and configured to receive customer input.

In one example, a method of autonomously unloading a container from an array of racked containers disposed within a truck transport volume includes receiving at a controller a request for retrieving a container including an identifier. The controller is in operable communication with a memory storing one or more identifiers and associated rack column and row positions within the array, a drive of a plurality of pushers each positioned at one of a plurality of rows, an elevator drive configured to raise and lower a receiving surface, and one or more transverse drives configured to move a container across the receiving surface in alignment with the rack columns. The method includes identifying from the memory a rack and row position of the requested container, and determining whether the identified rack and row position is adjacent the elevator receiving surface. The method includes instructing a stop gate to open upon determining the identified rack and row position is adjacent the elevator receiving surface, and instructing a drive of a pusher of the plurality of pushers that is associated with the row position to advance the requested container from the identified column and rack position onto the receiving surface of the elevator. The method includes determining whether the identified column is adjacent an orifice of a truck transport volume, instructing an elevator to lower the receiving surface to alignment with the orifice upon determining the identified column is adjacent the orifice, and instructing the one or more transverse drives to advance the container through the orifice.

Implementations of the method may include one or more of the following features.

In examples, the method includes closing the stop gate once the requested container is received onto the receiving surface of the elevator. In examples, the controller is configured to receive one or more signals from a presence sensor disposed at least one of on and adjacent the receiving surface for detecting a presence of a container on the receiving surface. The presence sensor can be configured to output a signal to the controller via a communication network. The communication network can be at least of wired and wireless.

In examples, the method includes storing a datum in the memory indicative of the requested container being delivered to an associated household. The controller further can update in the memory an updated row and column position of one or more other containers in the row.

In examples, the method includes determining whether delivery is complete and iterating at identifying column and row position of a next container.

In examples, if the controller determines the requested container is not adjacent the receiving surface, the method further includes reshuffling one or more other containers within the array by identifying open spots in the array and pushing the one or more other containers off and onto the array via the elevator to occupy one or more rows including the identified open spots in the array. The method further includes identifying row and column positions of one or more open container positions within the array.

In examples, the receiving surface of the elevator is below a lowest support surface of the array during alignment with the orifice.

In examples, the identifier is at least one of a data marker stored in software and a detectable identifier configured to be detected communicated to the controller via output signal of a sensor disposed on the one or more racks of the array.

In one example, as system of interconnected vehicle racks for receiving, constraining, and disgorging a plurality of customer containers from front and back ends of a vehicle transport volume, includes a plurality of racks interconnected in a constrained array. Each rack includes a support surface configured to receive and transit a plurality of containers thereon between a back end of the rack and a front end of the rack, a movable pusher disposed at the back end of the rack, the movable pusher being configured to engage a back surface of a rear most container disposed on the surface and move bidirectionally between the back end and the front end, and at least one selectively deactivated stop gate disposed at a front of the rack for engaging a front surface of a front most container disposed on the surface, the stop gate configured to retain one or more containers on the support surface.

Implementations of the system may include one or more of the following features.

In examples, the movable pusher is further configured to drop away from the back end during unloading of one or more containers from the support surface out the back end of the rack.

In examples, the movable pusher is dropped away from the back end during unloading of one or more containers out the back end of the rack.

In examples, the at least one stop gate moves away from the front end and loses contact with the front most container when deactivated during retrieval of the front most container from the support surface.

In examples, the support surface includes a plurality of flow rollers. At least one flow roller of the plurality of flow rollers can be driven.

In examples, the support surface includes a driven conveyor.

In examples, the pusher is spring loaded and is driven at least one of manually or by a drive motor to transit wheels of the pusher along side rails of the rack.

In examples, the pusher includes a pull rope.

In examples, the pusher is manually operated and includes at least one of a crank, a chain, a belt, a rope, and a spring loaded connector configured to transit wheels of the pusher along channels extend between front and back ends of the rack.

In examples, the pusher includes a spring loaded hinge configured to lay the pusher flat of the back end.

In examples, the pusher includes at least one horizontally oriented bar configured to ride on a looped belt.

In examples, a container is configured to be loaded and unloaded out either the front or the back end of the rack without disrupting an order of one or more containers disposed on the support surface.

In examples, the pusher and the stop gate are configured to constrain one or more containers on the support surface and maintain an order of the one or more containers during loading, transport, and unloading out either of the front end or back end.

In examples, the system further includes a light to pick system configured to illuminate a light disposed on or adjacent to a rack containing a particular customer container for retrieving at a delivery destination.

In examples, the system further includes a controller in communication with the light to pick system for operating the light, the controller in communication with a memory storing ordered locations of one or more containers associated with a delivery destination along a delivery route.

In examples, the containers are at least one of rigid and a uniform size.

In examples, the system further includes at least one of a top rail configured to constrain a top surface of the containers disposed on the rack and a pair of side rails configured to be disposed adjacent the sides of the containers oriented perpendicular to the front and back ends of the rack.

In examples the plurality of racks are densely packed racks disposed in a dense array within the vehicle transport volume.

In examples, a controller is configured to identify an unloading rack at each delivery destination.

In examples, the system further includes one or more sensors disposed on the rack for detecting an ordered positions of one or more containers disposed on the support surface and a status of container positions as containers are loaded and unloaded from one or more racks, shifting the remaining containers thereon forward or backward on the rack without changing their relative order.

In examples, the system further includes at least one of a physical button disposed on the racks and a touch screen button on a user interface to communicate with a controller upon adding or removing a customer container from the rack.

In examples, the user interface is configured to receive an input indicative of a number of boxes added or removed from a rack, the rack location in an array of racks, and a customer identifier (e.g., at least of a name, address, unique customer identification number, etc.).

In examples, a plurality of rigid containers disposed on the support surface each include two or more uniform dimensions including at least a length and width defining a footprint area of the containers.

In examples, densely packed includes a state of maximized occupancy of the plurality of containers within the vehicle transport volume. Each densely packed rack in an array of racks can share one or more structural support members with at least three other racks such that the tiers of racks are interconnected without free space therebetween. In examples, the one or more of the structural support members is secured to one or more structural support beams or surfaces of the transport volume such that the array is secured to prevent sliding, rotation, leaning or other structural compromise with loading, unloading, and transport within a moving vehicle along a delivery and pick up route.

In examples, a plurality of containers disposed on the support surface are densely packed to include small (e.g., less than 5 cm) or no gaps between container dwell locations along the length of the rack.

In examples, the racks support surface is configured to receive thereon a range of between about 5-15 containers.

In examples, each one of the containers disposed on the support surface weighs between about 5 to 50 lbs.

In examples, each one of the plurality of containers disposed on the rack includes outer envelope dimensions of at or around 12 inches by 22 inches by 14 inches.

BRIEF DESCRIPTION OF THE DRAWINGS

FIG. 33 depicts an alternate example of an autonomous racking system of the mobile delivery vehicle.

FIG. 34 depicts an alternate example of an autonomous racking system of the mobile delivery vehicle.

FIG. 44A depicts an end view of the flow gate of FIG. 43A in a closed state.

FIG. 44B depicts an implementation of one or more return springs disposed proximate a lever of the flow gate of FIG. 44A.

FIG. 44C depicts an implementation of a return spring disposed proximate a restraining arm of the flow gate of FIG. 44A.

FIG. 73A depicts a side view of the conveyor rack of FIGS. 72A-B with a side plate removed to show the conveyor drive and tensioning rollers.

FIG. 73B depicts a front perspective view of FIG. 73A.

FIG. 76A depicts a front perspective view of a side chain driven flow rack with bidirectional push tabs without containers disposed thereon and with various tab positions A-D labeled at top and bottom positions of only one side of the rack for clarity.

FIG. 76B depicts a close up of the front end of the rack of FIG. 76A.

DETAILED DESCRIPTION

Figure 1:
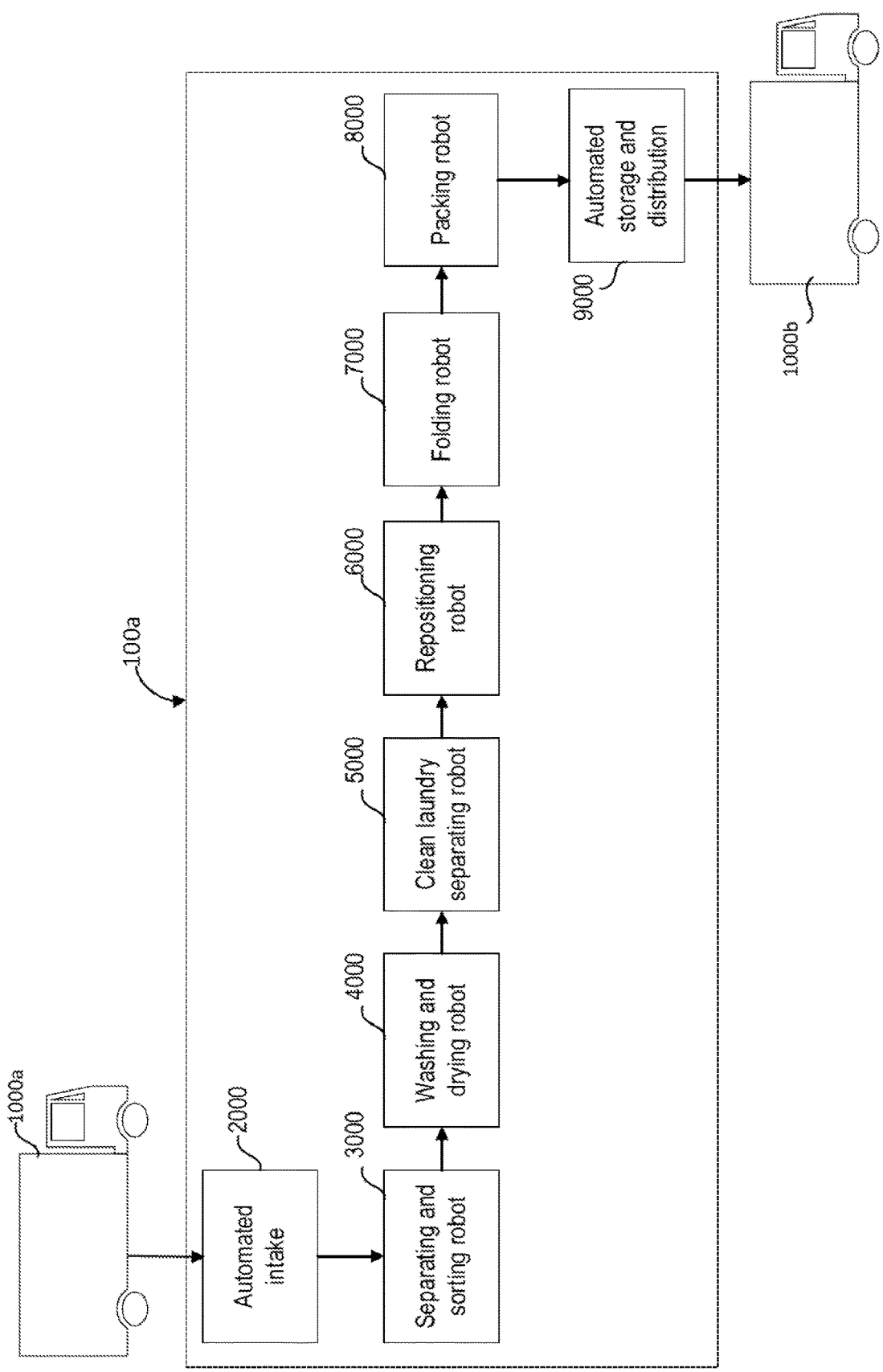
FIG. 1 depicts a schematic of an example autonomous robotic laundry process line comprising automated loading and unloading of transport vehicles.

This disclosure relates to autonomous robotic devices, systems, and methods for collecting, processing, and returning residential loads of laundry. An autonomous racking system for use with a mobile delivery vehicle is configured to transport a plurality of containers of laundry to and from a laundry processing facility. The facility comprises one or more autonomous process lines comprising a plurality of autonomous robotic devices configured to work in concert to process one or more dirty loads of household laundry from a collection of dirty, non-uniform articles to individually separated, cleaned, folded, and packed laundry articles. The one or more autonomous process lines include an autonomous intake system and autonomous storage and distribution system for interacting with the autonomous racking system of one or more of a plurality of mobile delivery vehicles in a fleet. The plurality of autonomous robotic devices and the autonomous racking system operate without human intervention to receive, launder, and redistribute a plurality of customers' loads of household laundry efficiently and effectively. In implementations, a mobile delivery vehicle comprises at least one of an electric vehicle and a hybrid electric vehicle for minimizing energy consumption and overall environmental impact. In implementations, the at least one of electric vehicles and hybrid electric vehicles employ regenerative breaking to charge batteries. Additionally or alternatively, rooftop solar powers on the at least one of electric vehicles and hybrid electric vehicles in a fleet provide clean energy to batteries of operating drive motors of the vehicles and automated racking, loading, and discharging systems contained therein. The efficient loading, routing, and unloading of containers enabled by the present invention further reduces environmental impact associated with operating delivery vehicles.

In implementations, the autonomous racking system includes a plurality of densely packed shelves and an automated elevator racking and retrieval device in wired or wireless communication with a controller configured to direct intelligent and autonomous racking and retrieval of one or more particularly identified customer containers matching a household location along a vehicle travel route. The autonomous racking system is designed for maximizing packing density to reduce delivery costs associated with driver labor and vehicle operation and maintenance. Maximizing packing density reduces the number of delivery vehicles and drivers required to retrieve and redistribute loads of laundry. The racking system is automated to enable speedy access to accurately identified containers, and faster delivery reduces driver hours and lower costs to customers subscribed to a laundry service. The autonomous intake, storage and distribution racking systems eliminate drivers exerting themselves through physical interaction with heavy containers and prevent lifting from ergonomically disadvantageous positions.

In other implementations, the autonomous racking system includes a plurality of densely packed flow racks or conveyors comprising guided rails for constraining the plurality of densely packed containers during loading, unloading, and transport. The autonomous racking system is designed for maximizing packing density to reduce delivery costs associated with driver labor and vehicle operation and maintenance. Maximizing packing density reduces the number of delivery vehicles and drivers required to retrieve and redistribute loads of laundry. More consolidated delivery reduces driver hours and lower costs to customers subscribed to a laundry service. As will be described subsequently with regard to implementations, the racking system eliminates drivers exerting themselves through extraneous physical interaction with heavy containers and prevent lifting from ergonomically disadvantageous positions.

In yet other implementations, the autonomous racking system includes a plurality of densely packed pallets containing an array of containers. The pallets maximize packing density and facilitate loading and unloading a mobile delivery vehicle as will be described subsequently with regard to implementations.

In implementations, as shown subsequently in Table 1, the autonomous racking system includes manual and automated flow rack systems as will be described subsequently. A manual system comprises at least one of a manual chain-driven flow rack, a manual spring driven flow rack, and a manual rope pull system for advancing one or more boxes out of a flow rack. An automated flow rack comprises at least one of a motorized chain-driven flow rack, a motorized spring-driven flow rack, a motorized belt conveyor, and motorized, side chain driven pushers. In implementations, an automated flow rack comprises at least one of a motorized flow rack driven comprising a belt drive, such as a time belt or round belt drive, particularly useful in vehicles with shorter transport volumes. The automated elevator racking and retrieval device can be implemented with any implementation of a motorized flow rack described herein with regard to implementations. Additionally, all pusher drop and spring eject mechanisms described herein are applicable for combined use with flow rack implementations described herein with the exception of a motorized belt conveyor implementation and a motorized side chain driven pushers.

All implementations herein are designed to address one or more of the following challenges associated with racking, transport, and unloading within and to/from a confined truck or van transport volume: Implementations of systems and devices presented herein are required to restrain one or more load customer boxes throughout physical disturbances associated with transport, starting, and stopping which maintaining one or more racked boxes in secured alignment and order. Implementations of systems and devices presented herein are required to move one or more customer boxes forward and backward along a flow rack on varying slopes, both positive and negative, associated with parking on residential city streets. Implementations of systems and devices presented herein not employing an automated elevator racking and retrieval device are required to accommodate removing individual customer boxes one at a time from one end (e.g., front of the rack to an internal transport volume) and accommodating individual or bulk removal of a plurality of customer boxes from the other end (e.g., back of the transport volume, out a rear door). All implementations of systems and devices presented herein are designed to function in a space-constrained environment associated with transport vehicles. All implementations of systems and devices presented herein are designed to function within weight limit restrictions associated with transport vehicles and account for weight shifting during loading and unloading and subsequent distribution of forces on transport vehicle axles. All implementations of manually operated systems and devices presented herein are designed to function under forces reasonably generated by a delivery person. All implementations of racking systems presented herein are designed for uninterrupted constraint of one or more containers remaining on a rack during removal of another container from the rack. Implementations of racks of the racking systems described herein are designed to be continually constraining of one or more containers disposed thereon. The continual constraint persists even during movement of the containers along a length of a rack such that a delivery person need not expend time and energy resecuring non-delivered containers at each delivery location. Additionally advantages will be presented throughout with regard to implementations.

As shown in FIG. 1, in implementations of the system, a process line 100*a* in a facility (e.g., a laundry cleaning facility) comprises a plurality of autonomous robots configured to operate in series without human intervention to process and transport dirty laundry through the cleaning process, folding and repackaging the clean laundry for return to a household. Dirty laundry is collected from customers using one or more mobile delivery vehicles 1000*a*, such as trucks or vans having loading racks (e.g., a plurality of flow racks) or pallets therein. In implementations, the mobile delivery vehicles 1000*a* are configured to contain flow racks and an intelligent, automated racking system therein. A customer places laundry in one or more containers received into the vehicle 1000*a*. When the vehicle 1000*a* arrives at the facility, the one or more containers of dirty laundry are automatically unloaded from the vehicle 1000*a* by an automated intake robot 2000 and provided to at least one separating and sorting robot 3000 and one or more intermediate queues configured to feed the at least one separating and sorting robot 3000. Such intermediate queues can comprise at least one of a first-in-first-out (FIFO) queue, an intelligent buffer rack, and an automated storage and retrieval system (ASRS) etc. In one implementation, the process line 100*a* comprises an automated intake robot 2000 for receiving a load of dirty household laundry comprising a plurality of deformable laundry articles from one or more delivery vehicles 1000*a*. The automated intake robot 2000 can comprise at least one of one or more automated rails, one or more rack surfaces, and one or more conveyors. In implementations, the back and/or side of the vehicle 1000*a* opens to allow automated retrieval of one or more containers. In implementations, the automated intake robot 2000 is configured to log and track the one or more containers upon receipt. In implementations, as will be described subsequently, a unique identifier (e.g., an identification marker) associated with and disposed on or in each of the containers is configured to be scanned at least one of wirelessly and visually and a location and state is updated in a memory store in communication with one or more controllers of the automated robots 1000-9000. While connected to a processing or distribution plant during unloading of the one or more containers, a vehicle 1000*a* may be simultaneously or sequentially re-fueled as needed by charging its internal batteries with electricity, swapping its batteries, and/or by supplying gasoline or another type of fuel.

The deformable laundry articles can be non-uniform in type, size, shape, color, and fabric. For example, the plurality of deformable laundry articles can include items commonly laundered in homes, such as sheets, towels, table cloths, and adult and children's garments, for example, tee shirts, pants, socks, undergarments, dresses, dress shirts, and blouses. The autonomous intake robot 2000 is configured to introduce the plurality of deformable laundry articles to a separating and sorting robot 3000 configured to separate out each one of the deformable laundry articles of the plurality of deformable laundry articles. In implementations, the separating and sorting robot 3000 is configured to sort each one of the separated deformable laundry articles into one or more related batches for washing. In implementations, the separating and sorting robot 3000 is configured to intelligently batch the separated each one of the deformable laundry articles according to a programmed sorting algorithm based, for example, on criteria including at least one of material color, material type, article size, customer washing preference, water temperature requirements, and load size (e.g., weight and/or physical volume). In implementations, the separating and sorting robot 3000 is configured to identify and record the number and types of garments in the load of laundry and provide this information to one or more robots of the process line 100*a*.

The separating and sorting robot 3000 outputs one or more intelligently sorted batches of deformable laundry articles to one or more washing and drying robots 4000 for laundering. The one or more washing and drying robots 4000 output the clean laundry articles to a clean laundry separating robot 5000. Implementations of the clean laundry separating robot 5000 can be similar or identical to the separating and sorting robot 3000. The clean laundry separating robot 5000 is configured to separate a load of clean laundry into individual deformable laundry articles for introduction into a repositioning robot 6000. In implementations, the repositioning robot 6000 receives a single deformable laundry article and manipulates and repositions it for automated introduction into a folding robot 7000, which automatically folds the laundry article for introduction to a packing robot 8000. In implementations, the packing robot 8000 automatically and autonomously packs the clean load of laundry comprising the plurality of clean and folded deformable laundry articles in a shipping container for automated redistribution to the customer. In implementations, the shipping container is a reusable container. In implementations, the shipping container is a disposable container. In implementations, the shipping container is a non-deformable container with an ingress protection rating that includes an intrusion protection rating of 5 or 6 and a moisture protection rating of any and all of 1 through 6 in accordance with the Ingress Protection Code, IEC standard 60529. In reusable implementations, the shipping container can be washable.

Figure 2:
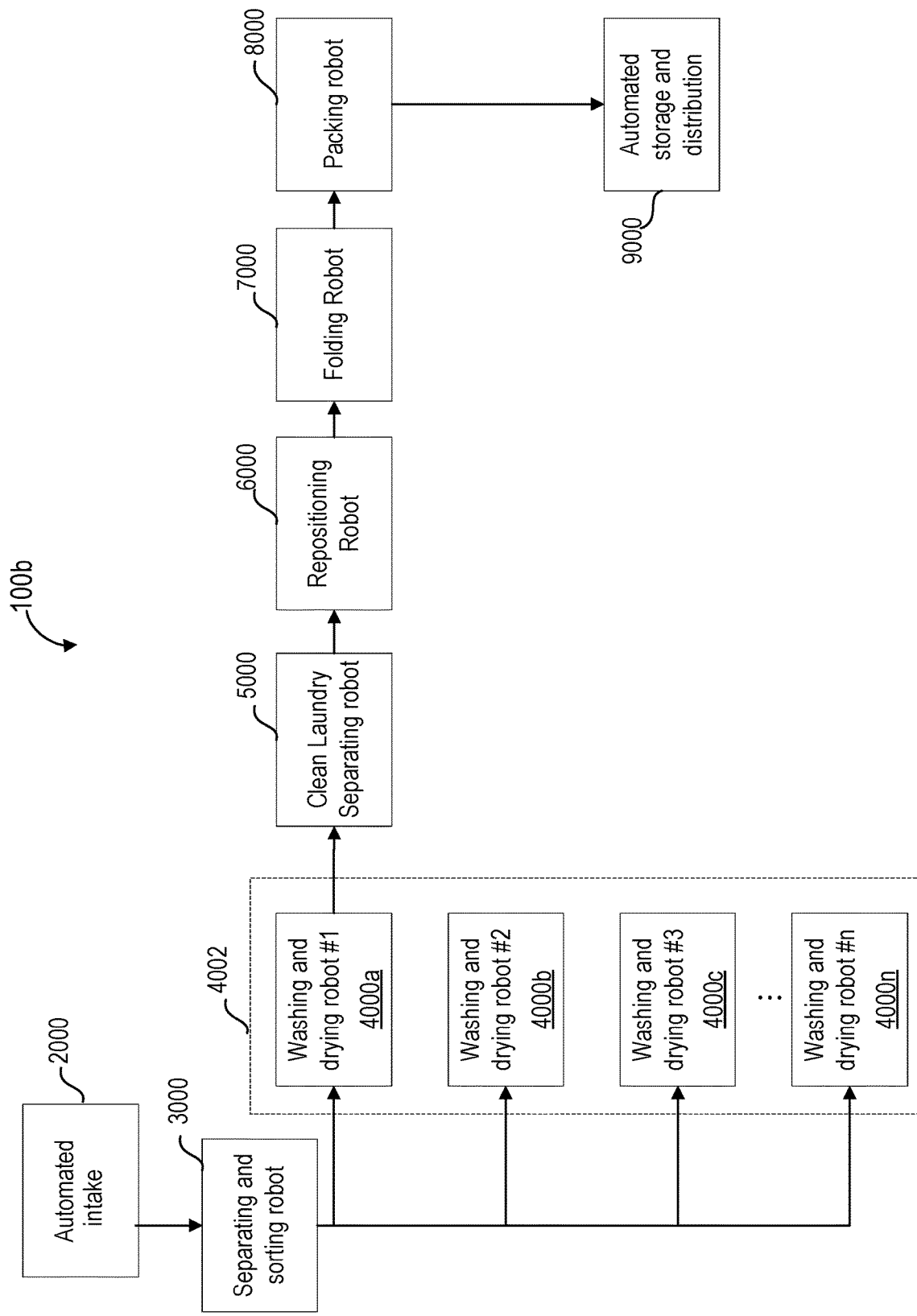
FIG. 2 depicts a schematic example of a system for controlling an autonomous robotic process line.
Figure 3:
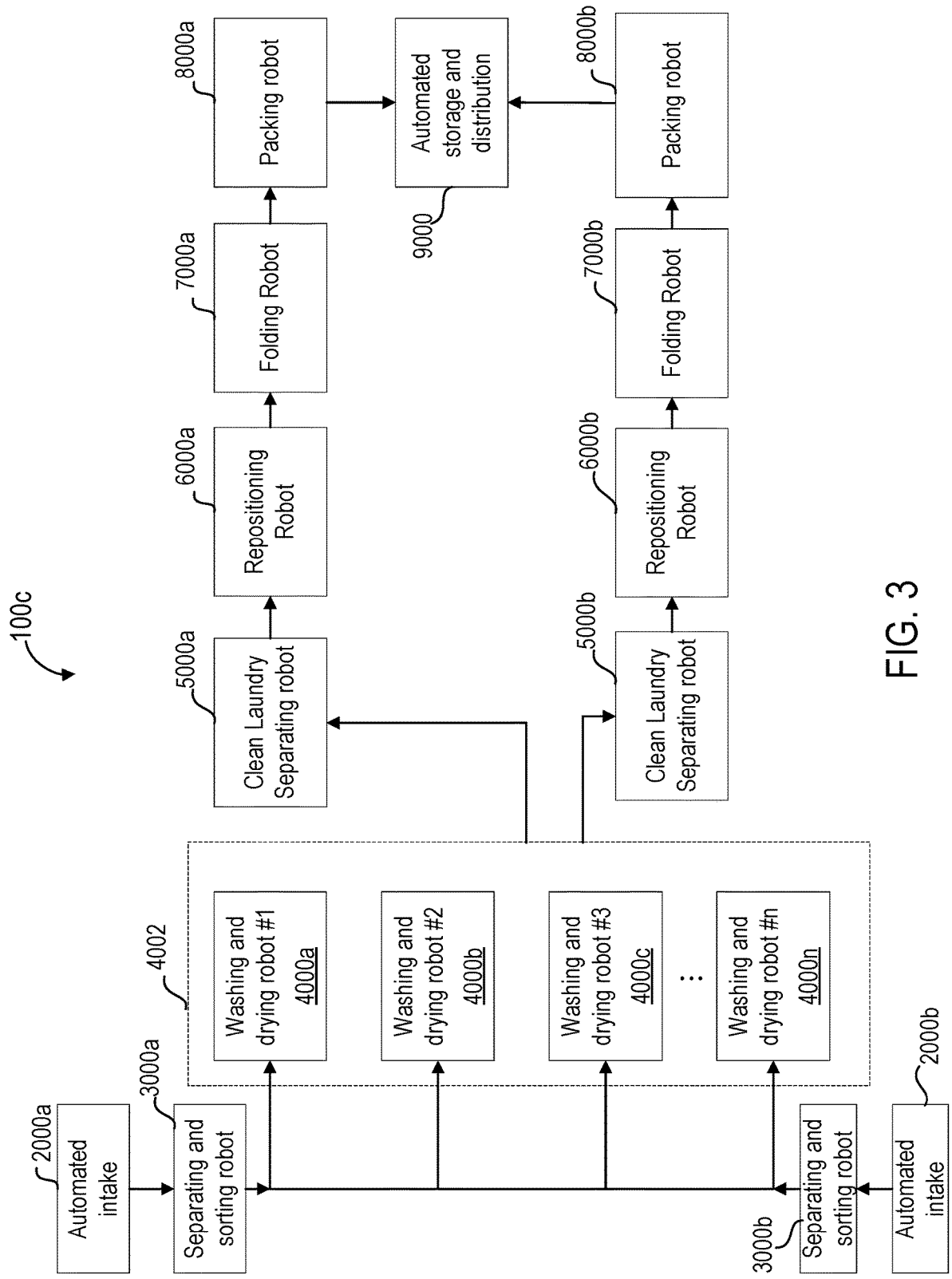
FIG. 3 depicts a schematic of a plurality of autonomous robotic laundry process lines including a plurality of intakes and outputs and a plurality of washing and drying robots.

Implementations of the process line 100*a* of household laundry cleaning robots can comprise one or more of each of the robots depicted in FIG. 1. For example, as shown in FIG. 2, each autonomous process line 100*b* can include a plurality, or cluster 4002, of washing and drying robots 4000*a-n* clustered together with shared services (e.g., water, wash chemicals, heat, dirty clothes delivery assembly and clean clothes carry off assembly). In other implementations, as shown in FIG. 3, the autonomous process line 100*c* includes a cluster 4002 of washing and drying robots 4000*a-n* shared by two or more sets of automated intake robots 2000*a-b* and dirty laundry separating and sorting robots 3000*a-b* and two or more sets of clean laundry separating robots 5000*a-b*, repositioning robots 6000*a-b*, folding robots 7000*a-b*, and packing robots 8000*a-b*. Additionally, two or more of the robots can be combined in a single module in alternate implementations. In implementations, one or more of the robots in the process line 100*a-c* are configured to communicate over wired connections or wireless communication protocols. For example, in implementations, one or more robots in the process line 100*a-c* can communicate with another one or more robots in the process line 100*a-c* over a wired BUS, LAN, WLAN, 4G, 5G, LTE, Ethernet, BLUETOOTH, or other IEEE 801.11 standard.

Figure 4:
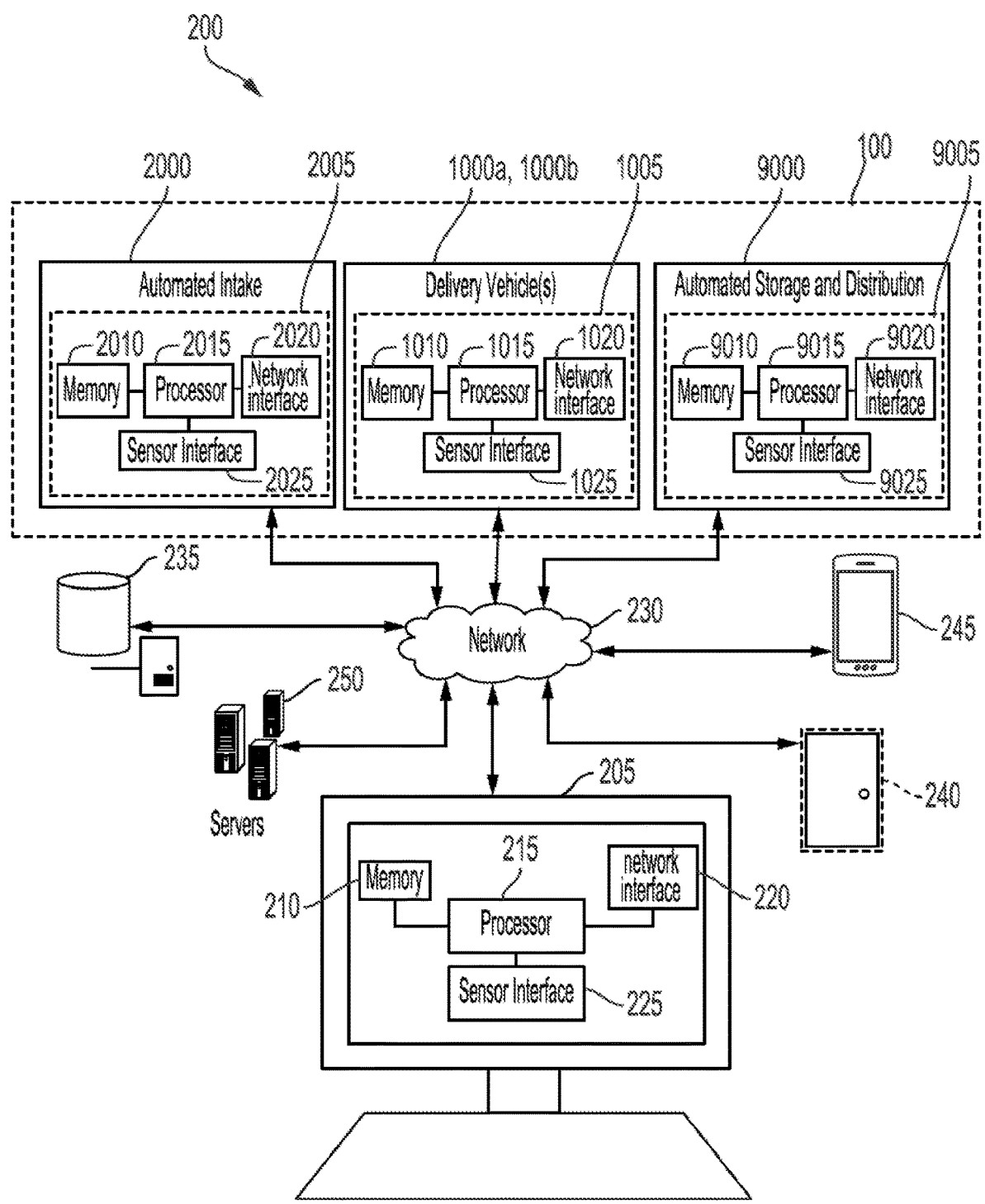
FIG. 4 depicts a schematic example of a system for controlling an autonomous robotic laundry process line.

Referring to FIG. 4, an example of a system 200 of operatively connected robots is shown. FIG. 4 depicts a schematic implementation of a portion of an autonomous robotic process line 100, 100*a-c*. An automated intake robot 2000 is in operative communication with a mobile delivery vehicle 1000*a* configured to provide a plurality of containers of dirty laundry items from one or more customers (e.g., household) to the process line. The automated intake robot 2000 transits the plurality of containers to at least one of an intermediate queue and the dirty laundry separating and sorting robot 3000 configured to provide sorted and batched loads of dirty deformable laundry articles to the washing and drying robot 4000 for washing and drying. The washing and drying robot 4000 is in operative communication with a clean laundry separating robot 5000 and outputs a load of clean laundry for separation by the clean laundry separating robot 5000, which delivers the clean laundry to one or more repositioning robots 6000, folding robots 7000, and packing robots 8000. The one or more packing robots 8000 deliver one or more containers of clean, folded laundry to the automated storage and distribution robot 9000.

Additionally or alternatively, the one or more packing robots 8000 can deliver the one or more containers of clean, folded laundry to an intermediate queue, like that of the intake robot 2000, prior to delivery to the automated storage and distribution robot 9000. The intermediate queue comprises at least one of a first-in-first-out (FIFO) queue, an intelligent buffer rack, and an automated storage and retrieval system (ASRS) etc. The containers in the queue or the buffer can be organized according to predetermined travel routes of one or more outgoing vehicles 1000*b*. In implementations, the containers of cleaned laundry that are to be delivered by the same vehicle 1000*b* are grouped together in the intermediate queue. In implementations, the vehicle 1000*a* delivering dirty laundry containers and the vehicle 1000*b* receiving cleaned laundry containers are the same vehicle. In other implementations, the incoming and outgoing vehicles 1000*a-b* are separate vehicles in a fleet of a plurality of vehicles.

The automated storage and distribution robot 9000 can comprise at least one of one or more automated rails, one or more rack surfaces, and one or more conveyors. In one example configuration, the back and/or side of a receiving vehicle 1000*b* opens to allow automated loading of one or more containers. In implementations, the automated storage and distribution robot 9000 is configured to log and track the one or more containers upon loading into the outgoing vehicle 1000*b*. In implementations, as will be described subsequently, a unique identification marker of each of the containers is configured to be scanned at least one of wirelessly and visually and a location and state is updated in a memory store in communication with one or more controllers of the vehicle 1000*a-b* and automated robots 2000-9000.

Returning to FIG. 4, in implementations, each delivery vehicle 1000*a-b* (e.g., vehicle automated racking system), and robot 2000, 9000 includes a controller 1005*a-b*, 2005*a-b*, 3005*a-b* configured to operate the associated robot. For example, in implementations, the mobile delivery vehicle 1000*a-b* includes a controller 1005. The controller 1005 includes a processor 1015 in communication with a memory 1010, a network interface 1020, and a sensor interface 1025. The processor 1015 can be a single microprocessor, multiple microprocessors, a many-core processor, a microcontroller, and/or any other general purpose computing system that can be configured by software and/or firmware. In implementations, the memory 1010 contains any of a variety of software applications, data structures, files and/or databases. In one implementation, the controller 3005 includes dedicated hardware, such as single-board computers, application specific integrated circuits (ASICs), and field programmable gate arrays (FPGAs).

A network interface 1020 is configured to couple the controller 1005 to a network 230. The network 230 may include both private networks, such as local area networks, and public networks, such as the Internet. It should be noted that, in some examples, the network 230 may include one or more intermediate devices involved in the routing of packets from one endpoint to another. In implementations, the network interface 1020 is coupled to the network 230 via a networking device, such as a bridge, router, or hub. In other implementations, the network 230 may involve only two endpoints that each have a network connection directly with the other. In implementations, the network interface 1020 supports a variety of standards and protocols, examples of which include USB (via, for example, a dongle to a computer), TCP/IP, Ethernet, Wireless Ethernet, BLUETOOTH, ZigBee, M-Bus, CAN-bus, IP, IPV6, UDP, DTN, HTTP, FTP, SNMP, CDMA, NMEA and GSM. To ensure data transfer is secure, in some examples, the controller 1005 can transmit data via the network interface 1020 using a variety of security measures including, for example, TLS, SSL or VPN. In implementations, the network interface 1020 includes both a physical interface configured for wireless communication and a physical interface configured for wired communication. According to various embodiments, the network interface 1020 enables communication between the controller 1005 of the mobile delivery vehicle 1000*a-b* and at least one of the plurality of robots 2000, 3000, 4000, 5000, 6000, 7000, 8000, 9000 of the process line 100, 100*a-c*.

Additionally or alternatively, the network interface 1020 is configured to facilitate the communication of information between the processor 1015 and one or more other devices or entities over the network 230. For example, in implementations, the network interface 1020 is configured to communicate with a remote computing device such as a computing terminal 205, database 235, server 240, smartphone 245, and server farm 250. In implementations, the network interface 3020 can include communications circuitry for at least one of receiving data from a database 235 and transmitting data to a remote server 240, 250. In some implementations, the network interface 3020 can communicate with a remote server over any of the wired protocols previously described, including a WI-FI communications link based on the IEEE 802.11 standard.

In some examples in accordance with FIG. 4, the network 230 may include one or more communication networks through which the various autonomous robots and computing devices illustrated in FIG. 4 may send, receive, and/or exchange data. In various implementations, the network 230 may include a cellular communication network and/or a computer network. In some examples, the network 230 includes and supports wireless network and/or wired connections. For instance, in these examples, the network 230 may support one or more networking standards such as GSM, CMDA, USB, BLUETOOTH®, CAN, ZigBee®, Wireless Ethernet, Ethernet, and TCP/IP, among others. In implementations, the network 230 can implement broadband cellular technology (e.g., 2.5 G, 2.75 G, 3 G, 4 G, 5 G cellular standards) and/or Long-Term Evolution (LTE) technology or GSM/EDGE and UMTS/HSPA technologies for high-speed wireless communication.

Although the controller 1005 is described herein in particular, one or more of the plurality of robots 2000, 3000, 4000, 5000, 6000, 7000, 8000, 9000 of the process line 100, 100*a-c* includes similar components having similar functionality.

Figure 5:
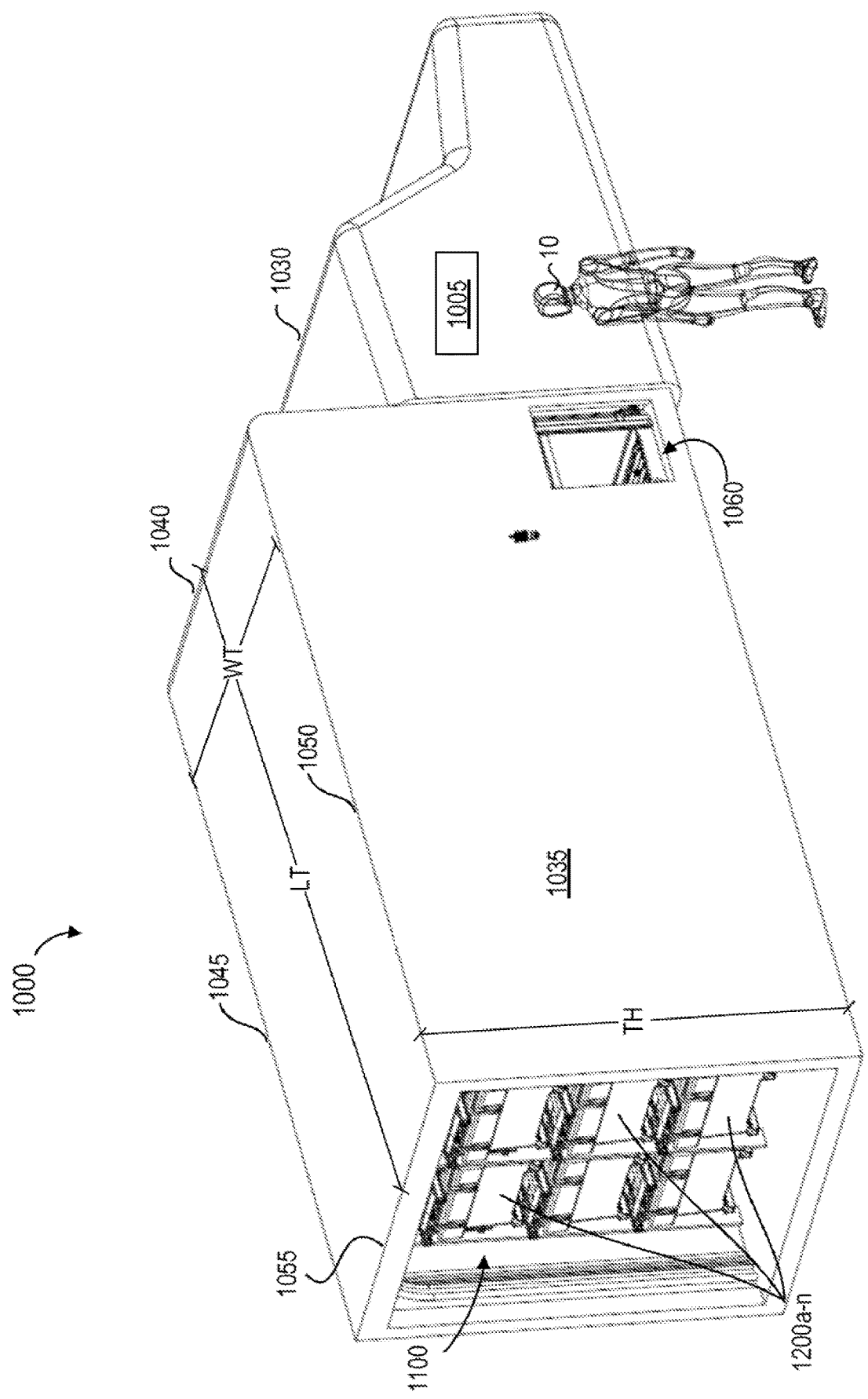
FIG. 5 depicts a perspective view of an implementation of a mobile delivery vehicle.

Turning now to FIG. 5, in implementations, the delivery vehicle 1000*a-b* (collectively referred to herein as vehicle 1000) is a truck or van configured to transport a plurality of boxes, or containers 1200*a-n*, of laundry between a plurality of customers and a laundry processing facility comprising a process line 100 of autonomously operating devices 2000-9000. In implementations, an array of racks 1100 (e.g., flow racks or conveyors) is configured to be disposed within an enclosed transport volume 1035 of the delivery vehicle 1000. In implementations, the transport volume 1035 has a length LT extending from a front end 1040 to a back end 1055 and a width WT extending between a left side 1045 and a right side 1050. In implementations, the enclosed transport volume 1035 comprises a width in a range of between about 6 to 8.5 feet and a height TH in a range of between about 6 to 10 feet. In implementations, the transport volume 1035 is 8 feet wide and in a range of between about 8 to 9 feet tall. In implementations, the delivery vehicle 1000 is at least one of a delivery van, a walk in van, a class 3 box truck, a class 4 box truck, a class 5 box truck, and a class 6 box truck. In implementations, the vehicle 1000 is an electric vehicle. In implementations, the vehicle 1000 is a hybrid electric vehicle.

In implementations, the mobile delivery vehicle 1000 is configured to deliver and retrieve the plurality of containers 1200*a-n* from one or more customer destinations associated with a delivery service such as an ad-hoc or subscription delivery service. In implementations, each one of the retrieved plurality of containers 1200*a-n* is configured to contain dirty household laundry and each one of the delivered plurality of containers 1200*a-n* contains clean household laundry. The containers 1200*a-n* comprise a maximum retention volume and will be filled with one or more articles up to the maximum retention volume. A weight of one or more containers 1200*a-n* disposed in the array will vary depending on occupied volume therein. Therefore, the aggregate weight of the containers 1200*a-n* in an array can vary and the distribution of weight throughout the array can vary. Additionally, the distribution of weight throughout an array will vary throughout the loading and unloading process. As will be described subsequently with regard to implementations, an autonomous racking system adjusts positions of the containers 1200*a-n* in part to optimally position filled containers above vehicle axles during transport.

In examples, the controller 1005 of an autonomous racking system is collocated at the vehicle 1000 and is in at least one of wired or wireless communication with a communication network 230 as previously described with regard to FIG. 4. The controller 1005 is configured to transmit and receive information to one or more remote devices regarding the receipt and disgorgement of the plurality of containers 1200*a-n* to and from the array of flow racks 1100. The one or more remote devices can be a handheld, Internet-enabled device (e.g., laptop, tablet, smart phone, smart watch, etc.) configured to receive input from a driver of the mobile delivery vehicle 1000. Additionally or alternatively, the one or more remote devices can be a computer terminal or handheld device located at a laundering facility. In implementations, the one or more remote devices is at least one of a computer terminal and a handheld device located at a customer delivery and pickup location. In implementations, the one or more remote devices are configured to receive customer input such as pick-up and delivery location, delivery and/or pick up time preferences, and other handling preferences and logistics details (e.g., where to leave the one or more customer containers 1200).

Figure 9A:
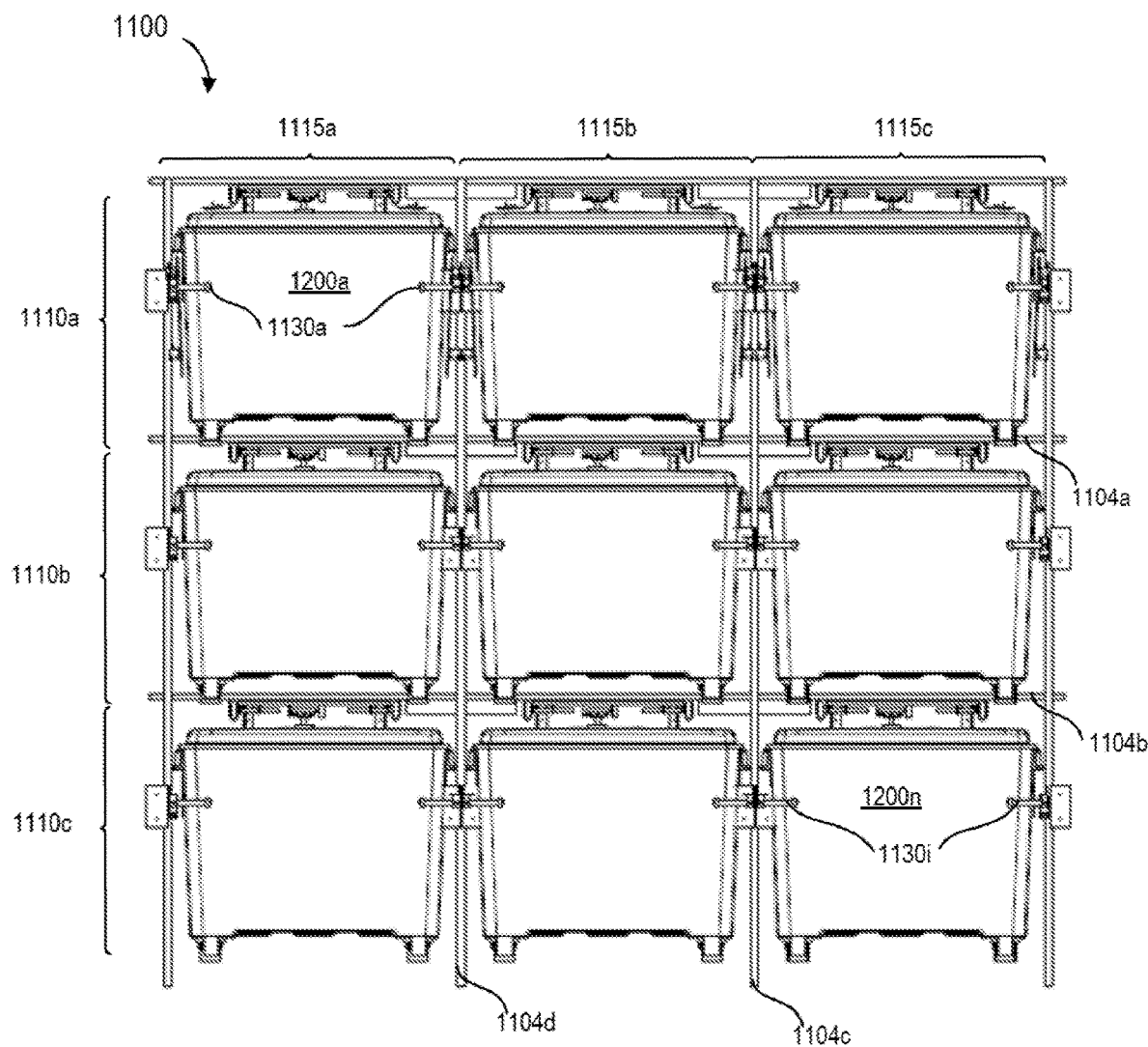
FIG. 9A depicts a front view of an example flow rack array of the autonomous racking system of FIG. 8.
Figure 9B:
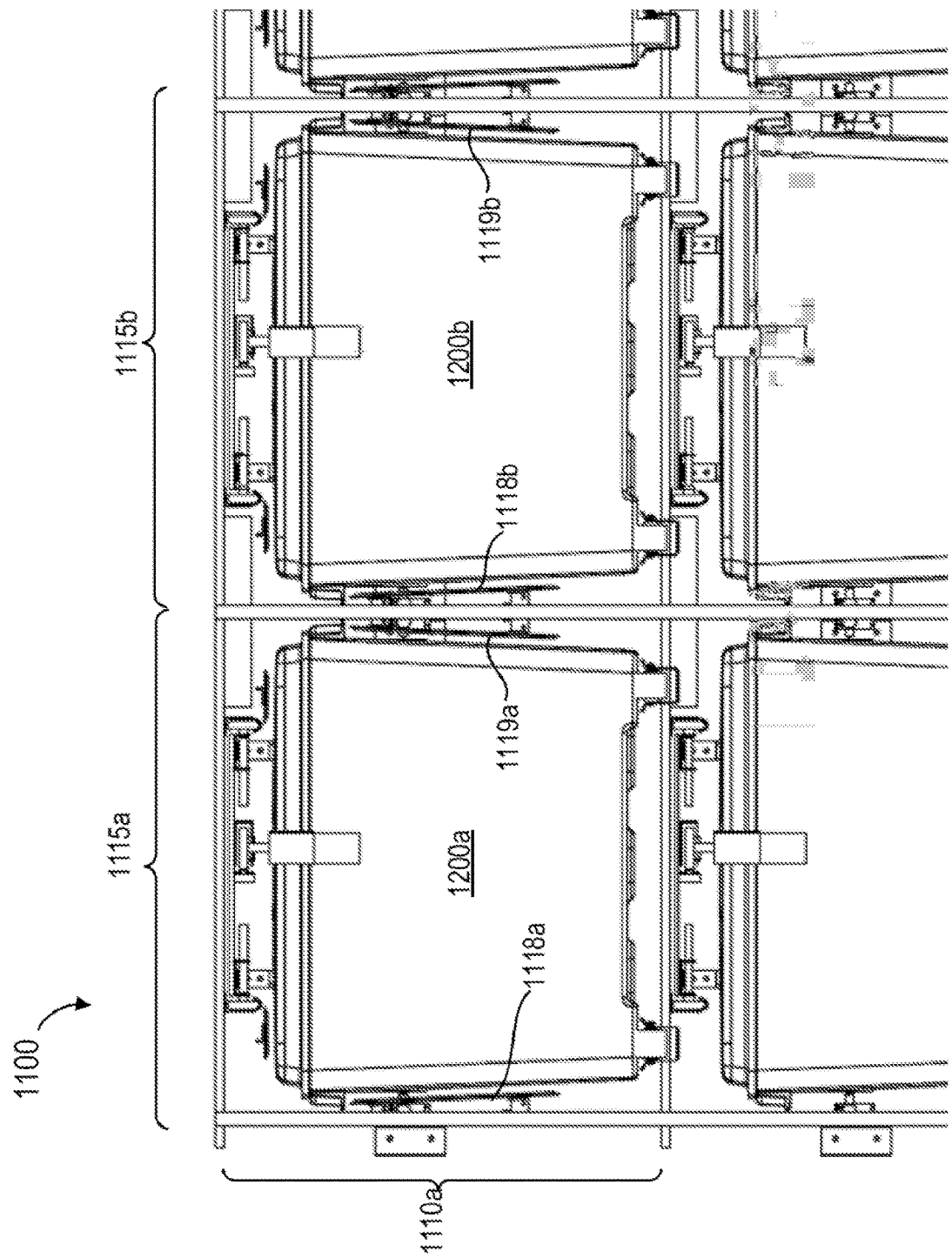
FIG. 9B depicts a close-up partial view of the example flow rack array of FIG. 9A with some structural elements removed and with stop gates shown.
Figure 10:
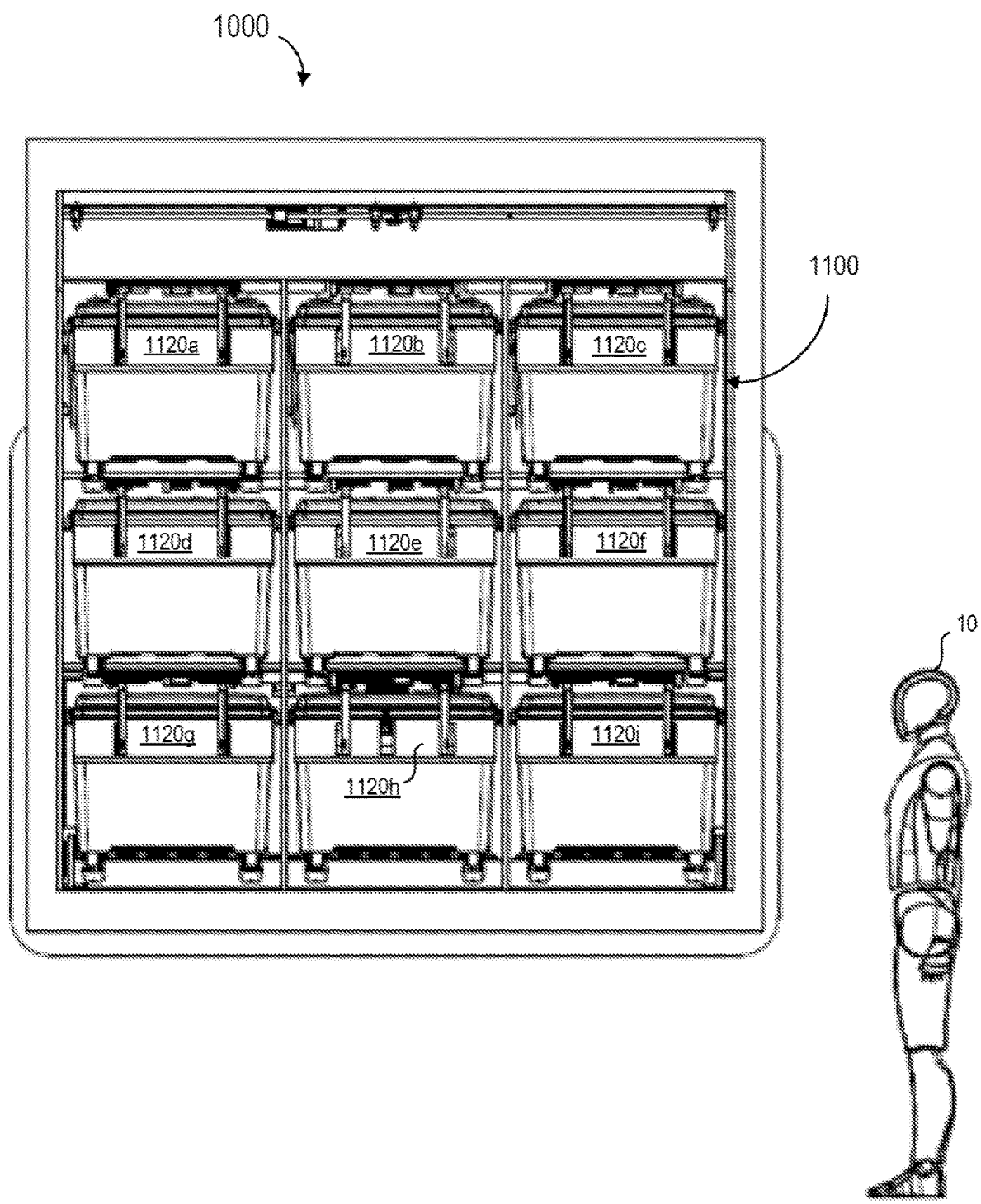
FIG. 10 depicts a rear view of an example flow rack array of the autonomous racking system of FIG. 8.
Figure 11:
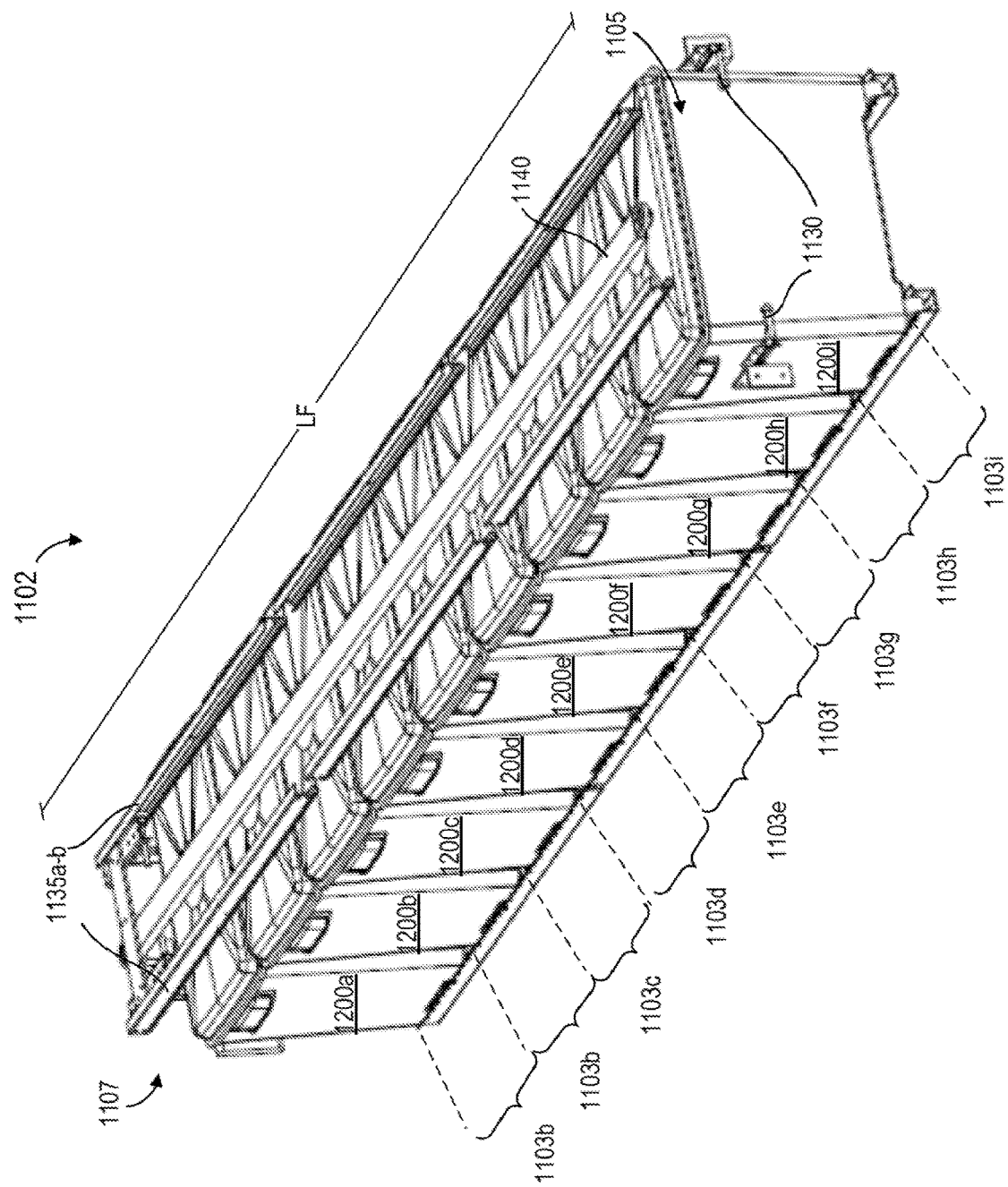
FIG. 11 depicts a front perspective view of a single flow rack of the autonomous racking system of FIG. 8.
Figure 12:
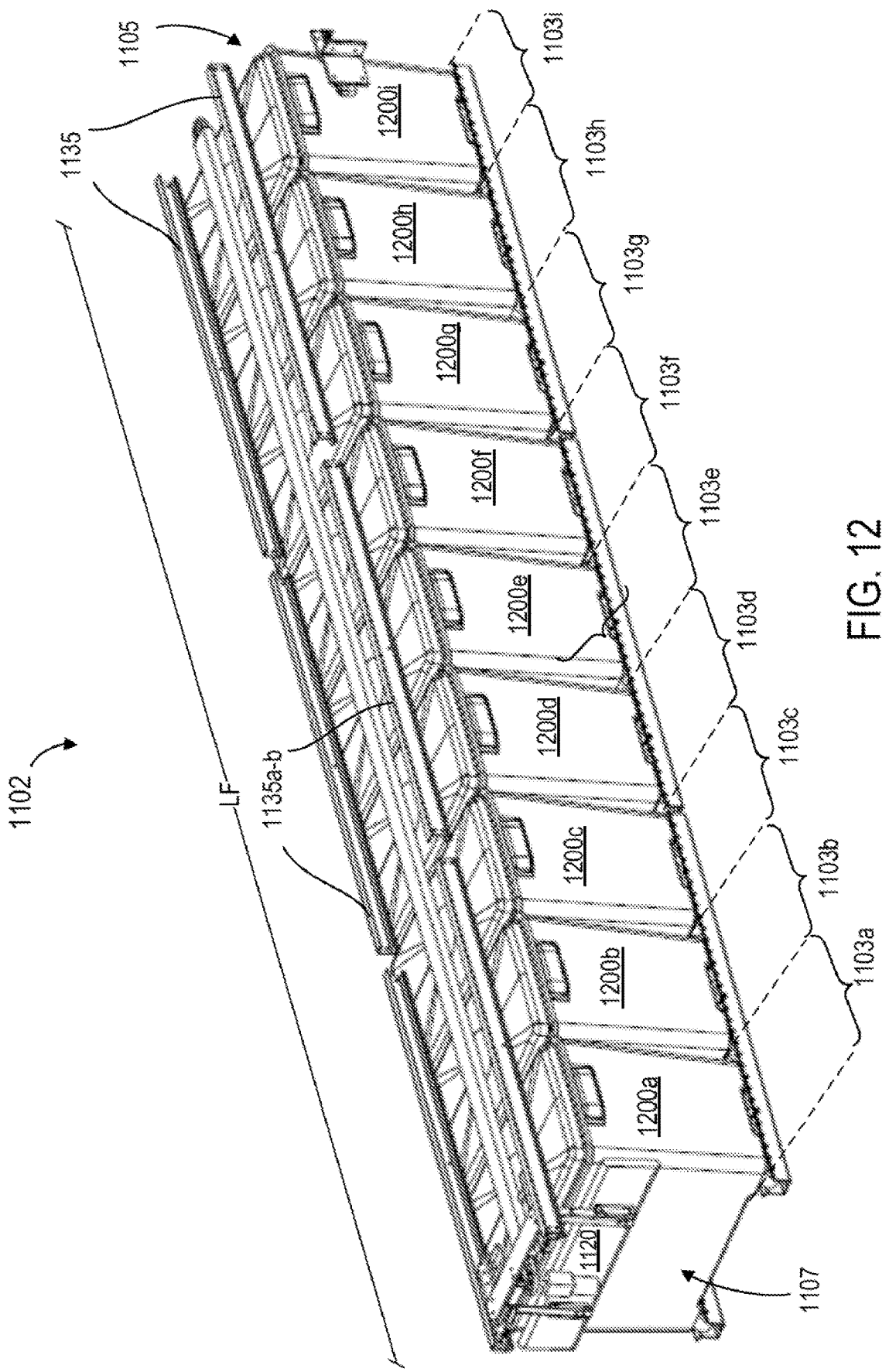
FIG. 12 depicts a rear perspective view of a single flow rack of the autonomous racking system of FIG. 8.
Figure 13A:
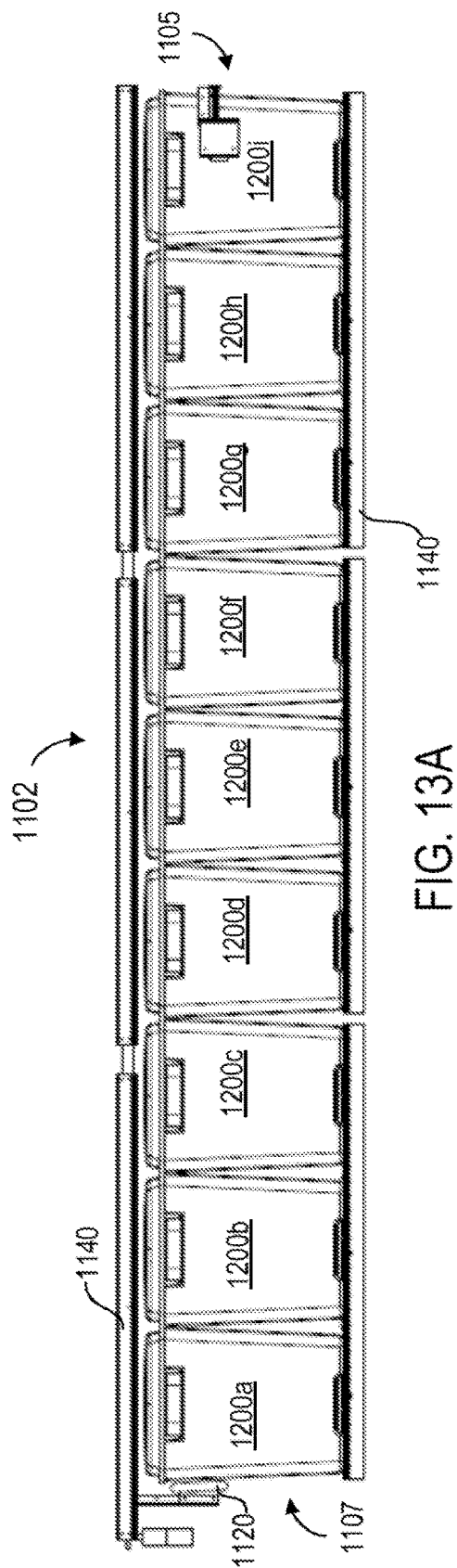
FIG. 13A depicts side view of a fully loaded single flow rack of the autonomous racking system of FIG. 8.
Figure 13B:
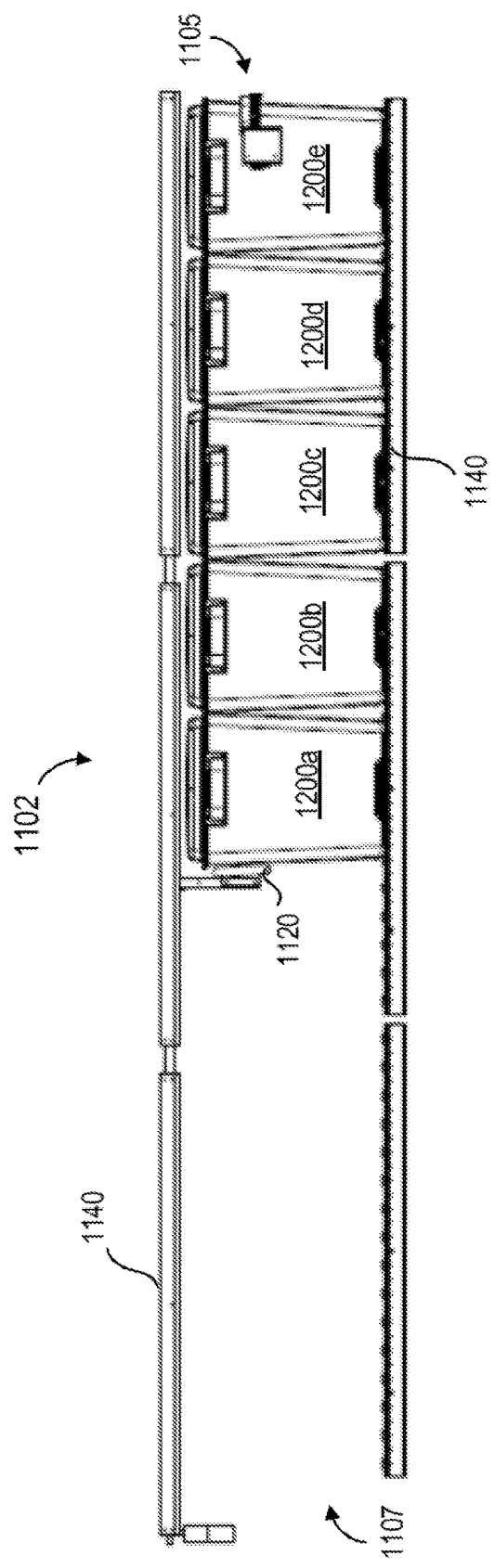
FIG. 13B depicts a side view of the flow rack of 13A in a partially unloaded state.
Figure 36:
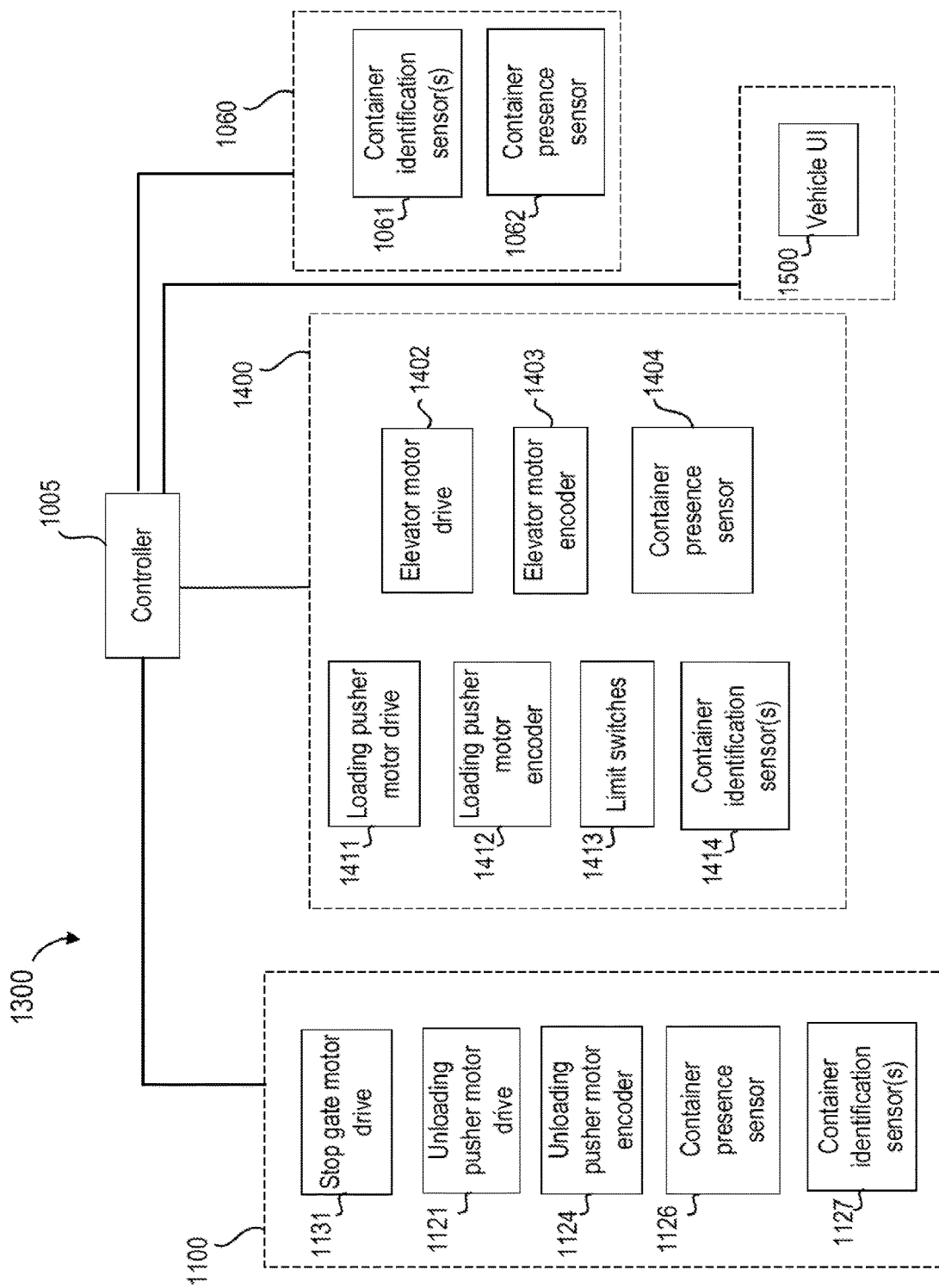
FIG. 36 depicts a schematic system diagram of an autonomous racking and elevator system.

In implementations, as shown in FIGS. 6-13, an autonomous racking system 1300 for use with a mobile delivery vehicle, includes an array of flow racks 1100, an elevator 1400 abutting the front end 1105 (e.g., loading/unloading access end) of the array of flow racks 1100, and a controller 1005 in operable communication with one or more motor drivers and memory stores. As shown for example in FIG. 9A, the array of flow racks 1100 comprises a plurality of rows 1110*a-c* (e.g., tiers) and a plurality of columns 1115*a-c*. As shown in FIGS. 11-13, each one of the flow racks 1102 of the array of flow racks 1100 is configured to receive thereon a plurality of containers 1200*a-i* each associated with a single household, where "i" indicates the total number of containers in the array of flow racks 1100. As shown in FIG. 10, the array of flow racks 1100 includes a plurality of unloading pushers 1120*a-i*. As shown in the close up view of FIG. 14, each one 1120 of the plurality of unloading pushers 1120*a-i* is disposed at a back surface 1205 of one or more of the plurality of containers 1200*a* disposed on each of the flow racks 1102 the array 1100. As shown in FIGS. 13A-B, each pusher 1120 is configured to push each one 1200 of the plurality of containers 1200*a-i* past a front end 1105 of the array of flow racks 1102. A plurality of unloading pusher drives 1121 (see FIG. 36) are in operable communication with one of the plurality of unloading pushers for moving the corresponding one of the plurality of unloading pushers 1120*a-i* toward the front end 1105 of the array of flow racks 1100. In implementations, the front end 1105 is toward a front end of the vehicle 1000 such that a total weight of the plurality of containers 1200*a-n* disposed on the array of flow racks 1100 is continuously pushed forward toward within the transport volume. Continuously shifting the total weight of the plurality of remaining containers forward enables more consistent vehicle 1000 handling while in transit and prevents the containers from freely sliding around when the vehicle 1000 is driving or parked on unlevel and/or uneven ground.

Figure 7:
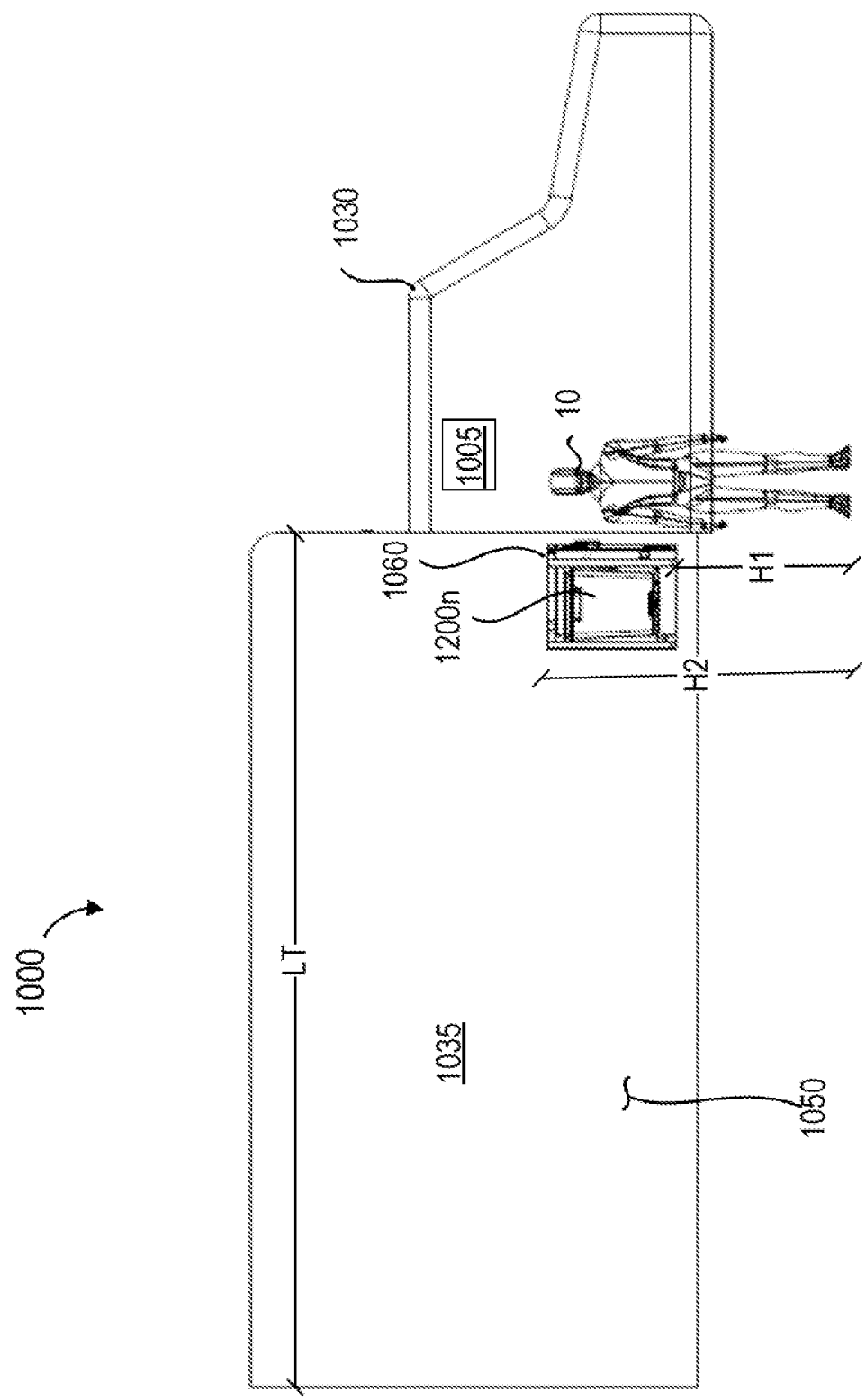
FIG. 7 depicts a side view of the mobile delivery vehicle of FIG. 5.
Figure 8:
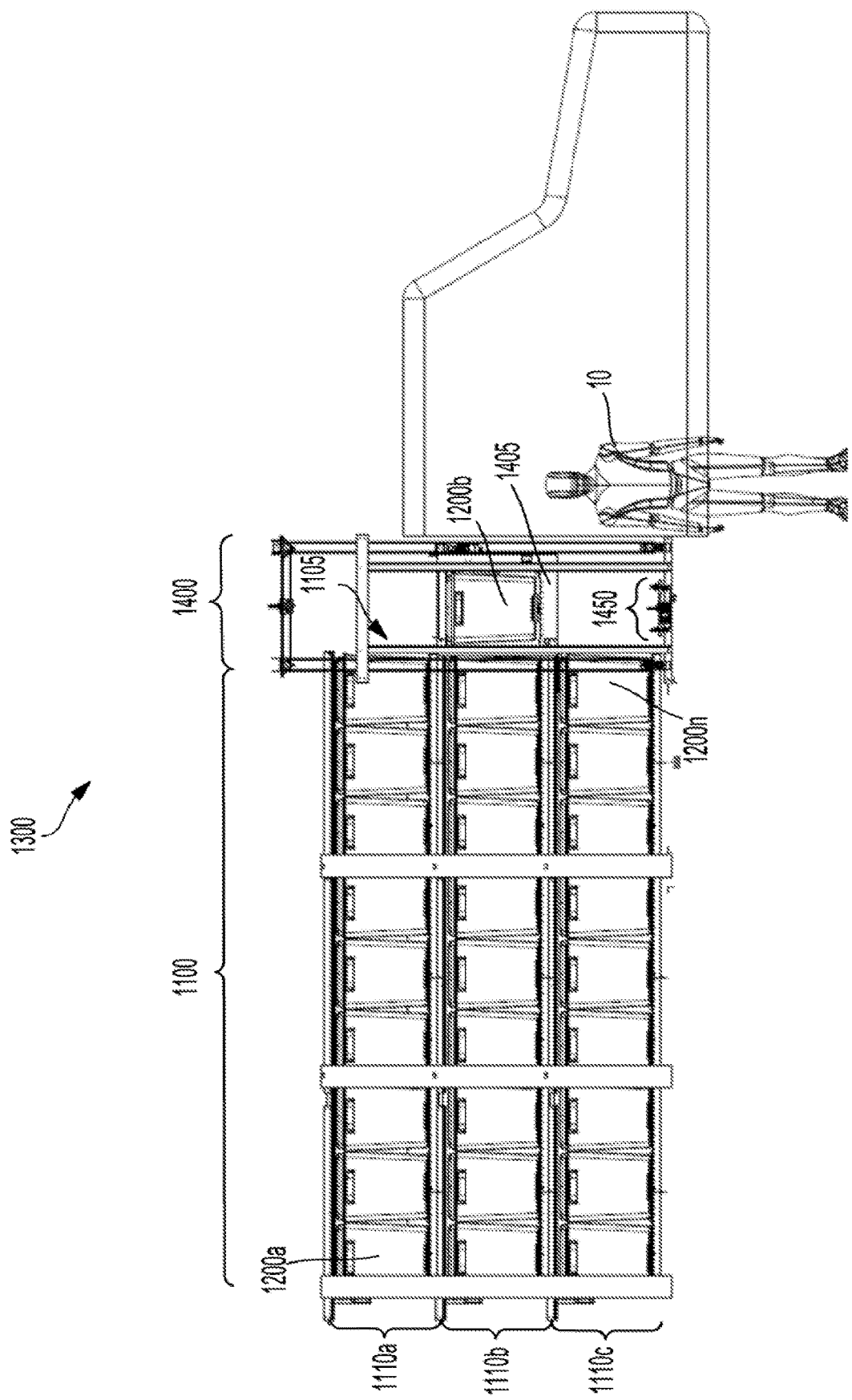
FIG. 8 depicts a side view of an implementation of an autonomous racking system for use with a mobile delivery vehicle.

As shown in FIGS. 15-20, the elevator 1400 is configured to receive one or more containers 1200 from at least one or more of the plurality of flow racks 1102 in the array of flow racks 1100 and a vehicle side access portal 1060 (see FIG. 7). Additionally, the elevator 1400 is configured to deliver one or more containers 1200 to at least one or more of the plurality of flow racks 1102 in the array of flow racks 1100 and a vehicle side access portal 1060. In implementations, the elevator 1400 is configured to receive and deliver one or more containers 1200 from and to at least one or more of the plurality of flow racks 1102 in the array of flow racks 1100 and from and to a vehicle cab access portal (not shown), for example in an implementation in which the vehicle is a step van. The cab access portal in a step van opens to enable a delivery person to enter the transport volume from the driver's cab without having to exit the vehicle 1000. As will be described subsequently with regard to implementations, an elevator 1400 can eject one or more containers 1200 into the driver's cab directly through the portal without the delivery person exiting the driver's cab. The elevator includes a movable carriage 1405 extending across a width of the plurality of columns 1115*a-c*. The movable carriage 1405 is in operable communication with an elevator drive 1402 of an elevator drive motor 1455 (e.g., FIGS. 24A-26) configured to move the carriage 1405 up and down in the direction of double arrow V to align a carriage support surface 1407 with at least of one of the plurality of rows 1110*a-c* and a lower edge of the vehicle side access portal 1060 disposed at a height H1 (see FIG. 7) in a range of between about 0.25 to 2.25 meters from a ground upon which the delivery vehicle 1000 is disposed. In implementations, the drive motor 1455 is configured to raise and lower the carriage 1405 via a plurality of interconnected pulleys 1460*a-b*, 1462*a-b*, 1462*a'-b'* evenly distributed to the corners of the carriage 1405 for level raising and lowering under power of the drive motor 1455.

Figure 21:
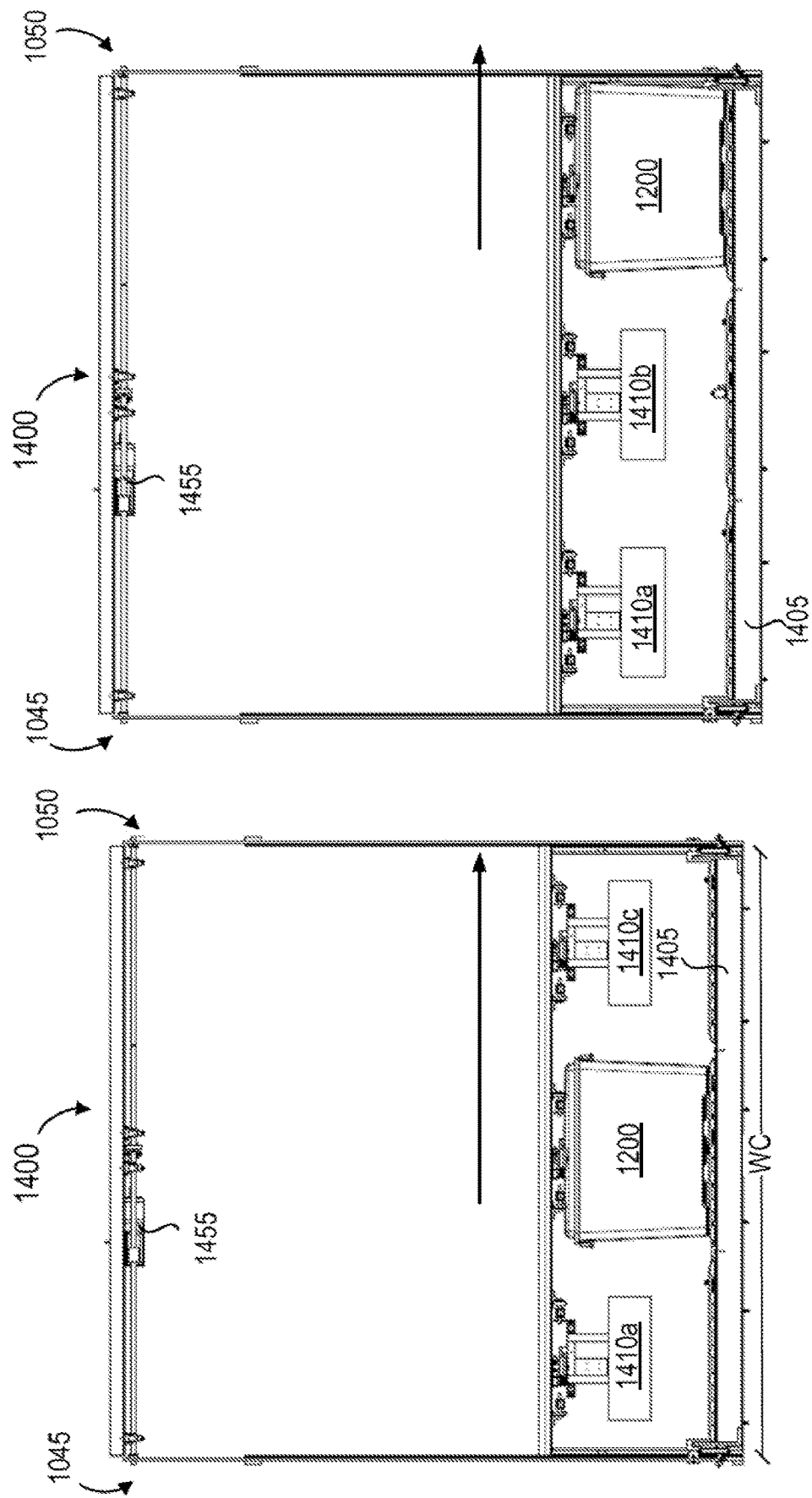
FIG. 21A depicts an example unloading stage of an elevator portion of the autonomous racking system of FIG. 8 receiving an unloaded container from the rack array onto a middle position of the elevator.
FIG. 21B depicts the elevator of FIG. 21A with the container moved to a side position of the elevator for unloading.
Figure 22:
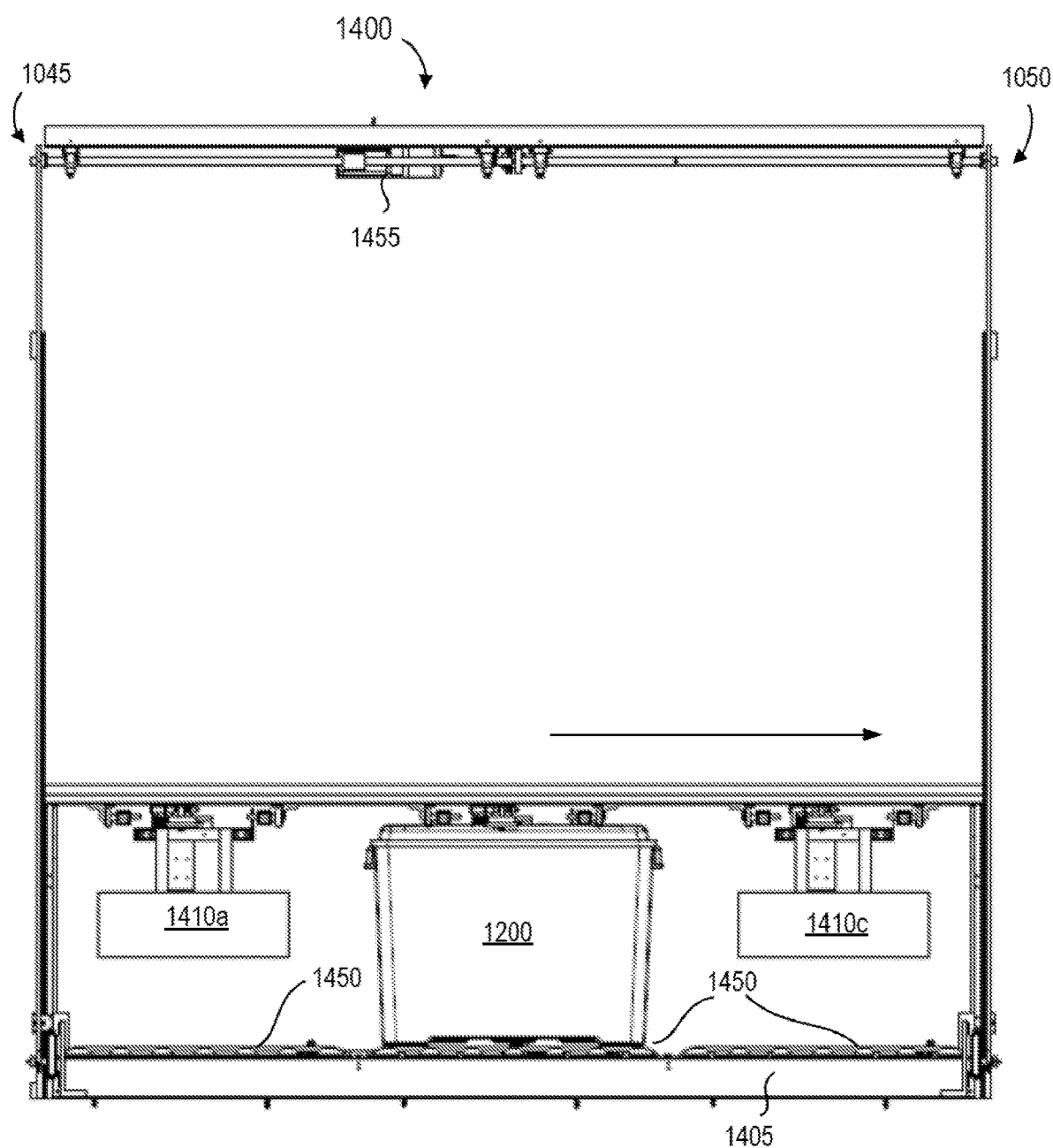
FIG. 22 depicts a front view of FIG. 21B showing the rollers of the elevator being lowered into gaps between side-to-side transfer wheels.
Figure 23:
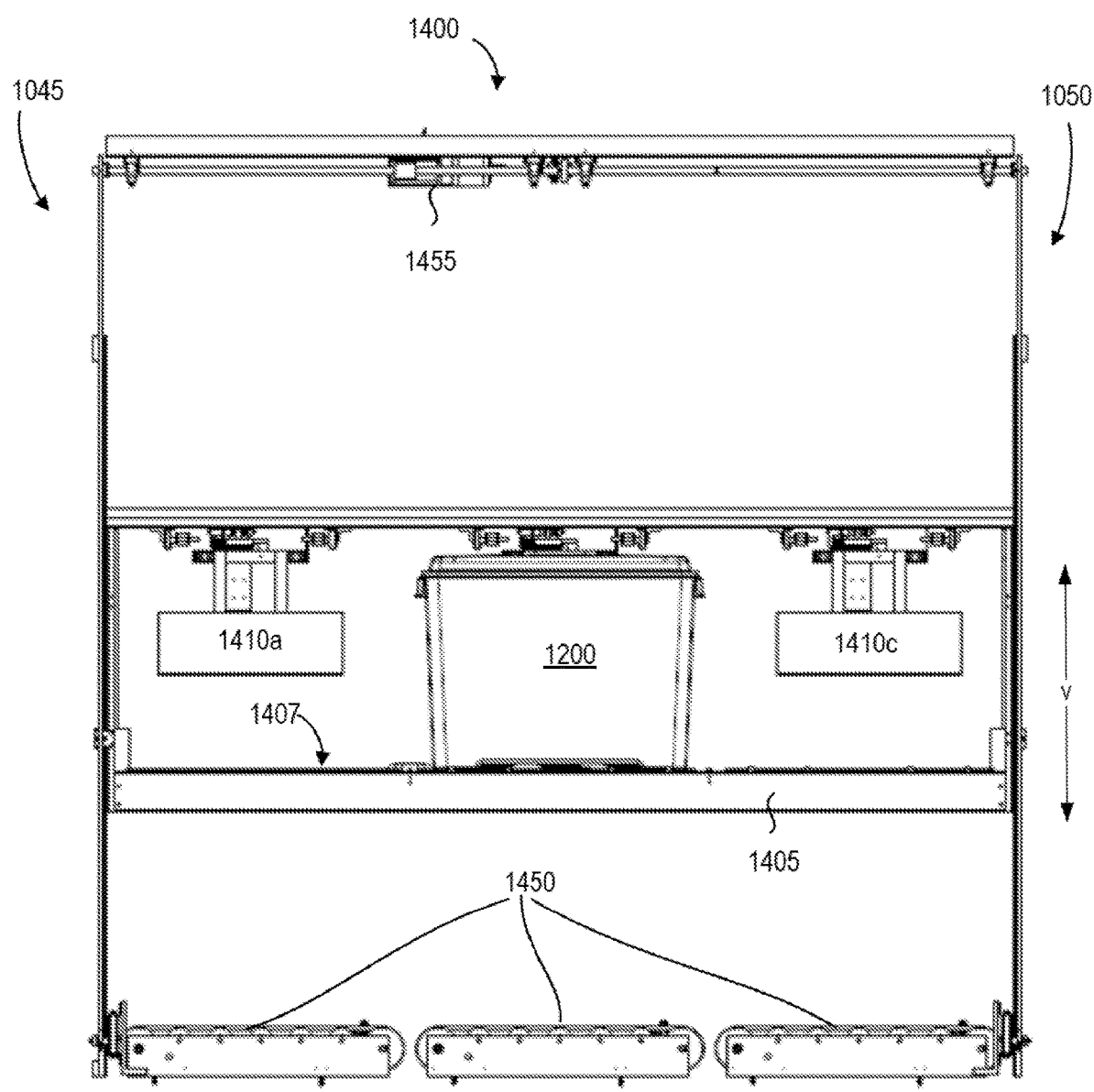
FIG. 23 depicts a front view of the elevator raised above the transfer wheels.
Figure 24A:
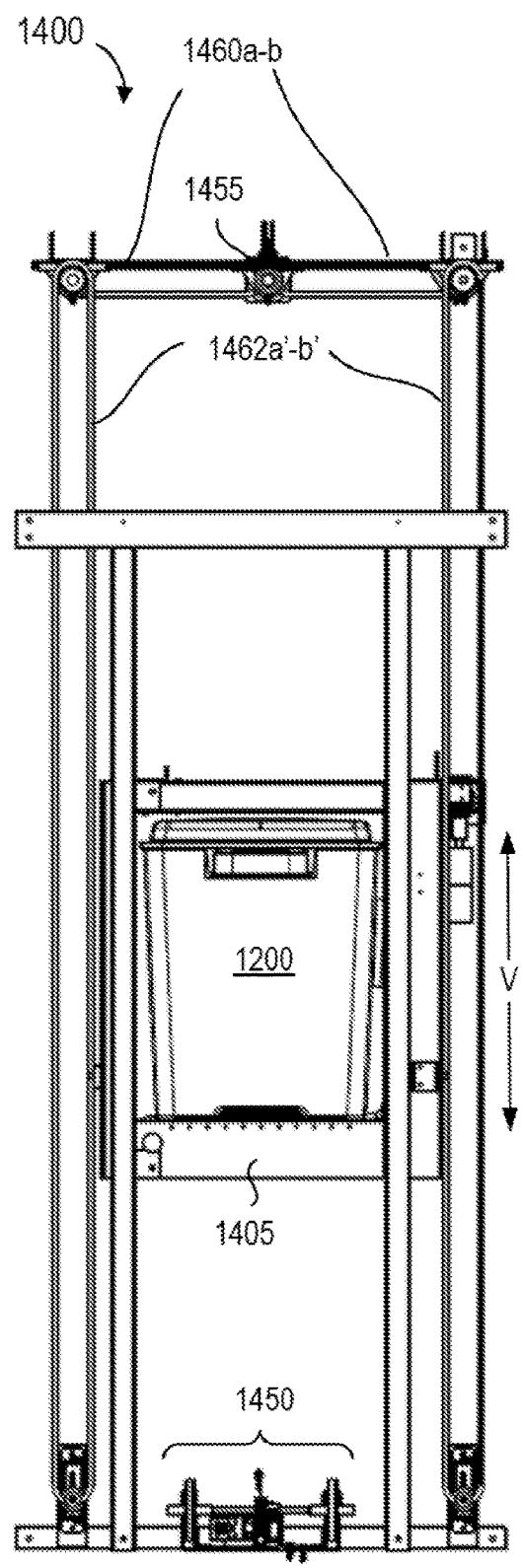
FIG. 24A depicts a side view of FIG. 23.
Figure 24B:
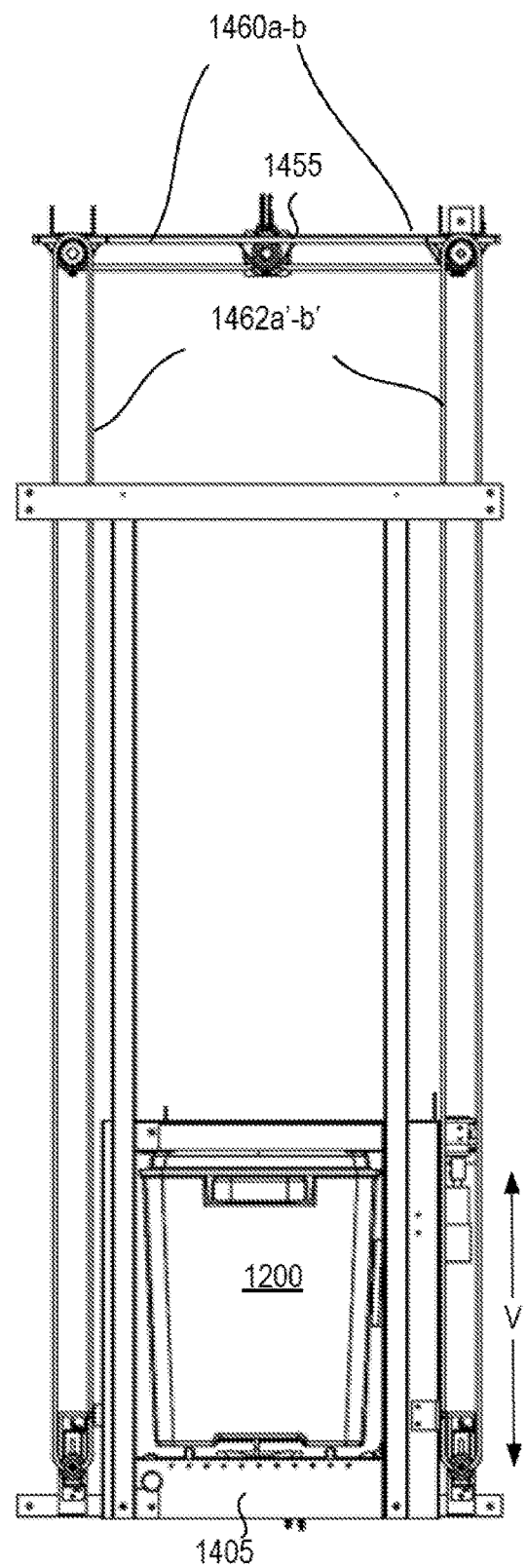
FIG. 24B depicts a side view of FIG. 22.

As will be described subsequently with regard to implementations, the elevator 1400 comprises one or more elevator position sensors configured to detect a vertical location of the movable carriage 1405 and output a position signal. In implementations, as shown in FIGS. 21A-21B, the elevator 1400 comprises a plurality of loading pushers 1410*a-c* (individually, loading pusher 1410), each one of which is aligned with one of the plurality of columns 1115*a-c* and configured to push a container 1200 from the movable carriage 1405 onto one of the aligned plurality of columns 1115, 1115*a-c* of the array 1100. In implementations, the elevator 1400 comprises a plurality of loading pusher drives 1411*a-c* (see FIG. 36). Each one of the loading pusher drives is in operable communication with one of the plurality of loading pusher drive motors 1423*a-c* (FIG. 29) for moving the corresponding one of the loading pushers 1410*a-c* toward the front end 1105 of the array of flow racks 1100 to load a container 1200 into the array 1100. The controller 1005 thus is in operable communication with a plurality of unloading pusher drive motor 1123 for the unloading pushers 1120*a-i*, the plurality of loading pusher drives 1402, the drive motor 1455 of the movable carriage 1405, and the one or more elevator position sensors 1413. The controller 1005 is configured to instruct the drive motor 1455 to move the movable carriage 1405 to align the carriage support surface 1407 with one of the plurality of rows 1110*a-c*, receive the position signal, and determine whether the carriage support surface 1407 is aligned with the one of the plurality of rows 1110*a-c* for at least one of receiving and delivering a container 1200.

In implementations, the controller 10005 is configured to load a container 1200 onto a flow rack 1102 from the movable carriage 1405. In implementations, the controller 1005 is further configured to instruct a drive of the one of the plurality of unloading pushers 1120*a-i* associated with the aligned one of the plurality of rows 1110*a-c* and one of the plurality of columns 1115*a-c* to retract by a distance equal to a depth D (see FIG. 14) of a container 1200, and instruct a drive of an opposing one of the one of the plurality of loading pushers 1410*a-c* associated with the one of the plurality of columns 1115*a-c* to advance the one of the plurality of loading pushers 1410*a-c* to the front end 1105 of the array 1100.

In implementations, the controller 1005 is configured to load a container 1200 onto the movable carriage 1405 from a flow rack 1102. In examples, the controller 1005 is further configured to instruct a drive of the one of the plurality of unloading pushers 1120*a-i* associated with the aligned one of the plurality of rows 1110a-c and one of the plurality of columns 1115a-c to advance by a distance equal to a depth D of a container 1200.

In implementations, each of the plurality of flow racks 1102 include a movable support for receiving one or more of the plurality of containers 1200a-n thereon. In implementations, the movable support comprises a conveyor configured to rotate toward the front end of the array. In implementations, the conveyor can be motor driven and operate without a pusher. In other implementations, the conveyor can be motor driven and configured to operate simultaneously with the unloading pusher drive motor 1123 (see FIG. 14B). Alternatively, the conveyor can be configured to rotate upon application of force from an associated one of the plurality of pushers to one or more of the plurality of containers disposed on the conveyor.

Figure 14A:
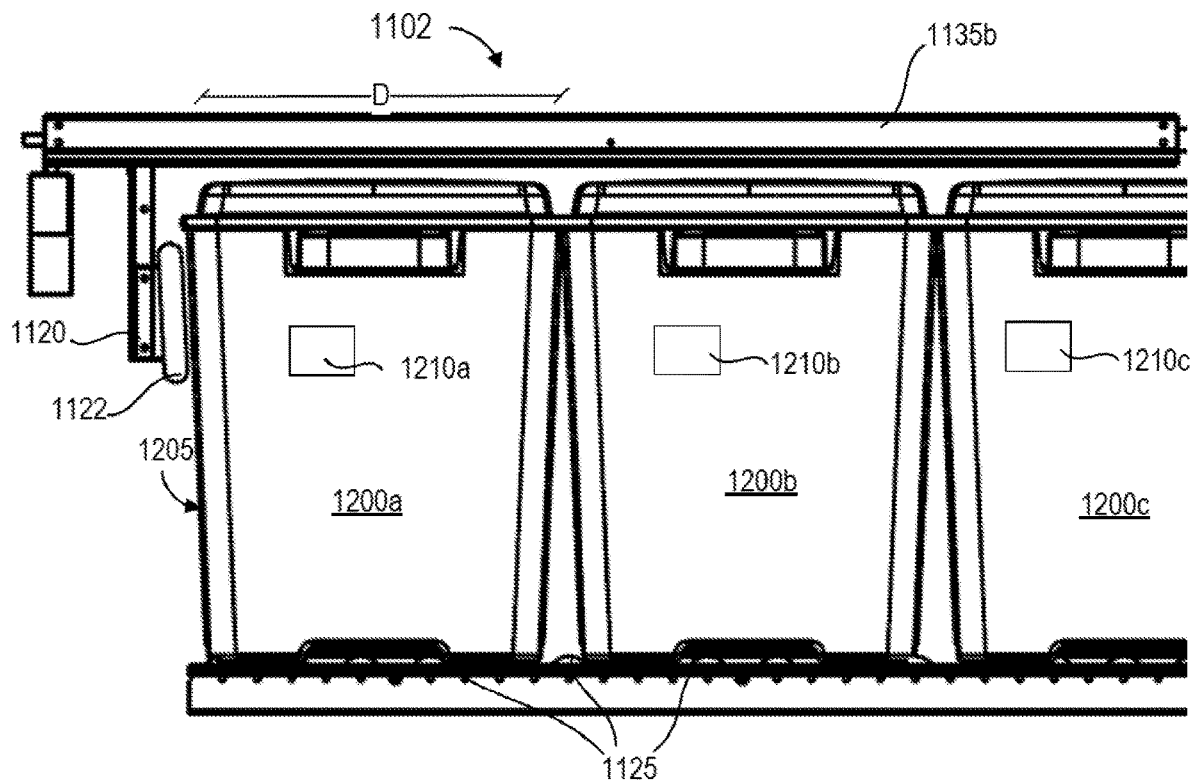
FIG. 14A depicts a side view of a pusher portion of the autonomous racking system of FIG. 8.

In implementations, as shown in FIG. 14A, the movable support comprises a plurality of rollers 1125 disposed continuously along the length LF of each one of the array of flow racks. The plurality of rollers 1125 rotate freely in either rotational direction and are configured to roll one or more of the plurality of containers 1200a-i disposed thereon toward the front end 1105 under application of a push force from the unloading pushers 1120a-i. Additionally or alternatively, the plurality of rollers 1125 can be interconnected to rotate simultaneously. In implementations, the plurality of rollers 1125 rotate under an application of pushing force on the one or more containers 12a-I in a row from an associated one of the plurality of unloading pushers 1120a-i. Alternatively, in implementations, one roller can be powered and the others passively connected such that all of the rollers simultaneously rotate when the powered roller is rotated by a drive motor.

Figure 6:
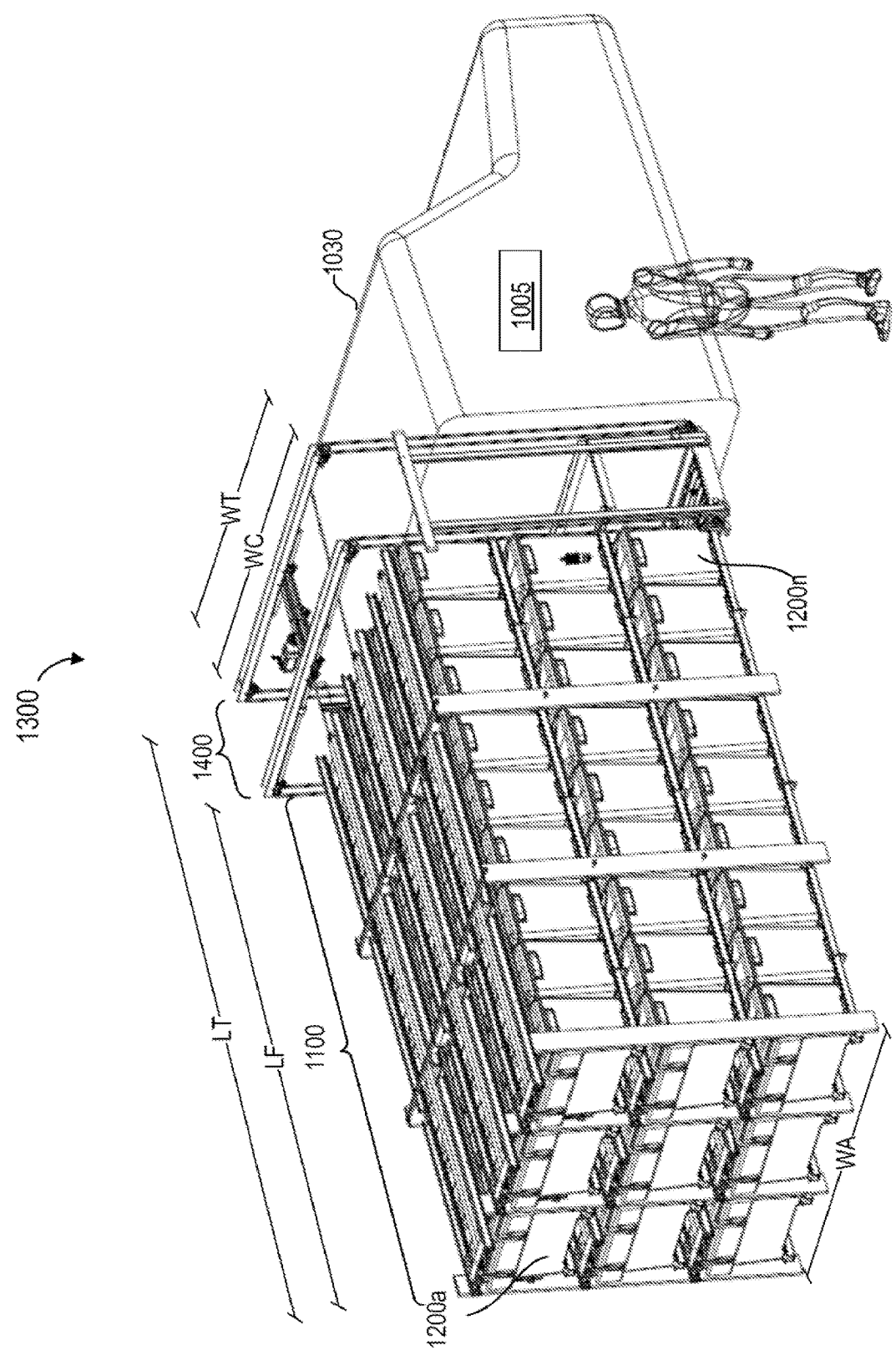
FIG. 6 depicts a cut away view showing an implementation of a racking system of the mobile delivery vehicle of FIG. 5.

In implementations, as shown in FIGS. 9A-10, the plurality of rows 1110a-c comprises 3 rows and the plurality of columns 1115a-c comprises 3 columns. The number of rows and columns can increase and decrease to fit various vehicle holding volumes and the 3×3 array 1100 is shown by way of example as one implementation. In examples, as shown in FIG. 6, the array 1100 has a length LF extending substantially parallel to a length LT of a transport volume of the delivery vehicle and a width WA extending substantially perpendicular to the length LT of the transport volume and substantially parallel to one or more vehicle wheel axles. The movable carriage 1405 has a longitudinal axis WC substantially perpendicular to the length LT of the transport volume and substantially parallel to the one or more vehicle wheel axles. As shown in FIG. 9A, in implementations, each flow rack 1102 of the array of flow racks 1100 is interlinked by at least one shared structural beam 1104a-d along the length LF of the array 1100 with at least one other adjacent flow rack 1102 of the array of flow racks. The flow racks 1102 therefore are compactly stacked with no gaps therebetween. Because a racking array and elevator system 1300 (FIGS. 15-20) comprises an elevator 1400, an array 1100, and a container tagging system (which will be described subsequently), delivery personnel 10 need not enter the transport volume to manually retrieve any of the plurality of containers 1200a-n.

In implementations, as shown in FIGS. 9A and 11, each flow rack 1102 of the array of flow racks further includes a movable stop gate 1130 (also herein referred to as "flow gate") disposed at the front end 1105 and configured to restrain one or more racked containers 1200a-i. In implementations, the system further includes a stop gate motor (and motor drive 1131) in operable communication with the controller 1005, the stop gate motor being configured to retract the movable stop gate 1130 upon the controller instructing a corresponding one of the plurality of unloading pusher drives to move the associated pusher 1120 toward the front end 1105. In implementations, the stop gate motor includes at least one of a servo motor and a linear motor. Alternatively, as will be described subsequently, in implementations the stop gate 1130 comprises a manual and/or spring-loaded activation and deactivation mechanism to prevent the flow of containers 1200 out of a rack 1102.

Figure 14B:
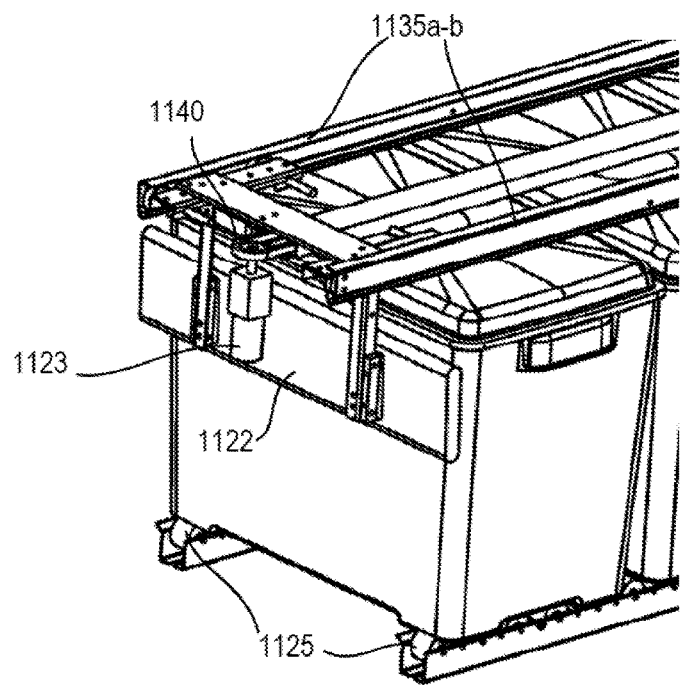
FIG. 14B depicts a perspective rear view of a pusher portion of the autonomous racking system of FIG. 8.
Figure 15:
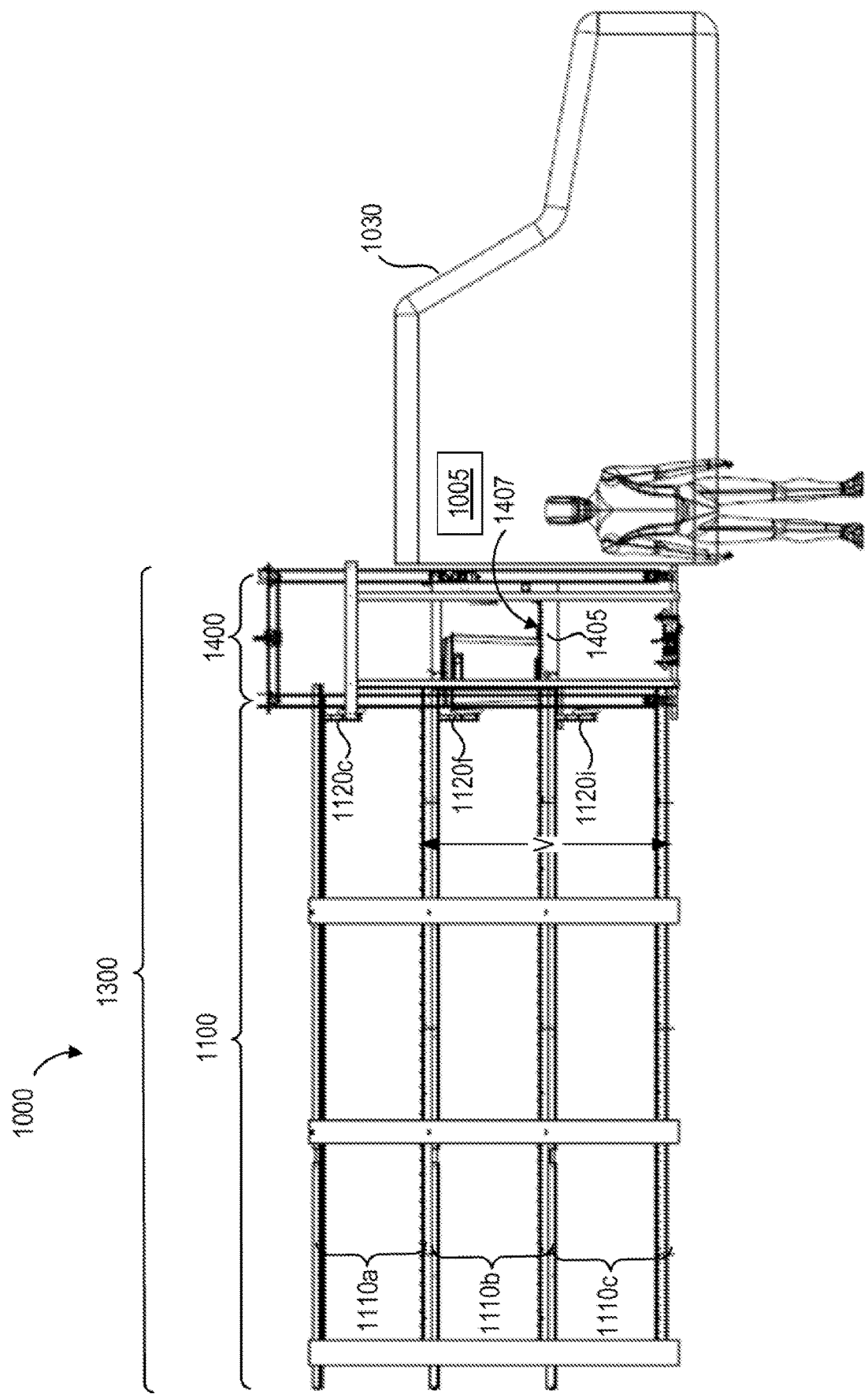
FIG. 15 depicts a schematic side view of a container being unloaded from a flow rack array onto an elevator.
Figure 16:
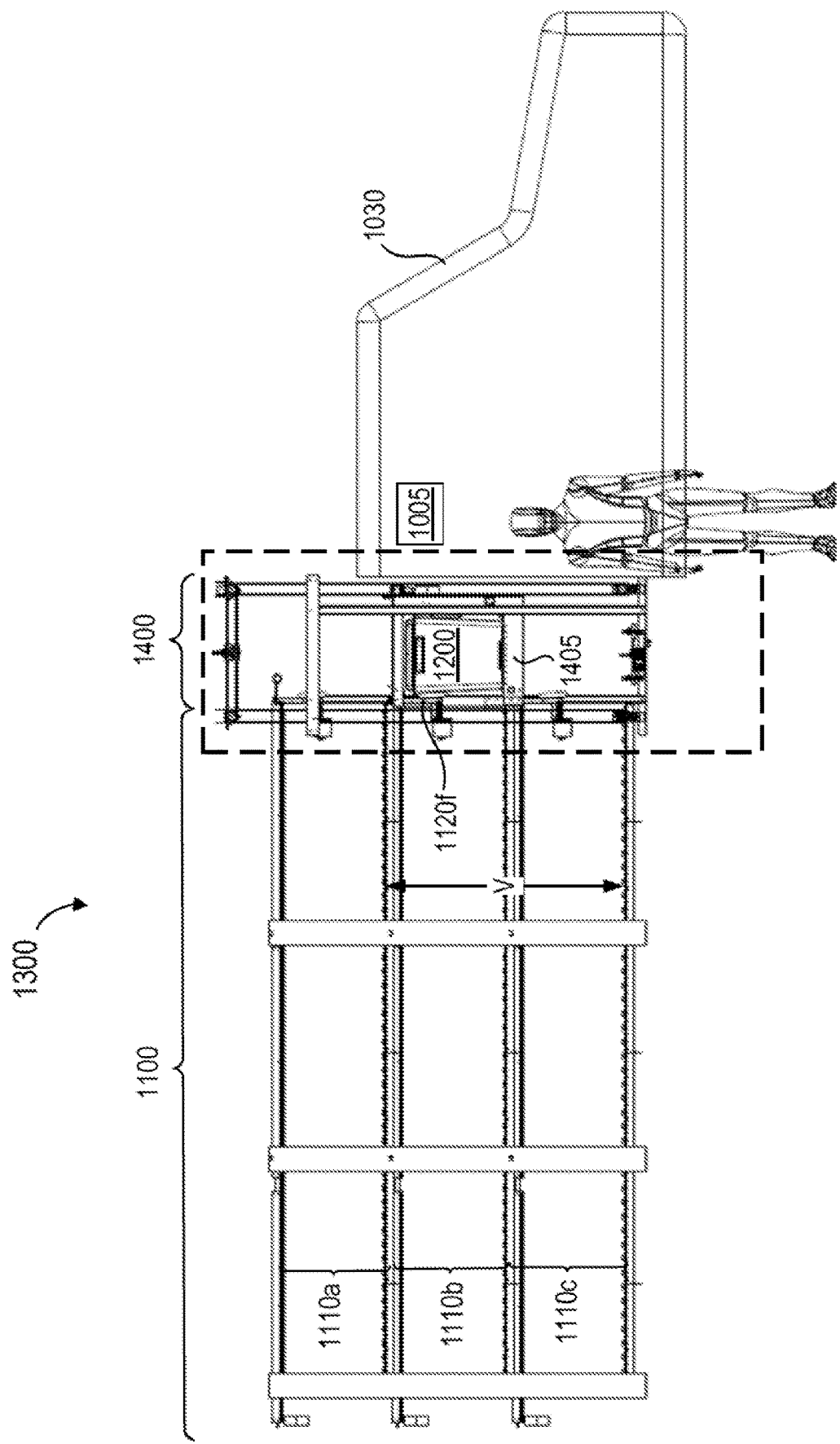
FIG. 16 depicts a schematic side view of the container if FIG. 15 being fully moved onto the elevator with the unloading pushers positioned within the elevator.
Figure 17:
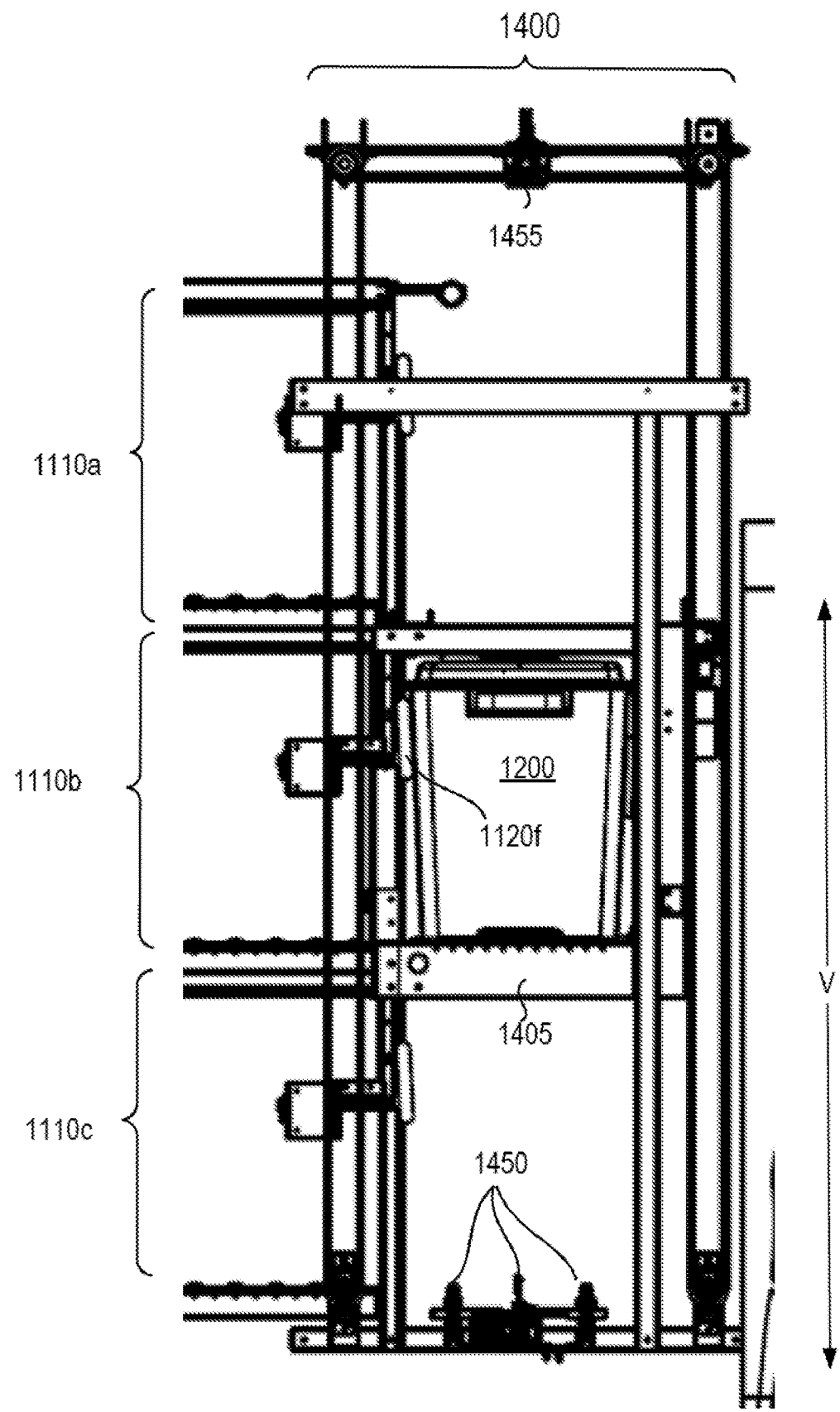
FIG. 17 depicts the elevator portion of FIG. 16.
Figure 18:
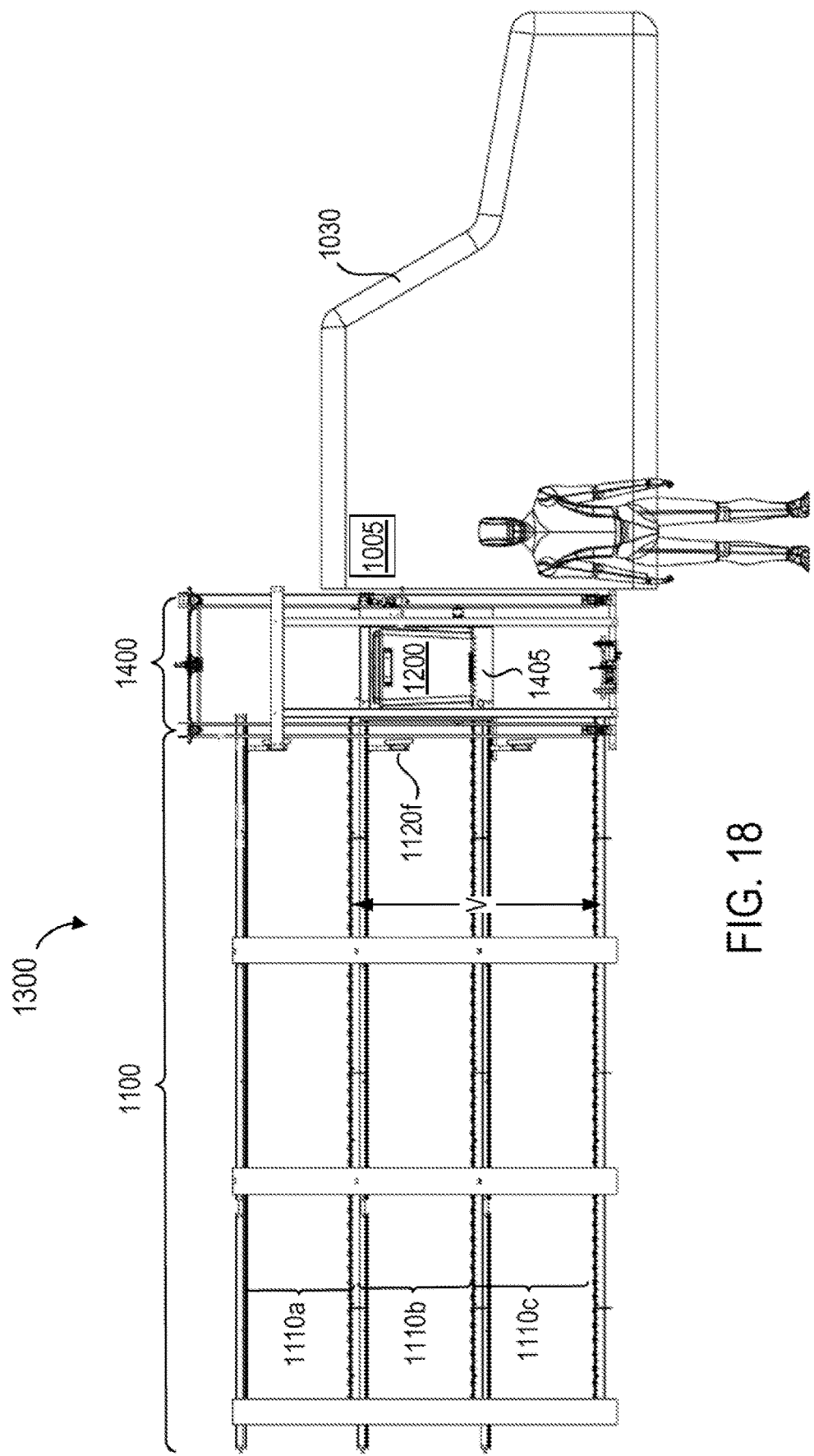
FIG. 18 depicts a schematic side view of a container being unloaded from a flow rack array onto an elevator with the unloading pushers being withdraw into the rack array.
Figure 19:
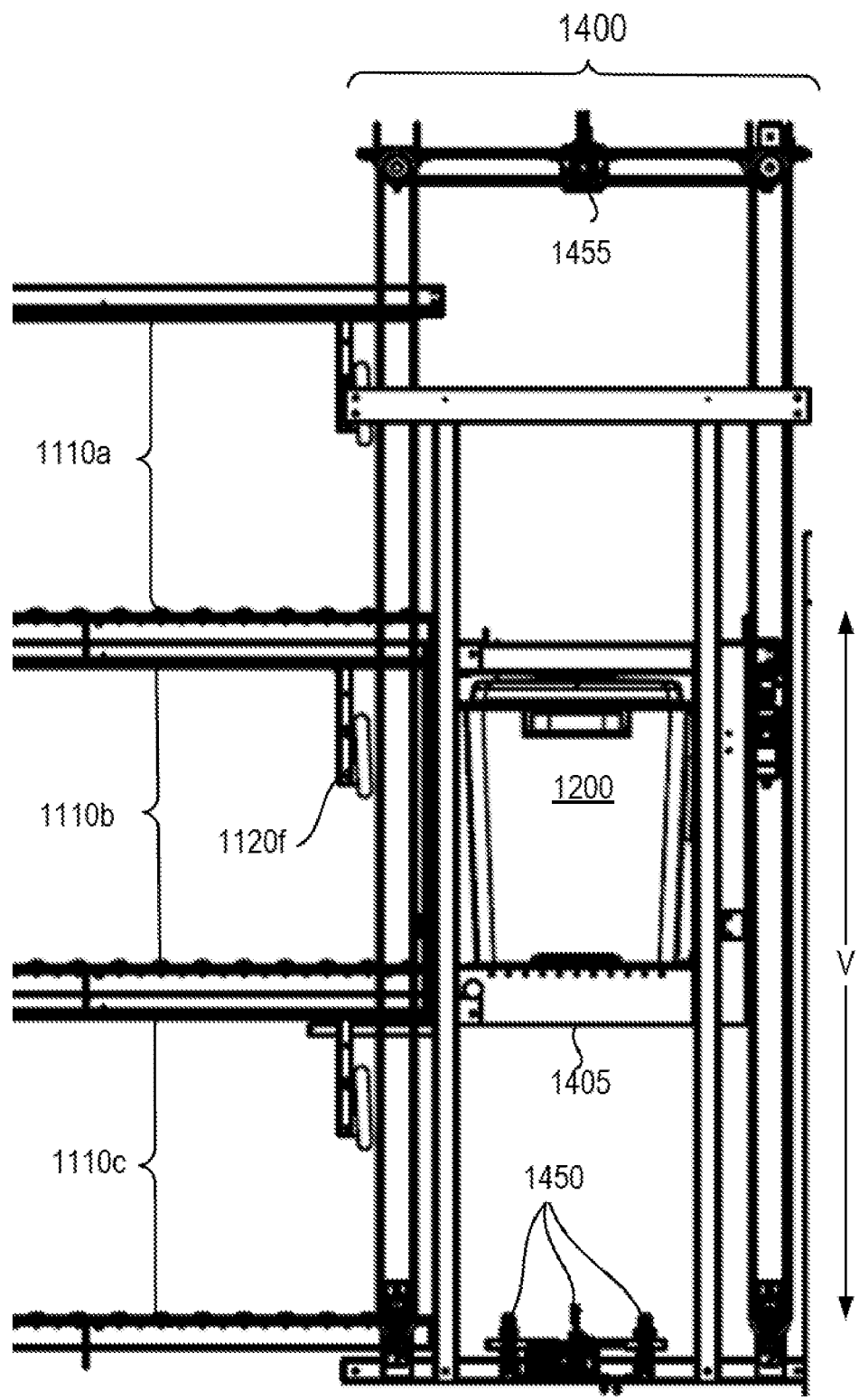
FIG. 19 depicts the elevator portion of FIG. 18.
Figure 20:
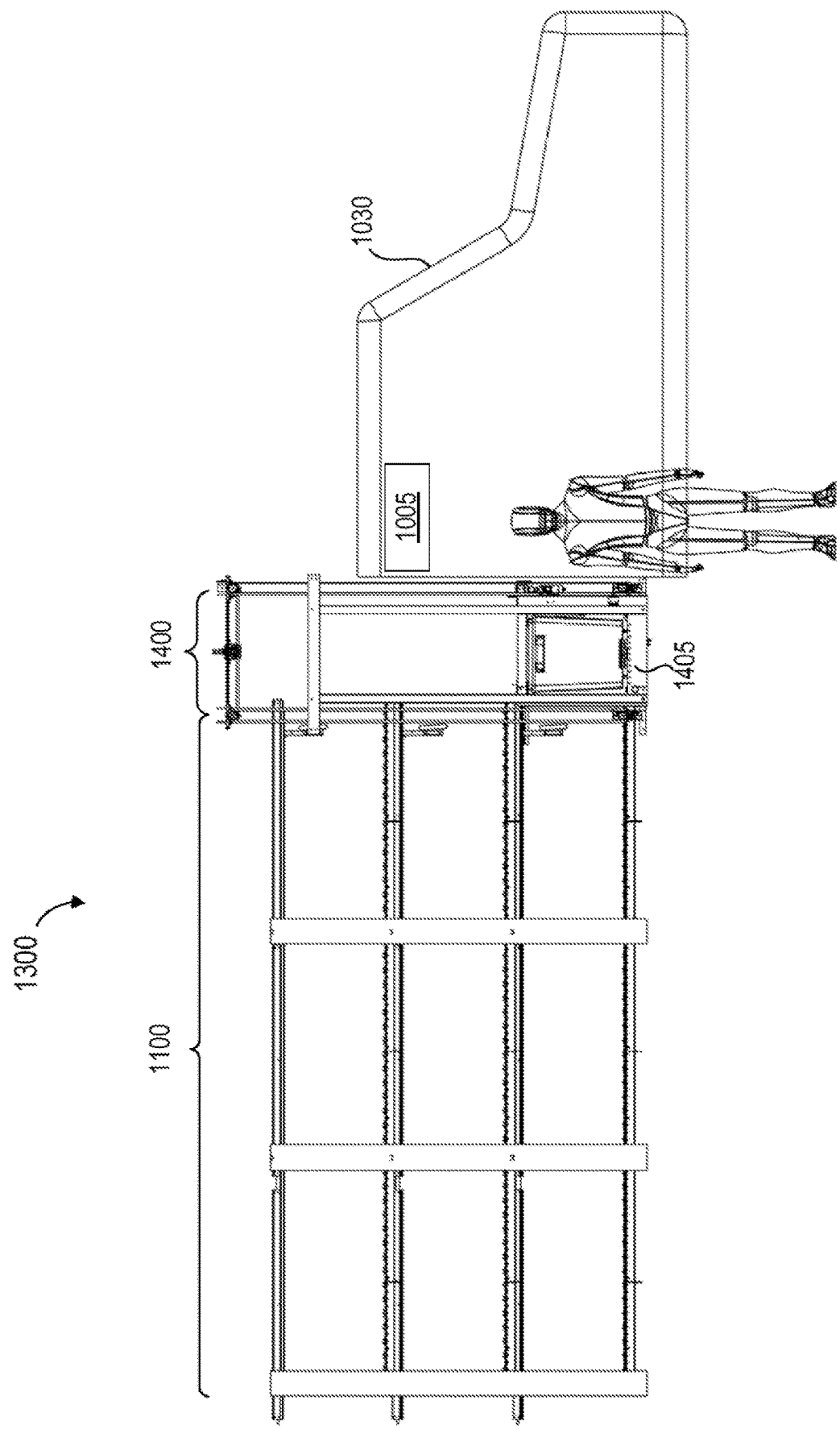
FIG. 20 depicts a schematic side view of the elevator of FIG. 19 being lowered to an unloading transfer height.

In implementations, as shown in FIGS. 14A-B, each one of the plurality of unloading pushers 1120 comprises a contact face 1122 configured to engage a back surface 1205 of a container 1200a disposed at the back end of the one or more of the plurality of containers 1200a-i disposed on each of the flow racks 1102 the array 1100. The contact face 1122 includes a contact material that is at least one of compliant and non-marking. Additionally or alternatively, in implementations, the contact face includes a contact material that is durable and wear resistant, and that provides damping against any collisions. The contact material can comprise at least one of silicone, rubber, nylon, and rigid polyurethane foam. As shown in FIGS. 16-17, the contact face 1122 is configured to enter the elevator 1400 upon pushing the container 1200 disposed at the back end of a plurality of containers 1200 onto the elevator 1400.

In implementations, as shown in FIG. 14B, each one of the plurality of unloading pusher drives includes a motor 1123. In implementations, for example, the motor can be a DC motor that nominally runs at 12V and 6 A. This is a non-limiting example and is intended as one of many potential options for this infrequently run motor. In implementations, each one of the motors includes an operably linked encoder 1124 in communication with the controller 1005 and configured to output a signal indicative of pusher position between the front end 1105 and the back end 1107. Additionally or alternatively, in implementations, each flow rack 1102 comprises at least one of one or more IR break beam sensors, one or more limit switches, and one or more Hall-effect sensors for determining a position of a corresponding unloading pusher 1120 along the length of the a rack 1102 between the front end 1105 and the back end 1107.

In implementations, as shown in FIGS. 11-12, each flow rack 1102 of the system 1300 further includes at least one rail 1135a-b disposed at a top of each flow rack 1102 of the array of flow racks 1100. The at least one rail 1135a-b is configured to receive thereon in slidable engagement an associated one of the plurality of unloading pushers 1120. In implementations, the at least one rail 1135a-b is configured to extend into the elevator 1400 such that the unloading pusher 1120 enters the elevator 1400 (FIG. 17) for fully pushing a container 1200 onto the movable carriage 1405. In subsequently described implementations of the at least one rail being beneath the pusher for receiving pusher wheels and corresponding rails on the elevator 1400 for receiving the pusher wheels such that the pusher enters the elevator 1400 during unloading from the array of racks 1100.

In implementations, as shown in FIGS. 12 and 14B, a connector 1140 extends between each one of the plurality of pushers and a corresponding one of the plurality of unloading pusher drive motors 1123. The connector can include at least one of a belt and a roller chain. In implementations, each one of the plurality of pushers can be driven by a motor mounted directly on the pusher. For example, an ASRS implementation (FIGS. 33-34) can include a motor mounted directly on the pusher. In implementations, each one of the plurality of pushers can be pushed from behind by a corresponding pneumatic bladder. Alternatively, in implementations, each one of the plurality of pushers can be driven by a cable and an antagonistic spring. Additionally or alternatively, in implementations, the pusher is motor driven view a rotary-to-linear drive mechanism, for example a rack and pinion or chain driven mechanism.

In implementations, each one of the plurality of flow racks 1102 of the array of flow racks 1100 has a length LF extending parallel to a length LT of a transport volume of the delivery vehicle 1000, and each one of the flow racks 1102 comprises a plurality of container positions along the length LF each configured to receive one of the plurality of containers 1200*a-i*. In implementations, the plurality of container positions comprises a range of between about 5-15 positions. In implementations, each one of the plurality of containers 1200*a-i* weighs between about 5 to 50 lbs. Each one of the plurality of containers weighs about 30 lbs. A collective maximum weight of a plurality of containers 1200*a-i* disposed on the array of flow racks 1100 is in a range of between about 50 to 100 percent of the weight of a structure defining the array of flow racks 1100. In examples, each one of the plurality of containers 1200*a-i* comprises outer envelope dimensions of at or around 12 inches by 22 inches by 14 inches.

In implementations each one of the plurality of containers 1200*a-i* comprises a matching bottom surface length and width so that the individual ones of the plurality of containers 1200*a-i* each occupy identical surface areas on a flow rack 1102. Additionally or alternatively, one or more of the plurality of containers 1200*a-i* comprises one common dimension across the width of a flow rack 1102 (parallel to the width WT of the truck 1000) and one or more variable dimensions comprising at least one of a height and a length (parallel to the length LF of the array of flow racks 1100).

Figure 31:
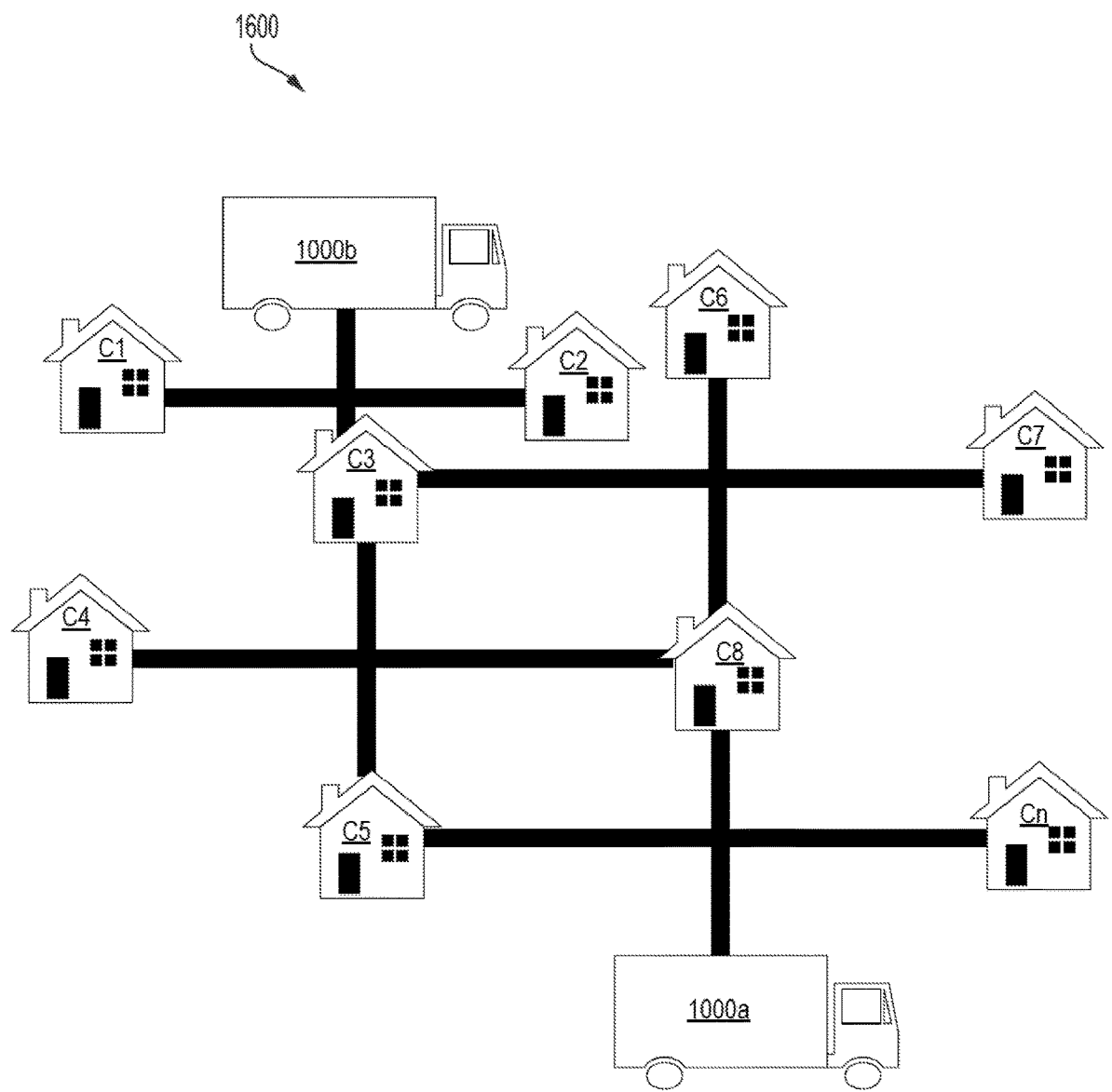
FIG. 31 depicts a schematic example of a travel route for a mobile delivery vehicle.

In examples, each one of the plurality of containers 1200*a-i* is associated with a single customer, and a single customer (e.g., delivery and pick up address) may be associated with more than one container 1200 in an array of flow racks 1100. The array of flow racks 1100 is configured to receive one or more containers 1200*a-i* associated with a plurality of customers. As shown in FIG. 31, each one of the plurality of customers is associated with a physical location C1-Cn along a delivery and pickup route 1600 transited by the delivery vehicle 1000. Locations comprise, for example, residential addresses and workplace addresses associated with customers. In implementations, the controller 1005 is further configured to record in a memory in wired or wireless communication with the controller 1005 each location within the array of flow racks 1100 of one or more containers 1200 associated with each one of the plurality of customers. The controller 1005 can be further configured to record in the memory which one or more containers 1200 have been unloaded from the array of flow racks 1100 along the route transited by the delivery vehicle 1000. In implementations, a delivery route transited by the delivery vehicle 1000 is predetermined based on an order in which each of the one or more containers 1200*a-n* associated with each one of the plurality of customers is received into the array of flow racks 1100.

Additionally or alternatively, in implementations as shown in FIG. 14, each of the containers 1200 comprises an identification marker 1210 for associating with one of the plurality of customers. The identification marker 1210 is at least one of externally visible and embedded within the container 1200. In implementations, an externally visible identifier comprises at least one of colored tape, colored boxes, and a manually adjustable color indicator for associating one or more boxes with a particular customer. In implementations, the controller 1005 can determined based on a delivery route and customer color indicators that containers belonging to two customers with similar or identical colors identifiers are not adjacent on a rack 1102. This is especially helpful for delivering to one or more customers at a shared address, such as an apartment complex or duplex house sharing a single route stop. Additionally or alternatively, in implementations, the identification marker 1210 can include at least one of a machine-readable serial number, a machine-readable barcode, a machine-readable QR code, an RFID code, a NFC tag, and a digital display. Such programmable markers 1210 can be reprogrammed for subsequent use with different ones of the plurality of customers. The racking array and elevator system 1300 further comprises one or more identification sensors 1127, 1414, 1061 (FIG. 36) disposed on or adjacent at least one of the array 1100, the elevator 1400, and the vehicle side access portal 1060 for detecting and/or reading the identification marker 1210 of each container 1200 and outputting a signal to the controller 1005 indicative of the identification marker 1210 associated with a customer as the container 1200 passes by the sensor. The one or more identification sensors can be in wired or wireless communication with the controller 1005. The controller 1005 therefore is able to keep track of at least one of an array location, delivery status, and pick-up status of each of the plurality of containers 1200*a-n*. In implementations, the one or more sensors disposed on the array 1100 for detecting and/or reading each of the identification markers 1210 are disposed at each dwell position 1103, 1103*a-i* (FIGS. 11-12). Additionally or alternatively, the one or more identification sensors disposed on the array 1100 for detecting and/or reading each of the identification markers 1210 are disposed at a front 1105 of each flow rack 1102. The controller 1005 can provide an audible and/or visible alert to a delivery person as to the container status on at least one of a readable display on the container and on a portable device (e.g., a tablet, smartphone, smartwatch, computer display screen, delivery vehicle dashboard display screen) having audio and visual display capabilities.

In implementations, as previously described, each container 1200 of the plurality of containers is durable. Additionally or alternatively, each container 1200 of the plurality of containers is reusable. Additionally or alternatively, in implementations, each container is rigid. In reusable implementations, each container 1200 can be washable. In implementations, each container 1200 is a non-deformable, durable, reusable, washable container with an ingress protection rating that includes an intrusion protection rating of 5 or 6 and a moisture protection rating of any and all of 1 through 6 in accordance with the Ingress Protection Code, IEC standard 60529. In implementations, each container 1200 has an ingress protection rating of at least one of IP56, IP57, IP58, IP66, IP67, and IP68 in accordance with Ingress Protection Code, IEC standard 60529. In implementations, the one or more of the plurality of containers is recyclable. Additionally or alternatively, one or more of the plurality of containers is disposable and biodegradable. In implementations, each container 1200 comprises a material such as plastic, metal, cardboard, lined cardboard, and silicone.

In implementations, each container 1200 of the plurality of containers has two or more tapered sidewalls so that the surface area at the container top is larger than the surface area at the container bottom. In examples, as shown in FIG. 9B in the partial cut away view of an array of flow racks of FIG. 9A, the system further includes pairs of angled guides 1118*a-i*, 1119*a-i*. The pairs of angled guides are disposed lengthwise along each side of an interior cavity of each flow rack 1102 of the array of flow racks 1100 to match the tapered container sidewalls and hold each container 1200 upright during loading, unloading, and transport. The pairs of angled guides 1118a-1119a-i can be made of a durable, rigid material, such as a thin metal, wood, or plastic (e.g., ¼" or ½" thick).

Figure 26:
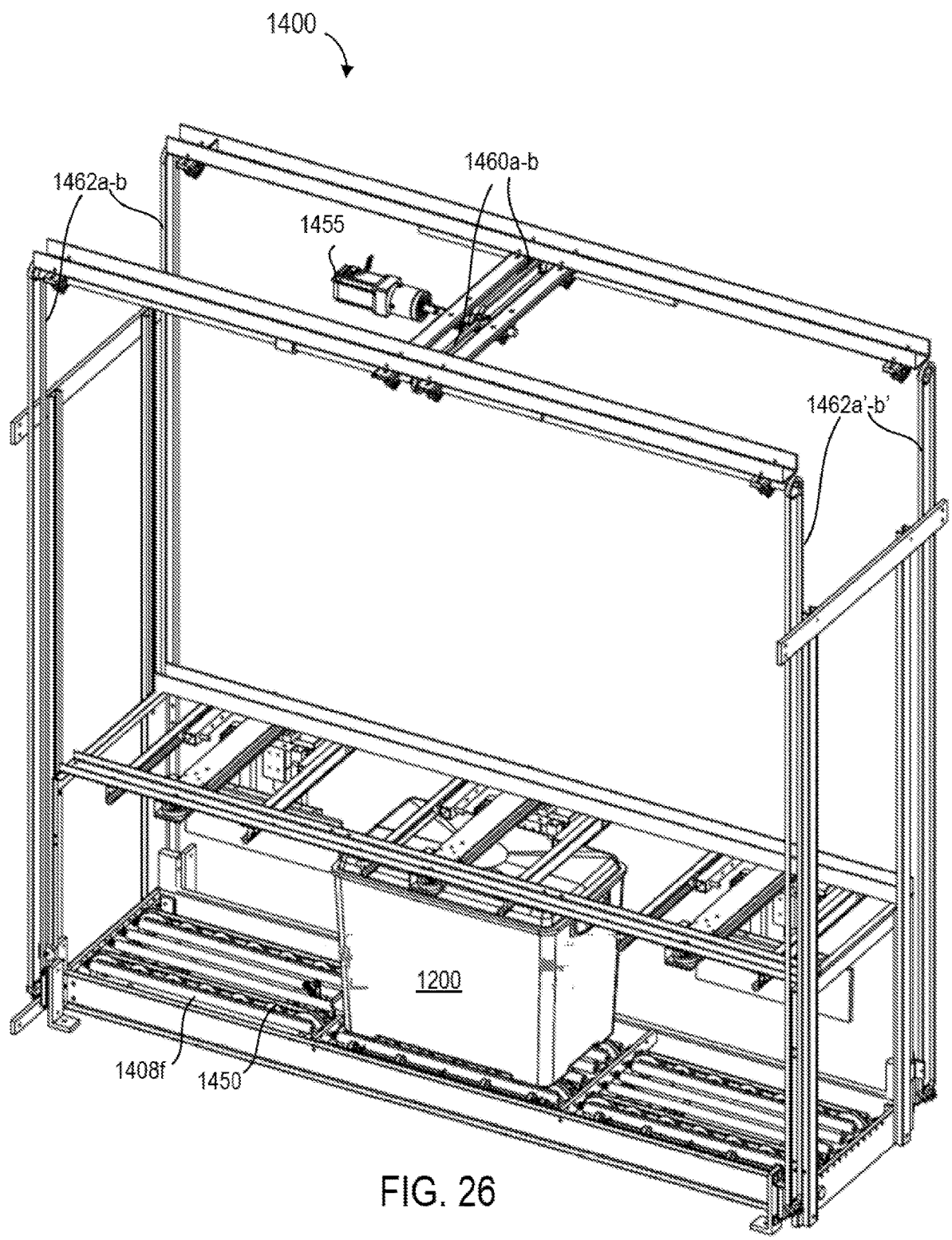
FIG. 26 depicts the perspective view of FIG. 25 with the elevator lowered to a discharge height such that the transfer wheels extend above the elevator rollers.

In implementations, as indicated in the system schematic of FIG. 26, in addition to or alternative to the one or more identification sensors, the system 1300 further includes one or more presence sensors 1126, 1404, 1062 for detecting at least one of the loading and unloading of one or more of the plurality of containers 1200 through the vehicle side access portal 1060, onto or off of at least one of the elevator 1400, and onto or off of the array of flow racks 1100. The one or more presence sensors comprises at least one of an IR break beam sensor, an encoder, a limit switch, and a Hall-effect sensor. The one or more presence sensors 1126, 1404, 1062 can be disposed at least one of at the vehicle side access portal 1060, at the front 1105 of each flow rack 1102 in the array of flow racks 1100, and at each container dwell position 1103, 1103a-i (FIGS. 11-12) along a length LF of each flow rack 1102 in the array of flow racks 1100.

Figure 25:
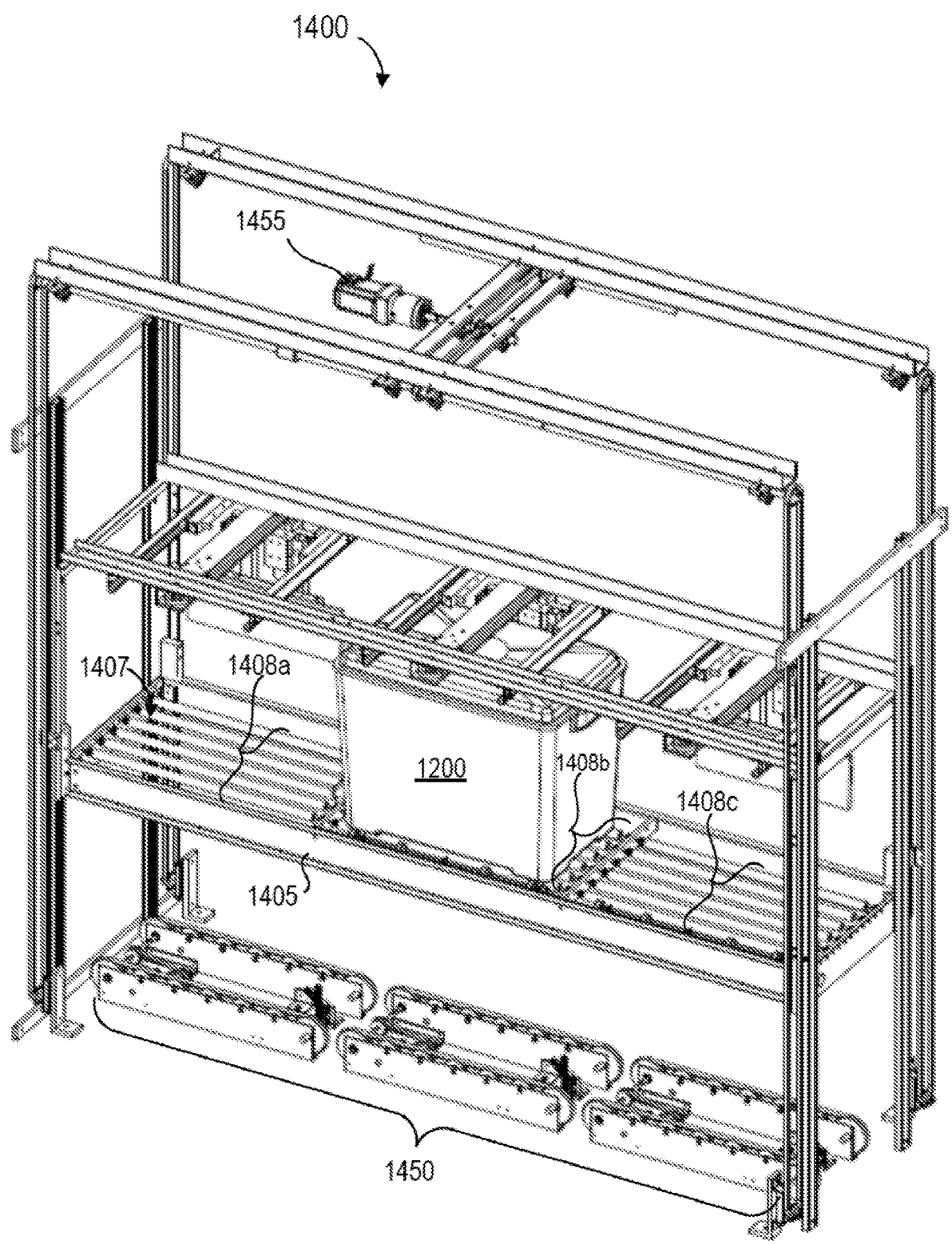
FIG. 25 depicts a perspective view of FIG. 23 showing the elevator raised above transfer wheels.

Returning now to the elevator 1400 portion of the racking and elevator system 1300, in implementations, as shown throughout FIGS. 22-29, the elevator 1400 further includes a plurality of bidirectionally driven transfer wheels 1450 disposed at a transfer level and configured to move one or more containers 1200 across a width of the vehicle. As shown in FIGS. 21A-B, the bidirectionally driven transfer wheels move a container 1200 in a travel direction from the elevator 1400 to the vehicle side access portal 1060 at the transfer level. In implementations, the bidirectionally driven transfer wheels move a container 1200 in a travel direction from the vehicle side access portal 1060 onto an elevator position aligned with one of the plurality of columns in the rack array 1100. In implementations, as shown in FIG. 25, a carriage support surface 1407 includes a plurality of one or more sets of flow wheels 1408a-c configured to rotate in a direction parallel to a length LT of the transport volume of the delivery vehicle 1000. In implementations, the one or more sets flow wheels 1408 comprise interconnected (e.g., by a belt and/or gears) rollers that rotate simultaneously. In implementations, one roller (e.g., a roller closest to the array 1100) can be powered and the others passively connected such that all of the rollers simultaneously rotate when the powered roller is rotated by a drive motor.

Figure 27:
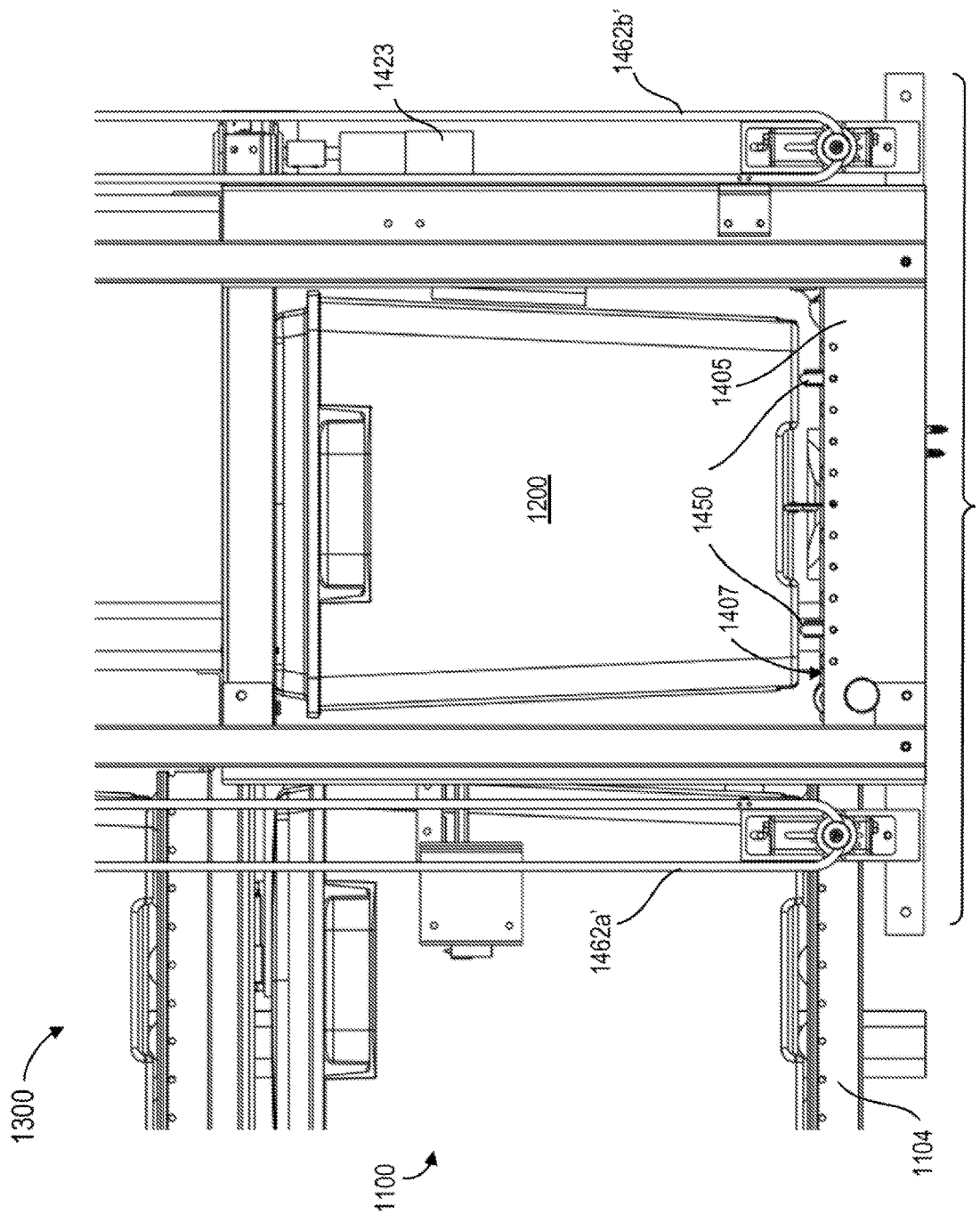
FIG. 27 is a magnified view of a container supported by the transfer rollers.
Figure 28A:
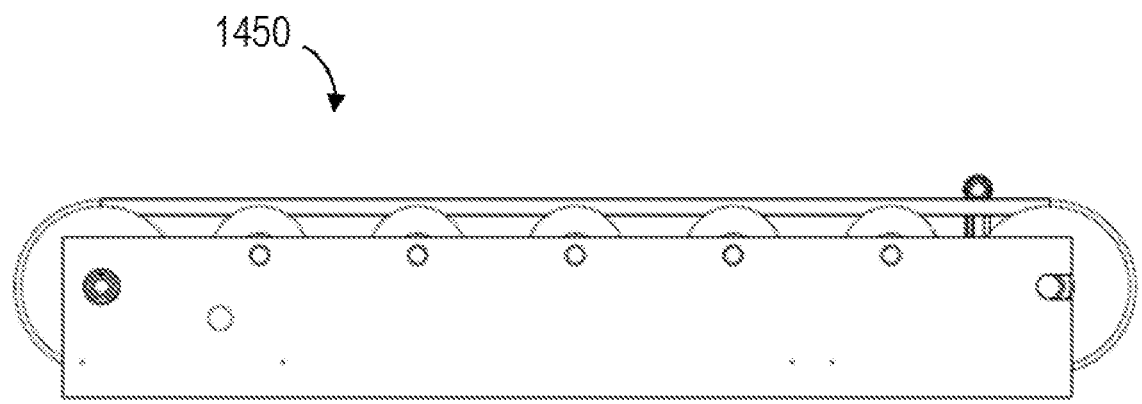
FIG. 28A depicts a side view of a transfer roller of the elevator of FIG. 27.
Figure 28B:
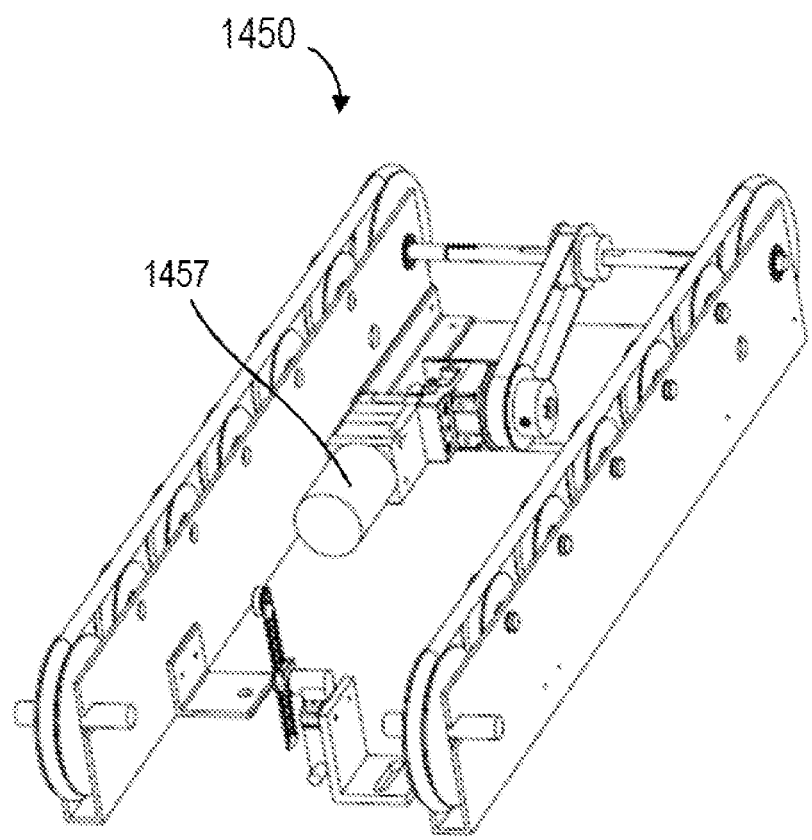
FIG. 28B depicts a perspective view of a pair of transfer rollers of FIG. 28A driven by a motor.
Figure 29A:
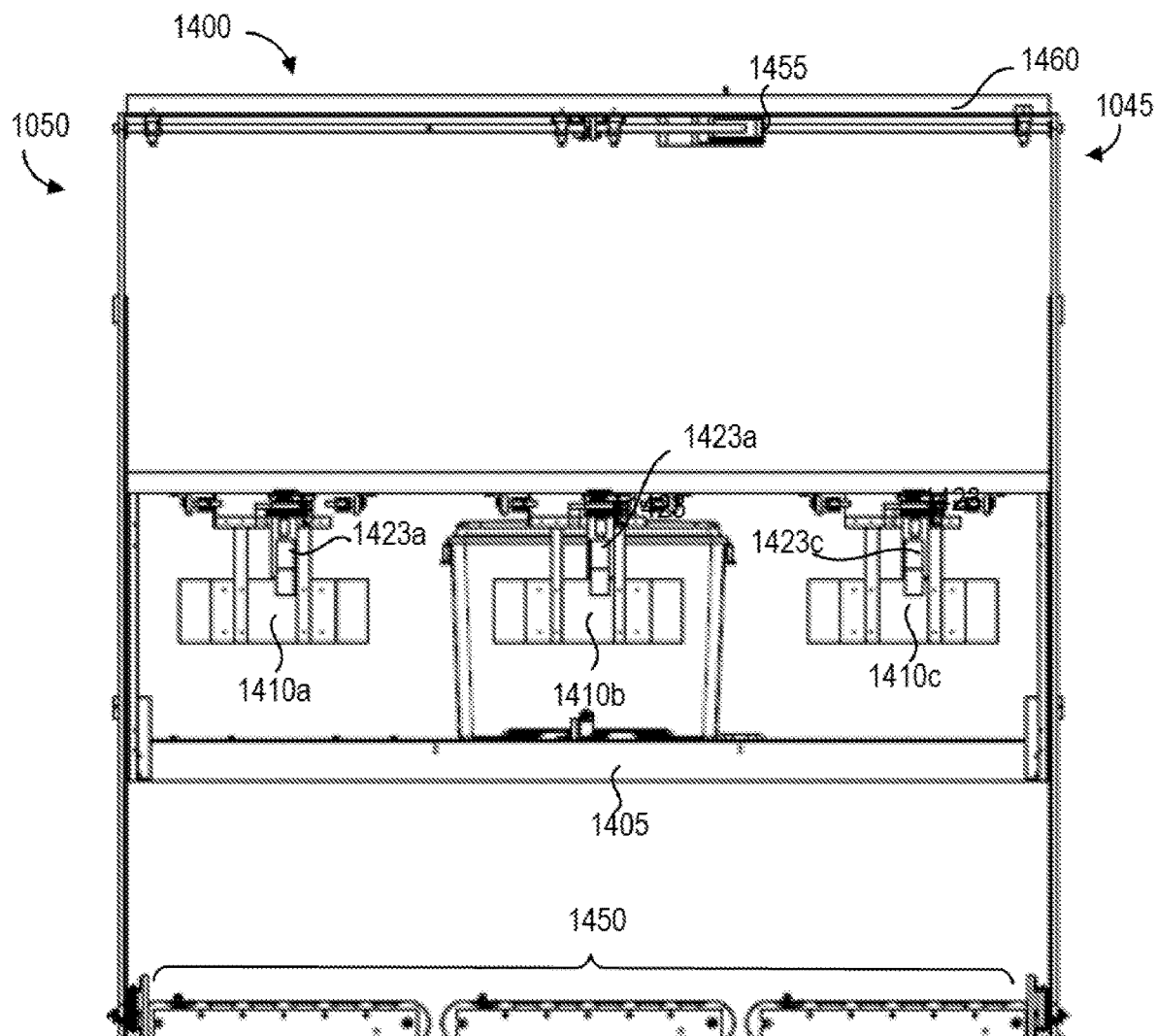
FIG. 29A depicts a rear view of an example elevator and container thereon.
Figure 29B:
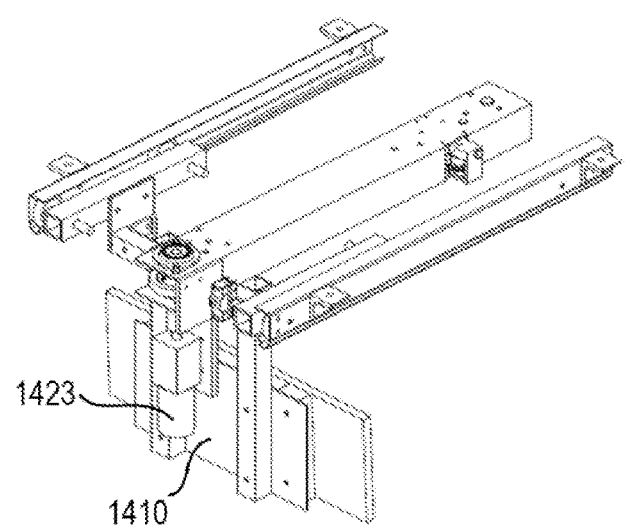
FIG. 29B depicts a perspective rear view of a pusher portion of the autonomous elevator of FIG. 29A.

As shown in FIGS. 26 and 27, the plurality of bidirectionally driven transfer wheels 1450 are configured to occupy gaps between adjacent ones of the plurality of flow wheels 1408a-c and protrude above a top surface (e.g., support surface 1407) of the plurality of flow wheels 1408a-c when the movable carriage 1405 is lowered to a loading and unloading height H1 (e.g., the transfer level). As shown in FIGS. 7 and 27, the loading and unloading height H1 is beneath the bottom row of the plurality of rows 1110a-c of flow racks 1102 such that the bidirectionally driven transfer wheels 1450 are not engaged with the flow wheels when the carriage support surface 1407 is aligned with the bottom row of the array of flow racks 1100. In examples, as shown in FIGS. 28B and 29, the elevator 1400 further includes one or more drive motors 1457, 1457a-c for rotating the plurality of bidirectional transfer wheels 1450. The one or more drive motors 1457 can be at least one of disposed in line with the plurality of transfer wheels 1450 and mounted at the top of the elevator 1400 and connected to the transfer wheels 1450 with a drive belt.

In implementations, the elevator 1400 further includes one or more sensors for detecting a columnar location of the container traveling from side-to-side on the plurality of bidirectional transfer wheels 1450. The one or more sensors can include at least one of an IR break beam sensor, an encoder, a limit switch, and a Hall-effect sensor.

Implementations, the elevator further includes at least one of an encoder 1403 (see FIG. 36) and limit switches 1404 in communication the elevator motor drive 1402 and configured to output an elevator position signal to the controller 1005 while moving up and down, the output signal being indicative of vertical location of the carriage support surface 1407 relative to each of the plurality of rows of flow racks 1102a-i.

In implementations, as shown in FIGS. 30A and 30B, each one of the plurality of loading pushers 1410a-c is analogous to the unloading pushers of FIG. 14B. In implementations, each of the loading pushers 1410a-c comprises a drive motor 1423a-c in operable communication with the controller 1005 via a loading pusher motor drive 1411. In implementations, the drive motor 1423 can be a DC motor that nominally runs at 12V and 6 A. This is a non-limiting example and is intended as one of many potential options for this infrequently run motor. In implementations, each one of the motors includes an operably linked encoder 1412 in communication with the controller 1005 and configured to output a signal indicative of pusher position between retracted and extended positions for respectively receiving a container 1200 onto and pushing a container off of the movable carriage 1405 of the elevator 1400.

In implementations, the vehicle 1000 comprises at least one side access portal 1060 on a curb side of the vehicle. Additionally or alternatively, the at least one side access portal comprises an opening on a driver's side of the vehicle 1000. The elevator 1400 allows containers 1200 from all of the flow racks in the array of flow racks 1100 to reach a delivery person 10 at least one side of the vehicle 1000. Having an option for selecting a discharge side of the vehicle accommodates for variation in terrain, one way streets, and other drive preferences. Additionally or alternatively, as previously described with regard to step van implementations, an elevator 1400 can eject one or more containers 1200 into the driver's cab directly through a cab access portal without the delivery person exiting the driver's cab. The cab access portal in a step van opens to enable a delivery person to enter the transport volume from the driver's cab without having to exit the vehicle 1000.

In implementations, as shown in FIG. 26, a flow wheel 1408f of the movable carriage 1405 adjacent an edge abutting the front end of the array is at least one of larger than and higher than the remainder of the plurality of flow wheels 1408 of the carriage support surface such that a container 1200 disposed on the carriage support surface 1407 cannot roll back onto the front end of the array 1100. Additionally or alternatively, in implementations, the carriage support surface further comprises a detent (not shown) configured to retain a container loaded on the carriage support surface from the array of flow racks.

In implementations, each one of the plurality of loading pusher drives 1411a-c is configured to move each one of the plurality of loading pushers 1410a-c independently. Additionally or alternatively, in implementations, the plurality of loading pusher drives 1411a-c are configured to move two or more of the plurality of loading pushers 1410a-c simultaneously.

In implementations, all or some of the motors of the plurality of unloading pushers 1120a-i, the plurality of loading pushers 1410a-c, the stop gate 1130, the elevator 1400, and the transfer rollers 1450 are configured to be rechargeable. In implementations, the vehicle is an electric vehicle and all some of the aforementioned motors can be charged off of the battery which can be charged by regenerative braking, for example. Additionally or alternatively, the power system of the electric vehicle can be charged by another environmentally-friendly power generation system. For example, one or more solar panels disposed on the vehicle 1000 can harness solar energy for powering the vehicle and some or all of the motors of the autonomous racking and elevator system 1300.

Figure 32:
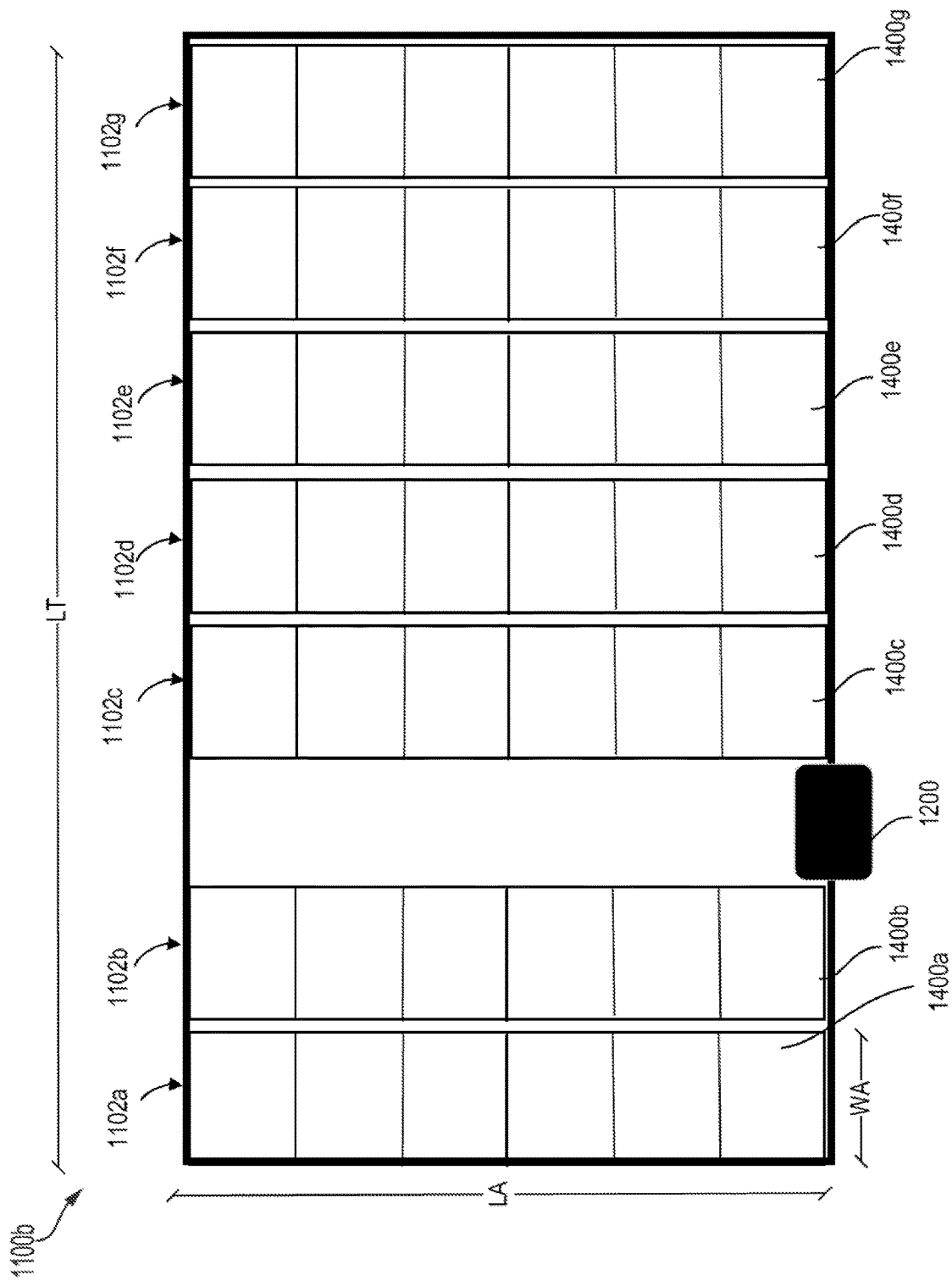
FIG. 32 depicts an alternate example of an autonomous racking system of the mobile delivery vehicle.

Although implementations of an autonomous racking and elevator system 1300 have been described as comprising an actuated array of flow racks oriented length wise from front to back of a delivery vehicle 1000 and having a single elevator 1400 traversing a width of the vehicle 1000 across an end of the array 1100 for side-loading the vehicle, other racking systems are contemplated. Implementations, such as the schematic array 1100b of FIG. 32, comprise a side-loaded vehicle having a transport volume length LT occupied by a plurality of flow racks 1102a-g oriented width wise and each comprising a dedicated elevator 1400a-g at a loading end.

In other implementations, the autonomous racking system can include a plurality of gravity driven flow-racks. In other implementations, at least one gravity driven and actuated flow rack can be loaded at a back opening of the vehicle. In implementations, loading the vehicle comprises opening a back door and inserting an entire loaded array of flow racks into the transport volume of the vehicle 1000.

Figure 33:
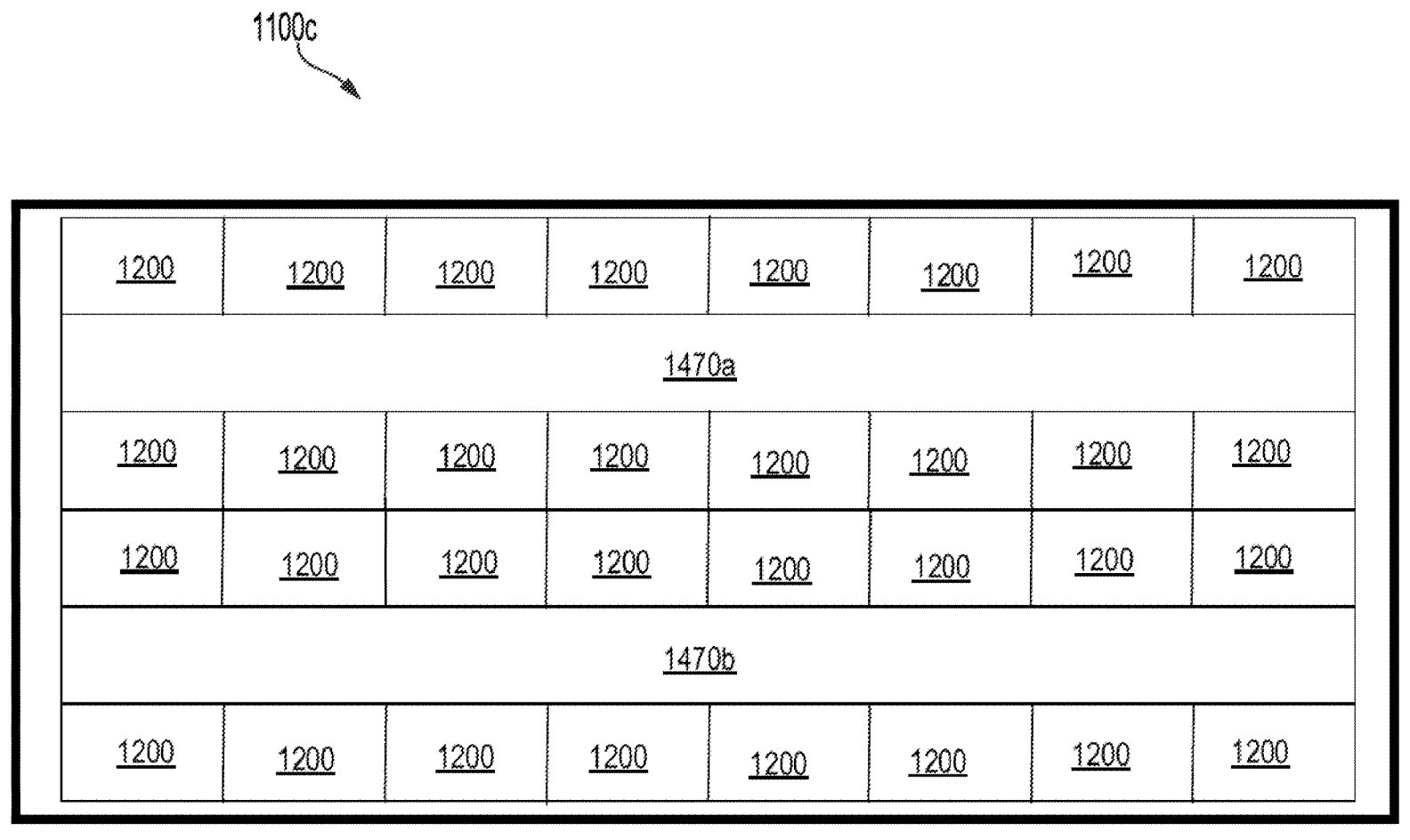
Figure 34:
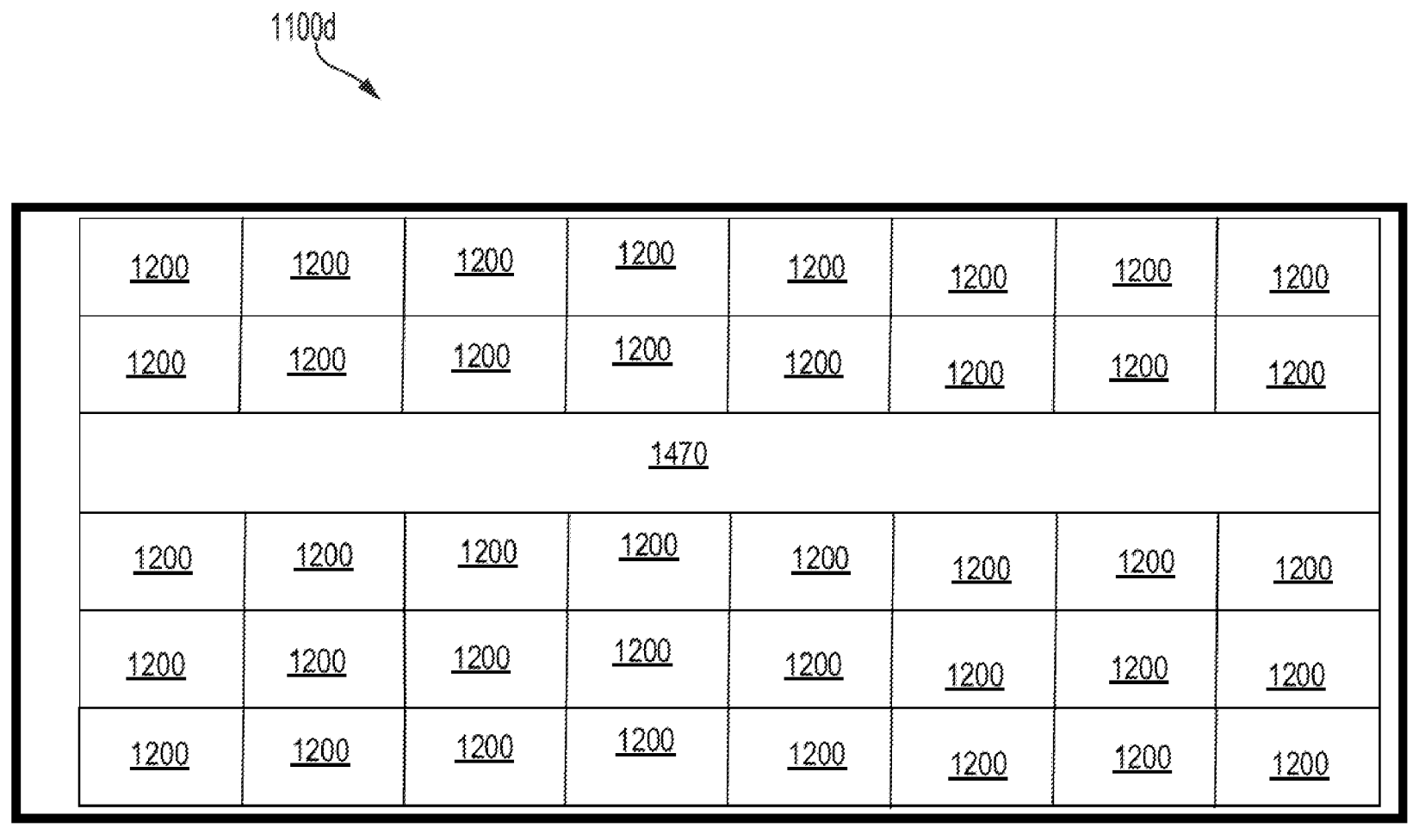

In implementations, such as the schematic systems of FIGS. 33 and 34, the autonomous racking system comprises an automated storage and retrieval system (ASRS) system. In implementations, the ASRS system can be one of full and multi-depth. As shown in FIG. 33, a back-loaded ASRS system 1100c comprises two shuttles 1470a-b configured to access any container 1200a-n at any time. As shown in FIG. 34, in implementations a back-loaded multi-depth ASRS racking system 1100d comprises one shuttle 1470 configured to access all containers 1200a-n.

Figure 35:
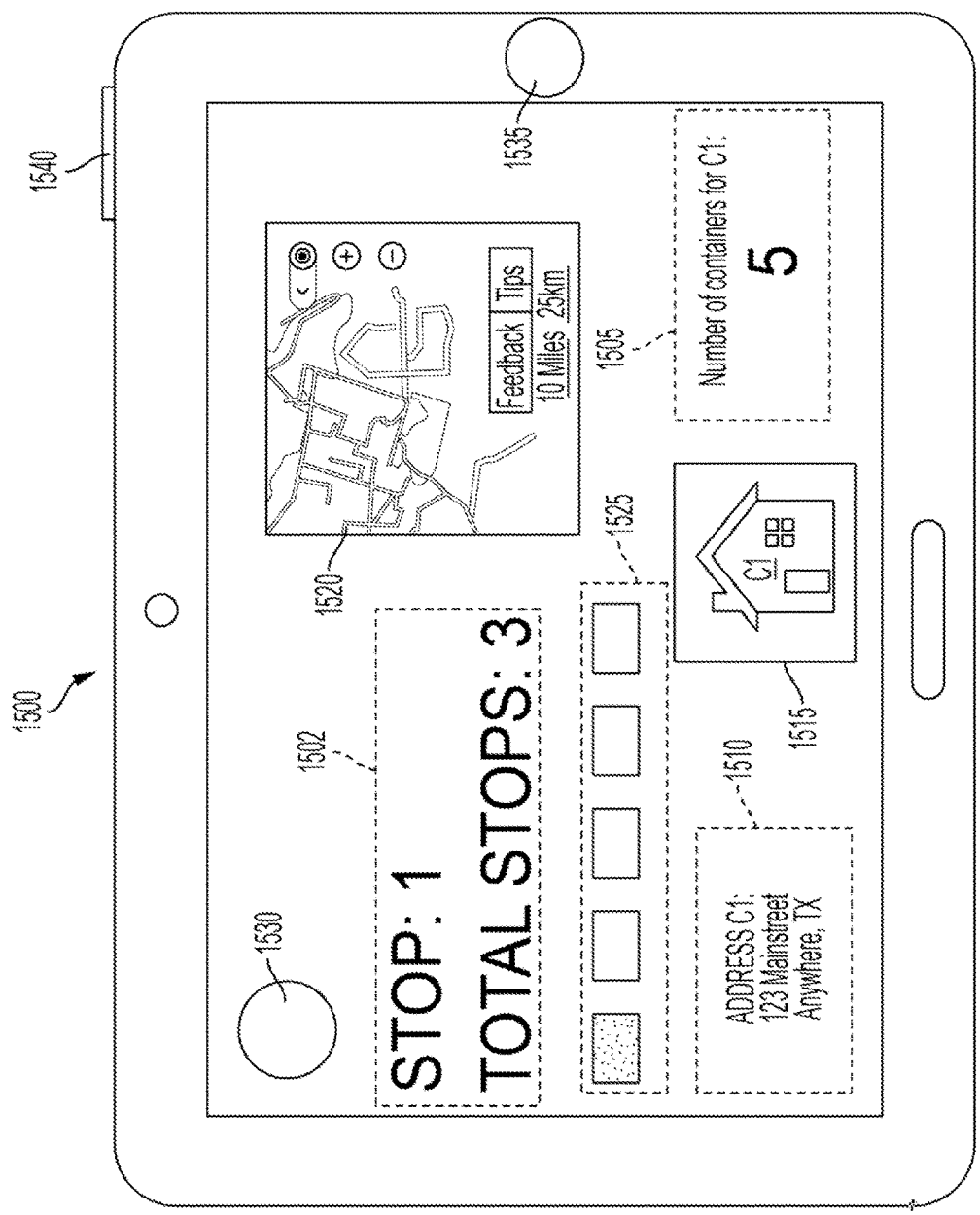
FIG. 35 depicts an example UI screen of a handheld device in communication with a controller of an autonomous racking system of a mobile delivery vehicle.

In implementations, such as that of FIG. 35, the system 1300 comprises a delivery vehicle interface 1500 that comprises a screen (e.g., a touch screen), one or more buttons, and/or a keypad to aid a delivery person 10 in determining how many containers 1200 to retrieve from or return to any given customer location C1-Cn. In implementations, the user interface 1500 provides information about progress along a travel route as displayed in a delivery stop count 1502, and information regarding a quantity 1505 of containers 1200 to retrieve from or return to any given location. For example, an address 1510 for delivery and/or pickup is displayed on the screen for the next destination along a travel route. An image or representation 1515 of the premise or location(s) for delivery and/or pickup is provided. The image 1515 can be obtained by a method including at least one of the controller 1005 retrieving an image from a street view image service, the controller 1005 receiving an image input by a customer at a terminal in communication with a network 230, the controller 1005 receiving an image input into a memory store (e.g., database) by a building management firm, and the controller 1005 receiving an image input into a memory by delivery personnel 10 on a prior visit to the location address 1510. In implementations, the user interface 1500 displays a map 1520 of the travel route.

In implementations, the user interface 1500 comprises a display of a quantity 1505 of containers that are being ejected or deposited through the vehicle access portal 1060 and/or another vehicle access point. In this example, 5 containers that are being ejected or deposited through the access portal 1060. The user interface 1500 can display a visual progress indicator 1525 showing the progress of ejecting or depositing containers from or to the portal in graphic format. In this example, one of five containers has been ejected or deposited through the access portal.

In implementations, a dynamic button 1530 or hamburger menu icon is provided to allow the delivery person 10 to select among a number of functions, such as at least one of a start, proceed, or end sequence for ejecting or depositing the containers 1200.

In implementations, the user interface 1500 can indicate a color associated with a color-coded indicia on all of the containers 1200 being delivered to a customer. The delivery person 10 can double check that the color on the one or more ejected containers 1200 matches the color assigned with the customer location C as indicated in the user interface 1500. The color-coded indicia can be, for example, a sticker or an adhesive seal applied to a cover of the container 1200 to indicate the items within have not been accessed since they were loaded into the container 1200 at the processing facility housing the one or more process lines 100, 100a-c. For addresses 1510 comprising a multi-unit dwelling with two or more distinct customers, the color-coded indicia assists the delivery person 10 in quickly identifying which one or more containers 1200 belong to which customers.

In implementations, the user interface 1500 comprises one or more physical buttons 1535 to enable the operator/delivery person 10 to select among a number of functions. In implementations, a first physical button 1535 is provided to enable the delivery person 10 to select among the functions including at least one of a start, proceed, or end sequence for ejecting or depositing the containers 1200. Another physical button 1540 can be provided to enable the operator to toggle options as necessary. The one or more physical buttons 1535, 1540 can be easier to activate as compared to a touch screen in certain wet and/or cold weather conditions along a travel route and/or while wearing gloves.

On unloading at a customer location C1-Cn, the autonomous system 1300 may automatically retrieve and disgorge through one or multiple vehicle access portals 1060 the one or more containers destined to that location. The system 1300 may disgorge the containers one at a time or more than one at a time upon request. The controller 1005 of the vehicle will know which containers are loaded into the transport volume and where each container is located in the array of racks 1100. As previously described with regard to implementations, one or more sensors in communication with the controller 1005 can read each container during loading into the vehicle and onto the array of racks 1100 and record in memory a storage location in the array of racks 1100. At each customer location along a travel route, the controller 1005 will recognize which one or more containers need to be unloaded next and actuate a pusher 1120 of the appropriate rack 1102. In implementations, the controller 1005 can operate automatically using GPS, actuating a pusher to disgorge a container upon recognizing a vehicle stop location as matching one or more containers 1200. Additionally or alternatively, the one or more containers 1200 can be retrieved manually by the delivery person 10. For example, implementations, the delivery person 10 can interact with the user interface 1500 to indicate a location along the travel route. Additionally or alternatively, the controller can memorize the planned route and correlate one or more containers in the array of flow racks 1100 with an associated stop number 1502. In implementations, upon determining arrival at a location, the controller 1005 operates a flow rack 1102 to push a single container 1200 onto the elevator 1400. The elevator lowers onto the transfer wheels that move the container from side-to-side, and the transfer wheels shift the container to the side access portal where the delivery person 10 will grab the container at an ergonomically desirable height. In implementations, the access portal 1060 comprises at least one of a hatch that folds down to support the container during ejection and an actuatable gate in operable communication with the controller 1005 for holding a container in place at the access portal until a delivery person 10 is present and ready to lift the container 1200.

Additionally, in implementations, the autonomous racking system 1300 accounts for variations in a travel route that requires unloading one or more containers out of order from the array of flow racks 1100. For example in implementations the autonomous racking system comprises an array of flow racks 1100 as described herein throughout with regard to implementations and an automated storage, and a distribution robot 9000 loads the vehicle 1000 in a last-in, first out order in accordance with a pre-planned travel route. Additionally or alternatively, the system 1300 accommodates variations in a pre-planned unloading order by shuffling one or more containers from one flow rack onto another flow rack and/or the elevator in order to unload containers associated with a location. In implementations, the controller 1005 tracks one or more flow racks 1102 having one or more unoccupied dwell positions for receiving shuffled containers. The controller 1005 then moves the undesired containers one-by-one from one flow rack 1102a, onto the elevator 1400, and onto to one or more other flow racks 1102b-i having one or more available dwell positions for accommodating the one or more shuffled containers. The controller 1005 stores in a memory the one or more new locations of the one or more shuffled containers in the array of flow racks 1100. This touchless shuffling accommodates missed stops, unavailable locations, detours, and other travel route aberrations.

Although the forgoing methods and systems are described herein with regard to the collection, cleaning, and return of laundry associated with a plurality of customers (e.g., households), the methods and systems are applicable to other businesses delivering packages to residences and businesses along a driven route. For example, the autonomous racking devices, systems, and methods as described herein with regard to implementations can be used with a grocery delivery business and an online retail service. In implementations, each container is a reusable, durable container configured to receive one or more unpackaged goods from an online retail service, thereby reducing the amount of packaging waste associated with outer packing and fill materials. In implementations, the autonomous racking devices, systems, and methods as described herein are configured to deliver one or more items mailed or shipped between residential senders and recipients.

Figure 37:
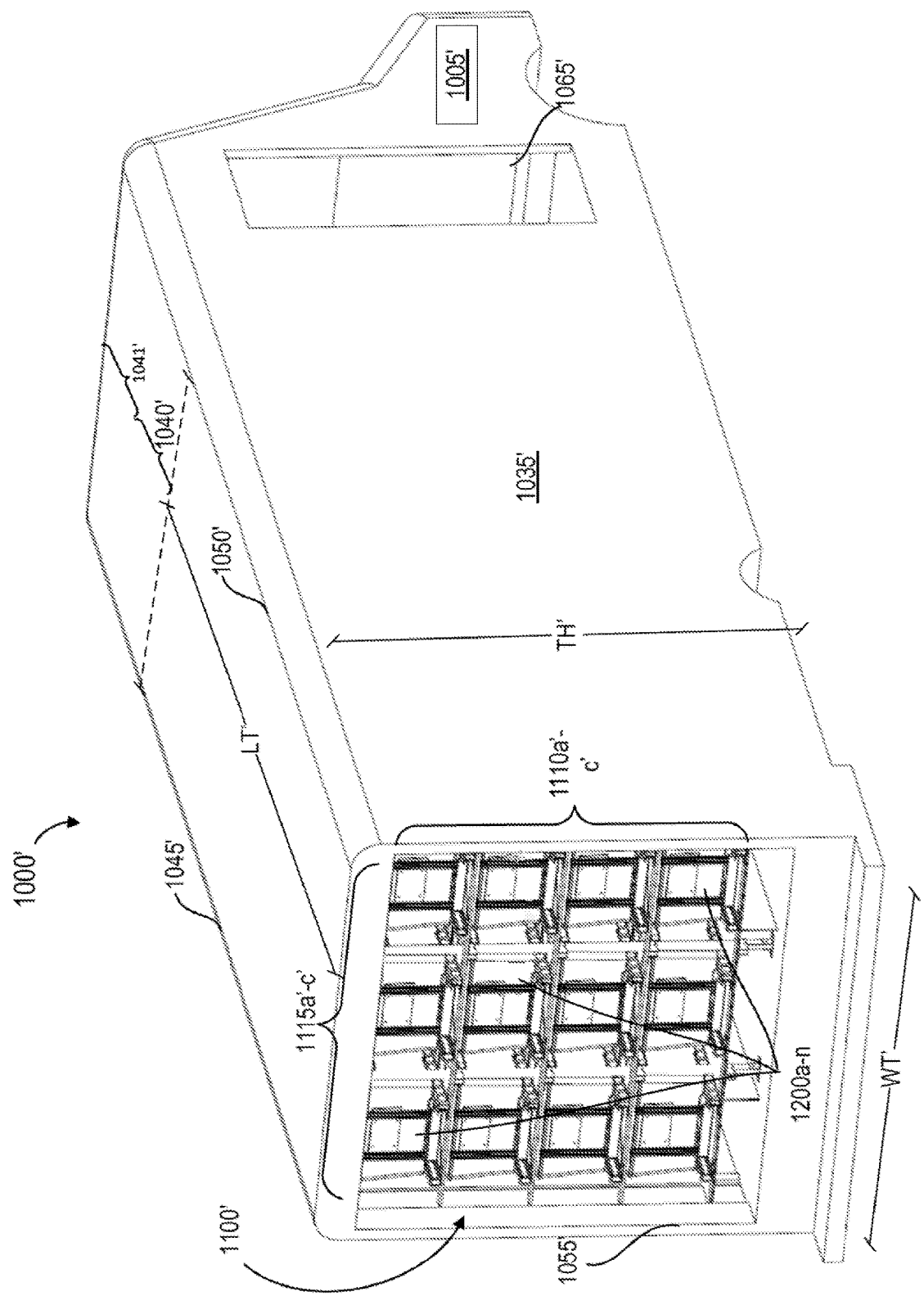
FIG. 37 depicts a rear perspective view of an array of spring-loaded flow racks in a mobile delivery vehicle and loaded with containers.

In implementations, the flow rack can be a spring-loaded rack that requires no motorized actuators. Turning now to FIG. 37, the delivery vehicle 1000' is a truck or step van configured to transport a plurality of containers 1200a-n of laundry between a plurality of customers and a laundry processing facility comprising a process line 100 of autonomously operating devices 2000-9000, as described previously with regard to alternative implementations. In implementations, an array 1100' of spring-loaded flow racks 1102' is configured to be disposed within an enclosed transport volume 1035' of the delivery vehicle 1000'. In implementations, the transport volume 1035' has a length LT' extending from a front end 1040' to a back end 1055' and a width WT' extending between a left side 1045' and a right side 1050'. In implementations, the enclosed transport volume 1035' comprises a width in a range of between about 6 to 8.5 feet and a height TH' in a range of between about 6 to 10 feet. In implementations, the transport volume 1035 is 8 feet wide and in a range of between about 8 to 9 feet tall. In implementations, the delivery vehicle 1000 is at least one of a delivery van, a walk in van (e.g., step van), and a box truck. In implementations, the vehicle 1000' is an electric vehicle. In implementations, the vehicle 1000' is a hybrid electric vehicle.

Figure 38:
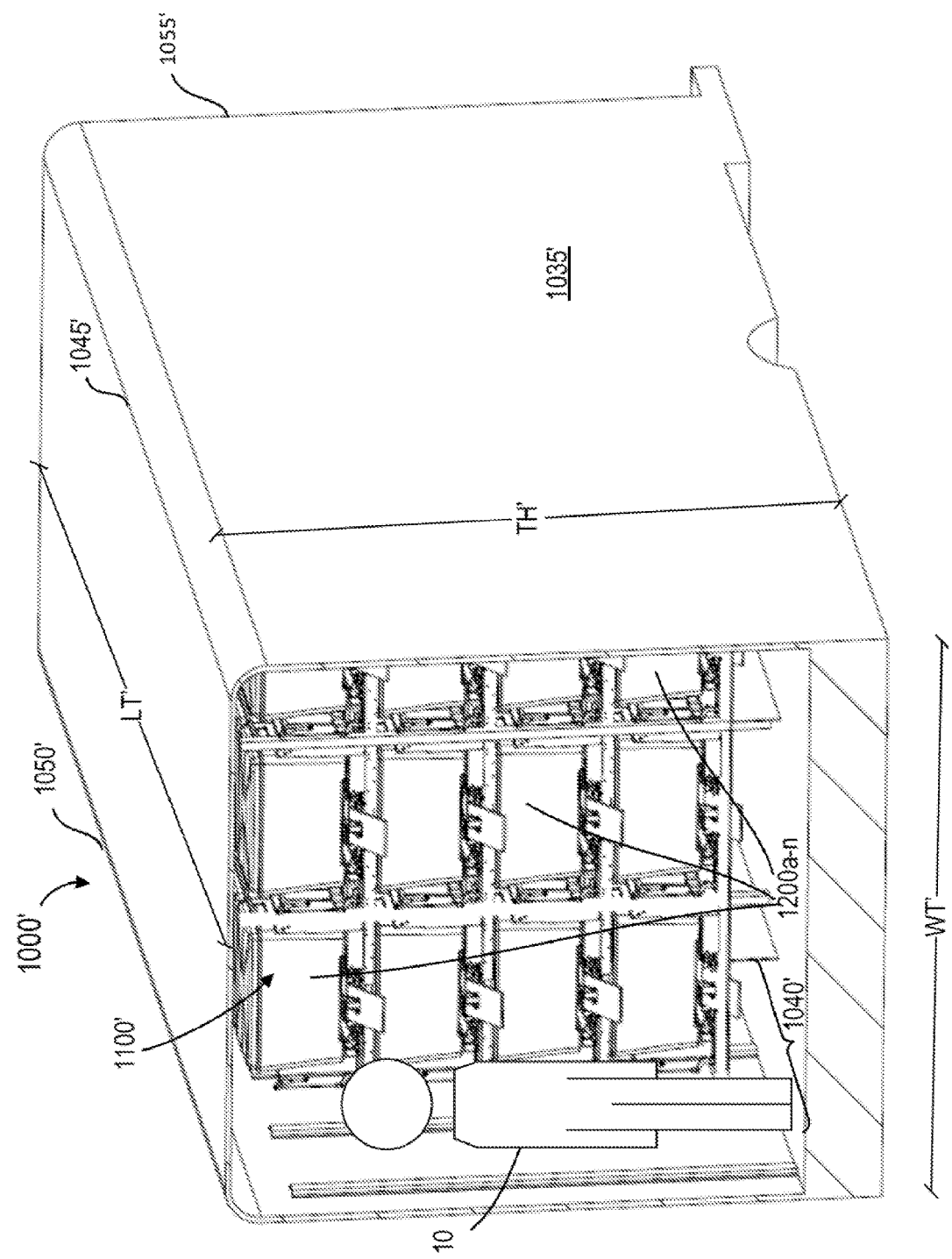
FIG. 38 depicts a front, cutaway perspective view of the mobile delivery vehicle of FIG. 37.

In the implementation of FIGS. 37 and 38, the front end 1040 comprises a walkable volume disposed between the array 1100' and the driver's compartment 1041' at the front of the vehicle 1000'. As shown in the implementation of FIGS. 37 and 38, a delivery person 10 can exit the driver's compartment and enter the enclosed transport volume 1035 through a door disposed between the two volumes. The delivery person 10 then releases one or more containers 1200a-n from one or more of the spring-loaded racks 1102' in the array 1100' and exits through a side door 1065 of the driver's compartment or through side door (not shown) in the transport volume. The front end 1040' therefore comprises a volume configured to enable the delivery person 10 to walk, reach, retrieve, and carry one or more containers 1200a-n for removal from the vehicle 1000' without impediment.

Figure 39:
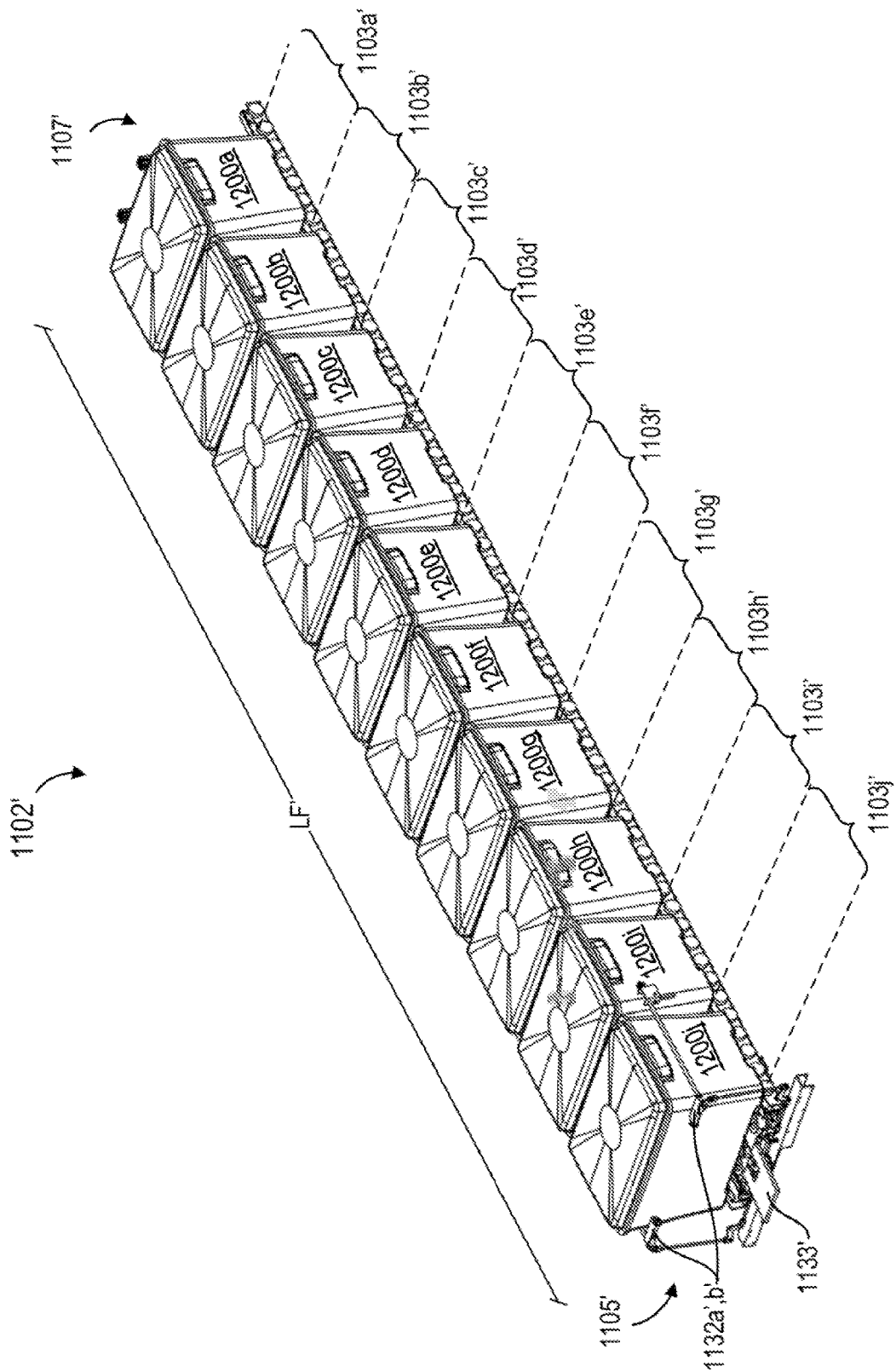
FIG. 39 depicts a front perspective view of a manually operated spring-loaded implementation of a single flow rack of an autonomous racking system loaded with a plurality of containers loaded.
Figure 40:
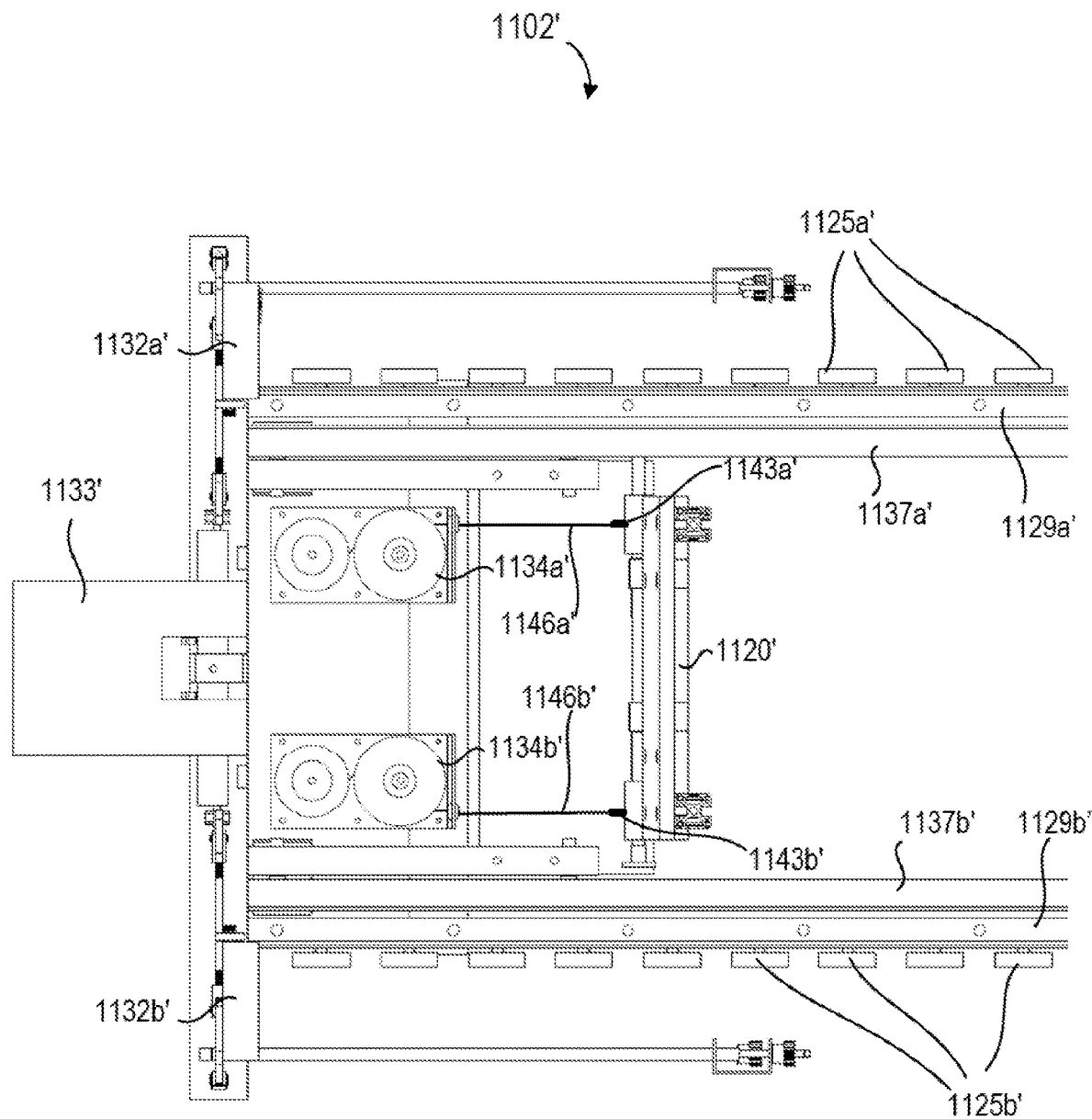
FIG. 40 depicts a top view of the single flow rack of FIG. 39 without containers loaded.
Figure 41:
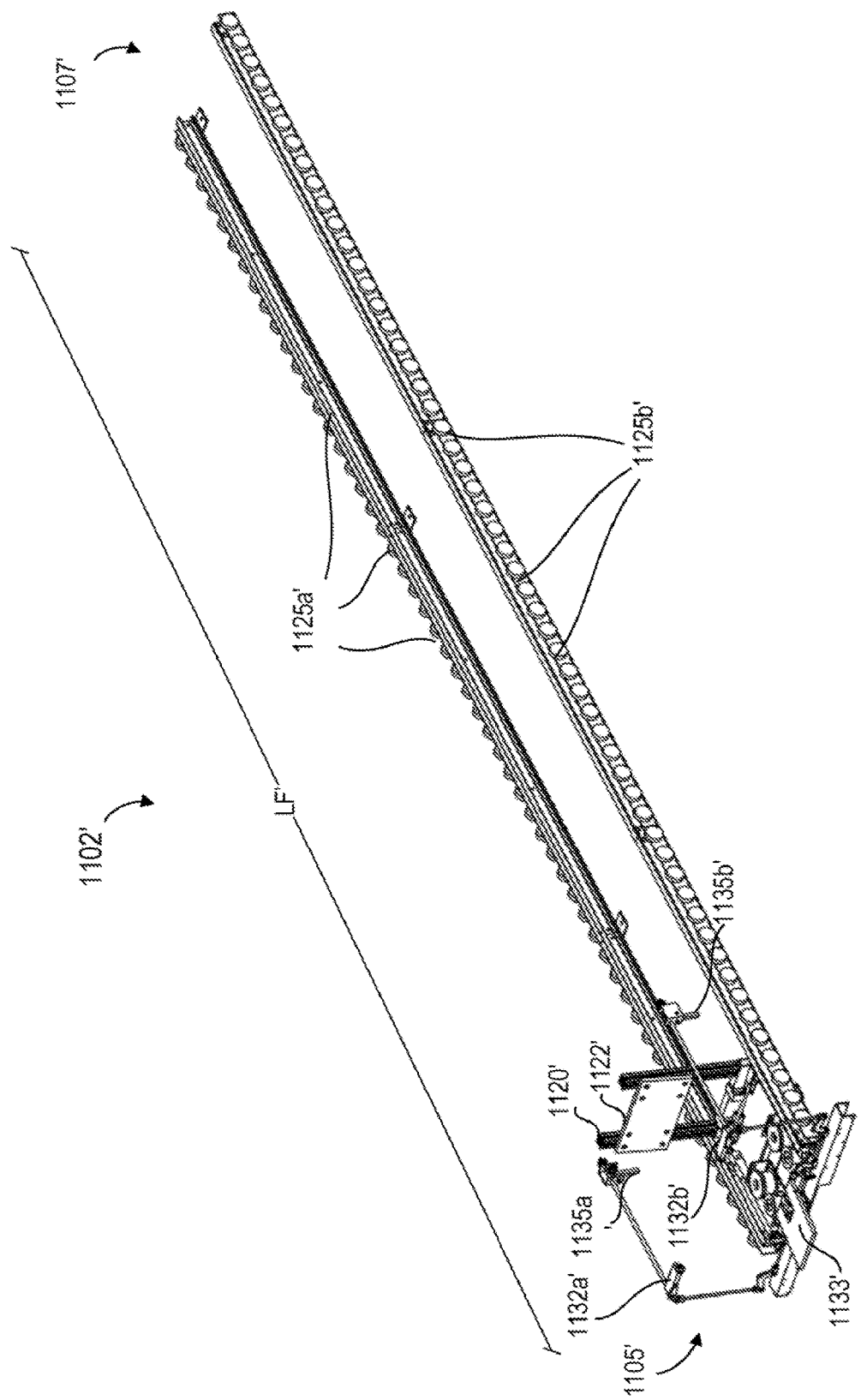
FIG. 41 depicts the front perspective view of the single flow rack of FIG. 39 without containers loaded and with a flow gate portion of the single flow rack in a closed state.

In implementations, the array 1100' comprises a plurality of densely packed spring-loaded flow racks 1102', as shown for example in FIGS. 39-41. As previously described, the racking system is designed for maximizing packing density to reduce delivery costs associated with driver labor and vehicle operation and maintenance. Maximizing packing density reduces the number of delivery vehicles and drivers required to retrieve and redistribute loads of laundry. More consolidated delivery reduces driver hours and lower costs to customers subscribed to a laundry service. The spring-loaded racking system eliminates drivers exerting themselves through extraneous physical interaction with heavy containers and prevent lifting from ergonomically disadvantageous positions. Additionally, the densely packed spring-loaded racks 1102' hold the containers securely in place so that they are undisturbed by the forces associated with driving a truck in variable terrain conditions, speed ranges, and inclines. Additionally, the delivery person need not rearrange racked containers as other containers are retrieved and the delivery person need not exert time and emergent manually adjusting any restraints. The delivery person 10 therefore need only exert a minimal manual effort when retrieving one or more containers for delivery. Additionally, as will be described subsequently herein with regard to implementations, the controller 1005 can be configured to guide the delivery person to the correct rack (e.g., via a light to pick system) for removing one or more containers for delivery and, additionally in implementations, the controller can receive a sensor signal indicative of the delivery person having retrieved a correct one or more containers for delivery at a particular customer location.

In implementations, as shown in FIGS. 39-41, the spring-loaded flow rack 1102' comprises a plurality of dwell positions 1103a' j' along a length LF' of the flow rack, each dwell position being configured to receive a container 1200a-j thereon. The flow rack 1102' comprises parallel lengths of conveyor rails 1129a'-b' each comprising a plurality of rollers 1125a'-b' on which the containers are disposed for advancing toward the delivery person 10 upon actuation of a spring-loaded pusher 1120'. In addition to the pusher 1120', the spring-loaded flow rack of FIG. 39 comprises a manually actuated flow gate 1132a'-b' as will be described subsequently with regard to implementations.

Figure 42A:
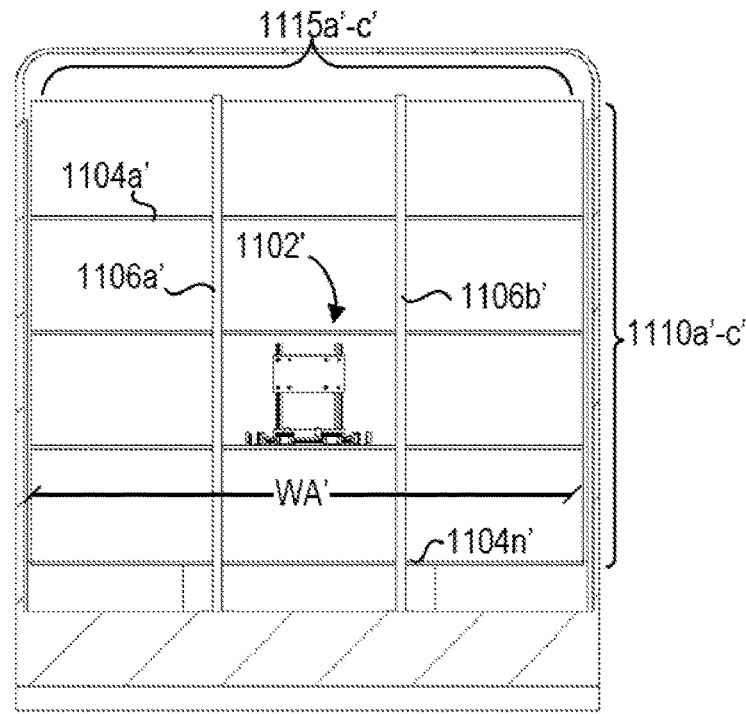
FIG. 42A depicts an end view of the single flow rack of FIG. 39 disposed in a mobile delivery vehicle without containers loaded.

As described previously with regard to alternative implementations, the array 1100' comprises a plurality of rows 1110a'-c' and a plurality of columns 1115a'-c' comprises 3 columns (see FIGS. 37 and 42A). In implementations, the array 1100' has a length LF' (FIG. 29) extending substantially parallel to a length LT' of a transport volume of the delivery vehicle and a width WA' extending substantially perpendicular to the length LT' of the transport volume and substantially parallel to one or more vehicle wheel axles. In implementations, each flow rack 1102' of the array of flow racks 1100' is interlinked by at least one shared structural beam 1104a'-n' along the length LF' of the array 1100' with at least one other adjacent flow rack 1102' of the array of flow racks and two or more shared vertical structural beams 1106a'-b'. The flow racks 1102' therefore are compactly stacked with no gaps therebetween.

Turning back to FIGS. 39-41, in implementations, the spring-loaded pusher 1120' comprises at least one of one or more constant force springs and one or more double wrapped torsion springs 1134a'-b' disposed at the front 1105' of the rack 1102' and affixed to an underside of the pusher 1120' for applying constant retraction force in the direction of the front 1105' of the rack 1102' without interfering with any container(s) 1200a-j on the rack 1102'. In implementations, as shown in FIG. 40, the one or more springs 1134a'b' are each configured to be attached to the pusher 1120' by one or more associated lanyards or wires 1146a'-b'. The one or more wires 1146a'-b' can be fixedly attached to corresponding one or more springs and releasably attached to the pusher 1120' with a clip or carabiner 1143a'-b' engaged with a rod or one or more eyelets on the pusher 1120'. The releasably attached clip 1143a'-b' enables servicing or replacing the pusher 1120'. In implementations, the spring-loaded pusher 1120' applies a retraction force in a range of between about 1-30 lb of force. The spring-loaded pusher 1120' is configured to be under constant force and is configured to push against the rear most container 1200n in the rack 1102'. When a delivery person 10 manually activates the flow gate 1132a'-b' of the rack 1102' to the open state, a container 1200a closest to the front end 1105' is ejected from the rack 1102' under force of the pusher 1120'. FIG. 41 depicts an empty flow rack with the spring-loaded pusher in the forward position.

Figure 42B:
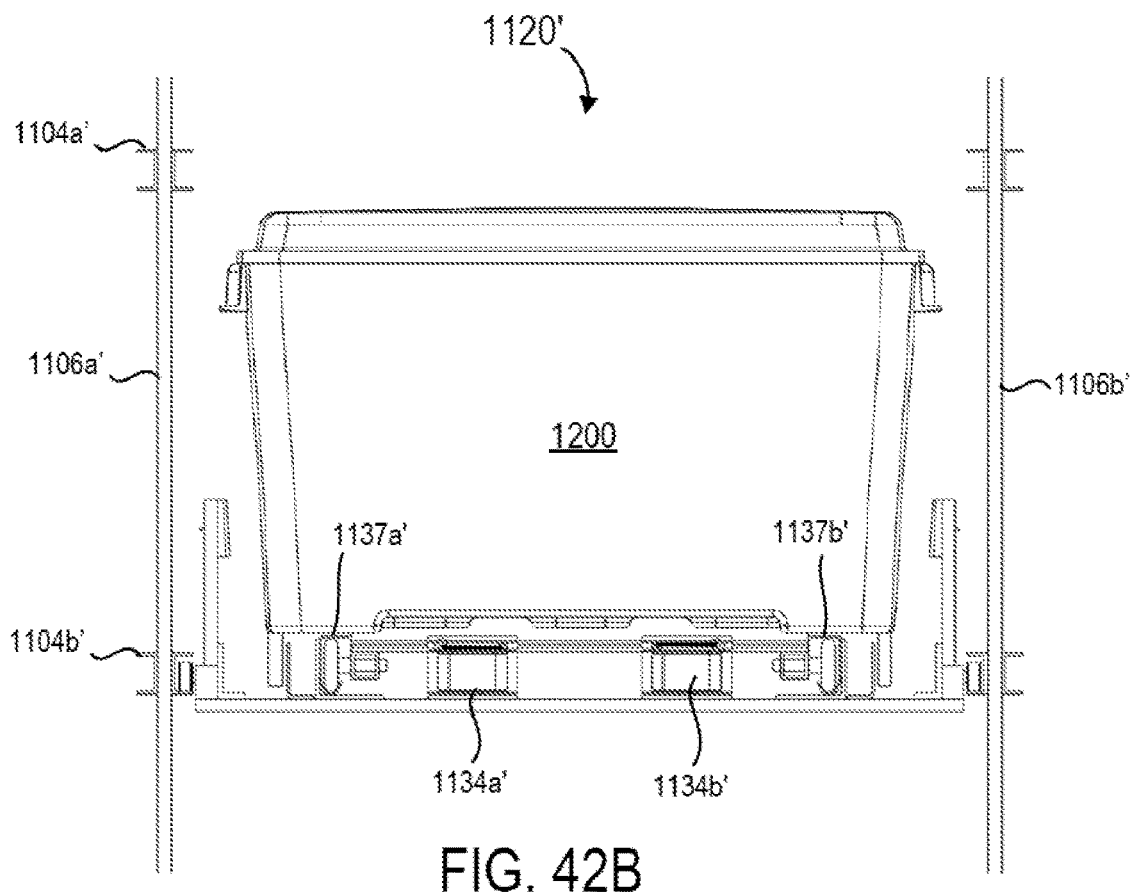
FIG. 42B depicts an augmented close-up view of the single flow rack and pusher of FIG. 39.

FIGS. 42A-B depict a single empty spring-loaded flow rack 1102' disposed in a delivery vehicle 1000'. Only one spring-loaded flow rack 1102' is depicted for clarity, but in implementations, each of the row and column grid positions in the array 1100' are configured to retain therein one of a plurality of spring-loaded flow racks 1102' as previously described. In implementations, as shown in the magnified end view of FIG. 42B, the spring-loaded pusher 1120' comprises wheels 1136a'-b' riding in tracks or channels 1137a'-b' on either side of the flow rack 1102' and the pair of springs 1134a'-b' evenly applies force to pull the pusher 1120' along the channels 1137a'-b' without binding. In implementations, as shown in FIGS. 42A-B, each one of the plurality of unloading pushers 1120' comprises a contact face 1122' configured to engage a back surface 1205' of a container 1200 disposed at the back end of the one or more of the plurality of containers 1200a-j disposed on each of the flow racks 1102' the array 1100'. The contact face 1122' includes a contact material that is at least one of compliant and non-marking. Additionally or alternatively, in implementations, the contact face includes a contact material that is durable and wear resistant, and that provides damping against any collisions. The contact material can comprise at least one of silicone, rubber, nylon, and rigid polyurethane foam.

Figure 43A:
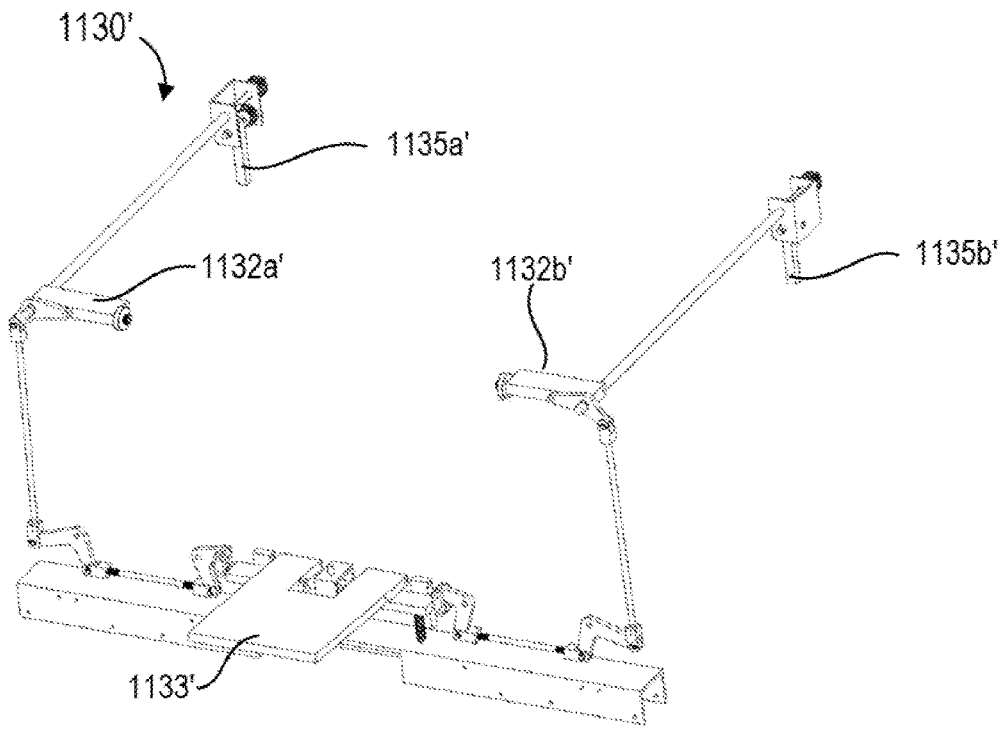
FIG. 43A depicts a flow gate of FIG. 39 in a closed, container retention state.
Figure 43B:
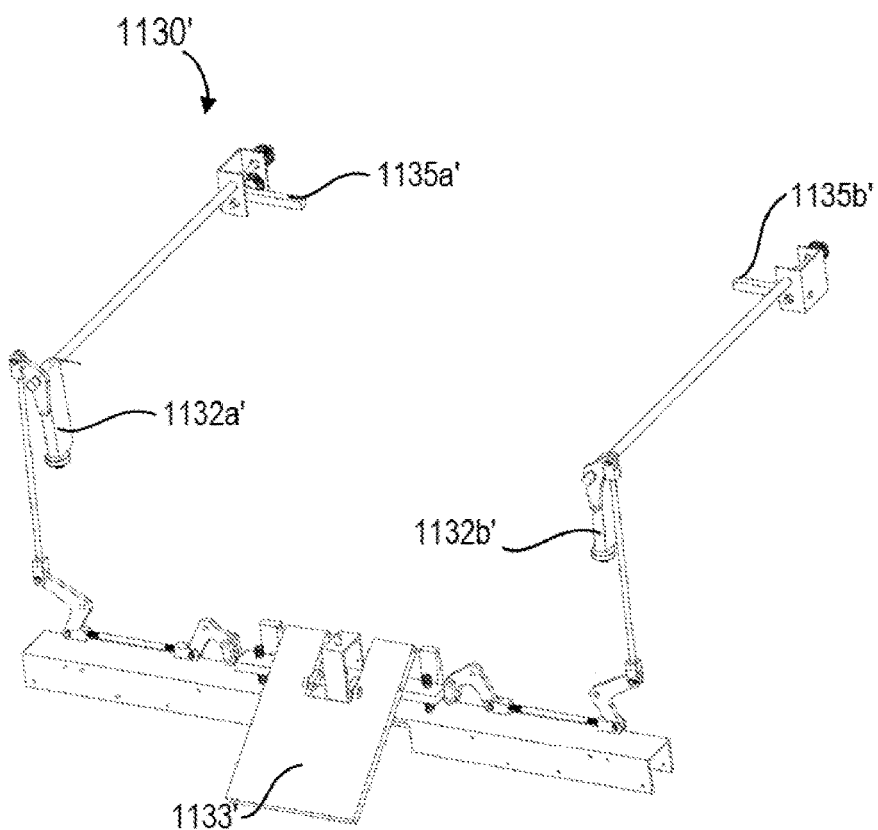
FIG. 43B depicts the flow gate of FIG. 43A in an open, container release state.

FIGS. 43A-44 depict an implementation of a flow gate disposed at the front end 1105' of the flow rack 1102'. FIG. 43A depicts the flow gate in a closed position such that restraining arms 1132a'-b' are substantially horizontal, blocking the opening through which a container 1200 would be ejected. Additionally, in some implementations, the flow gate comprises rear bars 1135a'-b' for preventing a container (e.g., container 1200i in FIG. 39) behind the front most container (e.g., container 1200j in FIG. 39) from sliding forward when the restraining arms 1132a'-b' are in an open position. In a vertical position the rear bars prevent the container behind the front most container from sliding forward to the front most position after the front most bin has been ejected from the spring-loaded flow rack 1102'. This enables a delivery person 10 to remove one container at a time in a controlled manner. FIG. 43B depicts the flow gate in an open position. The restraining arms 1132a'-b' are linked to lever 1133' such that when a delivery person pushes down on the lever 1133' with either a foot or a hand, the restraining arms bend down to allow the front most container to roll out of the opening under the force of the spring-loaded pusher 1120'. Simultaneously, the rear bars 1135a'-b', mechanically linked to the rotating restraining arms 1132a'-b', rotate up from their vertical resting position to a horizontal, closed state, blocking all but the front most container from moving forward through the opening of the flow rack 1102' and ensuring that multiple containers do not eject at once.

FIG. 44A depicts an implementation of the linkages 1138a'-b' between the lever 1133' and the restraining arms 1132a'-b'. As shown in FIGS. 44B-C, in implementations one or more return springs 1147a'-b', 1147c' are disposed proximate at least one of the lever 1133' and one or more of the restraining arms 1132a'-b' for returning the stop gate 1130' to a closed position once a front most container exits the flow rack 1102'. As shown in FIG. 44B, for example, when the front most container exits the flow rack, one or more return springs 1147a'-b' push the lever 1133' back up which moves the linkages 1138a'-b' to push the restraining arms 1132a'-b' back to a closed, horizontal state. Additionally or alternatively, one or more return springs 1147c' disposed on one or more of the restraining arms 1132a'-b' drives the restraining arm and adjoined linkage 1138a'-b' back to a closed state. In implementations of the flow gate comprising rear bars 1135a'-b', the linkages, under force of the one or more return springs 1147a'-b', 1147c' also return the rear bars 1135a'-b' to an open, vertical state so that the pusher 1120' can slide the next queued container forward to the forward most position, awaiting ejection.

Additionally, in implementations, the restraining arms 1132a'-b' further comprise one-way hinges (not shown) so that they can bend inward toward the rear 1107' of the flow rack 1102' but not outwards past the front 1105'. This enables a delivery person 10 to push a new contained into the flow rack 1102' without needing to actuate the gate (e.g., press the lever 1133'). Additionally or alternatively, in implementations not having rear bars 1135a'-b', the delivery person 10 can actuate the lever 1133' to move the restraining arms 1132a'-b' to an open state, enabling the delivery person 10 to load one or more containers onto the flow rack 1102' through the front end 1105' with the lever 1133' being pressed.

Figure 45:
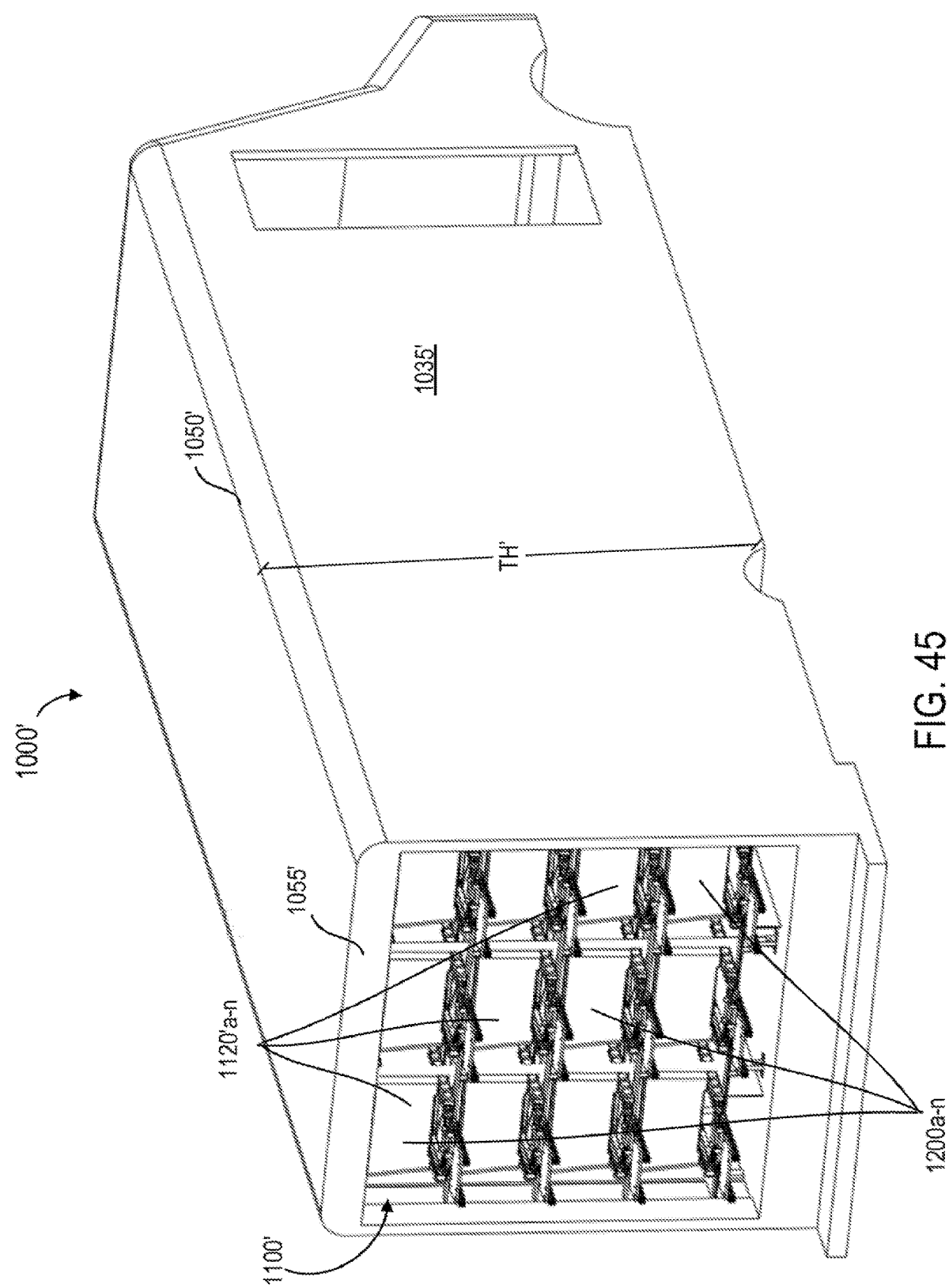
FIG. 45 depicts the rear perspective view of FIG. 37 with container pushers in a folded down state for container unloading from the rear of the mobile delivery vehicle into a laundry facility.
Figure 46A:
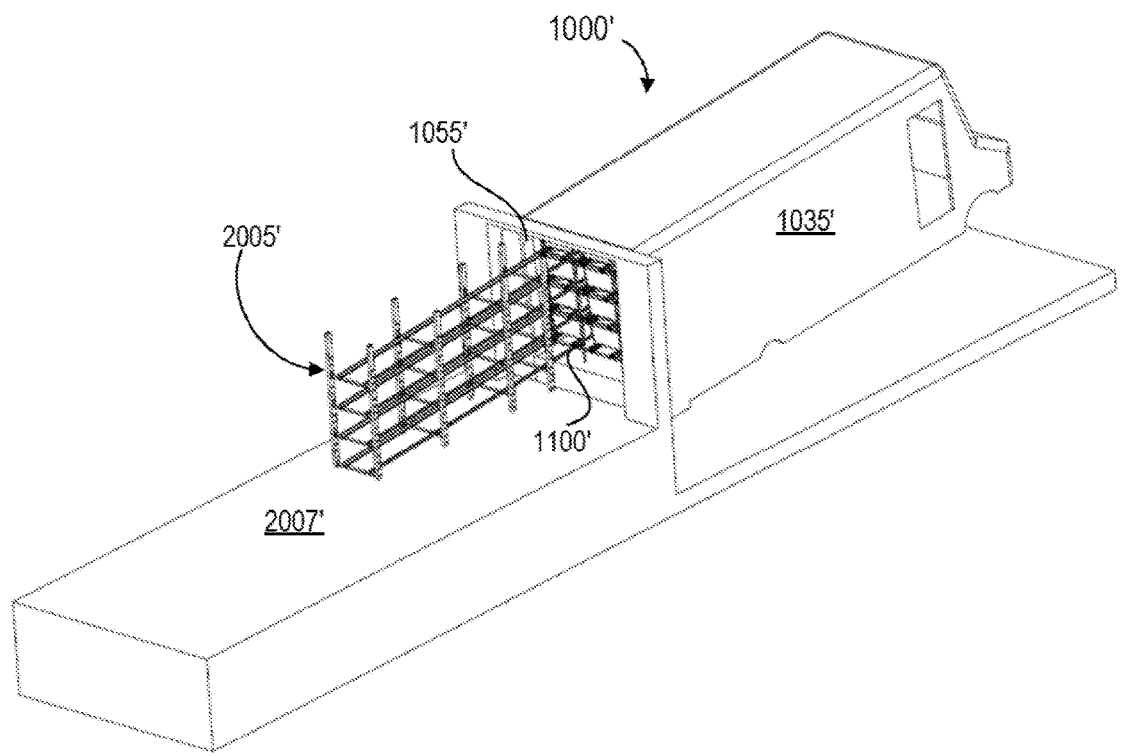
FIG. 46A depicts a rear perspective view of the mobile delivery vehicle of FIG. 43 positioned for loading and/or unloading containers into or out of the array.
Figure 46B:
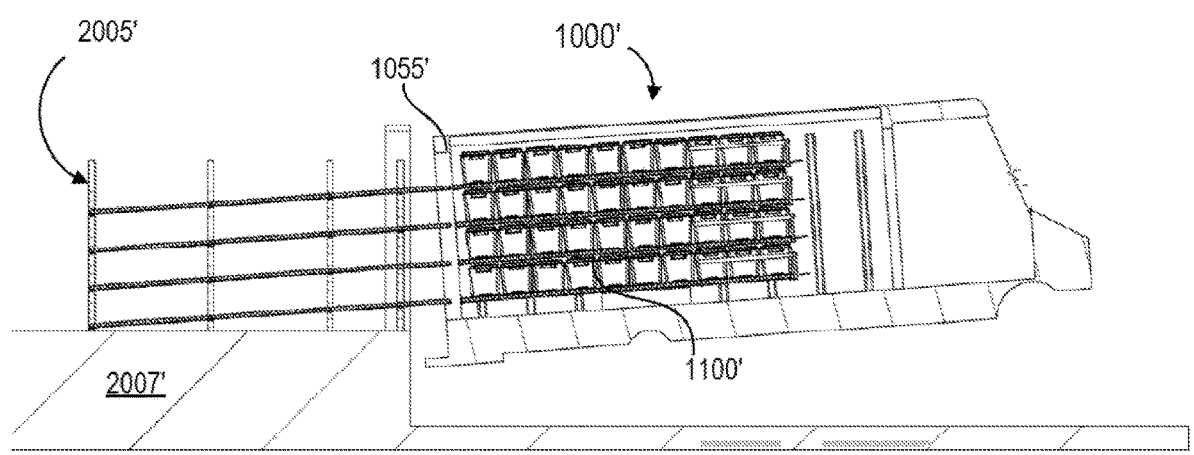
FIG. 46B depicts a side view of the mobile delivery vehicle of FIG. 43 positioned for loading and/or unloading containers into or out of the array.

As described above with regard to implementations, each flow rack 1102a-n' of the array of flow racks 1100' is interlinked by at least one shared structural beam 1104a'-d' along the length LF' of the array 1100' with at least one other adjacent flow rack 1102' of the array of flow racks. The array 1100' of flow racks 1102a'-l' therefore is securely affixed to one another and affixed within the transport volume 1035'. Turning to FIGS. 45-46B, in implementations, the affixed array 1100' of spring-loaded flow racks 1102a'-n' is configured for loading and unloading from a back end 1055' of the mobile delivery vehicle 1000'.

In implementations, as depicted in FIG. 45, the pushers 1120' are configured to fold down at a selectively actuated hinge to allow the containers 1200a-j in the array 1100' to be unloaded from a selectively sealed opening in the back end 1055' of the mobile delivery vehicle 1000'. With the pushers 1120' folded down, the containers 1200a-j roll out of the backs 1107a-l' of their flow racks 1102a-l' one at a time into a loading/unloading rack 2005' as shown in FIGS. 46A-B. As shown in FIGS. 46A-B the mobile delivery vehicle 1000' is disposed adjacent a facility loading dock 2007'. The mobile delivery vehicle 1000' can be disposed at an incline or adjusted to an inclined position such that gravity pushes the containers 1200a-n out of their respective flow racks 1102a'-n'. The loading/unloading rack 2005' is angled to act as a gravity flow rack within the facility. FIG. 46B shows a side view cross section of the array 1100' of flow racks 1102a'-n' within the mobile delivery vehicle 1000' and the loading/unloading rack 2005' aligned with the openings of the spring-loaded flow racks 1102a'-n' for receiving containers thereon. Although only one loading/unloading rack 2005' is shown for clarity, a plurality of loading/unloading racks 2005' can be aligned with the array 1100' for simultaneously receiving containers 1200a-n from the flow racks 1102a'-n' of the array 1100'. Additionally or alternatively, as will be subsequently described with regard to implementations, a spring or hand-powered crank can be used with an antagonistic pusher to force the containers 1200a-n out of their respective flow racks 1102'. In implementations, the loading/unloading rack 2005' can be used for both loading and unloading containers 1200a-n from the array 1100'.

Figure 47:
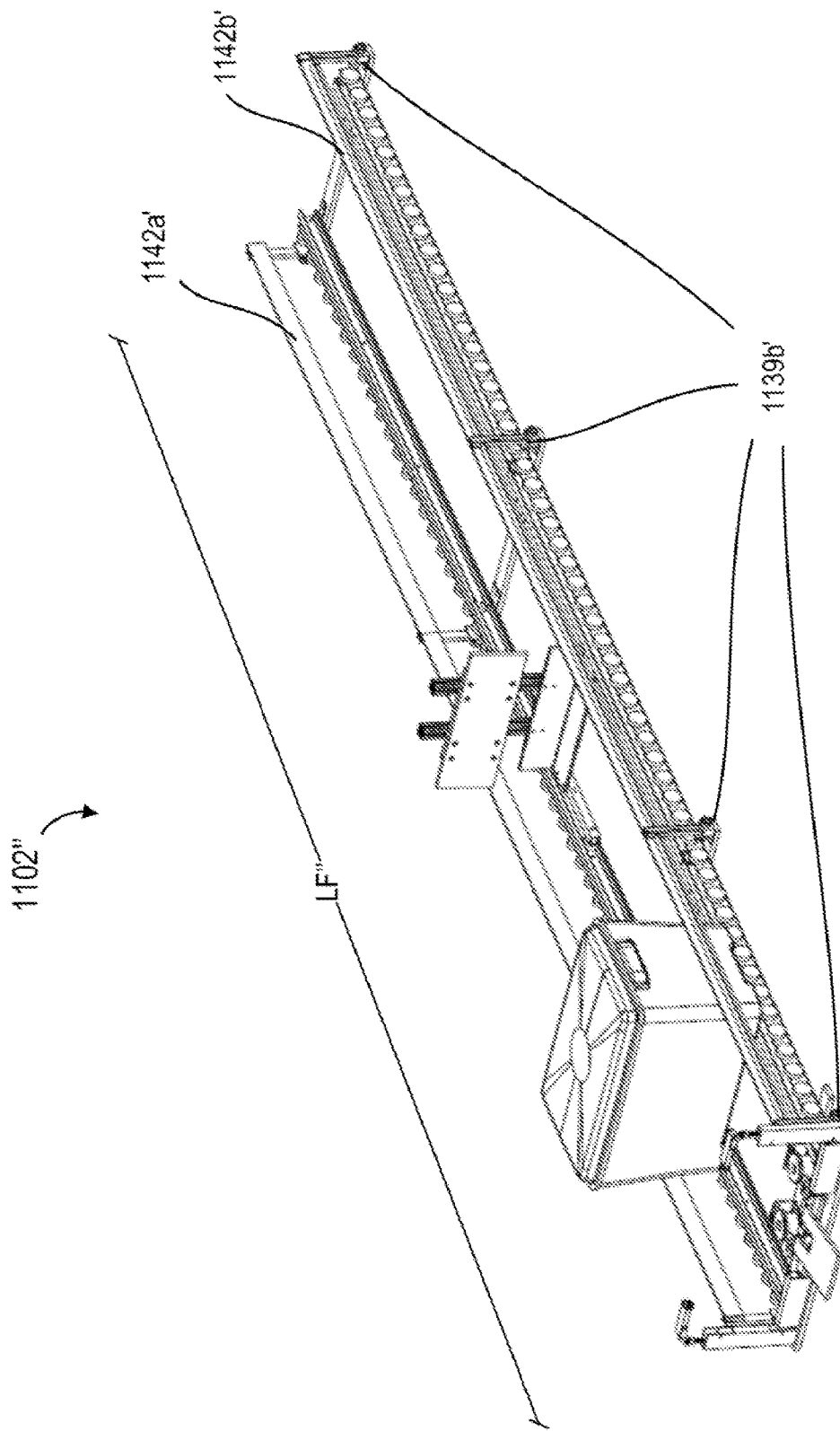
FIG. 47 depicts a perspective end view of the single removable flow rack.
Figure 48A:
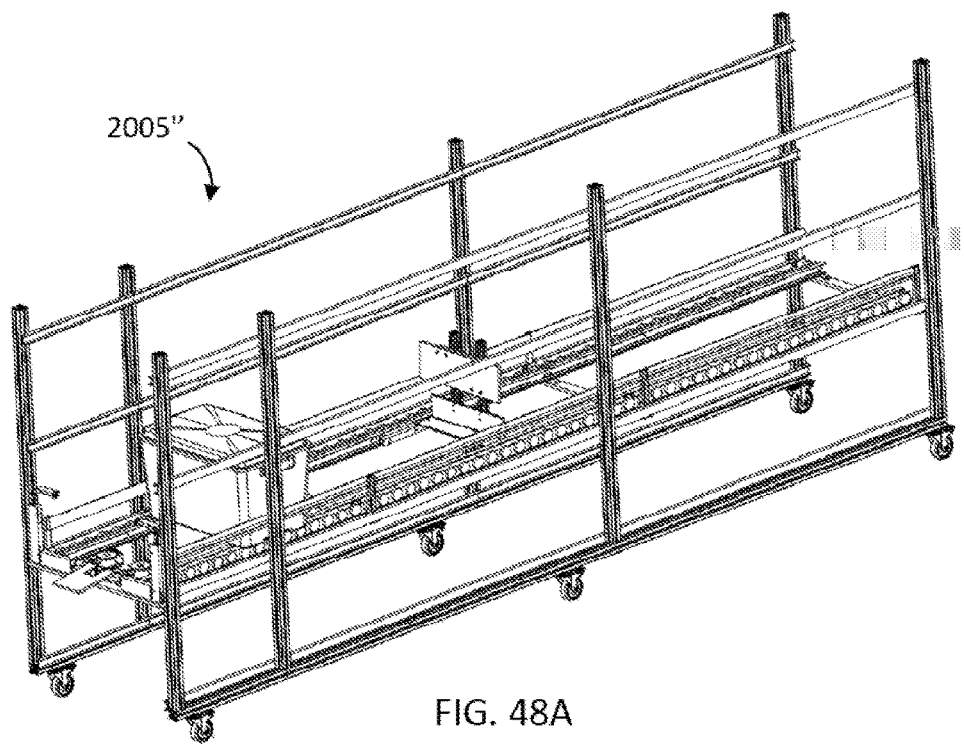
FIG. 48A depicts the removable flow rack of FIG. 47 removed from a mobile delivery vehicle and loaded on a wheeled cart.
Figure 48B:
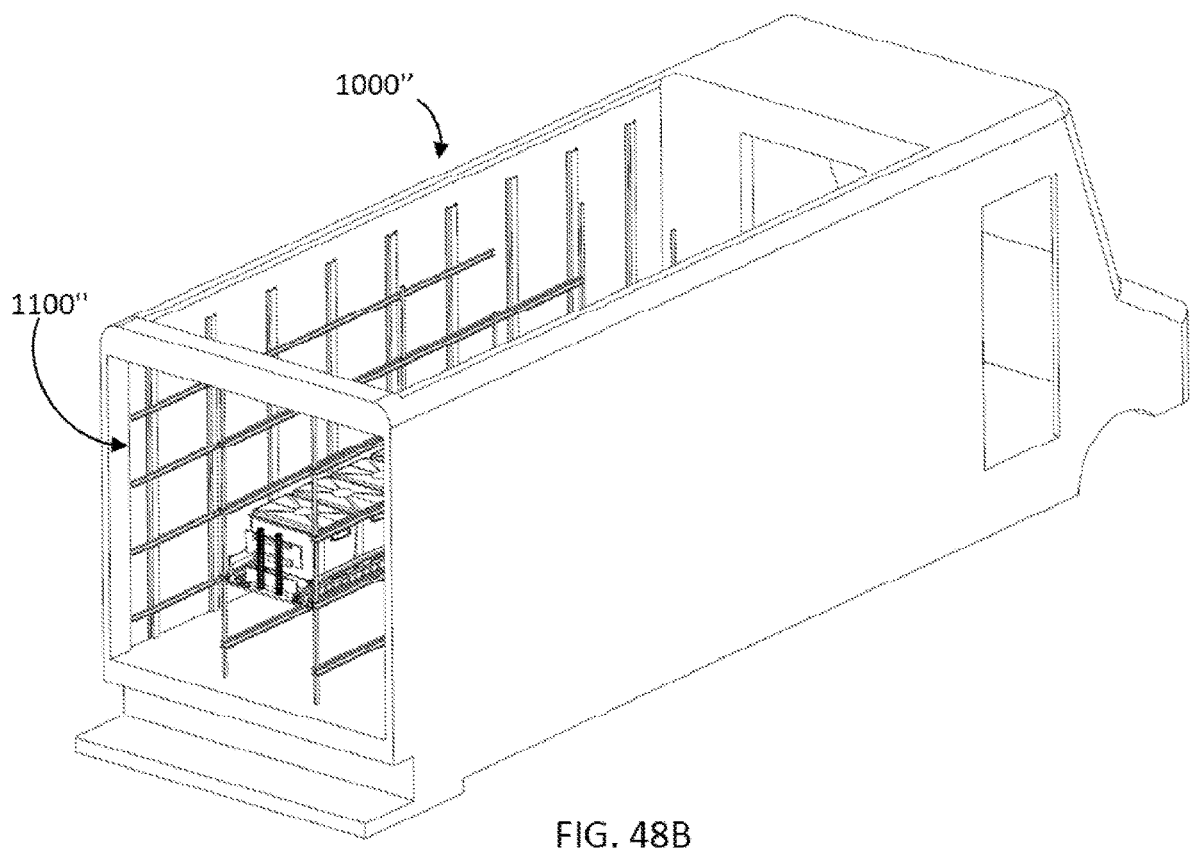
FIG. 48B depicts the removable flow rack of FIG. 47 disposed within a mobile delivery vehicle.
Figure 49:
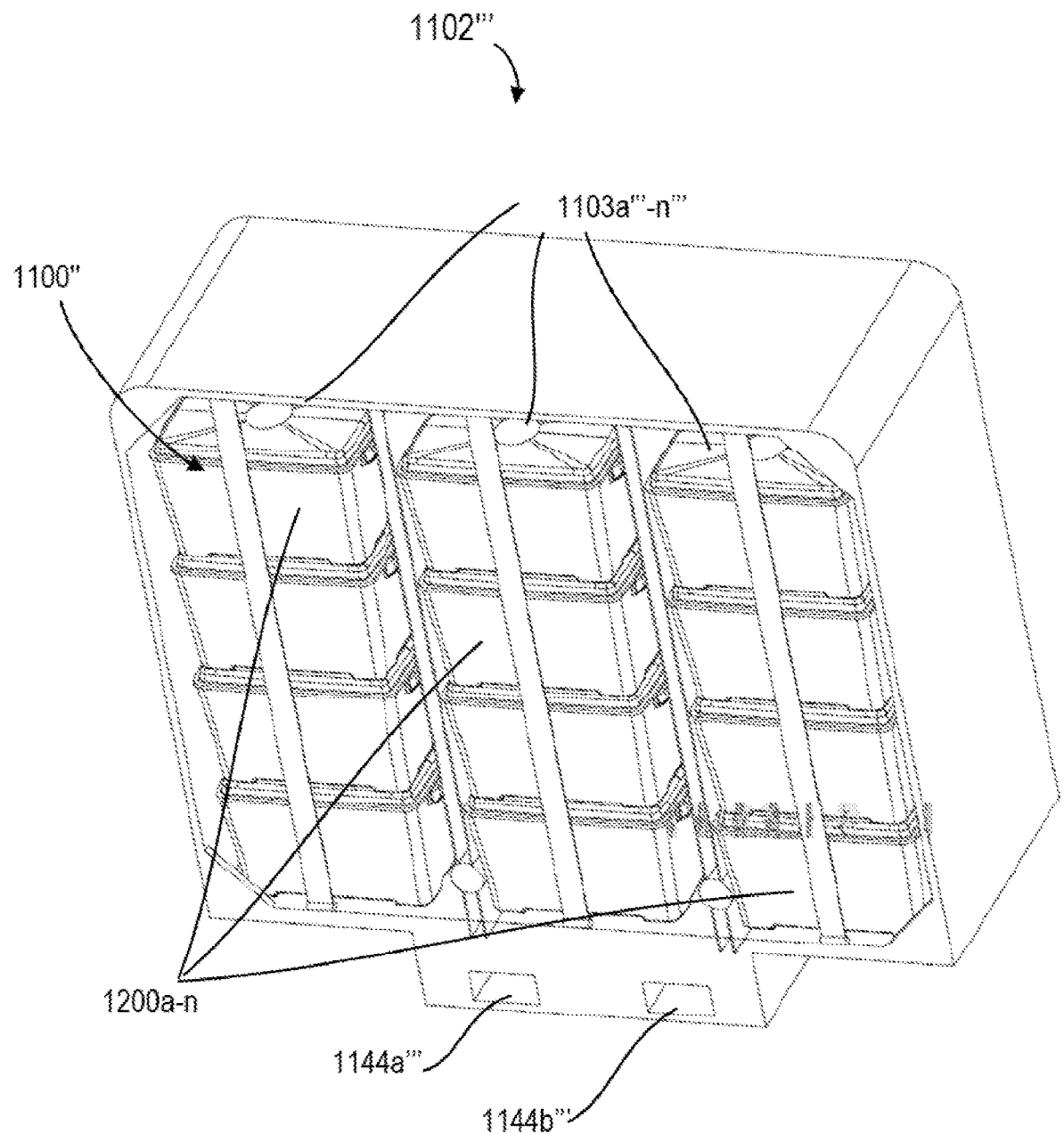
FIG. 49 depicts a perspective view of an implementation of a pallet for holding an array of shipping containers for use in a mobile delivery vehicle.
Figure 50:
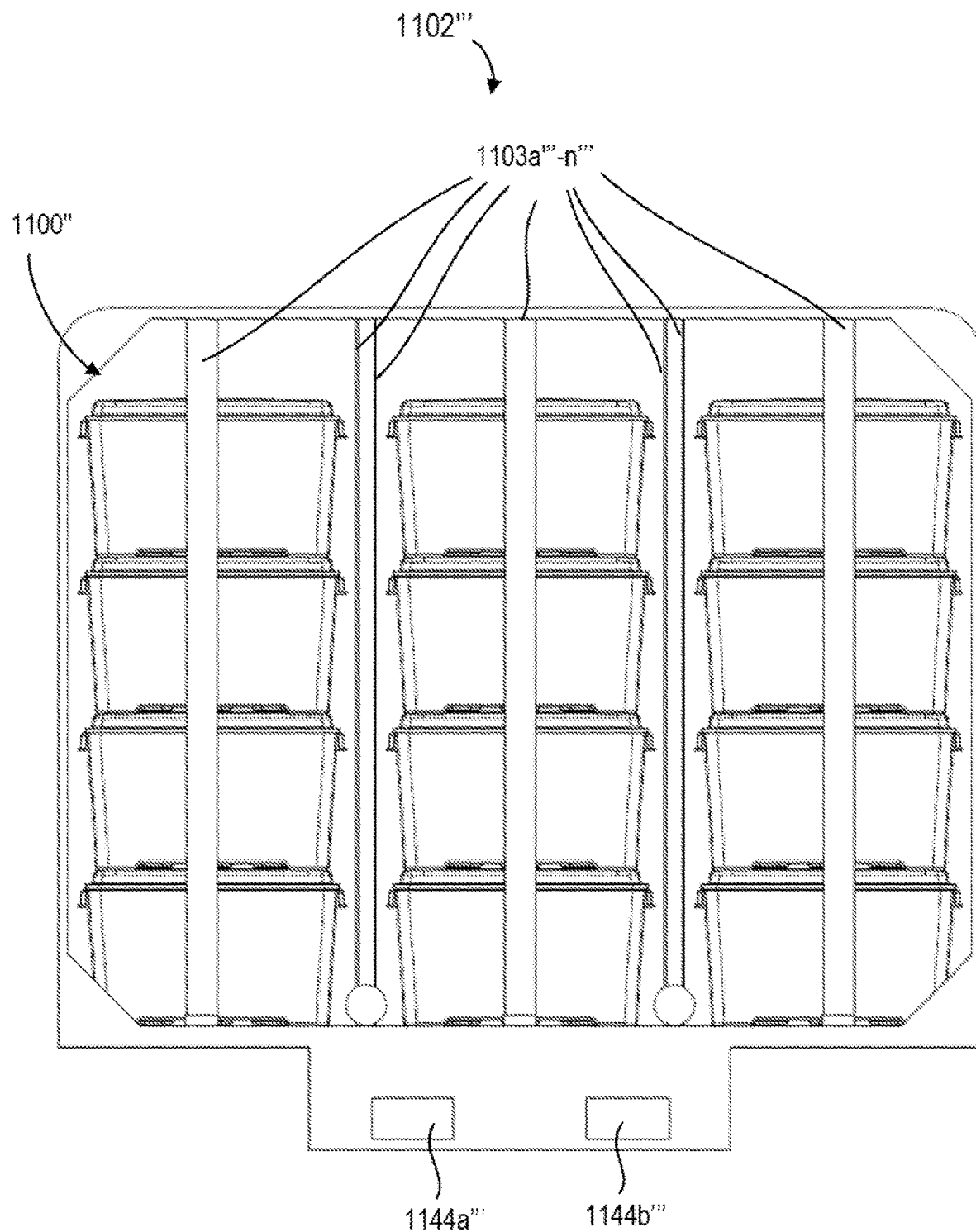
FIG. 50 depicts an end view of the pallet of FIG. 49.
Figure 51:
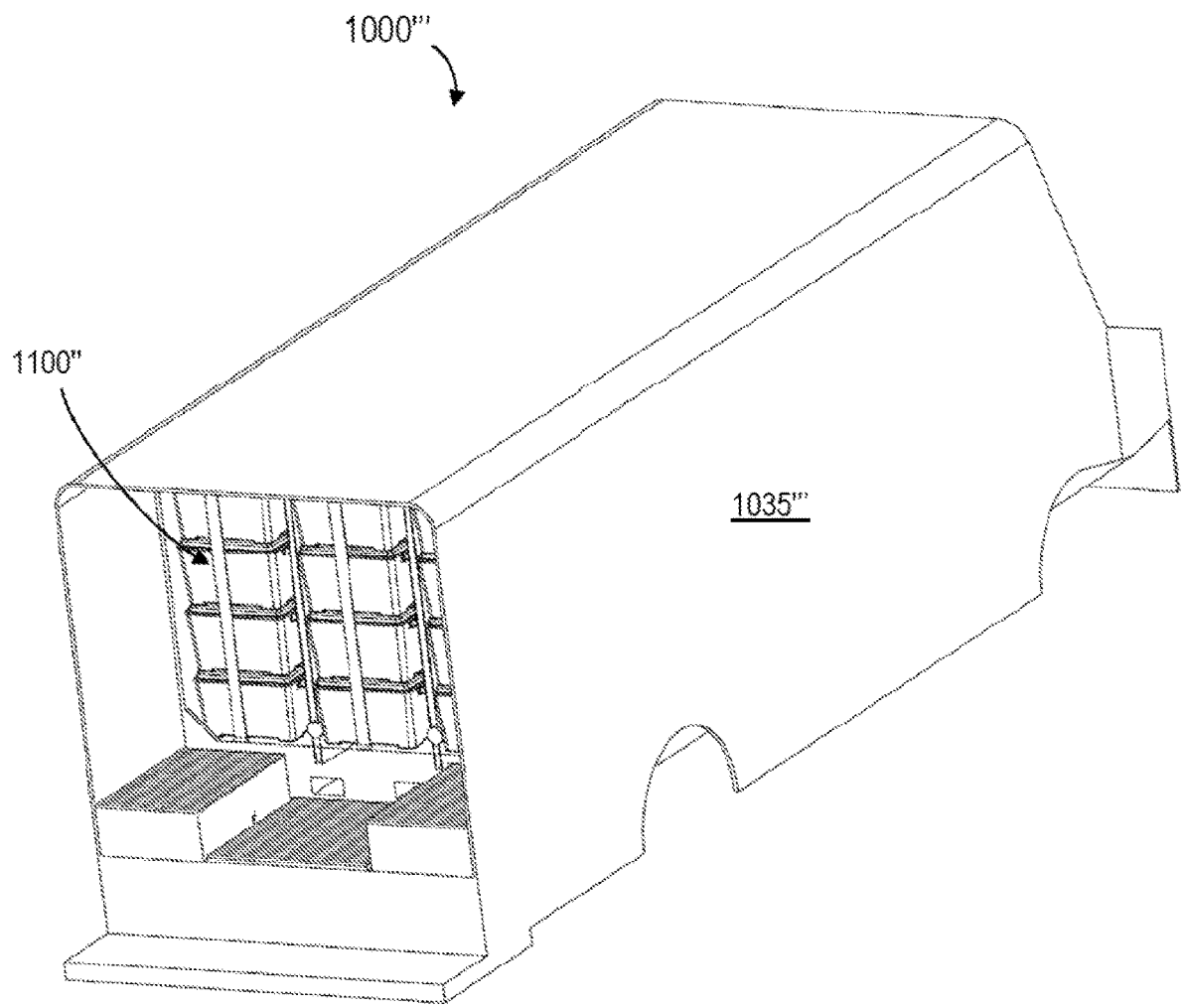
FIG. 51 depicts a rear perspective view of a mobile delivery vehicle loaded with the pallet of FIG. 49.
Figure 52:
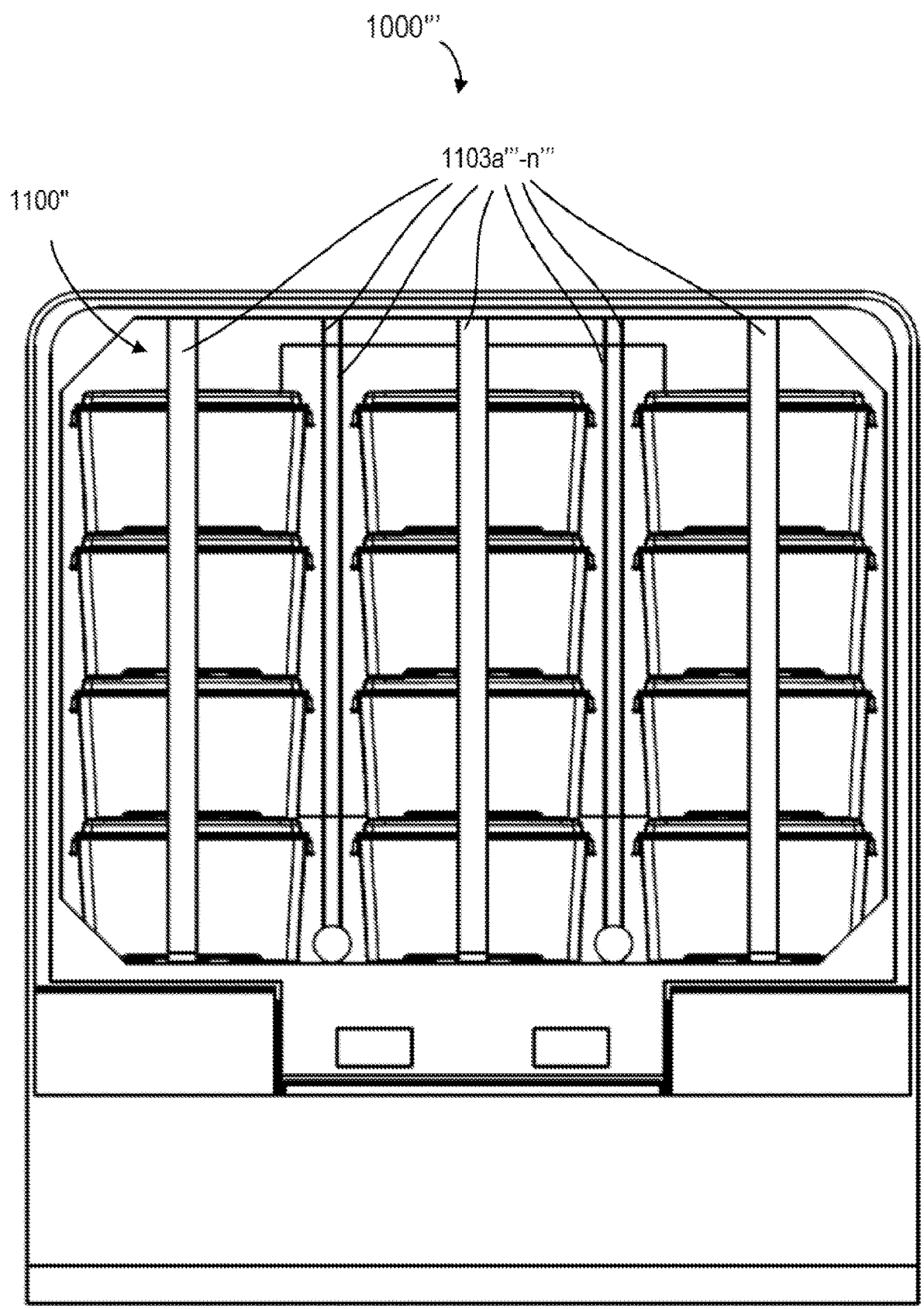
FIG. 52 depicts end view of FIG. 51.

In other implementations, as shown in FIGS. 47-48B, the spring-loaded flow racks are removable flow racks 1102a"-l" configured for complete removal from the mobile delivery vehicle 1000" onto a loading/unloading rack 2005". In implementations, a removable flow rack 1102" comprises external roller wheels 1139a'-b' on which the rack 1102" slidably rolls into and out of the array 1100" and onto and off of a loading/unloading rack 2005". In implementations, the removable flow rack 1102" further comprises a pair of raised rails 1142a'-b' along the length LF" of the flow rack 1102" for preventing containers thereon (not shown) from sliding side-to-side during removal and loading of the rack 1102".

In implementations, as described previously with regard to delivering one or more containers to a household address, an autonomous racking and elevator system 1300 can automatically retrieve one or more containers and disgorge the one or more containers through one or multiple vehicle access portals 1060 through a side of the transport volume of the vehicle. The system 1300 may disgorge the containers one at a time or more than one at a time upon request. In implementations, a driver positions the one or more vehicle access portals 1060 against an intake portal in a factory wall and the autonomous system 1300 retrieves and disgorges the one or more containers through the vehicle access portal 1060 and directly through the wall of the factory to a receiving conveyor or rack therewithin for autonomous queuing to one or more process lines 100, 100a-c. Additionally or alternatively, in implementations the system 1300 disgorges one or more containers through the vehicle access portal 1060 onto a conveyor or rack routed through a factory portal for autonomous queuing to one or more process lines 100, 100a-c.

In yet other implementations, as depicted in FIGS. 49-53, the autonomous racking system includes a plurality of densely packed pallets 1102a'"-f'" containing an array of containers 1200a-n. Each pallet 1102'" maximizes packing density and facilitates loading and unloading a mobile delivery vehicle 1000'". In implementations, as shown in the perspective end view of FIG. 49 and the front-end view of FIG. 50, a pallet 1102'" comprises a plurality of removable retention straps 1103a'"-n'" configured to restrain the containers 1200a-n at one of at least their front and back sides and their left and right sides. The pallet 1102' further includes, in implementations, one or more holes 1144a'"-b'" at the bottom of the pallet 1102'" for receiving a standard pallet jack for lifting and moving into and out of a delivery vehicle 1100'".

Figure 53A:
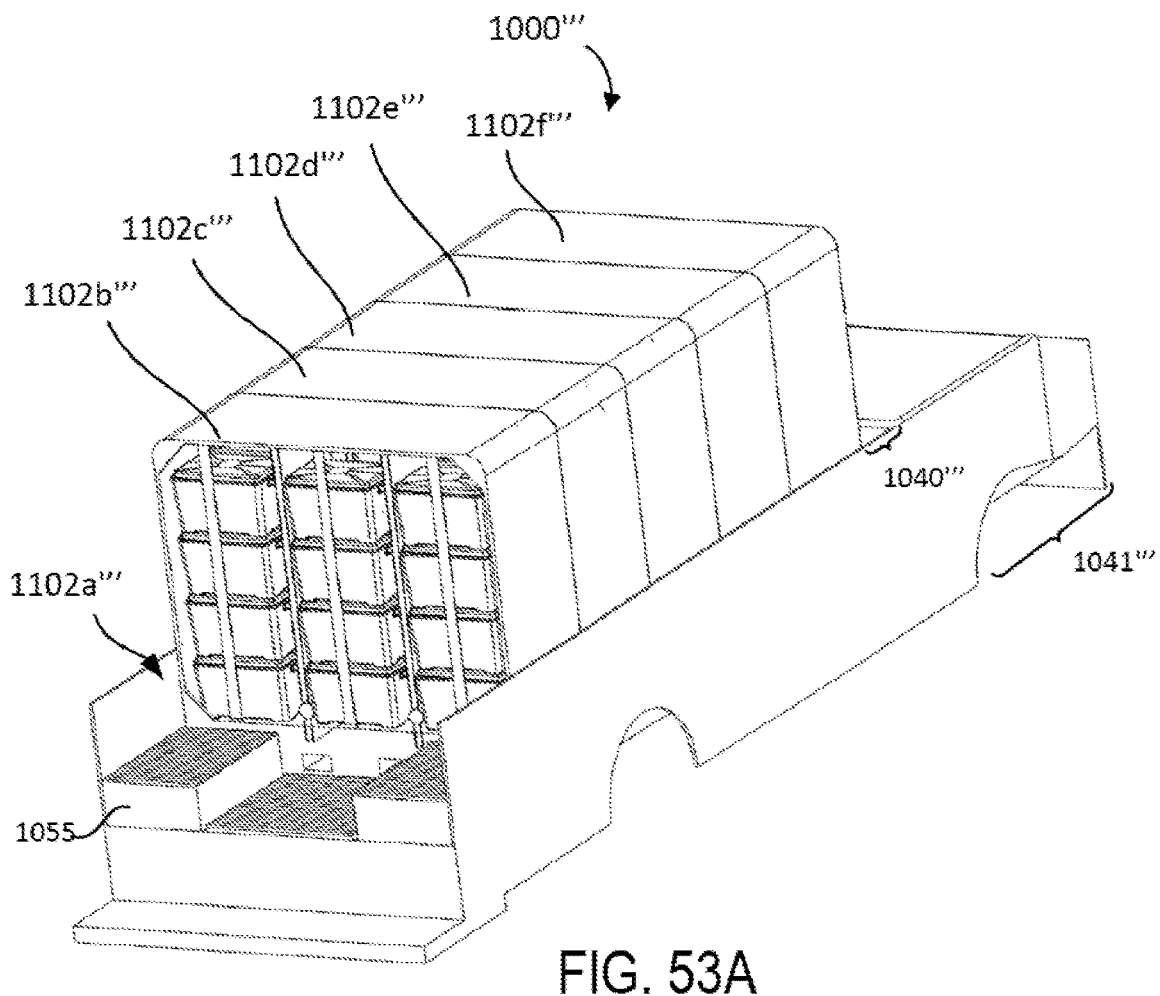
FIG. 53A depicts a partial cut away view of the loaded mobile delivery vehicle of FIG. 51.
Figure 53B:
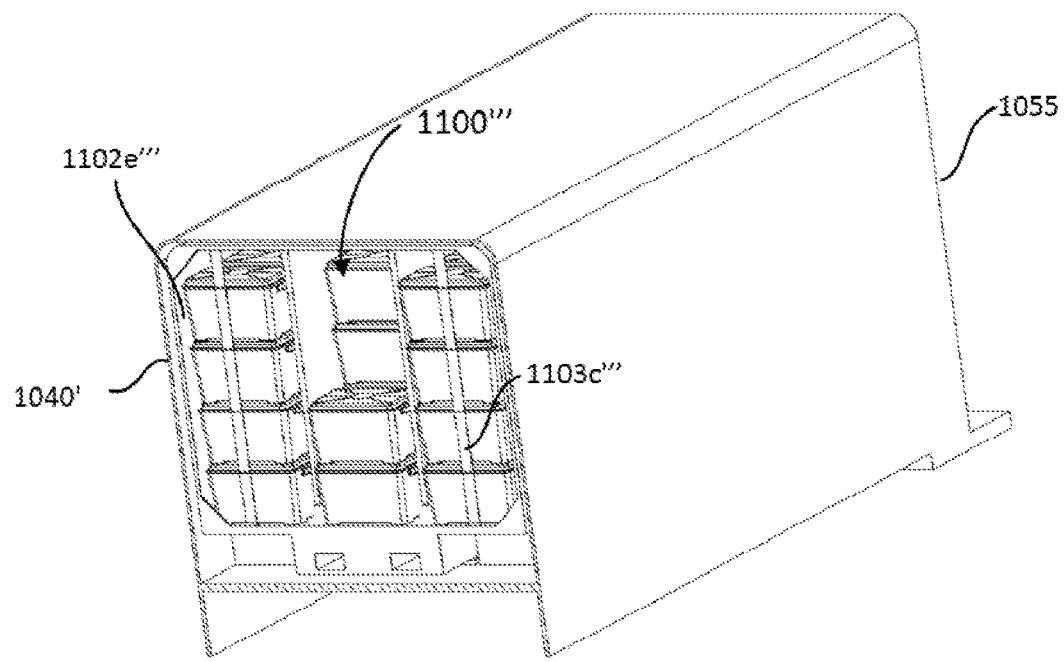
FIG. 53B depicts a front perspective view of the mobile delivery vehicle of 53A with a driver's cab removed.

In implementations, as shown in FIGS. 51-53B, a plurality of pallets 1102a'"-f'" are configured to be loaded into a transport volume 1035'" of the mobile delivery vehicle 1000'". In implementations the mobile delivery vehicle 1000'" comprises a plurality of rollers (not shown) disposed on the floor of the transport volume for rollably receiving the plurality of pallets 1102a'"-f'" thereon. As with the previously described implementations of spring-loaded flow racks 1102', 1102", the transport volume 1035'" comprises a front end 1040'" volume between the driver's compartment and the plurality of pallets 1102a'"-f'" such that a delivery person can enter the transport volume and walk, reach, retrieve, and carry one or more containers 1200a-n for removal from the vehicle 1000'" without impediment. FIG. 53B depicts a perspective front view cross section of the vehicle 1000'" with the driver's compartment 1041'" removed. A front pallet 1102f'" is partially unloaded with a portion of the front facing plurality straps 1103a-n'" removed for accessing the containers 1200a-n.

Any of the preceding implementations can additionally comprise one or more devices and methods for assisting a delivery person 10 with identifying and retrieving the correct container or containers when making a delivery to a destination address.

For example, in implementations, mobile delivery vehicle 1000', 1000", 1000' can further comprise a visible light-to-pick system in operable communication with the controller 1005-1005'" for actuating a light disposed proximate to and/or aimed at the one or more containers 1200a-n in an array 1100', 1100", 1100'" requiring delivery at a destination.

As described previously with regard to FIG. 14, in implementations, each of the containers 1200 comprises an identification marker 1210 for associating with one of the plurality of customers. The identification marker 1210 can include at least one of a machine-readable serial number, a machine-readable barcode, a machine-readable QR code, an RFID code, and a NFC tag. Such programmable markers 1210 can be reprogrammed for subsequent use with different ones of the plurality of customers. The system 1300 further comprises one or more sensors disposed on at least one of the array 1100', 1100", 1100'" for detecting and/or reading the identification marker 1210 of each container 1200 and outputting a signal to the controller 1005', 1005", 1005'"

indicative of the identification marker 1210 associated with a customer as the container 1200 is proximate to the sensor. The controller 1005', 1005", 1005''' therefore is able to keep track of at least one of a location, delivery status, and pick status of each of the plurality of containers 1200*a-n*. In implementations, the one or more sensors disposed on the array 1100', 1100", 1100''' for detecting and/or reading each of the identification markers 1210 are disposed at each dwell position 1103', 1103*a'-j'* (e.g., see FIG. 39).

Additionally or alternatively, the one or more sensors disposed on an array 1100', 1100", 1100''' for detecting and/or reading each of the identification markers 1210 are disposed ata front 1105', 1105", 1105''' of each flow rack 1102', 1102" or pallet 1102'''.

Figure 54:
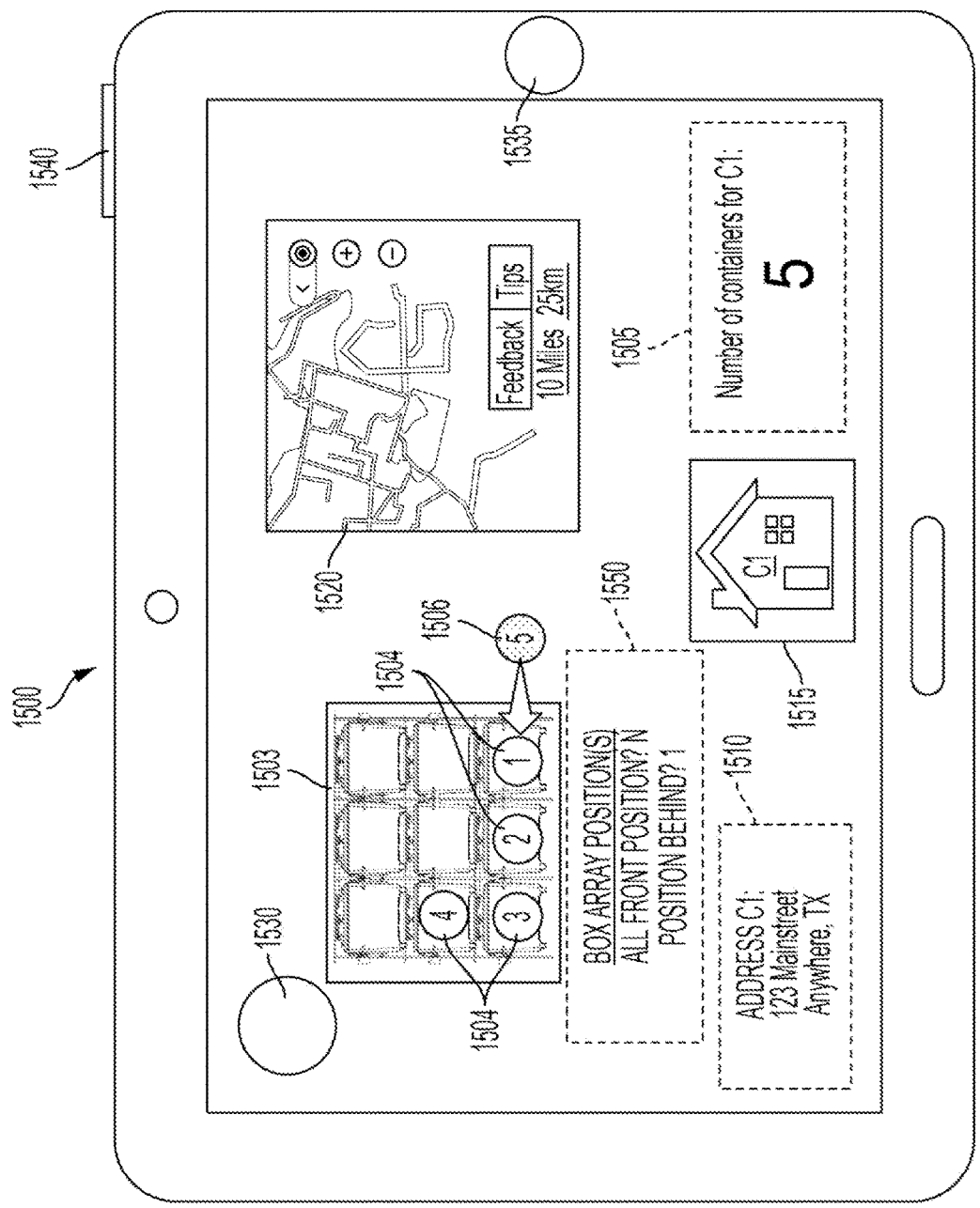
FIG. 54 depicts an example UI screen of a handheld device in communication with a controller of an autonomous racking system of a mobile delivery vehicle.
Figure 55:
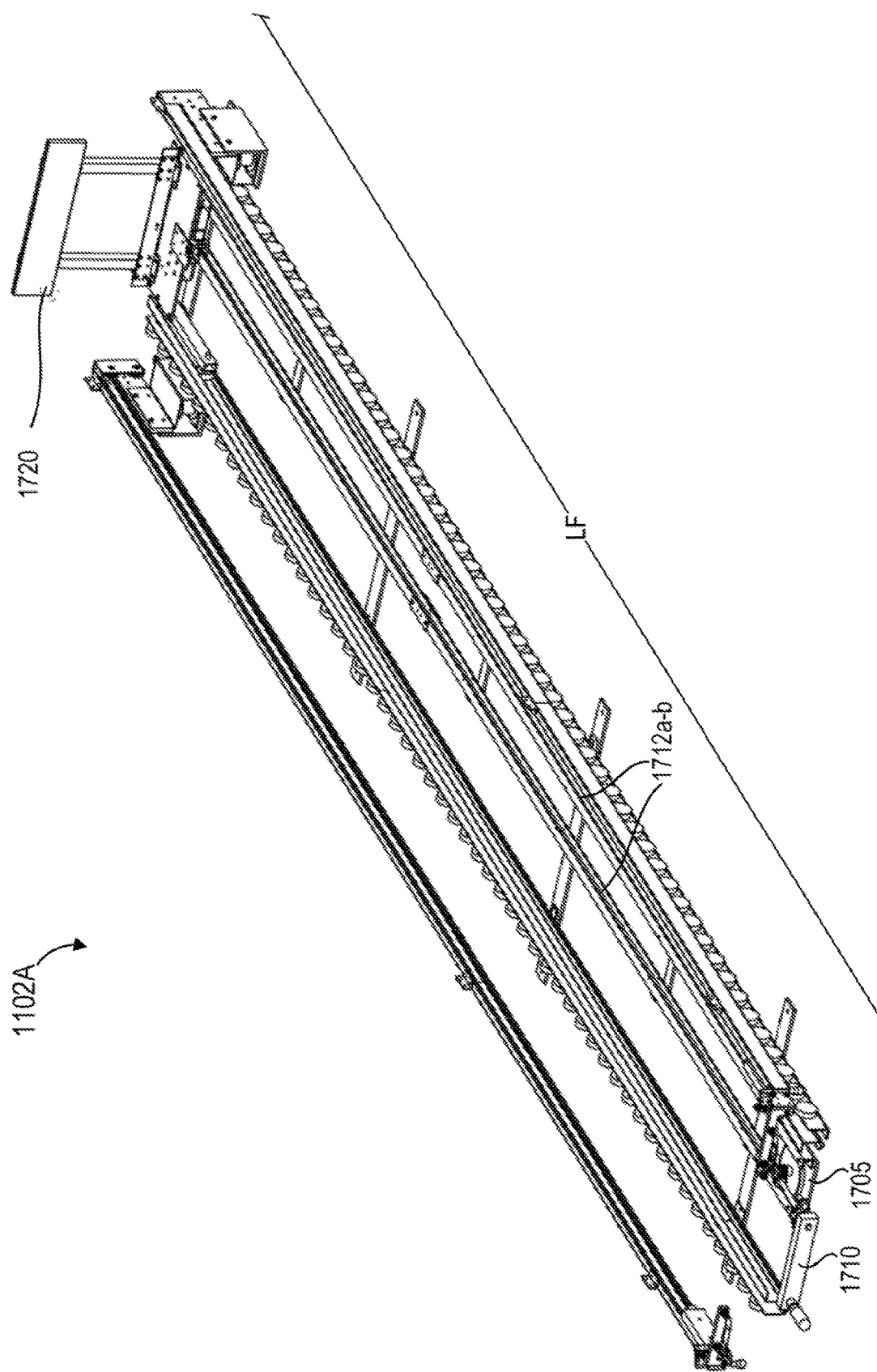
FIG. 55 depicts a manually operated pusher comprising a hand turned handle at the front of a flow rack.

Additionally or alternatively, in implementations, such as that of FIG. 54, the system 1300 comprises a delivery vehicle interface 1500 that comprises a screen (e.g., a touch screen), one or more buttons, and/or a keypad to aid a delivery person 10, in determining how many containers 1200*a-n* to retrieve from or return to any given location C1-Cn. In implementations, the user interface 1500 provides information regarding a quantity 1505 of containers 1200 to retrieve from or return to any given location C1-Cn and a visual indication 1503 of the container positions in the array 1100, 1100', 1100", 1100'''. The locations can be identified with at least one of a colored icon 1504 and a number. In implementations in which one or more containers are loaded front to back on a single rack, a separate identifier 1506 can be displayed in a unique color or grayscale with a number and an indicator (e.g., directional arrow) displaying where the container (e.g., "5") is loaded behind another (e.g., "4").

In implementations, the display of FIG. 54 is a sub-screen to the GUI display screen of FIG. 35 and is accessible through the dynamic button 1530 or hamburger menu icon to toggle between displaying the container location identifier 1503 and information 1502 about delivery progress. In implementations, toggling between screens retains some or all of the informative display elements. For example, the user interface 1500 can continually display of a quantity 1505 of containers that require delivery at an address. In this example, 5 containers require delivery, and their 5 locations are identified in the visual indication of container positions.

Figure 56:
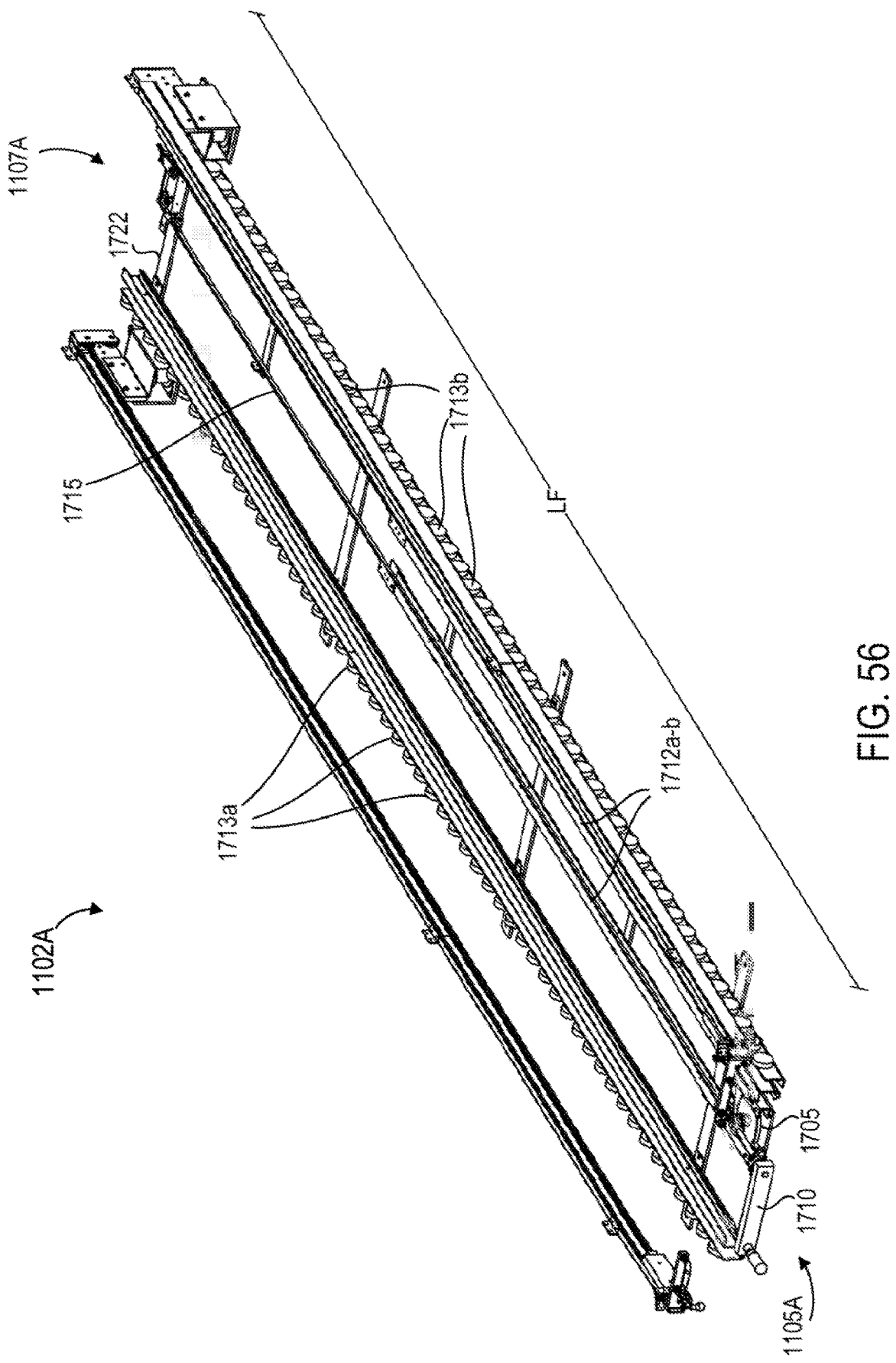
FIG. 56 depicts the flow rack of FIG. 55 with cover plates removed.
Figure 57A:
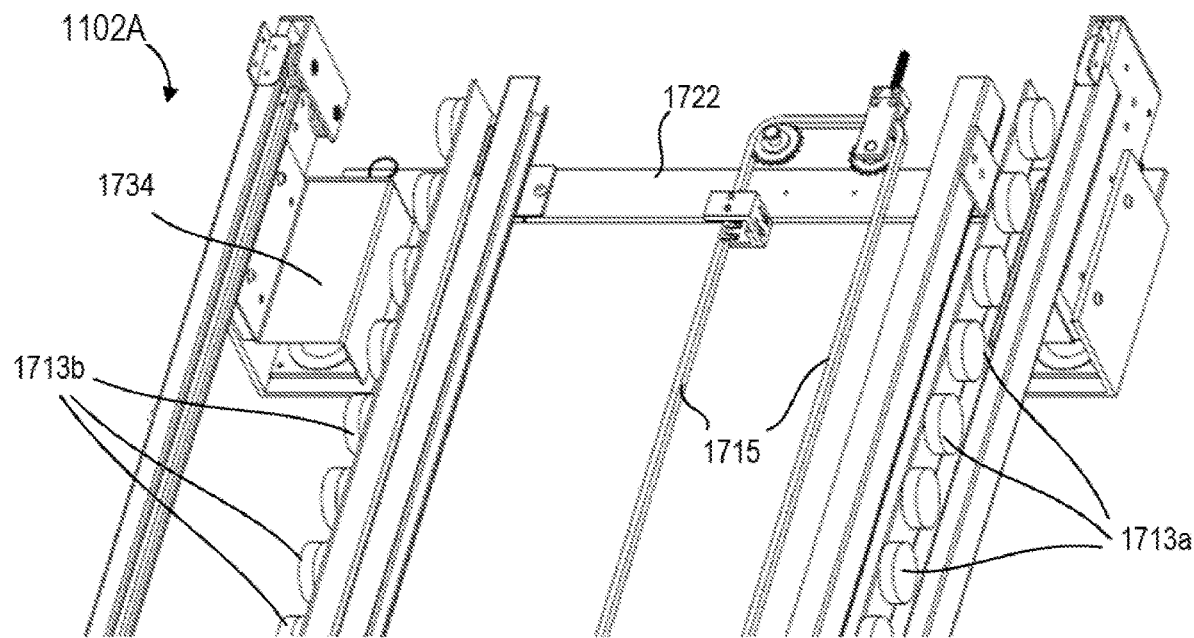
FIG. 57A depicts a close up back end of the flow rack of FIG. 56.
Figure 57B:
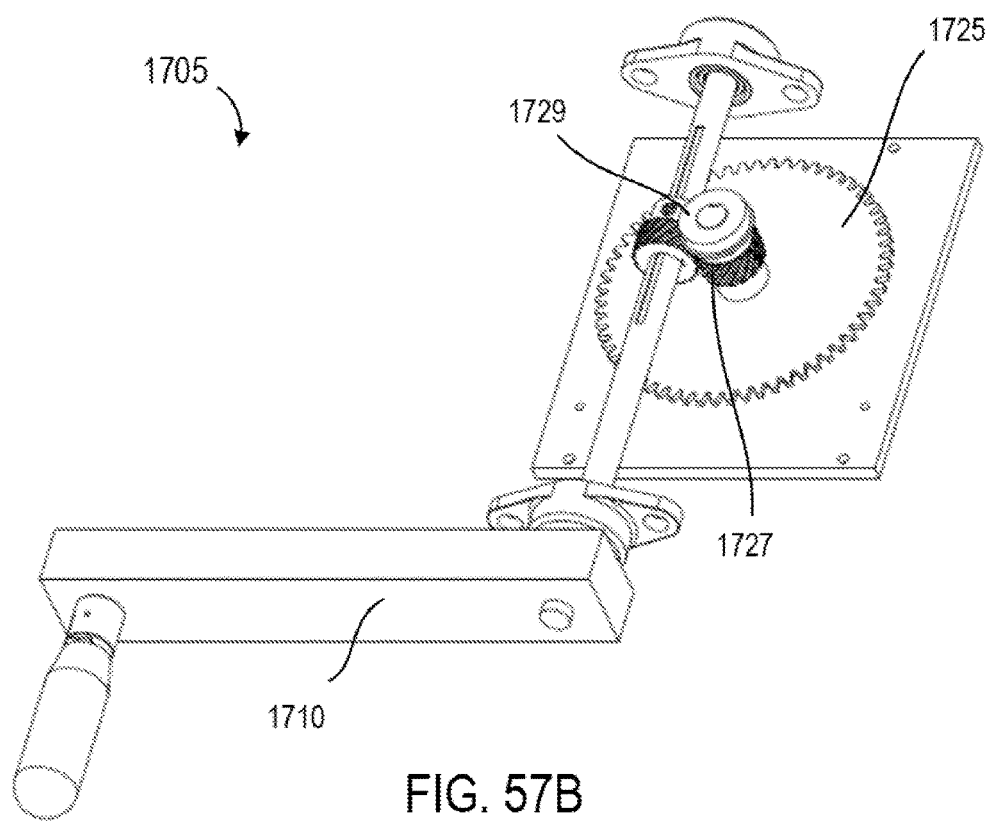
FIG. 57B depicts a close up of the hand turned handle of FIGS. 55 and 56 with a top plate removed to expose a gearing and sprocket mechanism.
Figure 58A:
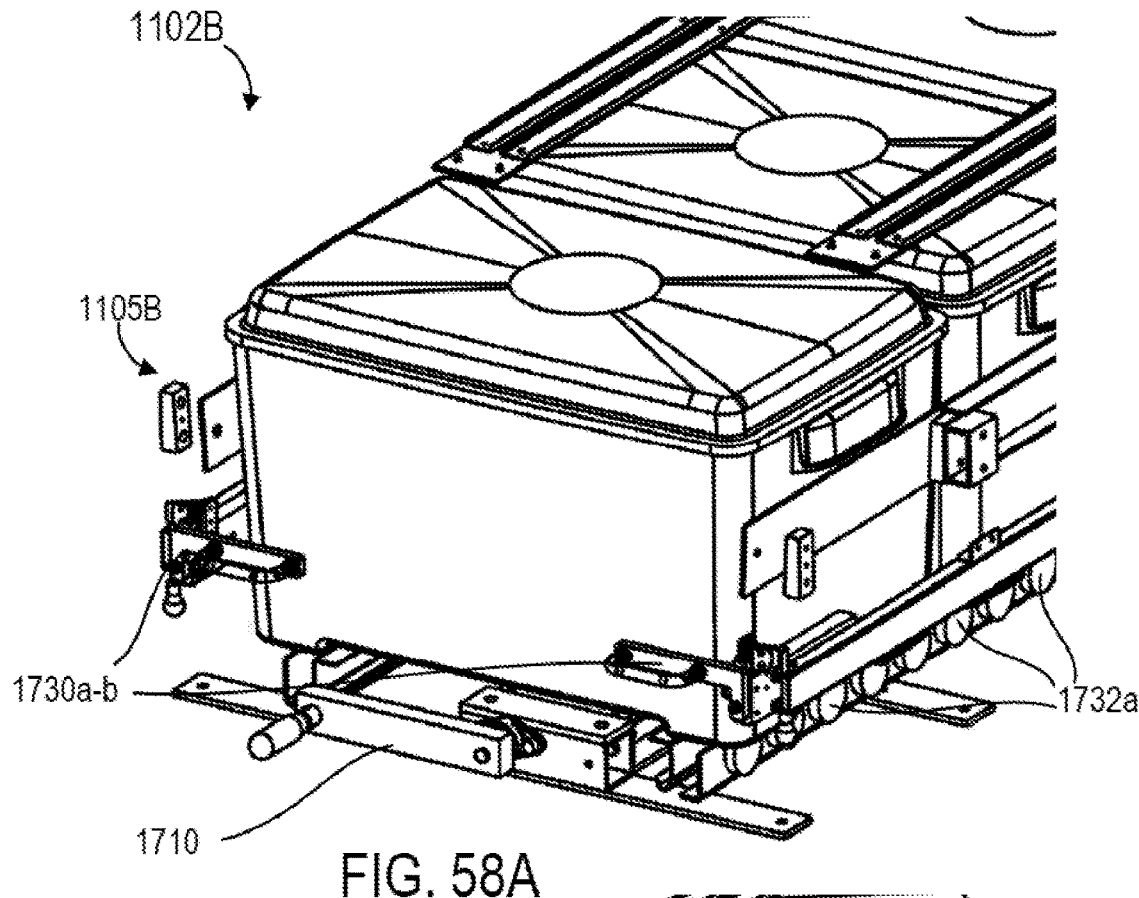
FIG. 58A depicts a front end of a spring eject rack with stop gates down for retaining containers on the rack.
Figure 58B:
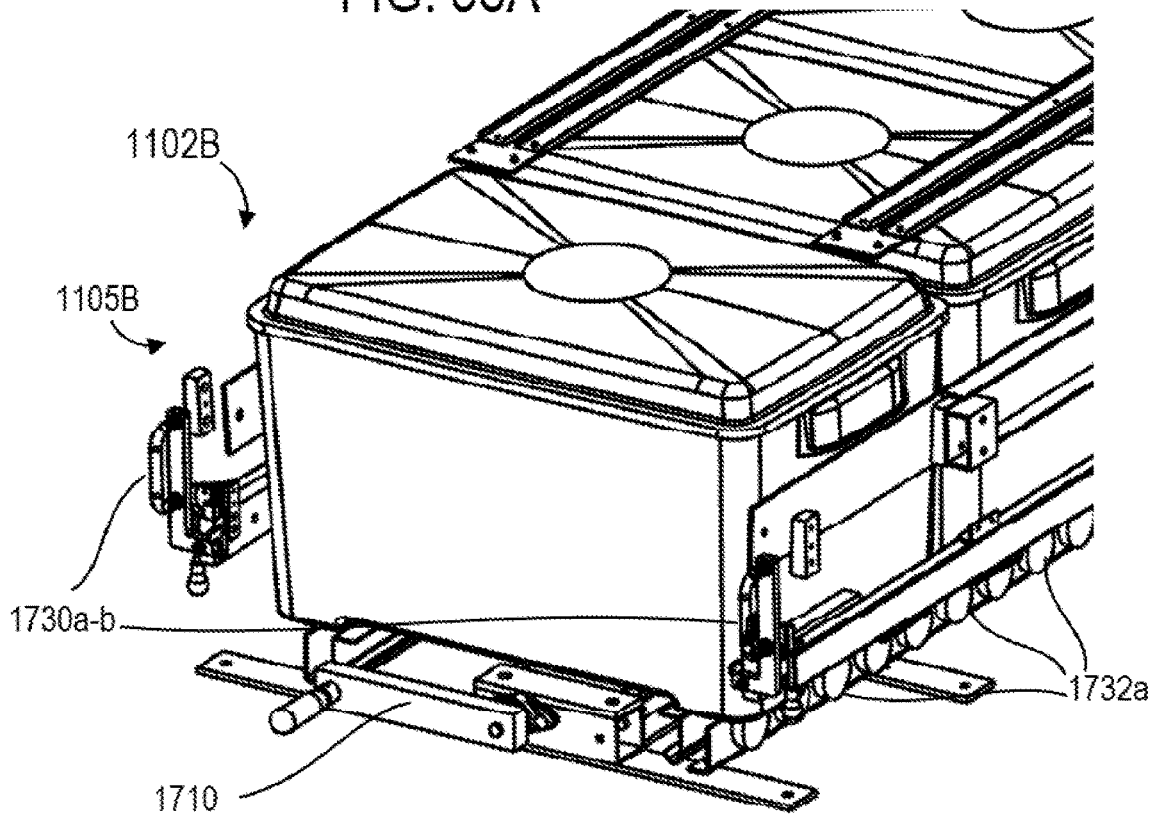
FIG. 58B depicts a front end of a spring eject rack of FIG. 58A with stop gates up for removing a container from the rack.

Returning now to alternate embodiments of the flow racks, FIGS. 55-57B depict a manually operated implementation of an unloading pusher 1720. In implementations, a manually operated flow rack 1102A comprises a handle 1710 at a front end 1105 of the rack 1102A. The handle 1710 is operably connected to a pull chain 1715 as shown in the partially exposed view of FIG. 56. As shown in FIG. 56 and the close-up rear end views of the flow rack 1102A of FIG. 57A, the pull chain 1715 extends the length of the flow rack LF to engage with a bottom portion 1722 of the unloading pusher 1720. As shown in FIG. 57B, the handle 1710 is operably connected to a drive gear 1725 that engages the pull chain 1715 via one or more bearings 1729 and gears 1727. A top place of the gear assembly 1705 is removed to in FIG. 57B and in practice, in implementations, the assembly 1705 would be covered to prevent deterioration and jamming of the gears, sprocket, and chain therein. Alternatively, in implementations, the handle is connected to a belt or shaft drive configured to manually retract and extend the pusher 1720.

Figure 59:
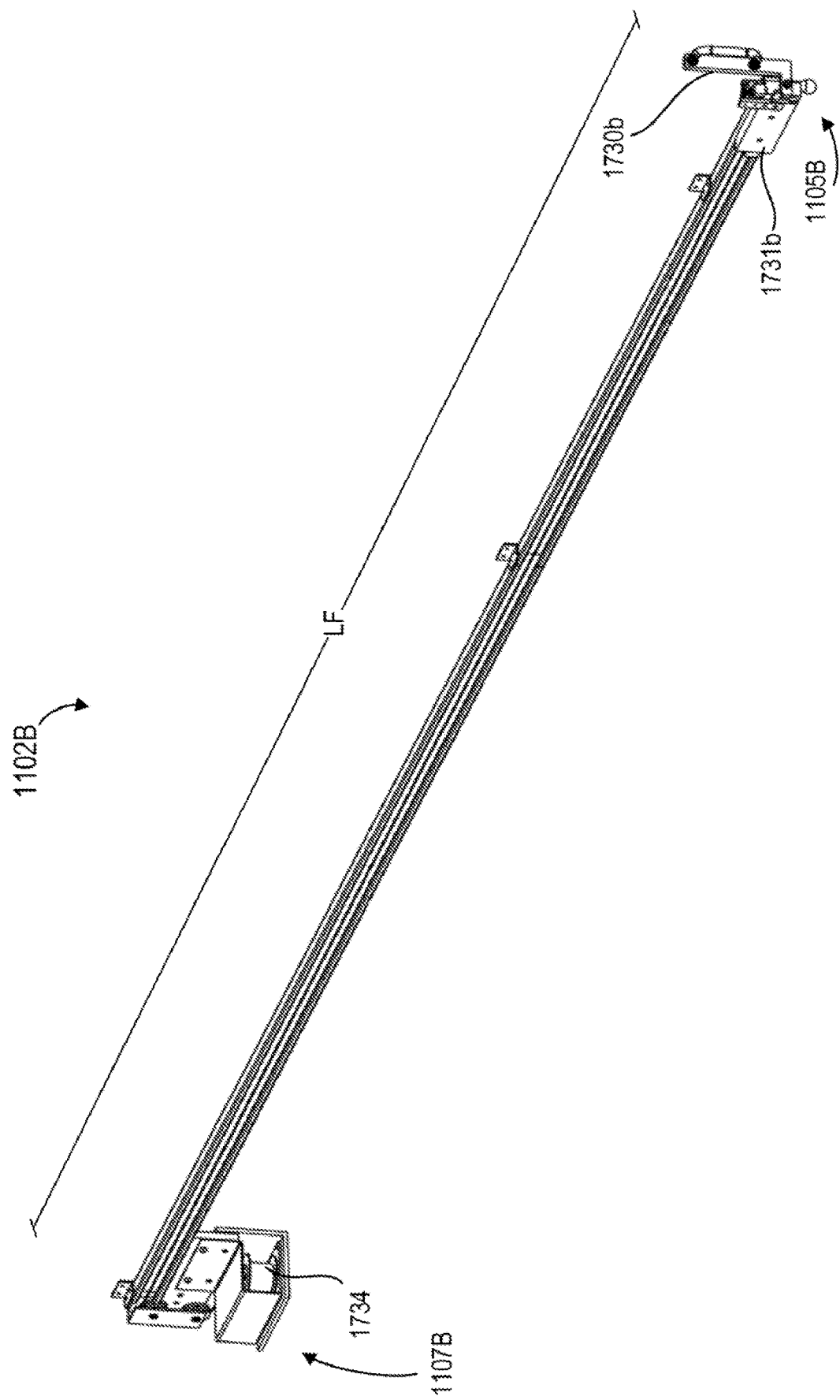
FIG. 59 depicts a side rail and spring loaded gate of the rack of FIGS. 58A-B.
Figure 60A:
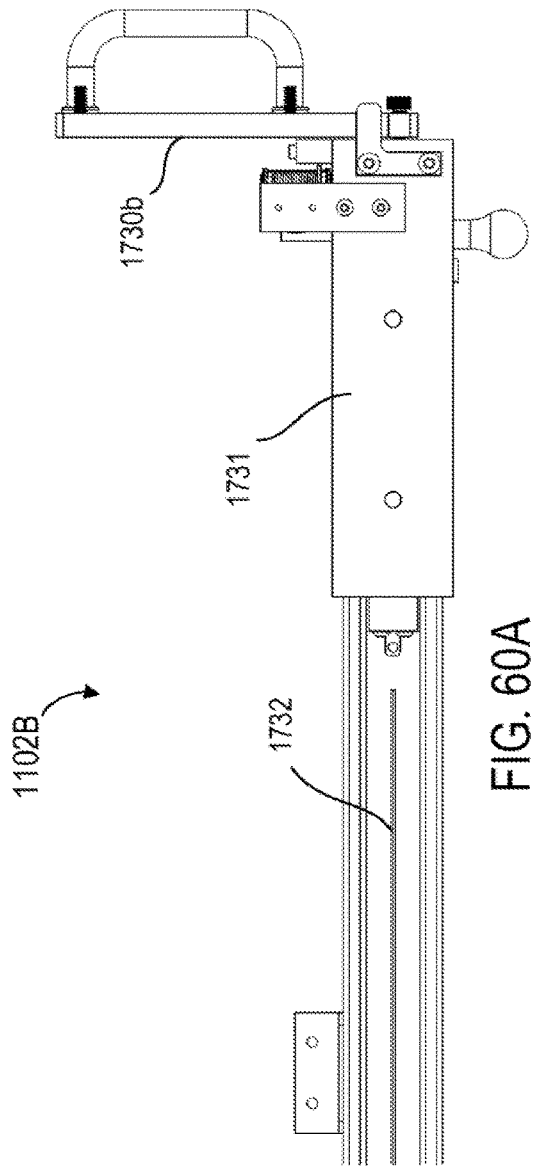
FIG. 60A depicts a front end of the side rail of FIG. 59.
Figure 60B:
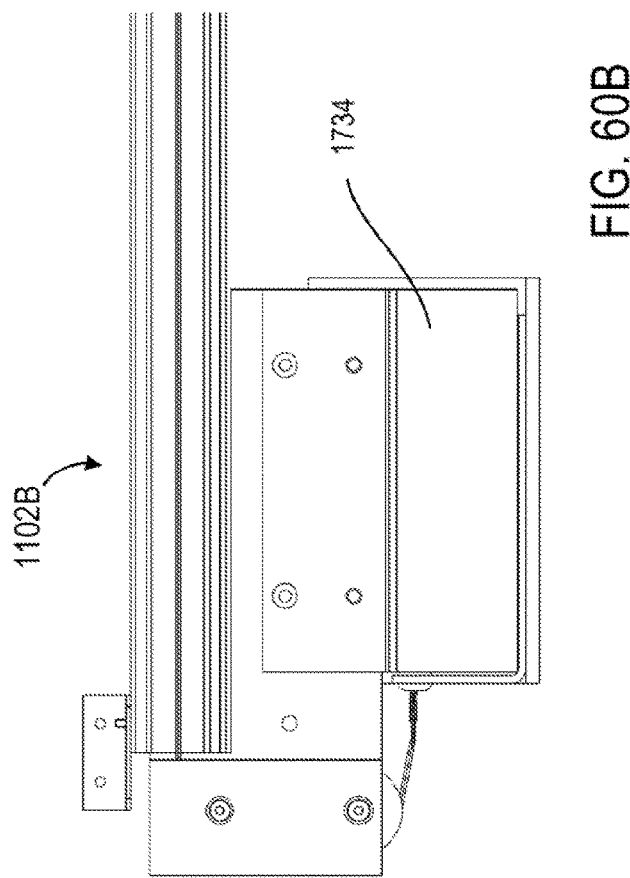
FIG. 60B a back end of the side rail of FIG. 59.
Figure 61A:
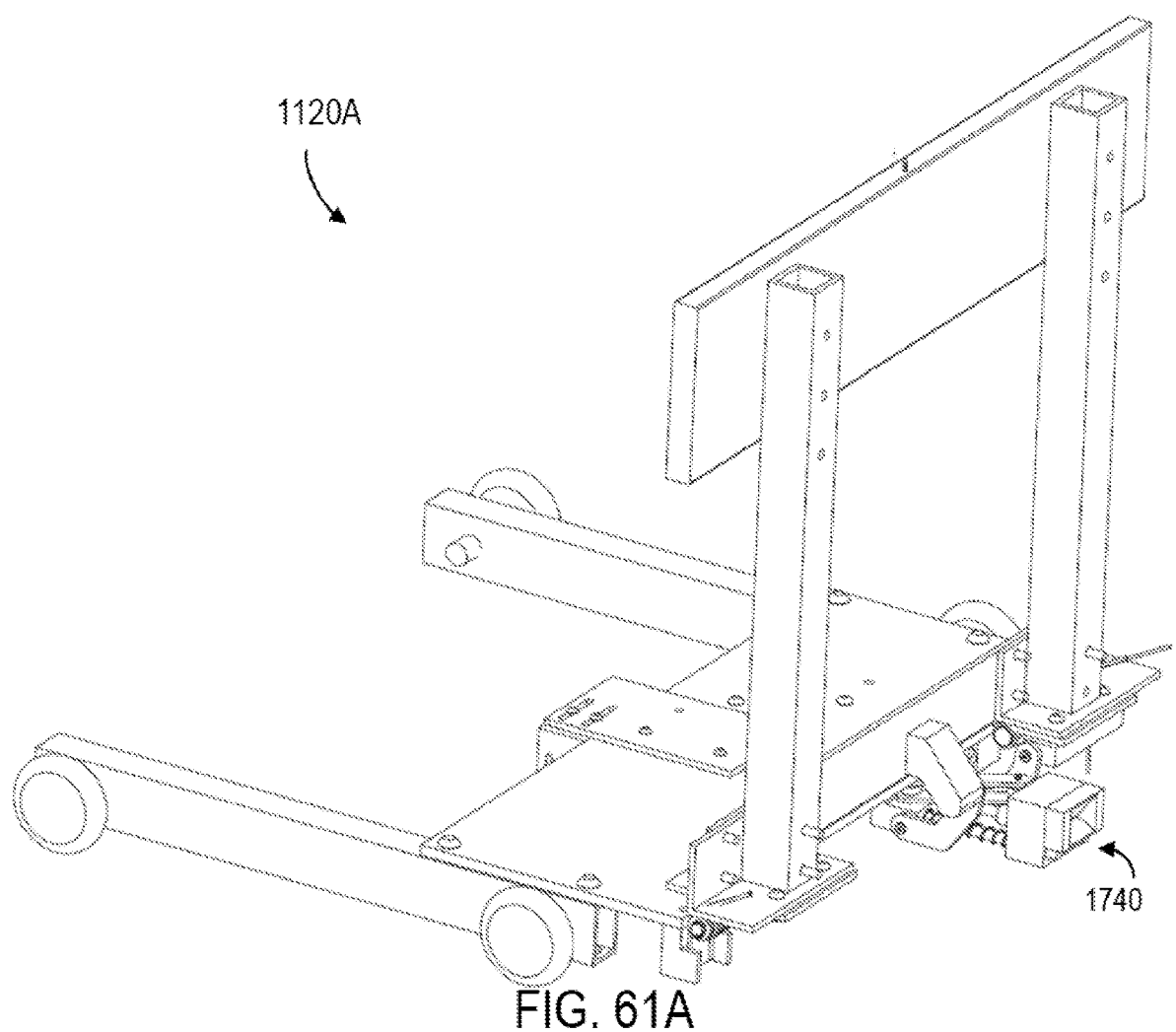
FIG. 61A depicts a side perspective view of an example pusher comprising a spring loaded pin drop down mechanism.
Figure 61B:
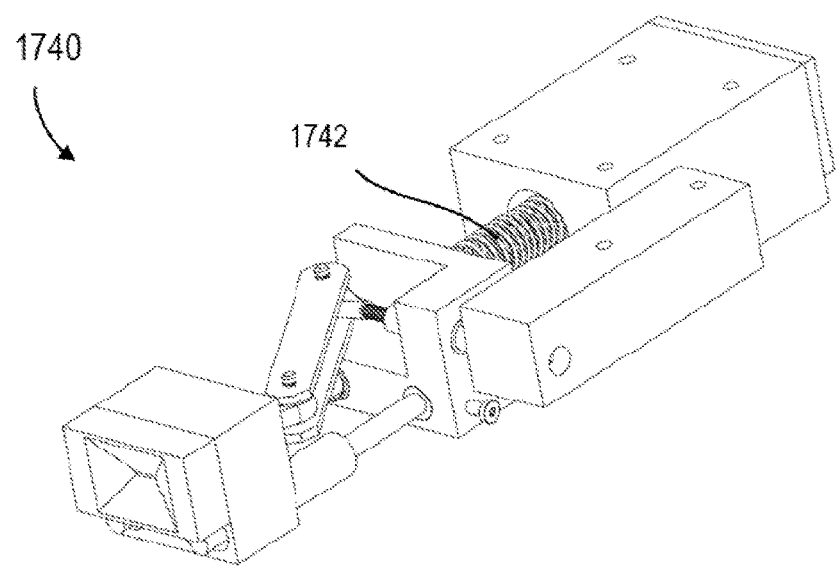
FIG. 61B depicts the spring loaded pin drop down mechanism of FIG. 61A.
Figure 62A:
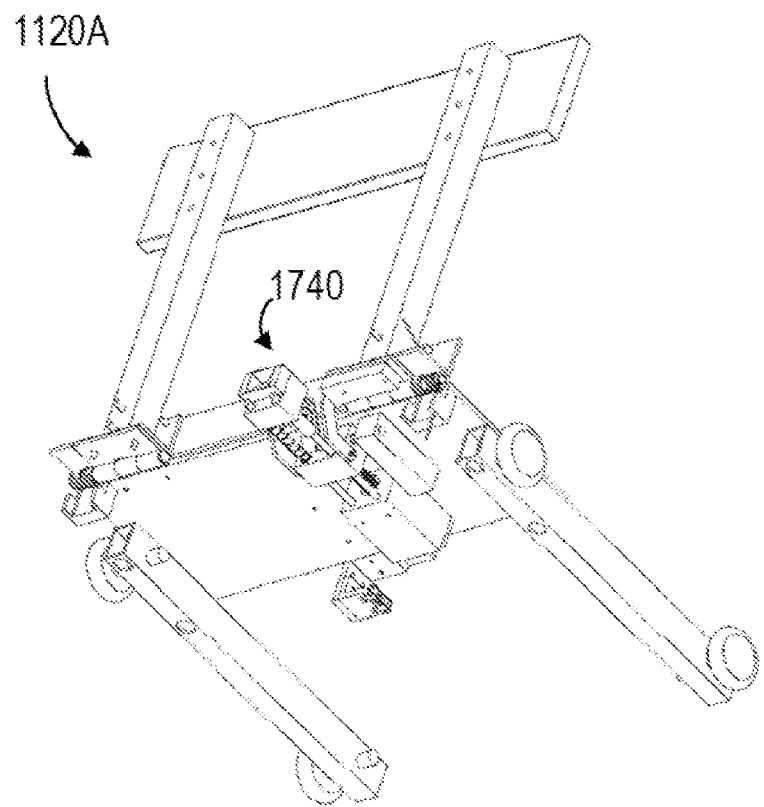
FIG. 62A depicts a bottom perspective view of the example pusher of FIG. 61A.
Figure 62B:
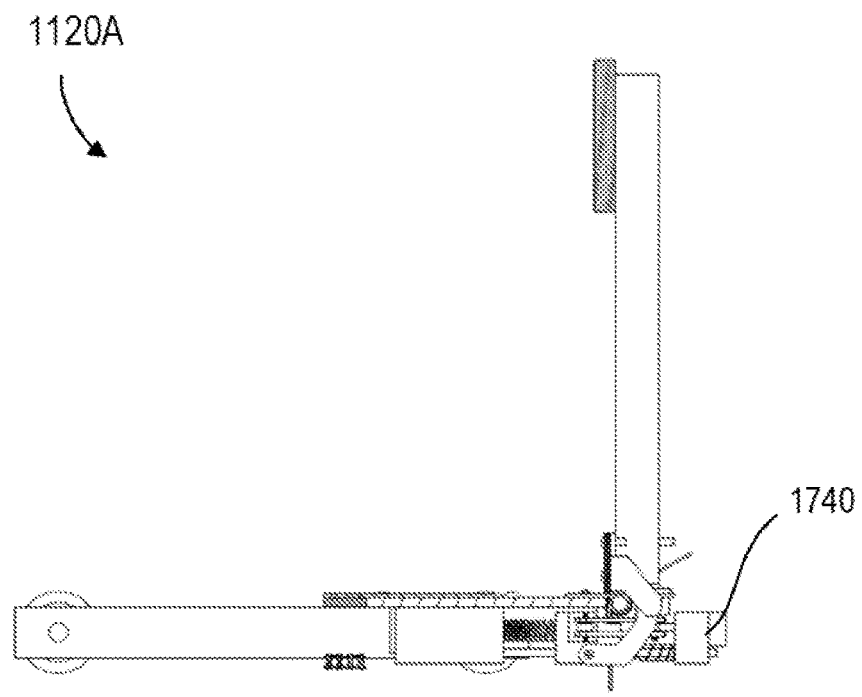
FIG. 62B depicts a side view of the example pusher of FIG. 62A with the spring loaded pin in a first compression stage.
Figure 63A:
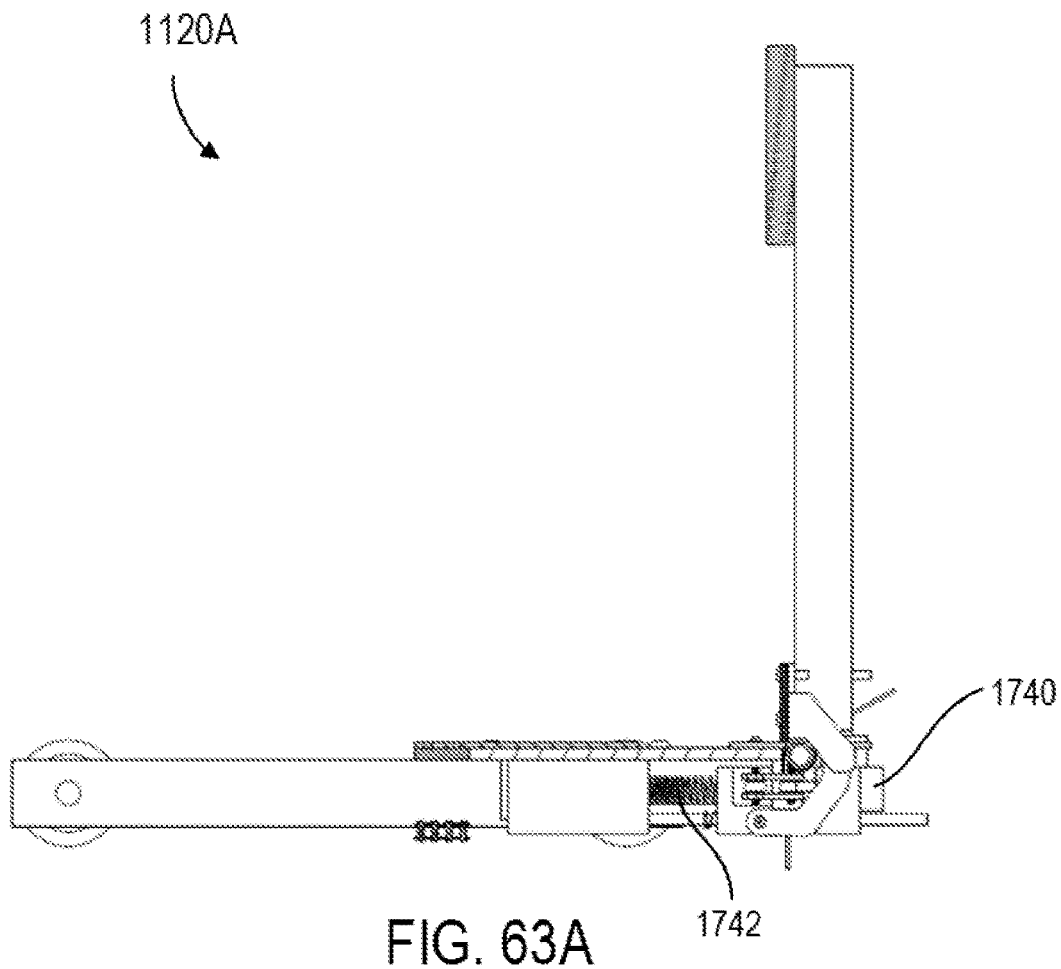
FIG. 63A depicts a side view of the example pusher of FIG. 62B with the spring loaded pin in a second compression stage.
Figure 63B:
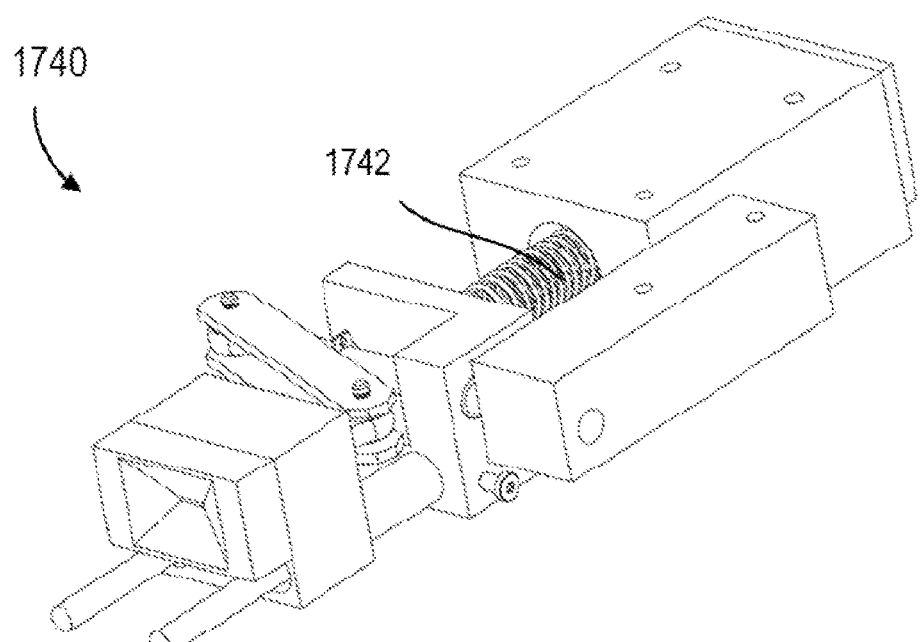
FIG. 63B depicts the spring loaded pin drop down mechanism of FIG. 63A.

Turning now to FIGS. 58A-60B, in implementations, a flow rack 1102B comprise a spring eject mechanism and manual folding/unfolding stop gates 1730*a-b* that permit a delivery person to select when to allow the container(s) on the flow rack to roll through a front end 1105B. In implementations, the gates 1730*a-b* fold up when a delivery person 10 wants to remove a container 1200. In implementations, the gates 1730*a-b* comprise one or more magnet detents to keep them in an upright position until the delivery person is ready to close the gates 1730*a-b*. Additionally or alternatively the gates 1730*a-b* comprise at least one of a bistable mechanism, such as a bistable spring, for holding the gates upright and out of the way of the front end 1105B or the gates can be held upright by gravity. In implementations, as shown in FIGS. 59 and 60A-B each of the gates 1730 is attached to a carriage 1731 that can slide the length of the rack LF, and is pulled back by a spring 1734 or other retraction mechanism housed at a back end 1107B of the rack 1102B and connected to the carriage 1731 by a cable 1732.

Figure 64A:
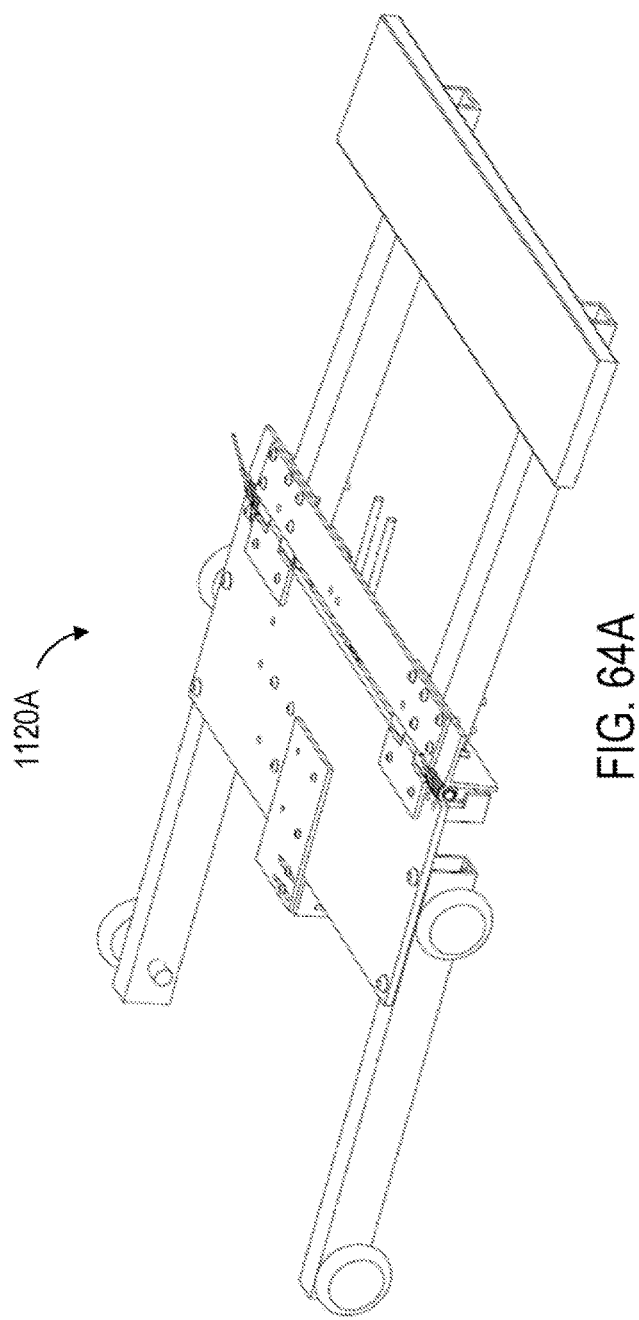
FIG. 64A depicts a side perspective view of the pusher of FIGS. 61A-63B in a lay flat state.
Figure 64B:
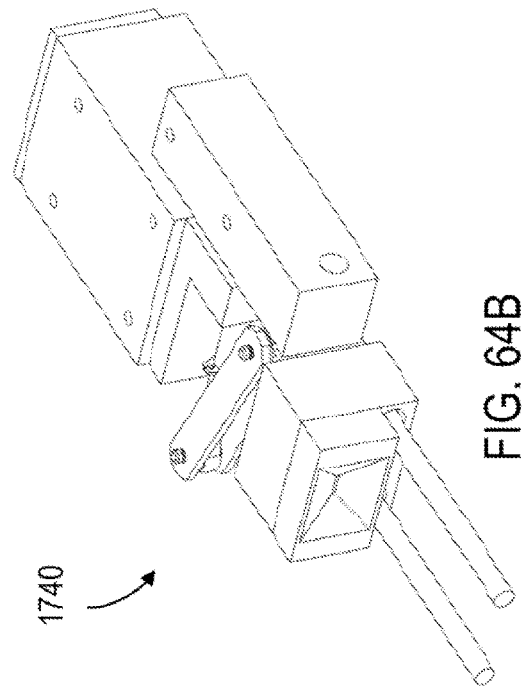
FIG. 64B depicts the spring loaded pin drop down mechanism of FIG. 64A in a fully compressed state.

Turning now to FIGS. 61A-64B, in implementations, a flow rack pusher 1120A comprises a manually operated drop mechanism for unloading a flow rack from the rear, as shown for example in FIG. 45. In implementations, as shown in FIGS. 61A-B and 62A-B, the pusher 1120A comprises a manually engaged spring loaded release pin 1740, shown in a fully extended state in FIG. 61B in a pusher locked position. The drop mechanism is two part: First, as shown in FIGS. 63A-B, the pin 1740 mechanism is disengaged by compressing the pin 1740 a first distance. Second, as shown in FIGS. 64A-B the pusher pad is rotated down when the fully compressed pin 1740 engages a lever or linkage mechanism for folding the pusher pad flat behind and lower than the rails of the rack on which it rides.

Figure 65A:
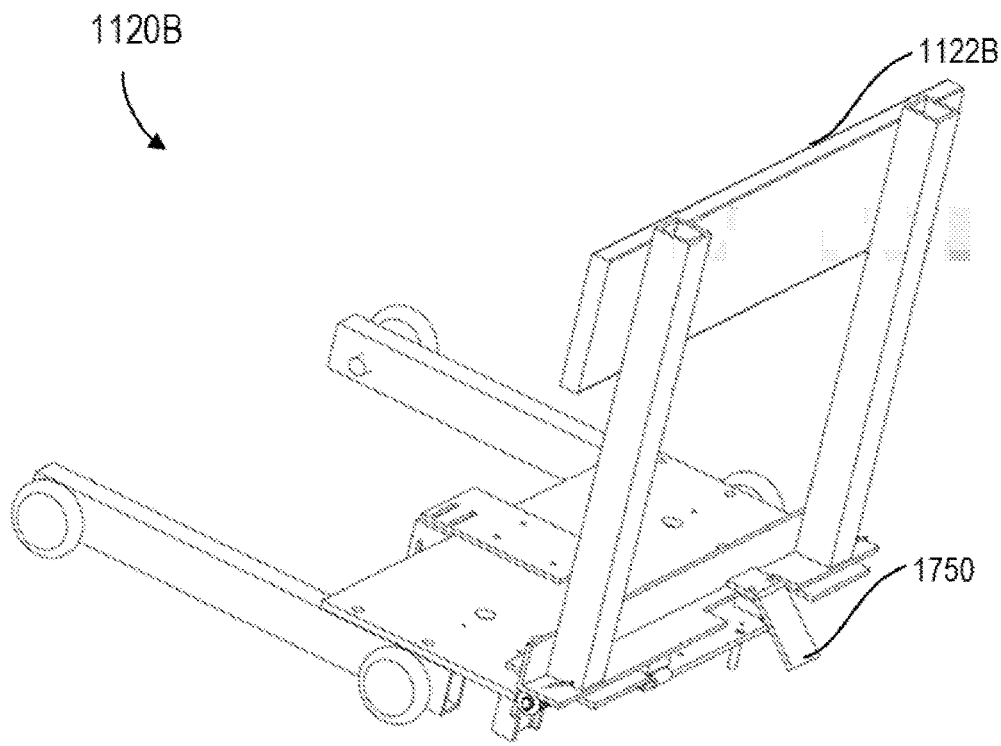
FIG. 65A depicts a rear perspective view of an example pusher comprising a spring loaded plate drop down mechanism.
Figure 65B:
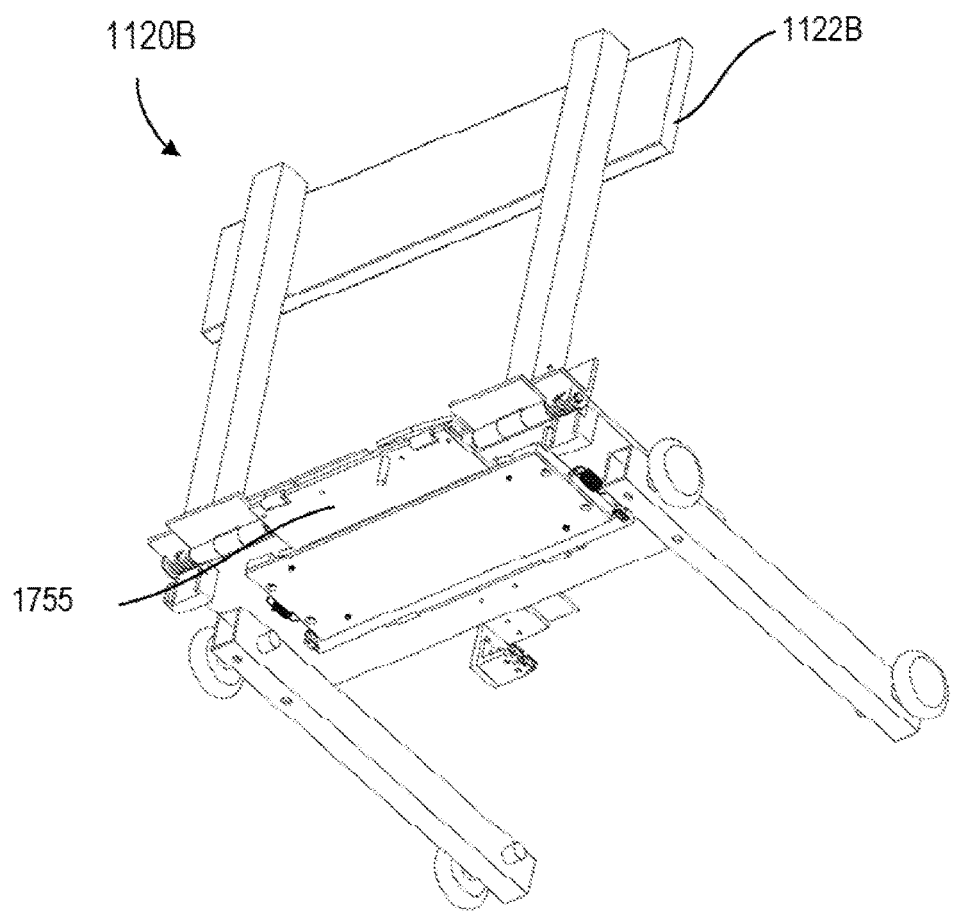
FIG. 65B depicts rear bottom perspective view of the example pusher of FIG. 65A with a cover removed to show the spring loaded plate.
Figure 66A:
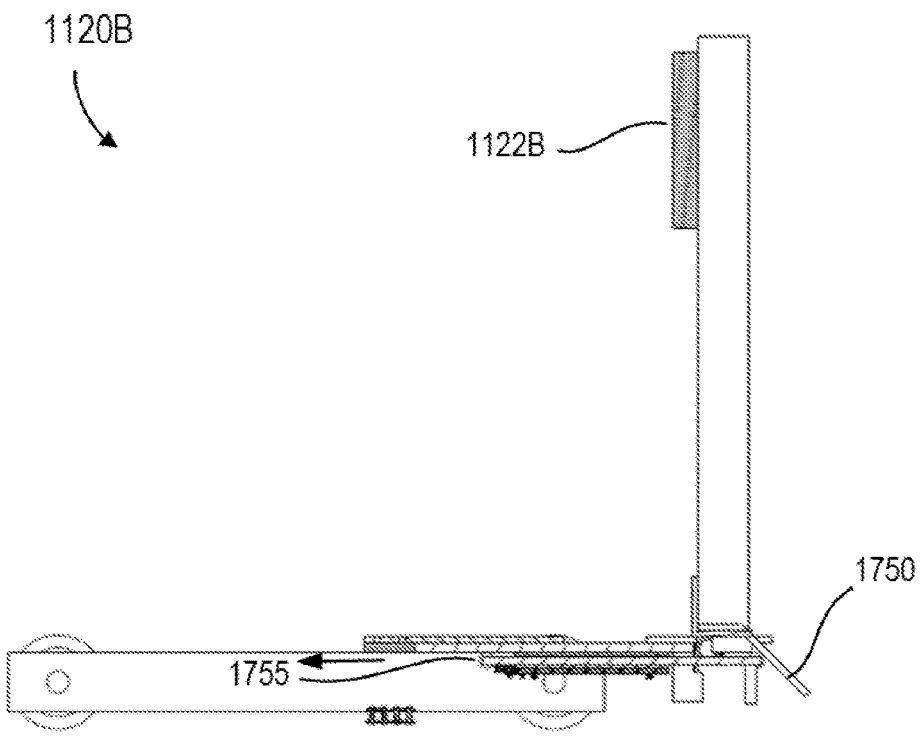
FIG. 66A depicts a side view of the pusher of FIG. 65B with the plate in a first compression position.
Figure 66B:
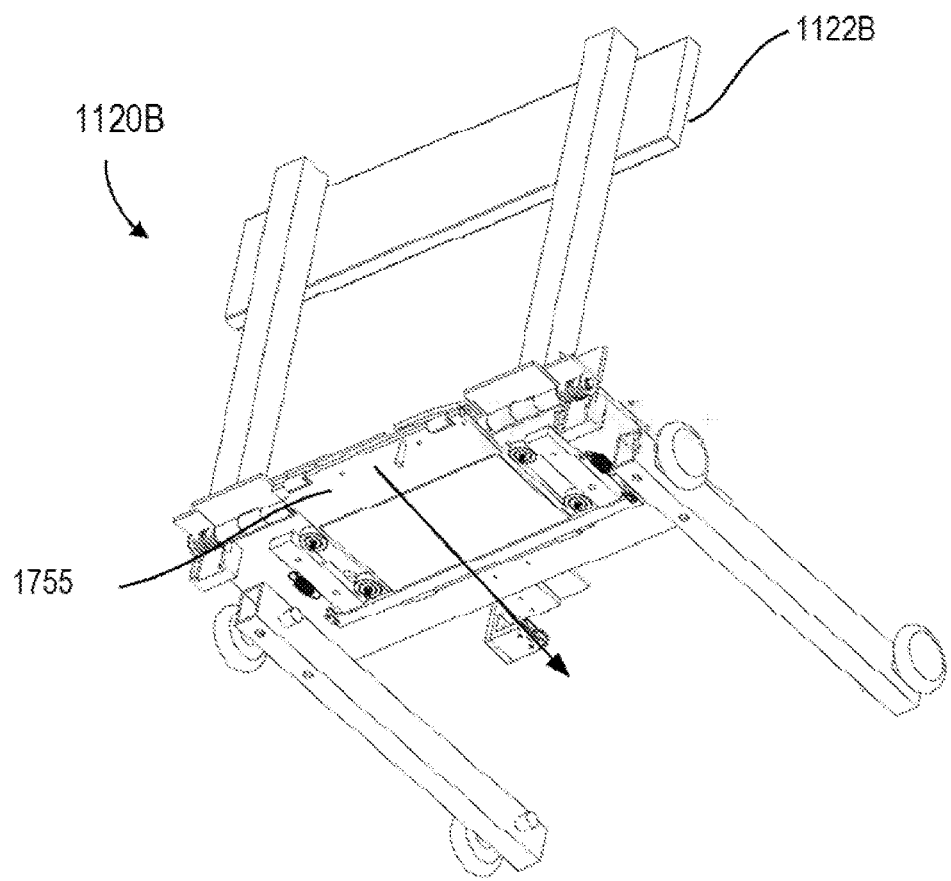
FIG. 66B depicts a bottom perspective view of the pusher of FIG. 66A.
Figure 67A:
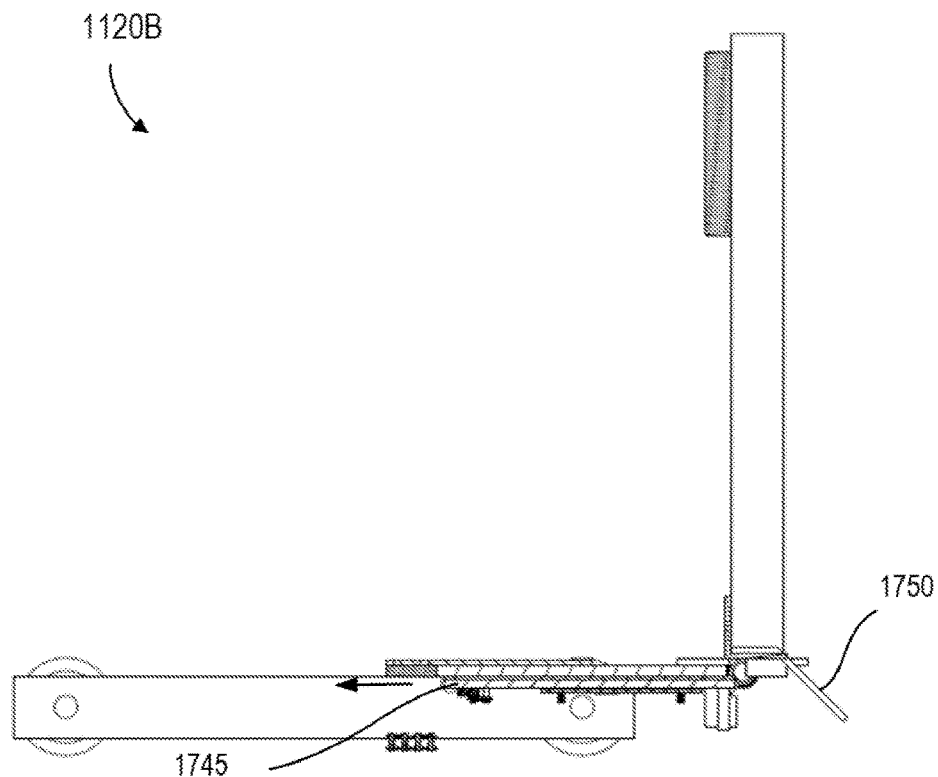
FIG. 67A depicts a side view of the pusher of FIG. 66A with the plate in a second compression position.
Figure 67B:
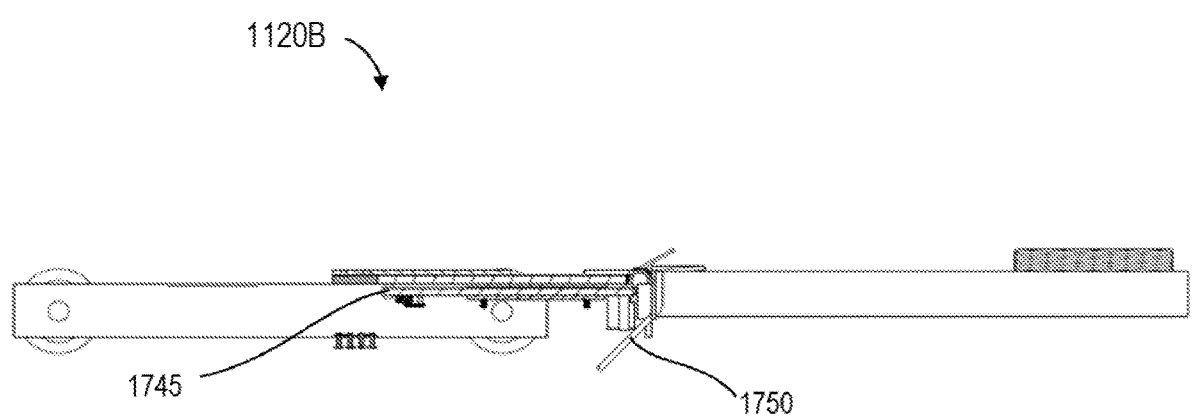
FIG. 67B depicts a side view of the pusher of FIG. 67A with the plate in a fully compressed position and the pusher in a lay flat state.
Figure 68:
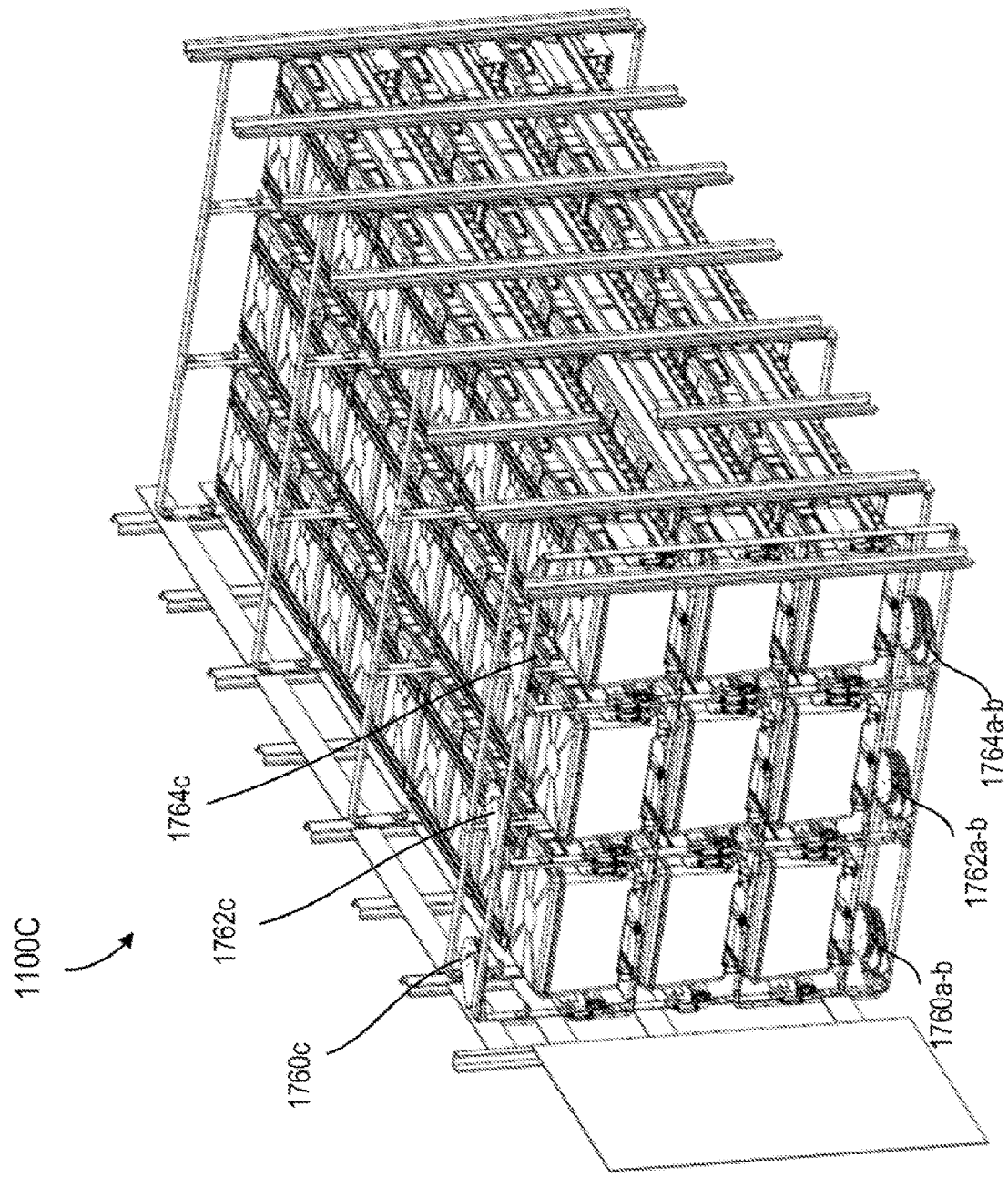
FIG. 68 depicts a perspective view of an example racking array of containers manually advanced by pull ropes from a transport volume of a vehicle.

In other implementations, as shown in FIGS. 65A-67B, a mechanically operated drop mechanism for unloading a flow rack 1102B from the rear, (for example, unloading into a laundry factory comprising one or more process lines 100, 100*a-c*) comprises a sliding plate 1755 and tab 1750 for extending a pusher 1120B to a lay flat state. The drop mechanism is configured to be operated by at least one of the delivery person and an extraction mechanism moved into engagement with the drop mechanism. As shown in FIGS. 65A-B, when the plate is in the rear position, it blocks the pusher contact face 1122B from tilting. As shown in FIGS. 66A-B in particular with a bottom cover of the pusher 1120B removed, an external mechanism such as an extraction rack (in the factory, not shown) engages with the rear edge of plate 1755, sliding it forward in the direction of the arrow and opening a path for the pusher contact face 1122B to tilt backwards such that the pusher 1120B is in a lay flat state (FIG. 67B). A second external mechanism, either a portion of the extraction rack or a standalone device, pushes on a tab 1750 that tilts the pusher contact face 1122B backwards to open flat for removing one or more containers 1200 from a back end 1107B of a rack 1102B. When the external mechanisms are removed, springs force the pusher contact face 1122B and sliding plate 1755 back into their original, upright pushing positions as shown in FIGS. 65A-B.

Figure 69:
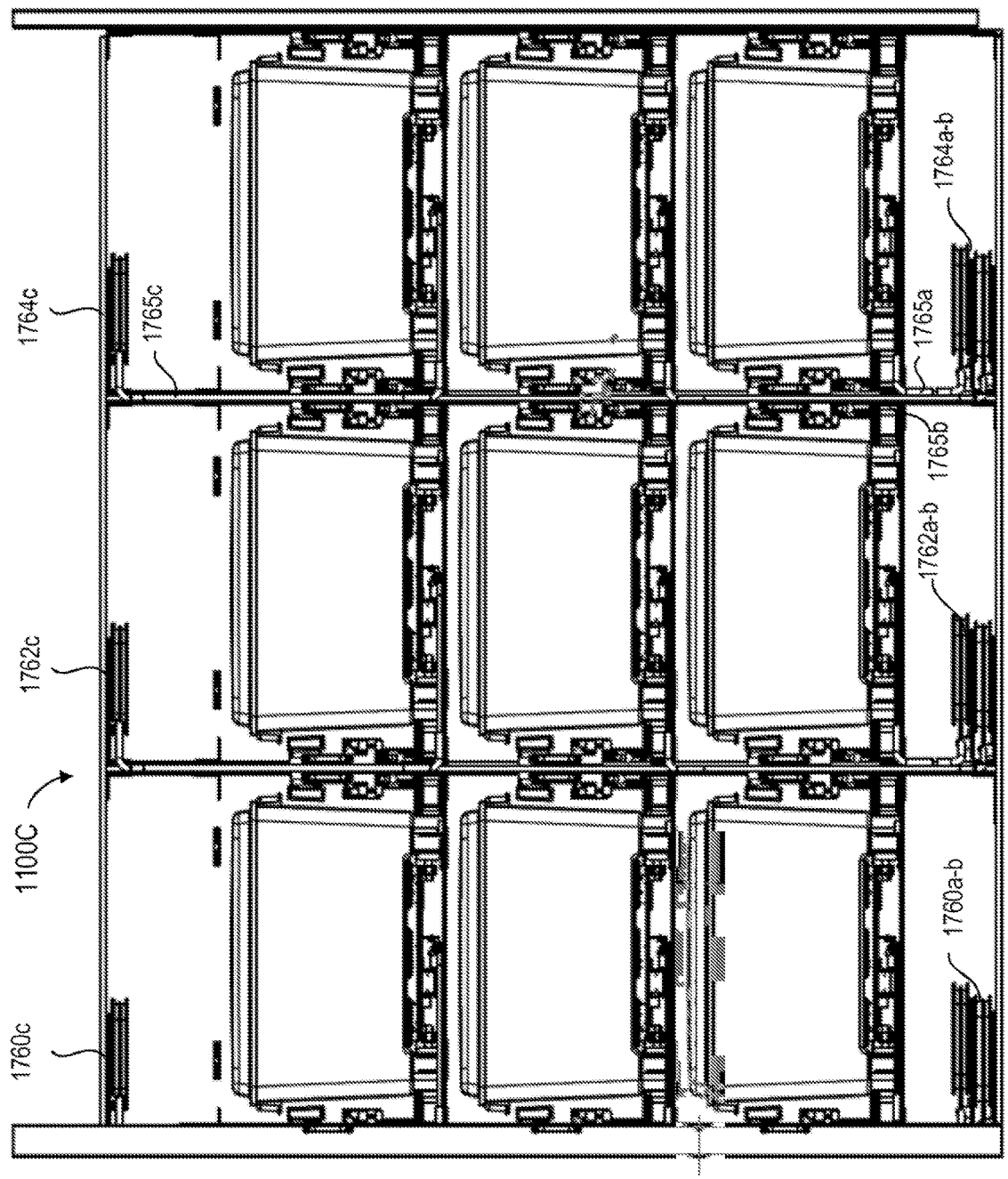
FIG. 69 depicts a front end view of the example racking array of FIG. 68 comprising a take up reel for each rope of each rack.
Figure 70:
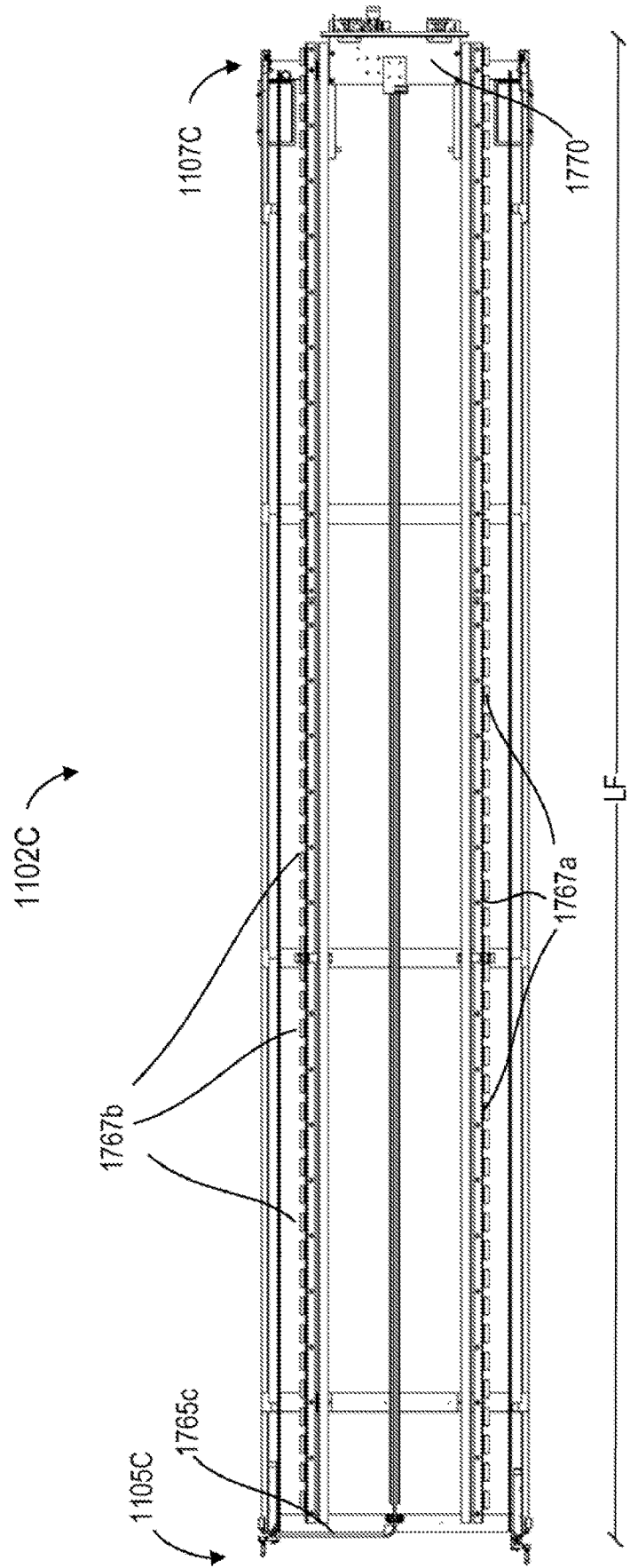
FIG. 70 depicts a top view of a rack of the array of FIGS. 68 and 69 showing a pull rope extending from a front end to a pusher at the back end of the rack.
Figure 71A:
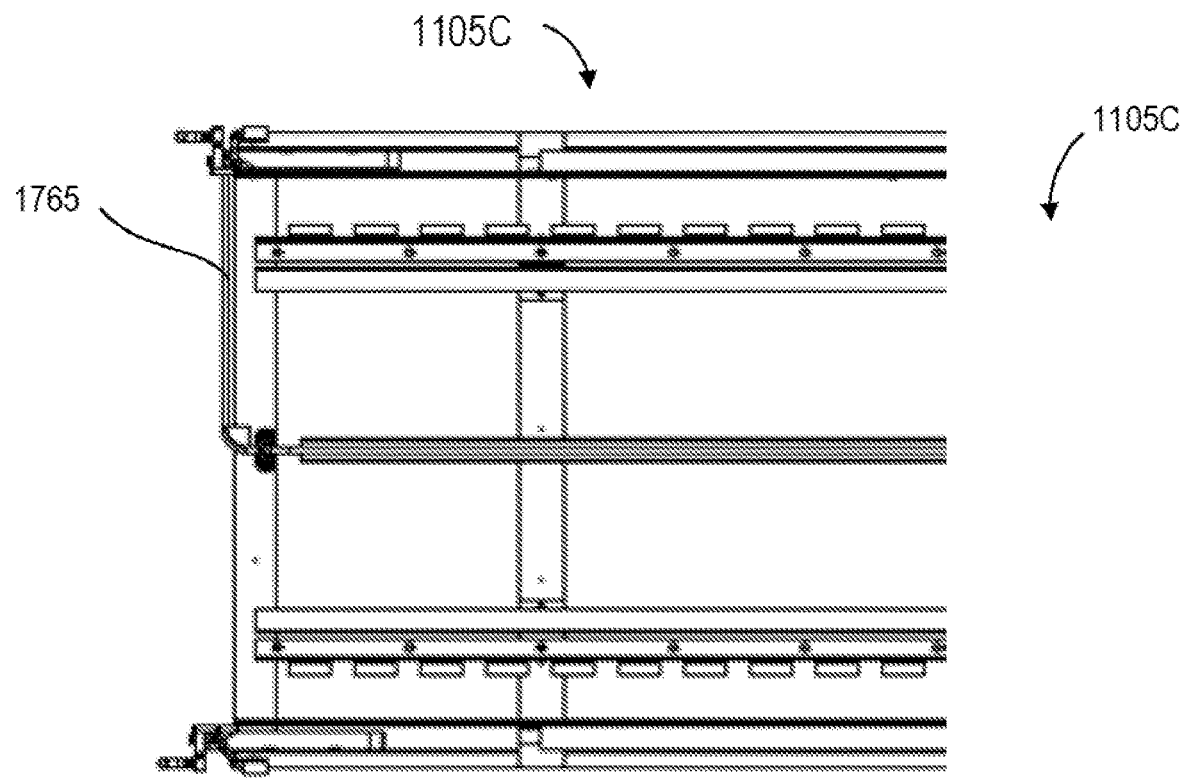
FIG. 71A depicts a close up of the front end of the rack of FIG. 70.
Figure 71B:
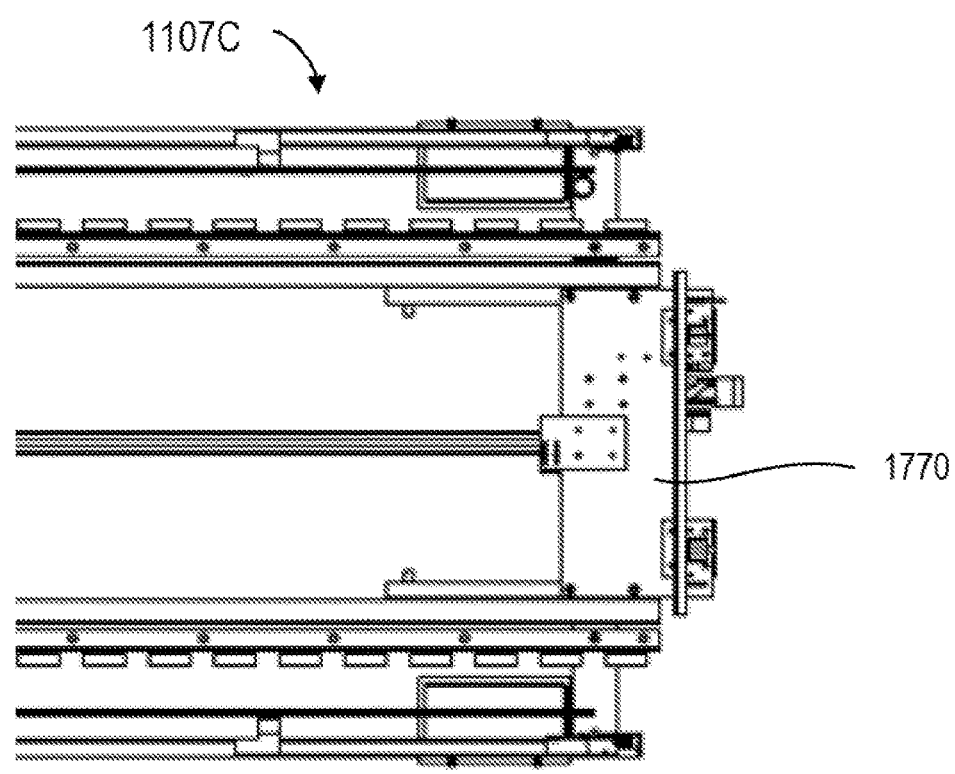
FIG. 71B depicts a close up of the back end of the rack of FIG. 70.
Figure 72A:
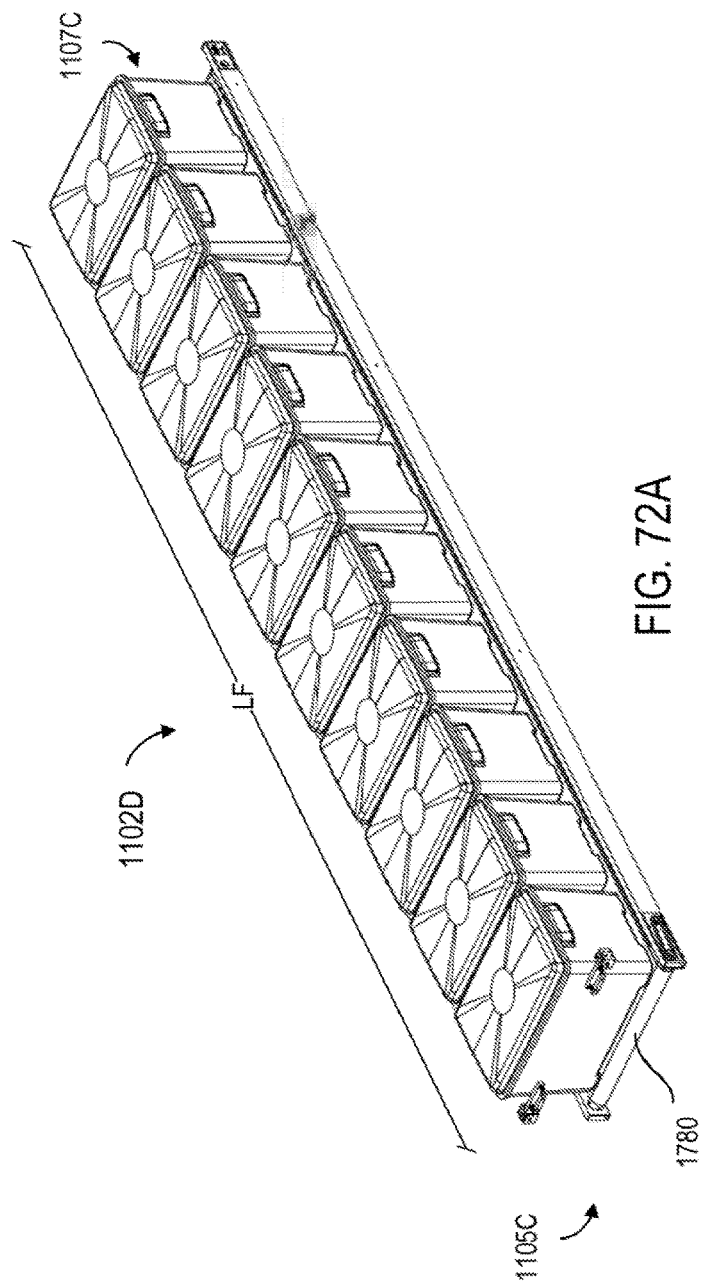
FIG. 72A depicts a perspective view of a conveyor rack supporting a plurality of containers for use in a transport volume racking array.
Figure 72B:
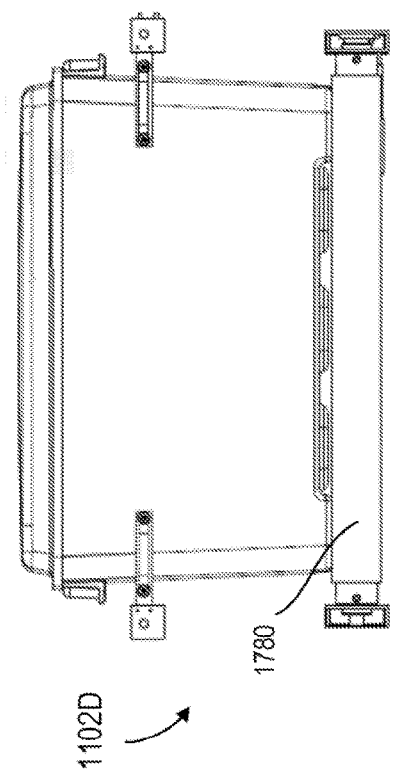
FIG. 72B depicts a front end view of the conveyor rack of FIG. 72A.
Figure 74A:
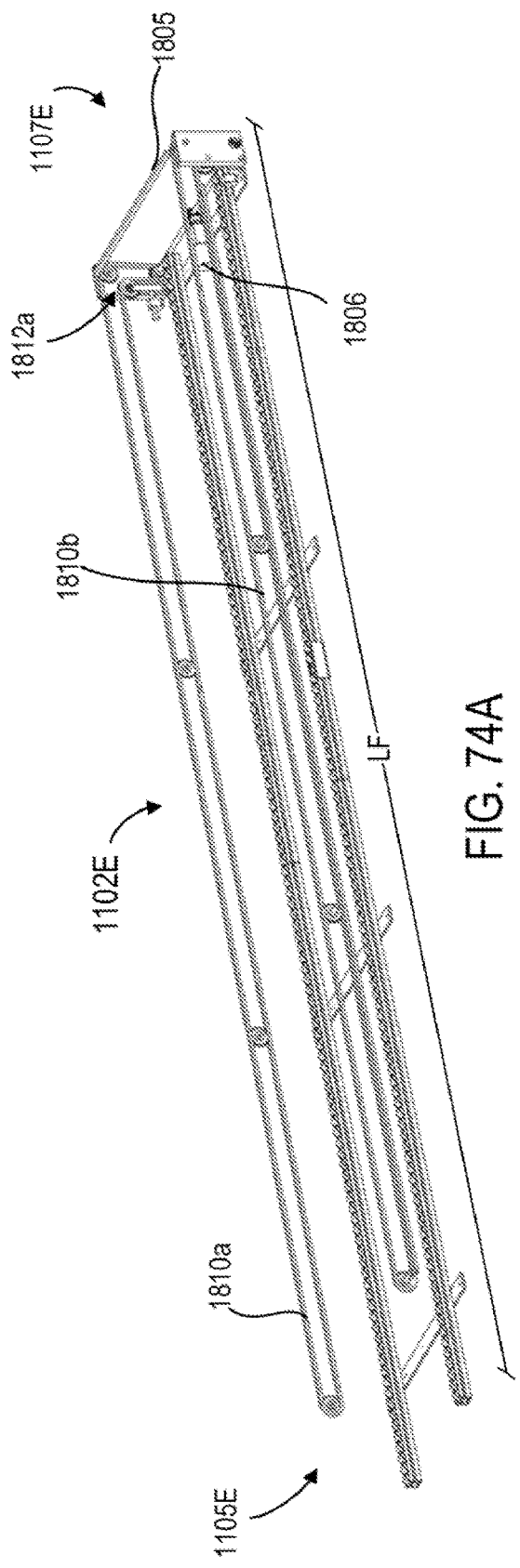
FIG. 74A depicts a front perspective view of a side chain driven flow rack without containers disposed thereon.
Figure 74B:
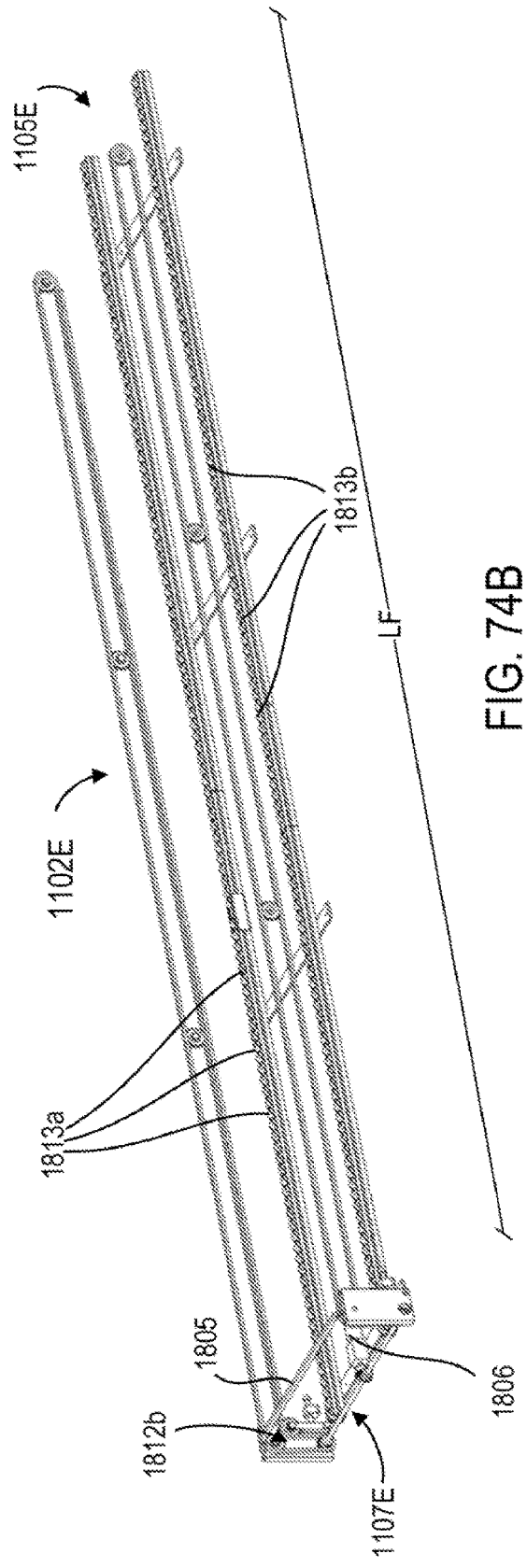
FIG. 74B depicts a rear perspective view of a side chain driven flow rack of FIG. 74A.
Figure 75A:
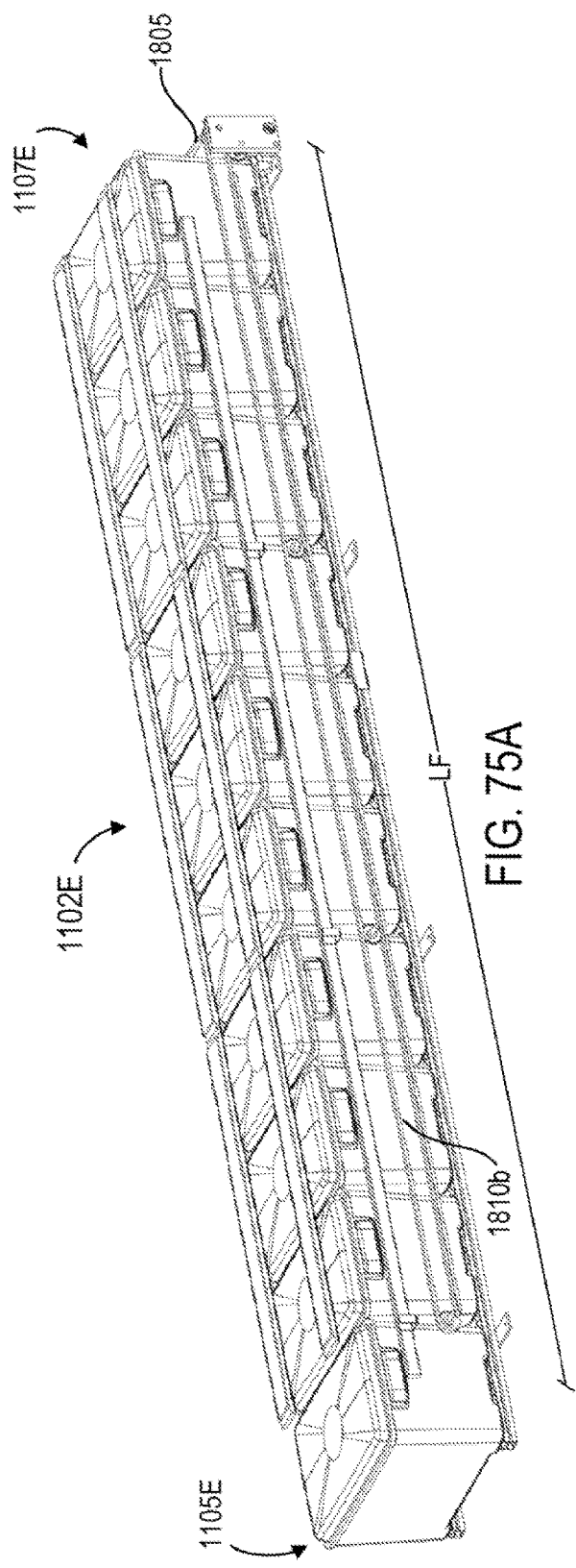
FIG. 75A depicts a front perspective view of the side chain driven flow rack of FIG. 74A with containers disposed thereon.
Figure 75B:
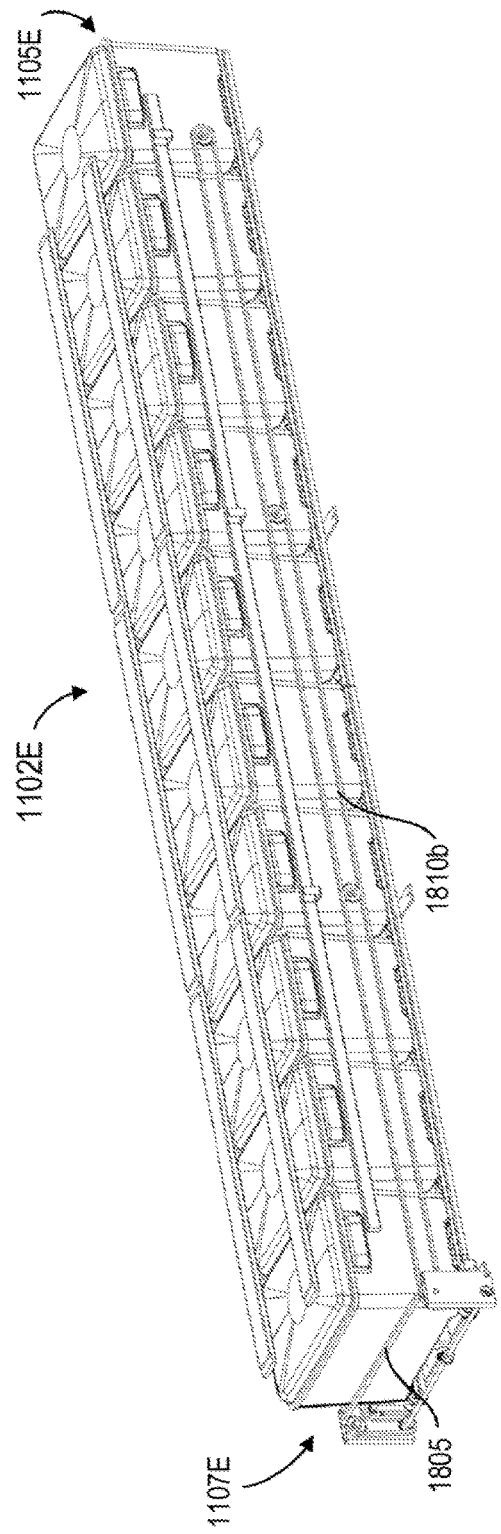
FIG. 75B depicts a rear perspective view of the loaded flow rack of FIG. 75A.

Turning now to FIGS. 68-71B, in implementations, a flow rack 1102C comprises a manually operated pusher for advancing one or more containers out of the array 1100C. In implementations, each flow rack 1102C comprises a manually pulled rope extending between a front end 1105C to a back end 1107 of a flow rack 1102. As the delivery person 10 pulls the rope 1765, slack is taken up by a dedicated spool 1760*a-b*, 1762*a-c*, 1764*a-b* (FIG. 69). A delivery person 10 is able to manually pull one container 1200 at a time off the end of the rack 1102 as the containers thereon roll on the flow wheels 1767*a-b* running the length of the rack LF.

As described previously with regard to implementations, the plurality of boxes 1200*a-n* in a rack can be advanced to a front end 1105 by a pusher pushing the plurality of boxes along rotating wheels. Alternatively, in implementations, each one of the plurality of racks in an array comprises a bidirectional driven conveyor 1780 that can be driven forward and in reverse to advance one or more containers 1200 thereon toward one or the other of a front end 1105C and back end 1107C for unloading. The conveyor 1780 can be driven by a motor in operable communication with the controller 1005. In implementations, the delivery person 10 can operate one or more conveyors upon request. For example, during unloading of containers of dirty laundry into a factory for laundering, the controller can rotate some or all of the conveyors in an array upon receiving a request to empty come or all of the racks onto a receiving conveyor, rack, or array of conveyors or racks. Although a conveyor may not comprise a pusher for pushing one or more containers along the conveyor, in implementations, the conveyor 1780 comprises an immobile backstop (not show) at the back end 1107C for preventing one or more containers 1200 thereon from falling off the back end 1107. In implementations, the back stop comprises at least one of a rail, a wall, or an bar configured to interfere with a back surface of the rear most container on the conveyor.

As shown in FIGS. 74A-75B, in implementations, a chain driven pusher bar 1805 can advance one or more containers off a front end 1105E of a flow rack. In implementations, a pair of side mounted chains 1810*a-b* run the length of the rack LF. At a back end 1107E, each chain 1810 takes a 90 degree turn. The pusher bar 1805 is configured to ride on the side mounted chains 1810*a-b* driven simultaneously by single motor 1806 on the bottom of the rack 1102E. In implementations, the delivery person 10 can operate the motor 1806 at the push of a physical button located at least one of on the flow rack 1102E and a touch screen button displayed on a user interface screen in wired or wireless communication with the controller 1005 for operating the motor 1806. In implementations, a single button is configured to operate the motor 1806 of every rack in an array to move the pusher bar 1805 of each rack to the back end 1107 when loading containers 1200 into the rack 1102E. In implementations, the bar drops down below level of the container at the push of a single button during loading and unloading at the back end 1107E of the rack 1102E at a laundry facility. In implementations, when unloading containers at a washing factory housing the one or more process lines 100, 100*a-c* (e.g., laundry facility), no eject mechanism pushes the containers out from the other side. In implementations, when unloading contains at a laundry facility, a spring loaded eject mechanism pushes one or more containers off each rack. Alternatively, an operator and/or the delivery person remove the containers from the rack 1102E with an extraction arm. In some implementations, the array of flow racks 1102E comprises a pick to light system. In other implementations, the rack is used with an elevator 1400.

As shown in FIGS. 76A-80B, in implementations, a pair of bidirectional pusher tabs 1850*a-b* are configured to advance one or more containers off a front end 1105F of a flow rack 1102F during unloading by a delivery person and off the back end 1107B during unloading into a laundry factory. Taking FIGS. 76A and 77 together, the pair of bidirectional pusher tabs 1850*a-b* move between a rear upper position A at the back end 1107F of the rack 1102F, a front upper position B at the front end 1105F of the rack 1102F, a rear lower position C at the back end 1107F and a front lower position D at the front end 1105F. Only one side of the rack 1102F is labeled for clarity however it is understood that positions A-D apply to both rails 1865*a-b* and rotating chains 1860*a-b* of the rack 1102F. As shown in FIG. 76B, the pair of bidirectional pusher tabs 1850*a-b* ride on corresponding rotating chains 1860*a-b* and are held in place against rails 1865*a-b* to keep each chain retained in a corresponding guide channel along the length of the rack 1102F and the pair of the pair of bidirectional pusher tabs 1850*a-b* are configured to ride their respective chain 1860*a-b* around the bends DB at the front end 1105F and the bends AC (FIG. 80A) at the back end 1107F of the rack 1102F and raise and lower as they move from the bottom to the top and the top to the bottom of their respective chains 1860*a-b*.

Figure 77:
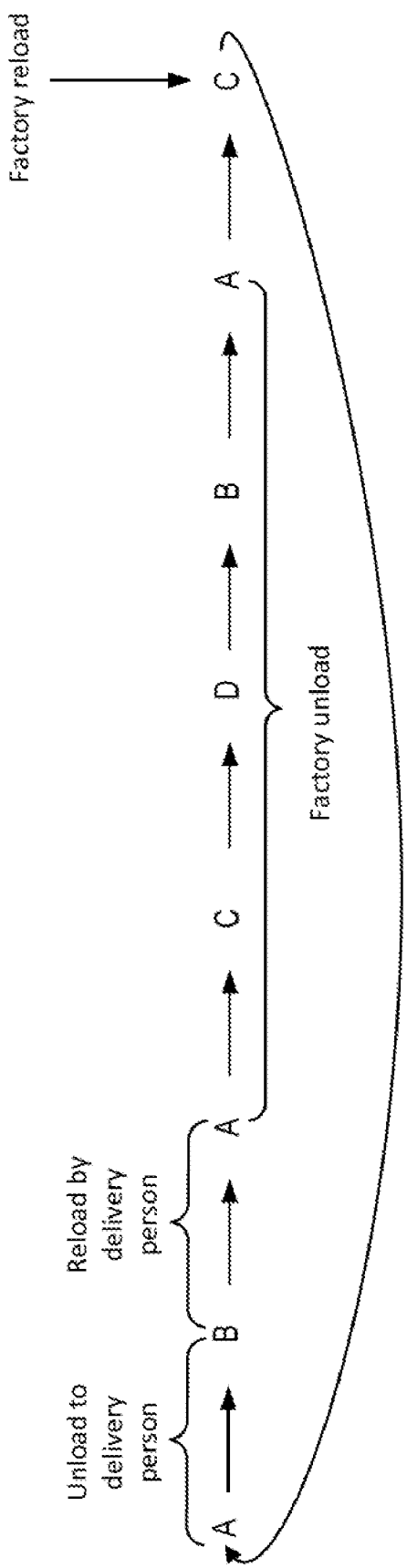
FIG. 77 depicts a schematic flow of a pair of bidirectional pusher tabs transiting a length LF of a flow rack in both directions, from back to front and front to back.

As indicated in the schematic flow of FIG. 77, the pair of bidirectional pusher tabs 1805*a-b* is configured to transit the length LF of the flow rack 1102F in both directions, from back end 1107F to front end 1105F and in reverse from front end to back end 1107 during various stages of delivery and receipt at customer locations and factory unloading and factory loading at a laundry facility housing one or more process lines 100, 100*a-c*. The pair of bidirectional pusher tabs 1805*a-b* is configured to move from position A to position B, outstretched horizontally and pushing against a rear most container in the rack 1102F as a plurality of containers (e.g., containers of clean laundry being returned to customer locations along a delivery route) disposed on the rack 1102F are advanced out the front end 1105F. As one or more containers (e.g., containers of dirty laundry retrieved from customer locations) are reloaded into the rack 1102F, the horizontally outstretched bidirectional pusher tabs 1805*a-b* are configured to be pushed back from upper position B (FIG. 79A-B) to upper position A at the back end 1107F of the rack 1102F. When the dirty containers 1200*a-n* are unloaded in a factory for washing, the bidirectional pusher tabs 1805*a-b* can move from position A (FIG. 78A-B) around the front bends AC to position C (FIG. 80A) with the tabs dropped down in a vertical orientation so that they do not interfere with the dirty containers 1200*a-n* disposed in the rack 1102F and transit the length LF of the rack 1102F to position D. At position D (FIG. 80B), the bidirectional pusher tabs 1805*a-b* round the front bends DB to upper position B at which position the bidirectional pusher tabs 1805*a-b* return to a horizontal alignment. The horizontally aligned bidirectional pusher tabs 1805*a-b* are then configured to contact a front surface of a front most container 1200 for pushing the plurality of containers disposed on the rack 1102F off the back end 1107F of the rack until the bidirectional pusher tabs 1805*a-b* reach the rear upper position. The bidirectional pusher tabs 1805*a-b* can then round the rear bends AC to drop the bidirectional pusher tabs 1805*a-b* to vertical and enable reloading the rack 1102F through the back end 1107F at the factory. In this way, the bidirectional pusher tables are able to engage with the containers selectively for pushing them off either the front or rear end of the rack 1002F and drop down out of the way when transiting the length of an occupied rack 1102F.

Figure 78A:
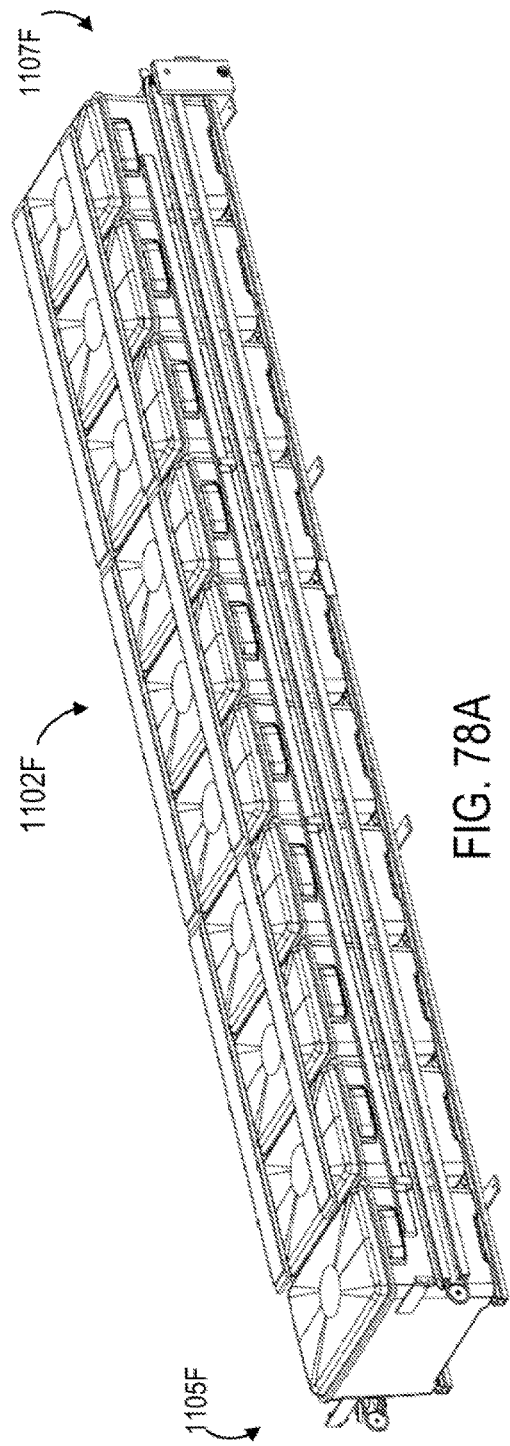
FIG. 78A depicts a front perspective view of the flow rack of FIG. 76A with boxes loaded thereon and a pair of bidirectional pusher tabs disposed at a rear end of the rack.
Figure 78B:
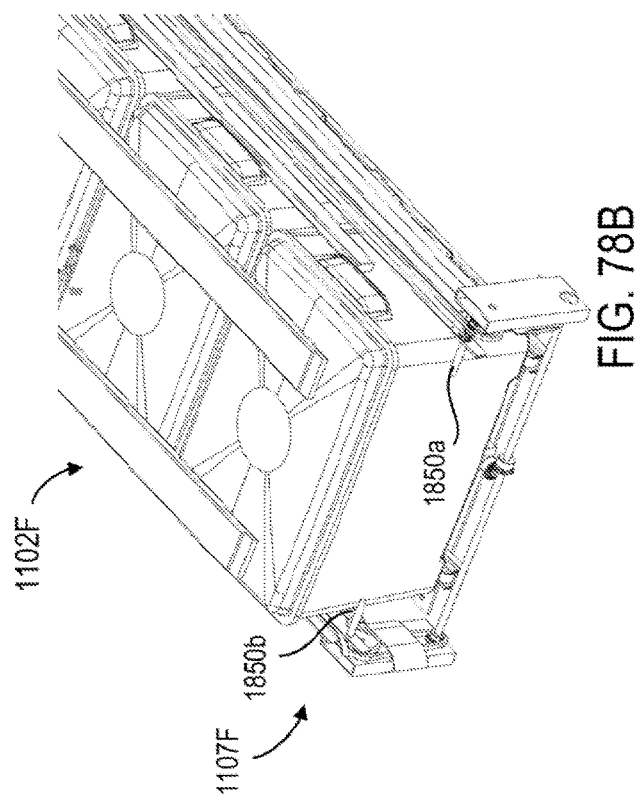
FIG. 78B depicts a close up view of the rear end of the rack of FIG. 78A.
Figure 79A:
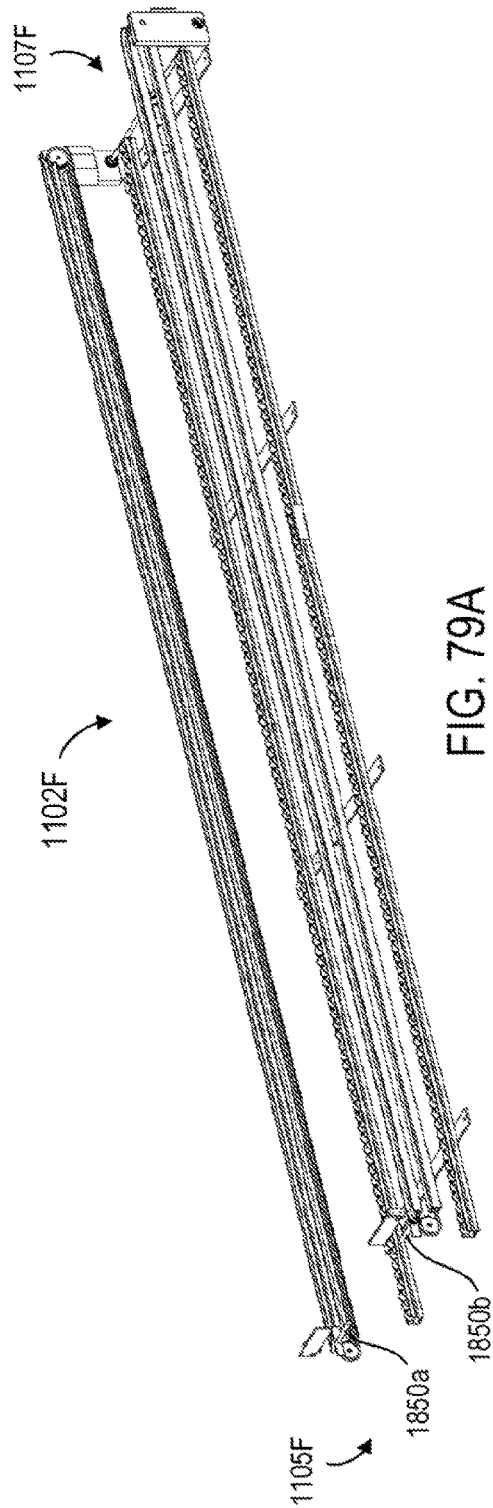
FIG. 79A depicts a front perspective view of the flow rack of FIG. 76A with a pair of bidirectional pusher tabs disposed at a front end of the rack in a horizontal position.
Figure 79B:
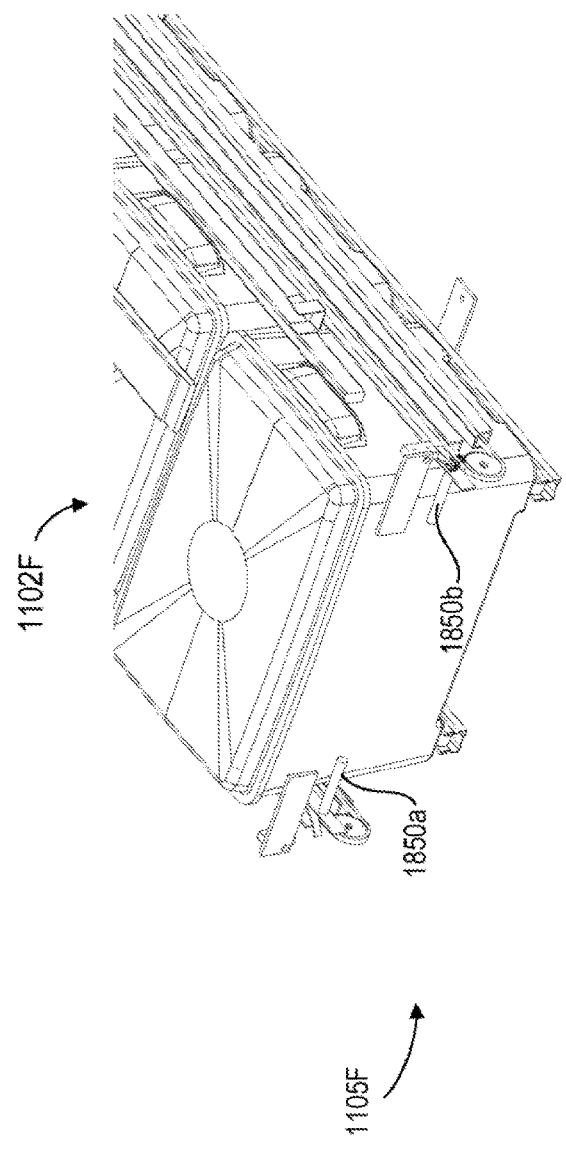
FIG. 79B depicts a close up view of the front end of the rack of FIG. 79A with a container loaded thereon.
Figure 80A:
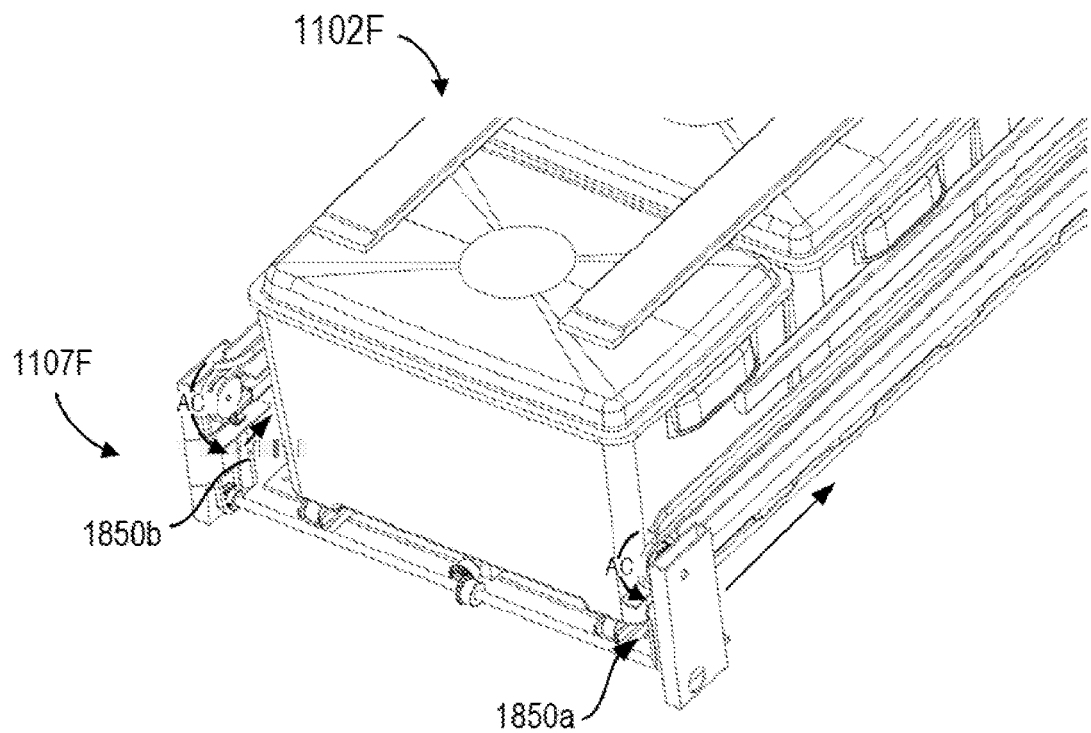
FIG. 80A depicts a close up view of the rear end of the rack of FIG. 79A with containers loaded thereon and the pair of bidirectional pusher tabs in dropped down lower position C.
Figure 80B:
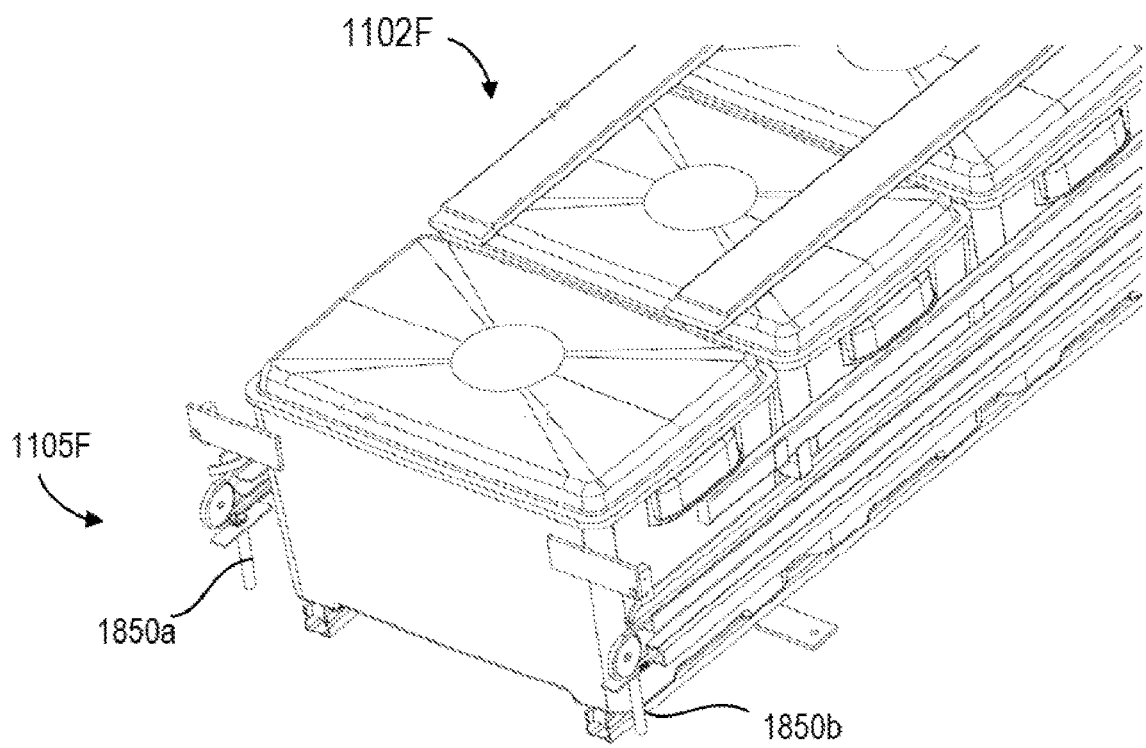
FIG. 80B depicts a close up view of the front end of the rack of FIG. 79A with containers loaded thereon and the pair of bidirectional pusher tabs in dropped down lower position D.

FIGS. 78A-80B depict the pair of bidirectional pusher tabs 1850*a-b* at the various positions described with regard to the schematic of FIG. 77. As described above, the pair of bidirectional pusher tabs 1850*a-b* are configured to travel the entire length of the rack 1102F, pushing containers 1200*a-n* off the front end 1105F during delivery to customers. They are also configured to change orientation when driven towards the back end 1107F, swinging around and down to a lower portion of the looped chain as shown in FIG. 80A. In this orientation, they can travel from the back end 1107F to the front end 1105F (as shown in FIG. 76B)

without disturbing the containers 1200*a-n* disposed on the rack 1102F, for example during loading of containers of clean laundry at the factory for return to customers. When the pair of bidirectional pusher tabs 1850*a-b* round the bend DB at the front end 1105F of the rack 1102F, the pair of bidirectional pusher tabs 1850*a-b* are forced back into a horizontal pushing orientation as shown in FIG. 78B. In this state, they can then push the one or more containers 12*a-n* backwards, ejecting them out of the back of the delivery vehicle 1000 and into the factory. Once all containers 1200*a-n* are ejected from the rack 1102F, the bidirectional pusher tabs 1850*a-b* continue transiting around the rear bend AC at the back end 1107F, flipping down and allowing new containers to be loaded into the rack 1102F from the factory. Once the rack 1102F is fully loaded, the bidirectional pusher tabs 1850*a-b* can rotate back around the back end 1107F from position C to A and flip back to the horizontal orientation, at the ready for pushing one or more containers off the front end 1105F during return delivery to one or more customers.

In implementations, the pair of bidirectional pusher tabs 1850*a-b* comprise a hinge comprising only a 90 degree range such that each tab 1850 drops under gravity while rounding a bend BD and AC from top to bottom positions (B to D and A to C) at the ends of the flow rack 1102F. Each one of the pair of bidirectional pusher tabs 1850*a-b* comprises a plate 1855*a-b* that slides on corresponding rails 1865*a-b* and prevents the chain 1860 from derailing under 30 lbs of force. In implementations, the pair of bidirectional pusher tabs 1850*a-b* further comprise a roller and bearing. In implementations, the pair of bidirectional pusher tabs 1850*a-b* comprise a v-groove roller pin configured to engage with a tube disposed on each of the rails 1865*a-b*.

In implementations, a container ejection mechanism comprises of at least one of the following: (1) a parallel chain-driven or spring-driven pusher or pusher tabs applying a force backwards (e.g., in the direction from the front end 1105 to the back end 1107 of a flow rack) to unload boxes at the factory, wherein 1105 and 1107 collectively represent all implementations of racks described herein; (2) a fixed or telescoping plunger that is pushed directly by the driver against the containers during unloading; (3) a fixed or telescoping arm with active or passive grippers on the end, that arm reaching into the truck transport volume from the rear vehicle and being grounded at a loading station (e.g. loading dock); and (4) a truck ramp that tilts the truck so that gravity pulls the boxes out.

Table 1 presents implementations of possible combinations of at least one manual and motorized flow racks, an elevator, a container eject mechanism, and a pusher drop down. Figure numbers referenced in Table 1 comprise example implementations, and the combinations herein are exemplary and non-exhaustive:

TABLE 1

|  | Rack pusher/puller | Compatible with elevator? | Compatible with Spring eject? | Compatible with pusher drop-down? | forward motion | reverse motion |
|---|---|---|---|---|---|---|
| Motorized | Spring-actuated (FIGS. 37-45, 47-48B) | Y | Y | Y | spring pulls pusher | motor reels in pusher |
|  | belt-driven (FIGS. 72A-73B) | Y | N | N | motor-driven belt | motor-driven belt |
|  | top/bottom chain with pusher (FIGS. 11-14B, 55-57B) | Y | Y | Y | motor-driven chain (or belt, shaft, etc.) | motor-driven chain (or belt, shaft, etc.) |
|  | side chain with crossbar (FIGS. 74A-75B) | Y | Y | N | motor-driven chain | motor-driven chain |
|  | side chain with tab (FIGS. 76A-77B) | Y | N | N | motor-driven chain | motor-driven chain |
| Manual | Spring-actuated (FIGS. 37-45, 47-48B) | N | Y | Y | spring pulls pusher | operator pushes on boxes |
|  | top/bottom chain with pusher (FIGS. 11-14B, 55-57B) | N | Y | Y | crank-driven chain (or belt, shaft, etc.) | crank-driven chain (or belt, shaft, etc.) |
|  | side chain with crossbar (FIGS. 74A-75B) | N | Y | N | crank-driven chain | crank-driven chain |
|  | side chain with tab | N | N | N | crank-driven | crank-driven |

TABLE 1-continued

| Rack pusher/puller | Compatible with elevator? | Compatible with Spring eject? | Compatible with pusher drop-down? | forward motion | reverse motion |
|---|---|---|---|---|---|
| (FIGS. 76A-77B) | | | | chain | chain |
| pull rope (FIGS. 68-71B) | N | Y | Y | operator pulls pusher w rope | operator pushes on boxes |

Figure 30:
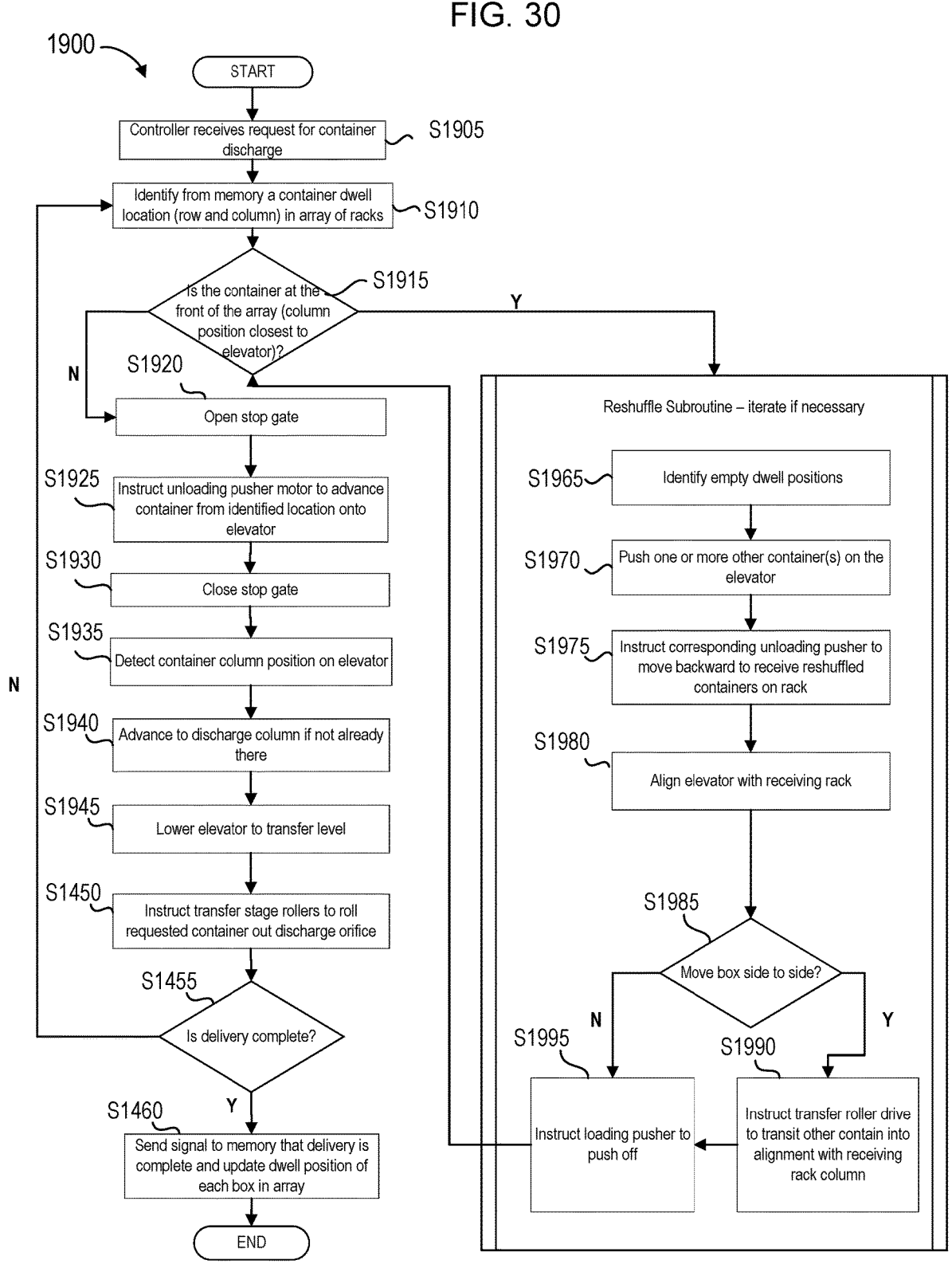
FIG. 30 depicts an example method of unloading a container from a rack array onto an elevator for discharge from a delivery vehicle.

Referring now to FIG. 30, any of the examples and implementations described previously with regard to an autonomous racking and elevator system 1300 are applicable to implementations described herein with regard to a method 1900 of autonomously unloading a container 1200 containing one or more clean or dirty deformable articles 12. Any of the methods described hereinafter are applicable in combination with any and all of the processes, devices, and systems described previously with regard to implementations mechanically compatible with an elevator 1400.

In implementations, a method 1900 of autonomously unloading one or more containers 1200 of deformable laundry articles from an array of racked containers disposed within a truck transport volume comprises receiving S1905, at a controller 1005, a request for retrieving a container 1200*a* having a mechanical, software tagged, and/or machine-readable identifier. In implementations, the identifier is at least one of a data marker stored in software and a detectable identifier configured to be detected and communicated to the controller via output signal of a sensor disposed on the one or more racks of the array. In implementations, the controller is in operable communication with a memory storing one or more identifiers and associated rack column and row positions within the array 1100, a drive of a plurality of pushers each positioned at one of a plurality of rows 1110*a-c*, an elevator drive configured to raise and lower a receiving surface 1407 of an elevator 1400, and one or more transverse drive rollers 1450 configured to move a container across the receiving surface in alignment with the rack columns. The method comprises identifying 1910 from the memory a rack and row position of the requested container 1200*a* within the array. The method comprises determining S1915 whether the identified rack and row position is at a front of the array, in a column adjacent the elevator.

Upon determining the identified rack and row position of the requested container 1200*a* is adjacent to the elevator 1400, the method comprises opening S1920 a stop gate 1130, instructing S1925 the unloading pusher of the identified row to push the container 1200*a* from the identified row and column position onto the elevator receiving surface. Optionally the stop gates close S1930 once the container 1200*a* is no longer supported by the identified row 1110. As previously described with regard to implementations, the controller 1005 is configured to receive one or more signals from a presence sensor disposed at least one of on and adjacent the receiving surface of the elevator 1400 for detecting a presence of a container on the receiving surface, the presence sensor outputting a signal to the controller via a communication network. The communication network is at least one of wired and wireless.

The method comprises detecting S1935 a container column position on the elevator. The method comprises advancing S1940 the container to a discharge column if not already there. The method comprises lowering S1945 the elevator to a transfer level and instructing S1450 one or more transfer rollers 1450 to roll the requested container 1200*a* out a discharge orifice 1060 (e.g., vehicle side access portal 1060). In implementations, the receiving surface 1407 of the elevator 1400 is below a lowest support surface of the array during alignment with the discharge orifice 1060. Once the requested container 1200*a* is discharged from a vehicle transport volume, the method comprises determining S1455 whether delivery is complete to the household or whether more containers are disposed on the array for delivery to the household. If delivery is complete the controller 1005 can send S1460 a signal to the memory that the requested container is delivered and update the row and column positions (e.g., dwell positions) corresponding to one or more remaining containers in the array.

In implementations, if the controller determines S1915 the requested container 1200*a* is not at the front of the array, the controller 1005 can execute one or more iterations of a reshuffling subroutine to move one or more blocking containers off the array, onto the elevator, and back onto the array at various new positions within rows having extra space for receiving the one or more blocking containers blocking the requested container from reaching the front of the array 1100. The reshuffling routine comprises identifying S1965 one or more open positions by a column and row location (dwell position) within the array, instructing a row pusher drive to push S1970 the one or more blocking containers onto the elevator 1400, and instructing S1975 an unloading pusher of a row identified as having extra space for receiving the one or more blocking containers to move backward to receive the one or more blocking containers from the elevator 1400. In implementations, the method comprises opening the stop gate prior to receiving the one or more blocking contains into the row identified as having extra space. The method comprises aligning S1980 the elevator receiving surface with the row (e.g., receiving rack) identified as having extra space for receiving the one or more blocking containers.

The method comprises determining S1985 whether each one of the one or more blocking containers received onto the elevator is in columnar alignment with the row identified as having extra space. If necessary, the method comprise instructing a transfer roller drive to transit the one or more blocking containers into alignment with a column corresponding to that of the row identified as having extra space before instructing a loading pusher 1410 of the elevator to push a blocking container off of the elevator and onto the row identified as having extra space. In implementations, the method then returns to determining S1915 whether the requested container is at the front of the array. If so, the method proceeds to unload the container and if not, the method will execute another iteration of the reshuffling routine.

As described previously with regard to implementations, one or more elevator position sensors are configured to detect a vertical location of the movable carriage 1405 and output a position signal. In implementations, as shown in FIGS. 21A-21B, the elevator 1400 comprises a plurality of loading pushers 1410a-c (individually, loading pusher 1410), each one of which is aligned with one of the plurality of columns 1115a-c and configured to push a container 1200 from the movable carriage 1405 onto one of the aligned plurality of columns 1115, 1115a-c of the array 1100. In implementations, the elevator 1400 comprises a plurality of loading pusher drives 1411a-c (see FIG. 36). Each one of the loading pusher drives is in operable communication with one of the plurality of loading pushers drive motors 1423a-c (FIG. 29) for moving the corresponding one of the loading pushers 1410a-c toward the front end 1105 of the array of flow racks 1100 to load a container 1200 into the array 1100. The controller 1005 thus is in operable communication with a plurality of unloading pusher drive motor 1123 for the unloading pushers 1120a-i, the plurality of loading pusher drives 1402, the drive motor 1455 of the movable carriage 1405, and the one or more elevator position sensors 1413. The controller 1005 is configured to instruct the drive motor 1455 to move the movable carriage 1405 to align the carriage support surface 1407 with one of the plurality of rows 1110a-c, receive the position signal, and determine whether the carriage support surface 1407 is aligned with the one of the plurality of rows 1110a-c for at least one of receiving and delivering a container 1200.

In addition to the method 1900 of autonomously unloading one or more containers from an autonomous racking and elevator system 1300, the devices, systems, and methods herein additionally or alternatively comprise loading and unloading rigid containers 12a-n of laundry articles into and out of a plurality of densely packed racks 1102 without an elevator. These methods apply to any of the racks previously described with regard to implementations. In implementations, the densely packed racks are disposed in a dense array 1100 within the vehicle transport volume 1035, and the controller 1005 is configured to identify an unloading position at each customer location along a delivery route as described previously with regard to implementations. In addition to unloading one or more specific customer containers for delivery along a travel route, methods comprise unloading containers of dirty laundry articles from the densely packed racks 1102 in the vehicle transport volume 1035 into a laundry facility (e.g., factory housing one or more process lines 100, 100a-c).

The racks 1102 of the array 1100 enable dense packing of a plurality of containers 1200 within a vehicle transport volume 1035 while allowing for ergonomic and swift access to one or more containers in the array. In implementations, the racks in an array 1100 comprise any of the sensors previously described with regard to implementations for detecting dwell positions of one or more containers and a status of the individual container positions as containers are loaded and unloaded from one or more racks, repositioning the remaining containers thereon. Additionally or alternatively, in implementations, a delivery person 10 interacts with at least one of a physical button disposed on one or more racks and a touch screen button on a user interface to communicate with the controller upon adding or removing a customer container from the array 1100. The delivery person can indicate a number of boxes added or removed, the rack location, and the customer identifier (e.g., at least of a name, address, unique customer identification number, etc.). The racks 1102 are configured to secure the containers during transport, loading, and unloading without a delivery person having to do more than open and close a gate at the front end 1105. This includes securing the containers after an arbitrary set of boxes has been removed, and as mechanical disturbances shake the racks, such as a vehicle hitting potholes during transit. The racks 1102 are also designed to operate within a range of orientations, including when tilted backwards and forwards up to 15 degrees or to either side, such as when a delivery vehicle is on a slope. Implementations of the racks 1102 therefore enable uninterrupted constraint and securing of the containers thereon without the added time and physical effort associated with tie downs and straps between interactions with the racks 1102.

For example, in implementations, removing a container 1200 from one or more of the implementations of racks 1102 described herein comprises a delivery person 10 entering the transport volume 1035 of a delivery vehicle 1000 at the front of the array 1100 of racks 1102 densely mounted within the transport volume for maximum holding capacity of a plurality of rigid containers. In implementations, as previously described the rigid containers 1200 comprise two or more uniform dimensions comprising at least a length and width defining a footprint area of the containers. In implementations, the controller 1005 is in operable communication with a pick light system installed in the transport volume for identifying which rack or racks from which one or more containers 1200 should be removed for delivery. The pick to light system can comprise at least one of lights, alphanumeric displays and bottoms collocated and disposed at the front ends 1105 of the racks 1102 in an array 1100. For example, the controller 1005 can illuminate a light at the end of a rack 1102 and display a number of containers to remove from the front end 1105 for delivery to a customer at the currently entered or detected (e.g., GPS) location along a travel route. While the densely packed array 1100 enables securely retaining and transporting a plurality of containers 1200 associated with specific ones of a plurality of customers, the controller-assisted picking system reduces or eliminates opportunities for a delivery person to retrieve an incorrect container for delivery to a customer to whom the container does not belong. Additionally, in implementations of wheeled flow racks 1102, the wheels enable quick and efficient loading and unloading off the front end 1105 when a container is guided off or on by a delivery person.

With a racks identified as containing the container or containers destined for a current delivery location, the delivery person opens the gate or gates 1130, 1132, 1730, retrieves a front container, and advances a pusher 1120 to slide one or more remaining containers forward on the rack. The delivery person 10 will repeat these steps until all identified customer containers associated with a delivery location are retrieved for delivering to a customer's door. The delivery person then closes the gate or gates 1130, 1132, 1730, and advances the pusher 1120 until a front most container of the remaining containers in the rack is flush with the gate.

Similarly, in implementations, the racks 1102 herein described with regard to implementations enable a delivery person to load one or more containers (e.g., containers of retrieved dirty laundry articles) into one or more racks 1102 in a densely packed array 1100 within a transport volume 1035. In implementations, loading a container into a rack 1102 comprises moving a pusher 1120 of the rack 1102 back one space such that the pusher is spaced apart from a container closes to the back end 1107 by a distance of at least one container depth (e.g., width dimension parallel to the length of the flow rack LF). In implementations the delivery person 10 pushes on the front container of the rack to move the one or more containers on the rack back to the pusher, making room for another container loaded thereon. The delivery person then inserts the container and repeats these steps until all containers are loaded into the rack 1102. The delivery person 10 then closes the gate 1130, 1132, 1730 to retain the containers 1200a-n on the rack 1102 during transport within the vehicle transport volume 1035, preventing them from sliding, rolling, bouncing off the front end 1105.

In implementations described herein, densely packed comprises a state of maximized occupancy of the plurality of containers 1200 within the vehicle transport volume. In implementations, as described previously with regard to implementations, each densely packed rack 1102 in an array 1100 of racks 1102 shares one or more structural support members with at least three other racks 1102 such that the tiers of racks are interconnected without free space therebetween. One or more of the structural support members is secured to one or more structural support beams or surfaces of the transport volume 1035 such that the array 110 is secured to prevent sliding, rotation, leaning or other structural compromise with loading, unloading, and transport within a moving vehicle 1000 along a delivery and pick up route. In addition to the array 1100 comprising densely packed tiers of racks, the racks 1102 in an array are also densely packed with one or more containers thereon comprising small (e.g., less than 5 cm) or no gaps between dwell locations along the length of the rack 1102 as described previously with regard to implementations.

As previously described with regard to implementations, each of the racks 1102 comprises a range of between about 5-15 dwell positions configured to receive and retain a corresponding 5-15 containers 1200 thereon. In implementations, each one of the plurality of containers 1200 weighs between about 5 to 50 lbs. In implementations, each one of the plurality of containers weighs about 30 lbs. In implementations, a collective maximum weight of a plurality of containers 1200a-i disposed on the array of flow racks 1100 is in a range of between about 50 to 100 percent of the weight of a structure defining the array of flow racks 1100. In examples, each one of the plurality of containers 1200a-i comprises outer envelope dimensions of at or around 12 inches by 22 inches by 14 inches. The flow racks 1102 are therefore designed such that a delivery person can easily lift each of the filled containers from the racks in an array in accordance with ergonomic lifting practices for delivery persons.

Returning now to the methods of loading and unloading the racks 1102 described previously with regard to implementations, a method of unloading one or more racks of an array 1100 at a laundry facility comprises emptying containers 1200a-n out a back end of a delivery vehicle 1000 and therefor off a back end 1107 of one or more racks 1102 in an array 1100 within the vehicle transport volume 1035. In implementations, a delivery person backs the vehicle 1000 into a loading dock or dock house at the laundry facility and opens rear doors of the vehicle. The delivery person or a facility operator aligns an extraction unit (e.g., a racking system, conveyor, flow rack, etc.) into alignment with the back of the vehicle and engages the extraction unit with the array 1100 to automatically actuate one or more pushers of the array to lower to a lay flat state or otherwise move to expose the back end 1107 of the rack 1102. Alternatively, a delivery person or facility operator can manually disengage the one or more pushers to lower them to a lay flat state.

With the pushers no longer blocking the back end 1107 of each rack 1102 in an array 1100, an eject mechanism (e.g., of bidirectional pusher tabs 1850a-b) pushes containers 1200 out of the one or more racks 1002 into an extraction unit. Additionally or alternative, as described previously with regard to implementations, (e.g., FIGS. 45-46) no eject mechanism is required and the plurality of racks are configured to be unloaded by at least one of tilting the delivery vehicle on an incline at an unloading dock and pushing on a front end of the containers in an array with hands or a tool to unload the containers from the array. Once all containers are unloaded from the one or more racks, new containers are pushed into the racks 1102 in the array for outgoing delivery, forcing the eject mechanisms to move back if necessary. Once the racks are loaded for outgoing delivery, the pushers 1120 of the racks in an array are either manually or automatically raised and returned to a resting, upright position. The one or more pushers can be spring loaded, for example. The extraction unit and or loading unit retracts back into the facility and the delivery person closes the doors on the rear of the vehicle. Additionally, in implementations, the delivery person adjusts the one or more pushers 1120 such that the rear most container on a rack is in contact with the pusher of that rack regardless of whether the rack is fully loaded thereby ensuring a container being pushed to the front position of each rack in an array for minimizing reach required to extract each container at a delivery location along a delivery route.

All of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors or circuitry or collection of circuits, e.g., a module) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Although the subject matter contained herein has been described in detail for the purpose of illustration, it is to be understood that such detail is solely for that purpose and that the present disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Other examples are within the scope and spirit of the description and claims. Additionally, certain functions described above can be implemented using software, hardware, firmware, hardwiring, or combinations of any of these.

Features implementing functions can also be physically located at various positions, including being distributed such that portions of functions are implemented at different physical locations.

What is claimed is:

1. An autonomous racking system for use with a mobile delivery vehicle, comprising an array of a plurality of flow racks comprising:
a plurality of rows each comprising two or more side-by-side flow racks and a plurality of columns each comprising two or more stacked flow racks, each one of the flow racks of the array of flow racks configured to receive thereon a plurality of containers each one of which is associated with a household,
a plurality of unloading pushers, each one of the plurality of unloading pushers being disposed at a back end of one or more of the plurality of containers disposed on each of the flow racks the array and being configured to push each one of the plurality of containers past a front end of the array of flow racks, and
a plurality of unloading pusher drives, each one of the unloading pusher drives being in operable communication with one of the plurality of unloading pushers for moving a corresponding one of the unloading pushers toward the front end of the array of flow racks;
a plurality of rollers disposed continuously along a length of each one of the flow racks in the array of flow racks, the plurality of rollers being configured to roll one or more of the plurality of containers disposed thereon toward the front end;
an elevator abutting the front end of the array and configured to receive one or more containers from at least one or more of the plurality of flow racks and a vehicle side access orifice, and deliver one or more containers to one or more of the plurality of flow racks, the elevator comprising
a movable carriage, the movable carriage extending across the plurality of columns and being in operable communication with an elevator drive motor configured to move the carriage up and down to align a carriage support surface with at least of one of the plurality of rows and a lower edge of the vehicle side access orifice disposed in a range of between about 0.25 to 2.25 meters from a ground upon which the delivery vehicle is disposed,
one or more elevator position sensors configured to detect a vertical location of the movable carriage and output a position signal,
a plurality of loading pushers, each one of the plurality of pushers being aligned with one of the plurality of columns and being configured to push a container off of the movable carriage and onto one of the aligned plurality of columns, and
a plurality of loading pusher drives, each one of the loading pusher drives being in operable communication with one of the plurality of loading pushers for moving the corresponding one of the loading pushers toward the front end of the array of flow racks; and
a controller in operable communication with plurality of unloading pusher drives, the plurality of loading pusher drives, the drive motor of the movable carriage, and the one or more elevator position sensors, wherein the controller is configured to
instruct the drive motor to move the movable carriage to align the carriage support surface with one of the plurality of rows,
receive the position signal, and
determine the carriage support surface is aligned with the one of the plurality of rows.

2. The system of claim 1, wherein the controller is further configured to
instruct a drive of the one of the plurality of unloading pushers associated with the aligned one of the plurality of rows and one of the plurality of columns to retract by a distance equal to a depth of a container, and
instruct a drive of an opposing one of the one of the plurality of loading pushers associated with the one of the plurality of columns to advance the one of the plurality of loading pushers to the front end of the array.

3. The system of claim 1, wherein the controller is further configured to
instruct a drive of the one of the plurality of unloading pushers associated with the aligned one of the plurality of rows and one of the plurality of columns to advance by a distance equal to a depth of a container.

4. The system of claim 1, wherein the plurality of rollers are interconnected to rotate simultaneously.

5. The system of claim 1, wherein the plurality of rollers are configured to rotate under an application of pushing force from an associated one of the plurality of unloading pushers.

6. The system of claim 1, wherein the array comprises a length extending substantially parallel to a length of a transport volume of the delivery vehicle and a width extending substantially perpendicular to the length of the transport volume and substantially parallel to one or more vehicle wheel axles.

7. The system of claim 6, wherein the movable carriage comprises a longitudinal axis substantially perpendicular to the length of the transport volume and substantially parallel to the one or more vehicle wheel axles, and wherein each flow rack of the array of flow racks is interlinked by at least one shared structural beam along the length of the array with at least one other adjacent flow rack of the array of flow racks.

8. The system of claim 1, wherein each flow rack of the array of flow racks further comprises a movable stop gate disposed at the front end.

9. The system of claim 1, wherein each one of the plurality of unloading pushers comprises a contact face configured to engage a back wall of a container disposed at the back end of the one or more of the plurality of containers disposed on each of the flow racks the array.

10. The system of claim 9, wherein the contact face is configured to enter the elevator upon pushing the container disposed at the back end of a plurality of containers on a flow rack onto the elevator.

11. The system of claim 1, wherein each one of the plurality of unloading pusher drives comprises a motor, and wherein each one of the motors comprises an operably linked encoder in communication with the controller, the encoder configured to output a signal indicative of pusher position between the front end and the back end.

12. The system of claim 1, wherein each one of the plurality of flow racks of the array of flow racks comprises a length extending parallel to a length of a transport volume of the delivery vehicle, wherein each one of the flow racks comprises a plurality of container positions along the length each configured to receive one of the plurality of containers, and wherein the plurality of container positions comprises a range of between about 5 to 15 positions.

13. The system of claim 12, wherein each one of the plurality of containers comprises a matching bottom surface length and width, wherein each one of the plurality of containers is associated with a single customer, and wherein the array of flow racks is configured to receive one or more containers associated with one or more of a plurality of customers.

14. The system of claim 13, wherein the controller is further configured to record in a memory in wired or wireless communication with the controller each location in the array of flow racks of one or more containers associated with each one of the plurality of customers, and wherein the controller is further configured to record in the memory which one or more containers have been unloaded from the array of flow racks along a route transited by the delivery vehicle.

15. The system of claim 13, wherein each of the containers comprises an identification marker for associating with one of a plurality of customers.

16. The system of claim 15, wherein the identification marker comprises at least one of a machine-readable serial number, a machine-readable barcode, a machine-readable QR code, an RFID code, and a NFC tag.

17. The system of claim 16, further comprising one or more identification sensors disposed on at least one of the array, the elevator, and the vehicle side access orifice, the one or more sensors being configured to detect the identification marker and output a signal to the controller indicative of the identification marker associated with a customer.

18. The system of claim 1, wherein each container of the plurality of containers is rigid and reusable.

19. The system of claim 1, further comprising one or more presence sensors for detecting at least one of the loading and unloading of one or more of the plurality of containers onto at least one of the elevator and the array of flow racks, and wherein the one or more sensors comprise at least one of an IR break beam sensor, an encoder, a limit switch, and a Hall-effect sensor, and wherein the one or more sensors is disposed at least one of at the vehicle side access orifice, the front of each flow rack in the array of flow racks, and at each container dwell position along a length of each flow rack in the array of flow racks.

20. The system of claim 1, wherein the elevator further comprises a plurality of bidirectionally driven transfer wheels disposed at a transfer level and configured to move one or more containers across a width of the vehicle in a travel direction comprising at least one of travel from the elevator to the vehicle side access orifice and travel from the vehicle side access orifice onto an elevator position aligned with one of the plurality of columns.

21. A method of autonomously unloading a container from an ordered array of racked containers disposed with in a truck transport volume, comprising:
receiving at a controller a request for retrieving a container comprising an identifier, the controller being in operable communication with a memory storing one or more identifiers and associated rack column and row positions within the array, a drive of a plurality of pushers each positioned at one of a plurality of rows, an elevator drive configured to raise and lower a receiving surface, and one or more transverse drives configured to move a container across the receiving surface in alignment with the rack columns;
identifying from the memory a rack and row position of the requested container;
determining whether the identified rack and row position is adjacent the elevator receiving surface;
instructing a stop gate to open upon determining the identified rack and row position is adjacent the elevator receiving surface,
instructing a drive of a pusher of the plurality of pushers that is associated with the row position to advance the requested container from the identified column and rack position onto the receiving surface of the elevator;
determining whether the identified column is adjacent an orifice of a truck transport volume;
instructing an elevator to lower the receiving surface to alignment with the orifice upon determining the identified column is adjacent the orifice; and
instructing the one or more transverse drives to advance the container through the orifice.

22. The method of claim 21, further comprising closing the stop gate once the requested container is received onto the receiving surface of the elevator.

23. The method of claim 22, wherein the controller is configured to receive one or more signals from a presence sensor disposed at least one of on and adjacent the receiving surface for detecting a presence of a container on the receiving surface, the presence sensor outputting a signal to the controller via a communication network.

24. The method of claim 23, wherein the communication network is at least of wired and wireless.

25. The method of claim 21, further comprising storing a datum in the memory indicative of the requested container being delivered to an associated household.

26. The method of claim 25, furthering comprising updating in the memory updated row and column positions of one or more other containers in the row.

27. The method of claim 21, further comprising determining whether delivery is complete and iterating, and if not complete, identifying column and row position of a next container.

28. The method of claim 27, wherein if the controller determines the requested container is not adjacent the receiving surface, the method further comprises reshuffling one or more other containers within the array by identifying open spots in the array and pushing the one or more other containers off and onto the array via the elevator to occupy one or more rows comprising the identified open spots in the array.

29. The method of claim 28, further comprising identifying row and column positions of one or more open container positions within the array.

30. The method of claim 21, wherein the receiving surface of the elevator is below a lowest support surface of the array during alignment with the orifice.

31. The method of claim 21, wherein the identifier is at least one of a data marker stored in software and a detectable identifier configured to be detected communicated to the controller via output signal of a sensor disposed on the one or more racks of the array.

32. A system of interconnected vehicle racks for receiving, constraining, and disgorging a plurality of customer containers from front and back ends of a vehicle transport volume, each rack comprising:
a support surface configured to receive and transit a plurality of containers thereon between a back end of the rack and a front end of the rack;
a movable pusher disposed at the back end of the rack, the movable pusher being configured to engage a back surface of a rear most container disposed on the surface and move bidirectionally between the back end and the front end;

a plurality of rollers disposed continuously along the support surface, the plurality of rollers being configured to roll one or more of the plurality of containers disposed thereon toward the front end; and at least one selectively deactivated stop gate disposed at a front of the rack for engaging a front surface of a front most container disposed on the surface, the stop gate configured to retain one or more containers on the support surface.

33. The system of claim 32, wherein a container is configured to be loaded and unloaded out either the front or the back end of the rack without disrupting an order of one or more containers disposed on the support surface.

34. The system of claim 32, wherein the movable pusher and the stop gate are configured to constrain one or more containers on the support surface and maintain an order of the one or more containers during loading, transport, and unloading out either of the front end or back end.

* * * * *